(12) United States Patent
Sull et al.

(10) Patent No.: US 7,624,337 B2
(45) Date of Patent: Nov. 24, 2009

(54) SYSTEM AND METHOD FOR INDEXING, SEARCHING, IDENTIFYING, AND EDITING PORTIONS OF ELECTRONIC MULTIMEDIA FILES

(75) Inventors: Sanghoon Sull, Seoul (KR); Hyeokman Kim, Seoul (KR); Min Gyo Chung, Seoul (KR); Ja-Cheon Yoon, Seoul (KR); Hyungseok Choi, Seoul (KR)

(73) Assignee: VMark, Inc., Palo Alto, CA (US)

( * ) Notice: Subject to any disclaimer, the term of this patent is extended or adjusted under 35 U.S.C. 154(b) by 813 days.

(21) Appl. No.: 09/911,293

(22) Filed: Jul. 23, 2001

(65) Prior Publication Data
US 2002/0069218 A1    Jun. 6, 2002

Related U.S. Application Data

(60) Provisional application No. 60/221,394, filed on Jul. 24, 2000, provisional application No. 60/221,843, filed on Jul. 28, 2000, provisional application No. 60/222,373, filed on Jul. 31, 2000, provisional application No. 60/271,908, filed on Feb. 27, 2001, provisional application No. 60/291,728, filed on May 17, 2001.

(51) Int. Cl.
*G06F 15/00* (2006.01)
(52) U.S. Cl. ........................ 715/201; 715/202; 715/203
(58) Field of Classification Search .............. 715/501.1, 715/500.1, 512, 723, 201, 202, 203; 709/231
See application file for complete search history.

(56) References Cited

U.S. PATENT DOCUMENTS 5,655,117 A    8/1997   Goldberg et al.

(Continued)

FOREIGN PATENT DOCUMENTS

EP          0 782 085 A1       2/1997

(Continued)

OTHER PUBLICATIONS

Almeroth, et al., "The interactive Multimedia Jukebox (IMJ): a new paradigm for the on-demand delivery of audio/video", Computer Networks and ISDN Systems 30, 1998, p. 431-441.*

(Continued)

*Primary Examiner*—Amelia Rutledge
(74) *Attorney, Agent, or Firm*—Jones Day; Edward L. Pencoske

(57) ABSTRACT

A method and system are provided for tagging, indexing, searching, retrieving, manipulating, and editing video images on a wide area network such as the Internet. A first set of methods is provided for enabling users to add bookmarks to multimedia files, such as movies, and audio files, such as music. The multimedia bookmark facilitates the searching of portions or segments of multimedia files, particularly when used in conjunction with a search engine. Additional methods are provided that reformat a video image for use on a variety of devices that have a wide range of resolutions by selecting some material (in the case of smaller resolutions) or more material (in the case of larger resolutions) from the same multimedia file. Still more methods are provided for interrogating images that contain textual information (in graphical form) so that the text may be copied to a tag or bookmark that can itself be indexed and searched to facilitate later retrieval via a search engine.

9 Claims, 65 Drawing Sheets

U.S. PATENT DOCUMENTS

| | | | |
|---|---|---|---|
| 5,740,304 A | | 4/1998 | Katsuyama et al. |
| 5,758,180 A | * | 5/1998 | Duffy et al. ................. 710/122 |
| 5,767,893 A | | 6/1998 | Chen et al. |
| 5,884,056 A | | 3/1999 | Steele |
| 5,918,237 A | * | 6/1999 | Montalbano ................ 715/513 |
| 5,966,121 A | * | 10/1999 | Hubbell et al. .............. 715/726 |
| 5,969,716 A | * | 10/1999 | Davis et al. ................. 715/726 |
| 5,973,679 A | * | 10/1999 | Abbott et al. ............ 715/500.1 |
| 6,064,380 A | * | 5/2000 | Swenson et al. ......... 715/500.1 |
| 6,075,576 A | * | 6/2000 | Tan et al. ................. 348/425.4 |
| 6,195,458 B1 | * | 2/2001 | Warnick et al. ............. 382/173 |
| 6,219,679 B1 | | 4/2001 | Brisebois et al. |
| 6,278,446 B1 | * | 8/2001 | Liou et al. .................. 345/328 |
| 6,349,330 B1 | | 2/2002 | Bernadett et al. |
| 6,356,971 B1 | * | 3/2002 | Katz et al. .................. 710/301 |
| 6,363,380 B1 | * | 3/2002 | Dimitrova ...................... 707/6 |
| 6,429,879 B1 | * | 8/2002 | Sturgeon et al. ............ 715/723 |
| 6,449,392 B1 | | 9/2002 | Divarkaran et al. ......... 382/235 |
| 6,460,038 B1 | * | 10/2002 | Khan et al. ................... 707/10 |
| 6,492,998 B1 | | 12/2002 | Kim et al. |
| 6,549,245 B1 | | 4/2003 | Lee ............................ 348/700 |
| 6,549,643 B1 | | 4/2003 | Toklu et al. |
| 6,553,180 B1 | | 4/2003 | Kikuchi et al. |
| 6,567,980 B1 | * | 5/2003 | Jain et al. ...................... 725/61 |
| 6,616,700 B1 | * | 9/2003 | Thum et al. .............. 715/500.1 |
| 6,654,933 B1 | * | 11/2003 | Abbott et al. ............... 715/513 |
| 6,693,652 B1 | | 2/2004 | Barrus et al. |
| 6,693,959 B1 | * | 2/2004 | Eckart et al. ........... 375/240.01 |
| 6,725,227 B1 | * | 4/2004 | Li .............................. 707/102 |
| 6,757,273 B1 | * | 6/2004 | Hsu et al. .................... 370/349 |
| 6,774,917 B1 | | 8/2004 | Foote et al. |
| 6,829,428 B1 | | 12/2004 | Quintos |
| 6,859,838 B1 | * | 2/2005 | Puranik et al. .............. 709/231 |
| 6,868,225 B1 | * | 3/2005 | Brown et al. .................. 386/83 |
| 6,904,227 B1 | | 6/2005 | Yamamoto et al. |
| 6,912,327 B1 | | 6/2005 | Hori et al. |
| 6,925,602 B1 | | 8/2005 | Clapper |
| 6,956,593 B1 | * | 10/2005 | Gupta et al. ................. 715/751 |

FOREIGN PATENT DOCUMENTS

| | | |
|---|---|---|
| EP | 0 833 258 A2 | 1/1998 |
| EP | 0 944 009 A2 | 9/1999 |
| KR | 10-0313713 B1 | 7/2000 |

OTHER PUBLICATIONS

H. Kim, J. Lee, J.-H. Yang, S. Sull, W.M. Kim, S.M.-H. Song, "Visual Rhythm and Shot Verification," Multimedia Tools and Applications, pp. 227-245, vol. 15, No. 3, Kluwer Academy Publishers, Dec. 2001.

H. Kim, J. Lee, S.M.-H. Song, "An Efficient Graphical Shot Verifier Incorporating Visual Rhythm," Proceedings of the Sixth IEEE International Conference on Multimedia Computing and Systems (ICMCS), pp. 827-834, Florence Italy, Jun. 1999.

H. Kim, S.-J. Park, J. Lee, W.M. Kim, S.M.-H. Song, "Processing of Partial Video Data for Detection of Wipes," Proceedings of Storage and Retrieval for Image and Video Databases VII, pp. 280-289, SPIE vol. 3656, SPIE, San Jose, California, Jan. 1999.

E. Chavez, J. Marroquin and G. Navarro, "Fixed Queries Array: A Fast and Economical Data Structure for Proximity Searching," Multimedia Tools and Applications, 113-135, vol. 14, No. 2, Kluwer Academy Publishers, 2001.

C.-H. Hsieh and Y.-J Liu, "Fast Search Algorithms for Vector Quantization of Images Using Multiple Triangle Inequalities and Wavelet Transform," IEEE Trans. on Image Processing, 321-328, vol. 9, No. 3, Mar. 2000.

S. Sull, J. Oh, S. Oh, S Moon-Ho Song, S. Lee, "Relevance Graph-Based Image Retrieval," Proc. of IEEE Conf. on Multimedia and Expo, pp. 713-716, vol. 2, New York, New York USA, Jul. 2000.

Selim Aksoy, Robert M. Haralick, "Graph-Theoretic Clustering for Image Grouping and Retrieval," Proc. of IEEE Conf. on Computer Vision and Pattern Recognition, pp. 63-68, vol. 1, Jun. 1999.

Apostolos N. Papadopoulos, Yannis Manolopoulos, "Structure-Based Similarity Search with Graph Histograms," Proc. of IEEE Database and Expert Systems Applications, pp. 174-178, 1999.

Qi Tian, Pengyu Hong, Thomas S. Huang, "Update Relevant Image Weights for Content-Based Image Retrieval Using Support Vector Machines," Proc. of IEEE Conf. on Multimedia and Expo, pp. 1199-1202, vol. 2, 2000.

K. Lee, H.S. Chang, S.S. Chun, H. Choi, S. Sull, "Perception-Based Image Transcoding for Universal Multimedia Access," Proc. IEEE ICIP, 475-478, vol. 2, Oct. 2001.

"A Fast Search Algorithm For Vector Quantization Using Wavelet Transform", by Hwang, Jeng and Chen, PIMRC'96, Seventh IEEE International Symposium on Personal, Indoor and Mobile Radio Communications, 1996, vol. 3, Oct. 15-18, 1996, pp. 1010-1013.

XP000110079, IBM TDB, vol. 33, No. 10A, Mar. 1991, pp. 344-345 Sequence Index For Temporal Data Descriptions.

XP000772256, IBM TDB, vol. 41, No. 1, Jan 1998, p. 687 Internal Placemarks for Uniform Resource Locator Bookmark Operations.

XP002944115, Network Working Group, RFC 2396, Aug. 1998, pp. 13-14 Uniform Resource Identifiers (URI): Generic Syntax.

* cited by examiner

* The media time point P is a start time of the segment A in the master file.

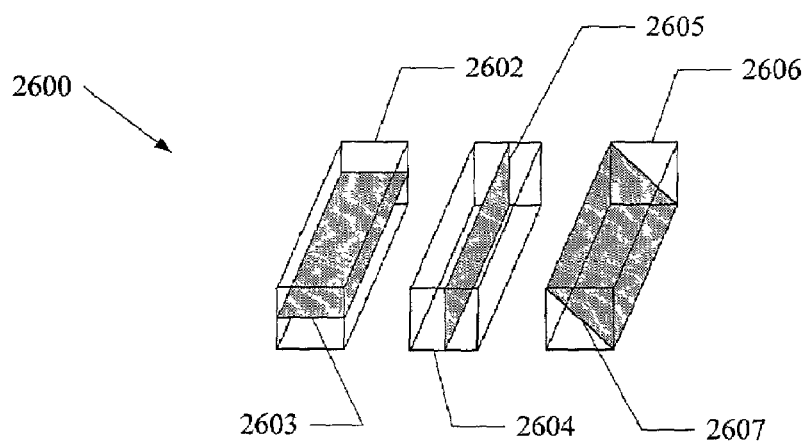
*Figure 26*
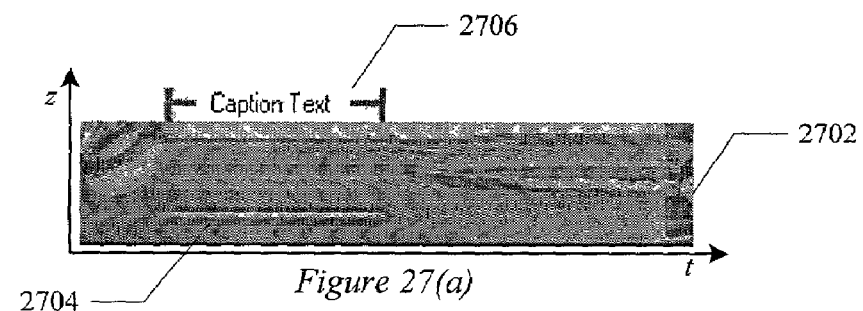
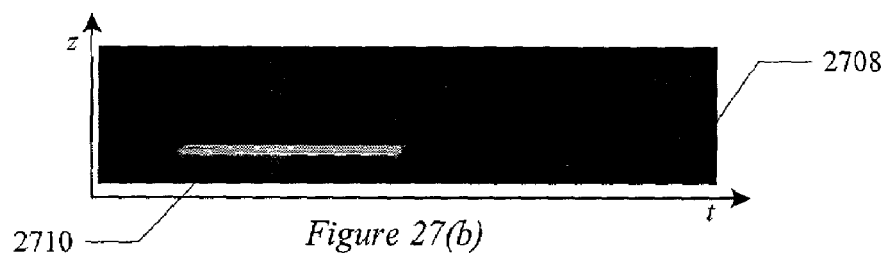
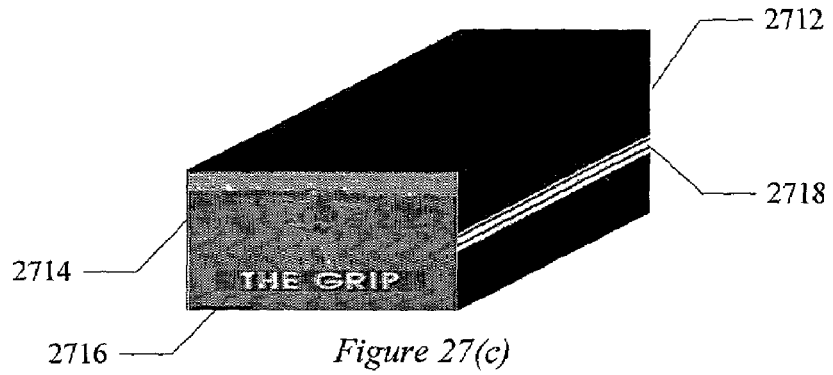
*Figure 27*

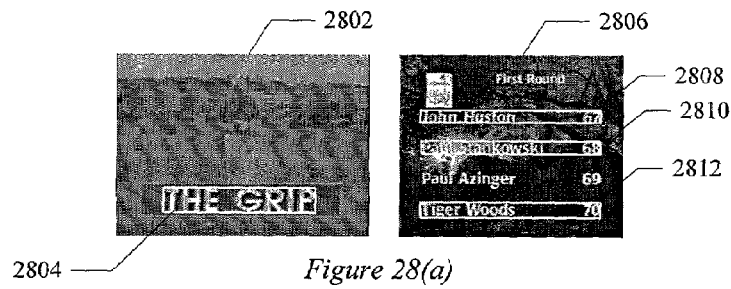
*Figure 28(a)*
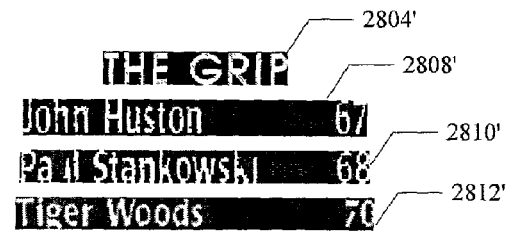
*Figure 28(b)*
Figure 28
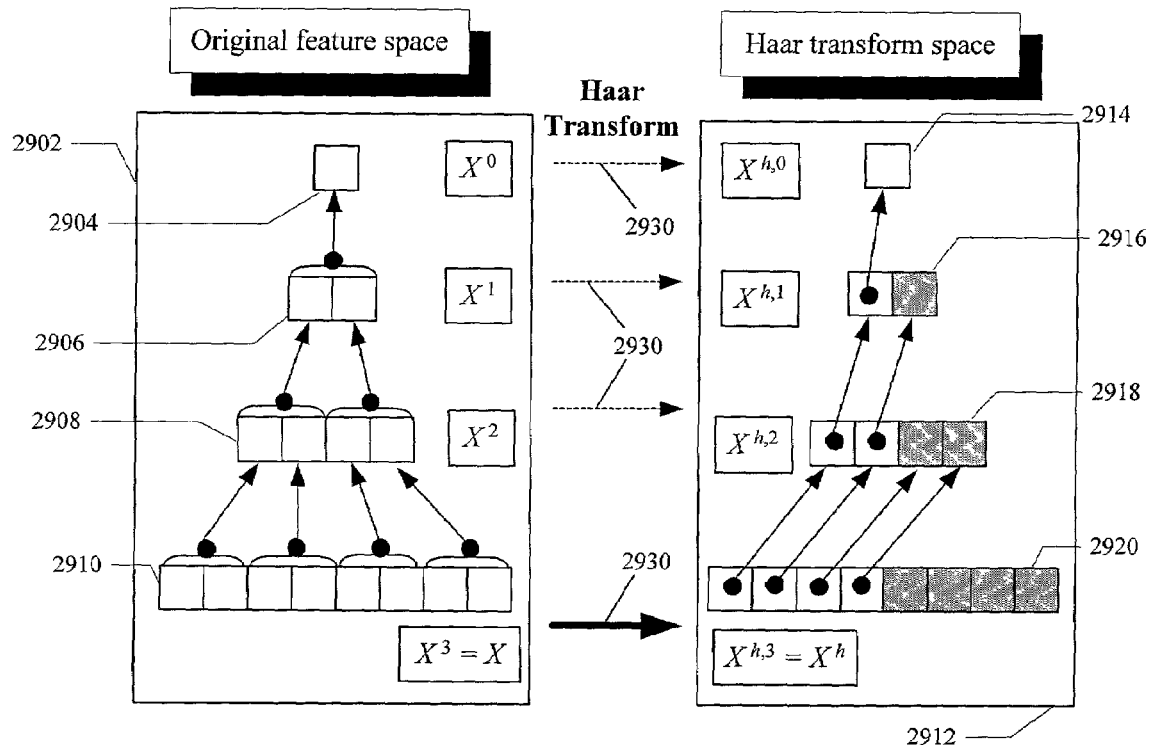
Figure 29

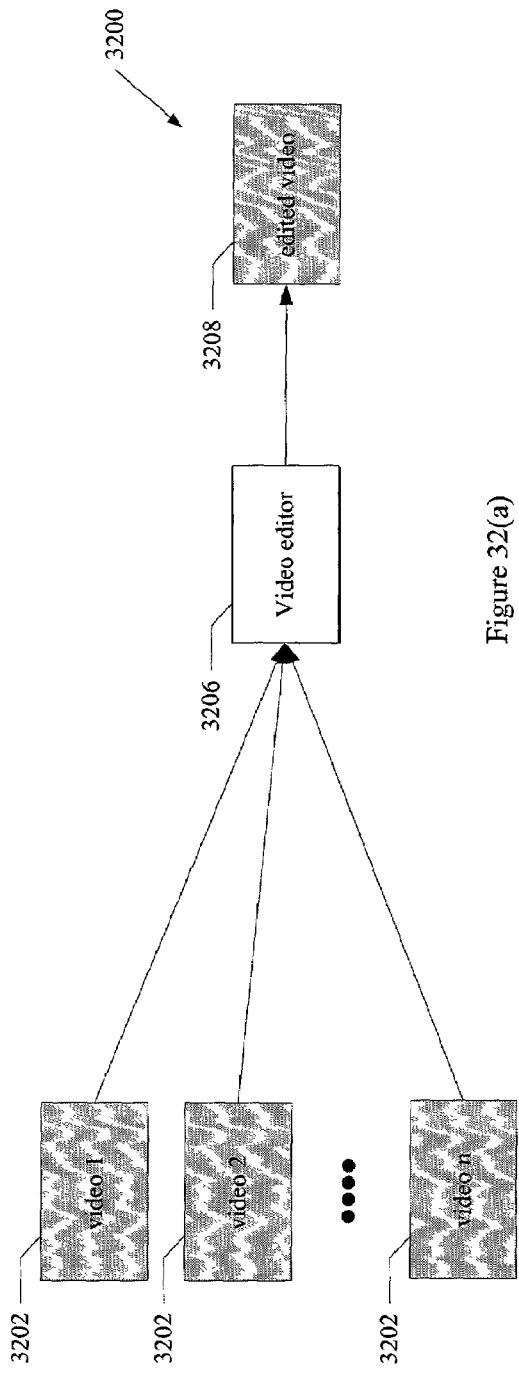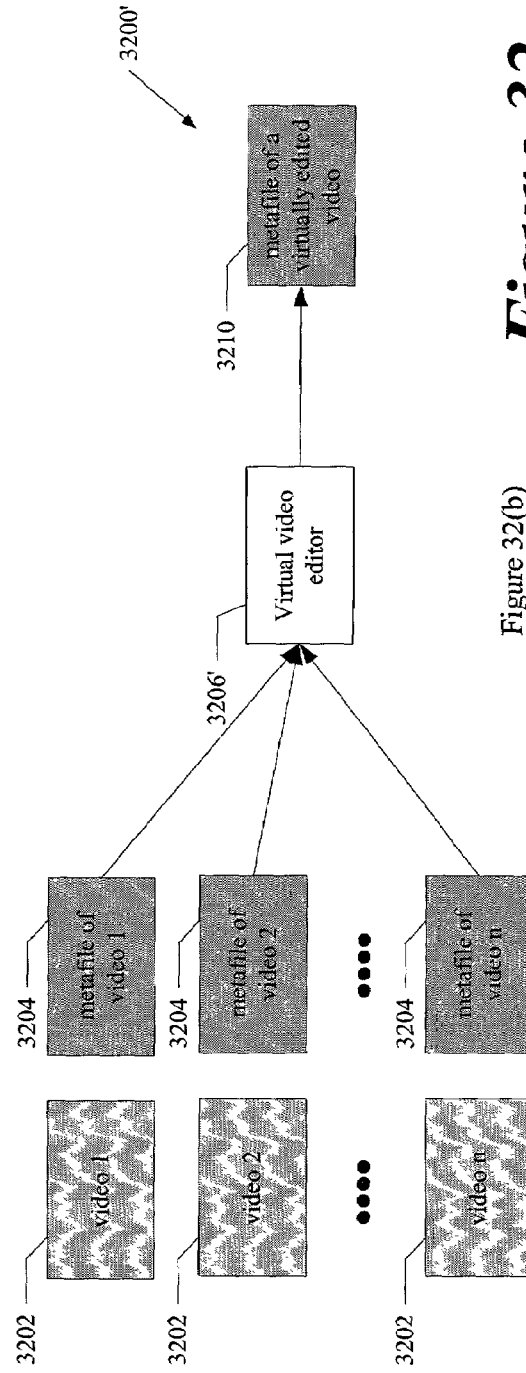
Figure 32

Figure 36

```xml
<!-- This is listing for metafile1.xml of the video1 stored at server1 -->
<Metadata>
    <Segment id="seg_7" title="segment 7" duration="580">
        <MediaURI> //www.video.server1/video1 </MediaURI>
        <StartTime> 0 </StartTime> <MediaDuration> 580 </MediaDuration>
        <Keyframe> .... </Keyframe> <Annotation> .... </Annotation>
        ....

<Segment id="seg_5" title="segment 5" duration="300">
            <StartTime> 0 </StartTime> <MediaDuration> 300 </MediaDuration>
            <Keyframe> .... </Keyframe> <Annotation> .... </Annotation>
            ....
            <Segment id="seg_1" title="segment 1" duration="100">
                <StartTime> 0 </StartTime> <MediaDuration> 100 </MediaDuration>
                <Keyframe> .... </Keyframe> <Annotation> .... </Annotation>
                ....
            </Segment>
            <Segment id="seg_2" title="segment 2" duration="200">
                <StartTime> 100 </StartTime> <MediaDuration> 200 </MediaDuration>
                <Keyframe> .... </Keyframe> <Annotation> .... </Annotation>
                ....
            </Segment>
        </Segment>

<Segment id="seg_6" title="segment 6" duration="280">
            <StartTime> 300 </StartTime> <MediaDuration> 280 </MediaDuration>
            <Keyframe> .... </Keyframe> <Annotation> .... </Annotation>
            ....
            <Segment id="seg_3" title="segment 3" duration="110">
                <StartTime> 300 </StartTime> <MediaDuration> 110 </MediaDuration>
                <Keyframe> .... </Keyframe> <Annotation> .... </Annotation>
                ....
            </Segment>
            <Segment id="seg_4" title="segment 4" duration="170">
                <StartTime> 410 </StartTime> <MediaDuration> 170 </MediaDuration>
                <Keyframe> .... </Keyframe> <Annotation> .... </Annotation>
                ....
            </Segment>
        </Segment>

</Segment>
</Metadata>
```

Figure 37

```xml
<!-- This is listing for metafile2.xml of the video2 stored at server1 -->
<Metadata>
    <Segment id="seg_e" title="segment e" duration="380">
        <MediaURI> //www.video.server1/video2 </MediaURI>
        <StartTime> 0 </StartTime> <MediaDuration> 380 </MediaDuration>
        <Keyframe> .... </Keyframe> <Annotation> .... </Annotation>
        ....

<Segment id="seg_d" title="segment d" duration="230">
            <StartTime> 0 </StartTime> <MediaDuration> 230 </MediaDuration>
            <Keyframe> .... </Keyframe> <Annotation> .... </Annotation>
            ....
            <Segment id="seg_a" title="segment a" duration="50">
                <StartTime> 0 </StartTime> <MediaDuration> 50 </MediaDuration>
                <Keyframe> .... </Keyframe> <Annotation> .... </Annotation>
                ....
            </Segment>
            <Segment id="seg_b" title="segment b" duration="180">
                <StartTime> 50 </StartTime> <MediaDuration> 180 </MediaDuration>
                <Keyframe> .... </Keyframe> <Annotation> .... </Annotation>
                ....
            </Segment>
        </Segment>

<Segment id="seg_c" title="segment c" duration="150">
            <StartTime> 230 </StartTime> <MediaDuration> 150 </MediaDuration>
            <Keyframe> .... </Keyframe> <Annotation> .... </Annotation>
            ....
        </Segment>

</Segment>
</Metadata>
```

Figure 38

```xml
<!-- This is listing for metafile3.xml of the video3 stored at server2. -->
<Metadata>
    <Segment id="seg_H" title="segment H" duration="620">
        <MediaURI> //www.video.server2/video3 </MediaURI>
        <StartTime> 0 </StartTime> <MediaDuration> 620 </MediaDuration>
        <Keyframe> .... </Keyframe> <Annotation> .... </Annotation>
        ....

<Segment id="seg_F" title="segment F" duration="410">
            <StartTime> 0 </StartTime> <MediaDuration> 410 </MediaDuration>
            <Keyframe> .... </Keyframe> <Annotation> .... </Annotation>
            ....
            <Segment id="seg_A" title="segment A" duration="80">
                <StartTime> 0 </StartTime> <MediaDuration> 80 </MediaDuration>
                <Keyframe> .... </Keyframe> <Annotation> .... </Annotation>
                ....
            </Segment>
            <Segment id="seg_B" title="segment B" duration="150">
                <StartTime> 80 </StartTime> <MediaDuration> 150 </MediaDuration>
                <Keyframe> .... </Keyframe> <Annotation> .... </Annotation>
                ....
            </Segment>
            <Segment id="seg_C" title="segment C" duration="180">
                <StartTime> 230 </StartTime> <MediaDuration> 180 </MediaDuration>
                <Keyframe> .... </Keyframe> <Annotation> .... </Annotation>
                ....
            </Segment>
        </Segment>

<Segment id="seg_G" title="segment G" duration="210">
            <StartTime> 410 </StartTime> <MediaDuration> 210 </MediaDuration>
            <Keyframe> .... </Keyframe> <Annotation> .... </Annotation>
            ....
            <Segment id="seg_D" title="segment D" duration="110">
                <StartTime> 410 </StartTime> <MediaDuration> 110 </MediaDuration>
                <Keyframe> .... </Keyframe> <Annotation> .... </Annotation>
                ....
            </Segment>
            <Segment id="seg_E" title="segment E" duration="100">
                <StartTime> 520 </StartTime> <MediaDuration> 100 </MediaDuration>
                <Keyframe> .... </Keyframe> <Annotation> .... </Annotation>
                ....
            </Segment>
        </Segment>
    </Segment>
</Metadata>
```

Figure 39

```
<!-- This is listing for metafile4.xml of the virtually edited video -->
<!-- according to the "copy metadata of selected segment" method. -->
<Metadata>
    <Segment id="seg_②" title="segment ②" duration="710">
        <Keyframe> ···· </Keyframe> <Annotation> ···· </Annotation>
        ....

<Segment id="seg_5" title="segment 5" duration="300">
            <MediaURI> //www.video.server1/video1 </MediaURI>
            <StartTime> 0 </StartTime> <MediaDuration> 300 </MediaDuration>
            <Keyframe> ···· </Keyframe> <Annotation> ···· </Annotation>
            ....
            <Segment id="seg_1" title="segment 1" duration="100">
                <StartTime> 0 </StartTime> <MediaDuration> 100 </MediaDuration>
                <Keyframe> ···· </Keyframe> <Annotation> ···· </Annotation>
                ....
            </Segment>
            <Segment id="seg_2" title="segment 2" duration="200">
                <StartTime> 100 </StartTime> <MediaDuration> 200 </MediaDuration>
                <Keyframe> ···· </Keyframe> <Annotation> ···· </Annotation>
                ....
            </Segment>
        </Segment>

<Segment id="seg_c" title="segment c" duration="150">
            <MediaURI> //www.video.server1/video2 </MediaURI>
            <StartTime> 230 </StartTime> <MediaDuration> 150 </MediaDuration>
            <Keyframe> ···· </Keyframe> <Annotation> ···· </Annotation>
            ....
        </Segment>

<Segment id="seg_①" title="segment ①" duration="260">
            <MediaURI> //www.video.server2/video3 </MediaURI>
            <Keyframe> ···· </Keyframe> <Annotation> ···· </Annotation>
            ....
            <Segment id="seg_A" title="segment A" duration="80">
                <StartTime> 0 </StartTime> <MediaDuration> 80 </MediaDuration>
                <Keyframe> ···· </Keyframe> <Annotation> ···· </Annotation>
                ....
            </Segment>
            <Segment id="seg_C" title="segment C" duration="180">
                <StartTime> 230 </StartTime> <MediaDuration> 180 </MediaDuration>
                <Keyframe> ···· </Keyframe> <Annotation> ···· </Annotation>
                ....
            </Segment>
        </Segment>

</Segment>
</Metadata>
```

Figure 40

```
<!-- This is listing for metafile4.xml of the virtually edited video -->
<!-- according to the "write URI of selected segment" method.       -->
<Metadata>
    <Segment id="seg_②" title="segment ②" duration="710">
        <Keyframe> .... </Keyframe> <Annotation> .... </Annotation>
        ....

<Segment xlink:form="simple" show="embed"
            href="//www.video.server1/metafile1.xml#id(seg_5)">
            <MediaURI> //www.video.server1/video1 </MediaURI>
        </Segment>

<Segment xlink:form="simple" show="embed"
            href="//www.video.server1/metafile2.xml#id(seg_c)">
            <MediaURI> //www.video.server1/video2 </MediaURI>
        </Segment>

<Segment id="seg_①" title="segment ①" duration="260">
            <MediaURI> //www.video.server2/video3 </MediaURI>
            <Keyframe> .... </Keyframe> <Annotation> .... </Annotation>
            ....
            <Segment xlink:form="simple" show="embed"
                href="//www.video.server2/metafile3.xml#id(seg_A)">
            </Segment>
            <Segment xlink:form="simple" show="embed"
                href="//www.video.server2/metafile3.xml#id(seg_C)">
            </Segment>
        </Segment>

</Segment>
</Metadata >
```

Figure 41

```
<!-- This is play list for a root segment of metafile4.xml -->
<Playlist>
    <MediaSegment>
        <MediaURI> //www.video.server1/video1 </MediaURI>
        <StartTime> 0 </StartTime> <MediaDuration> 300 </MediaDuration>
    </MediaSegment>

<MediaSegment>
        <MediaURI> //www.video.server1/video2 </MediaURI>
        <StartTime> 230 </StartTime> <MediaDuration> 150 </MediaDuration>
    </MediaSegment>

<MediaSegment>
        <MediaURI> //www.video.server2/video3 </MediaURI>
        <StartTime> 0 </StartTime> <MediaDuration> 80 </MediaDuration>
    </MediaSegment>

<MediaSegment>
        <MediaURI> //www.video.server2/video3 </MediaURI>
        <StartTime> 230 </StartTime> <MediaDuration> 180 </MediaDuration>
    </MediaSegment>
</Playlist>
```

| Workstation | Color PC | TV | HHC | PDA |
|---|---|---|---|---|
| | | | | |
| Content Value: 1.0 | 1.0 | 0 | 0 | 0 |
| | | | | |
| Content Value: 1.0 | 1.0 | .53 | .53 | .53 |

Figure 43

| | Workstation | Color PC | TV | HHC | PDA |
|---|---|---|---|---|---|
| | | | | | |
| Content Value: 1.0 | 1.0 | 0 | 0 | 0 |
| | | | | | |
| Content Value: 1.0 | 1.0 | 1.0 | .78 | .78 |

Figure 44

SYSTEM AND METHOD FOR INDEXING, SEARCHING, IDENTIFYING, AND EDITING PORTIONS OF ELECTRONIC MULTIMEDIA FILES

This application claims the benefit of provisional application No. 60/221,394, filed on Jul. 24, 2000, now expired; provisional application No. 60/221,843, filed on Jul. 28, 2000, now expired; provisional application No. 60/222,373, filed on Jul. 31, 2000, now expired; provisional application No. 60/271,908, filed on Feb. 27, 2001, now expired; and provisional application No. 60/291,728, filed on May 17, 2001, now expired.

BACKGROUND OF THE INVENTION

1. Field of the Invention

The present invention relates generally to marking multimedia files. More specifically, the present invention relates to applying or inserting tags into multimedia files for indexing and searching, as well as for editing portions of multimedia files, all to facilitate the storing, searching, and retrieving of the multimedia information.

2. Background of the Related Art

1. Multimedia Bookmarks

With the phenomenal growth of the Internet, the amount of multimedia content that can be accessed by the public has virtually exploded. There are occasions where a user who once accessed particular multimedia content needs or desires to access the content again at a later time, possibly at or from a different place. For example, in the case of data interruption due to a poor network condition, the user may be required to access the content again. In another case, a user who once viewed multimedia content at work may want to continue to view the content at home. Most users would want to restart accessing the content from the point where they had left off. Moreover, subsequent access may be initiated by a different user in an exchange of information between users. Unfortunately, multimedia content is represented in a streaming file format so that a user has to view the file from the beginning in order to look for the exact point where the first user left off.

In order to save the time involved in browsing the data from the beginning, the concept of a bookmark may be used. A conventional bookmark marks a document such as a static web page for later retrieval by saving a link (address) to the document. For example, Internet browsers support a bookmark facility by saving an address called a Uniform Resource Identifier (URI) to a particular file. Internet Explorer, manufactured by the Microsoft Corporation of Redmond, Wash., uses the term "favorite" to describe a similar concept.

Conventional bookmarks, however, store only the information related to the location of a file, such as the directory name with a file name, a Universal Resource Locator (URL), or the URI. The files referred to by conventional bookmarks are treated in the same way regardless of the data formats for storing the content. Typically, a simple link is used for multimedia content also. For example, to link to a multimedia content file through the Internet, a URI is used. Each time the file is revisited using the bookmark, the multimedia content associated with the bookmark is always played from the beginning.

FIG. 1 illustrates a list 108 of conventional bookmarks 110, each comprising positional information 112 and title 114. The positional information 112 of a conventional bookmark is composed of a URI as well as a bookmarked position 106. The bookmarked position is a relative time or byte position measured from a beginning of the multimedia content. The title 114 can be specified by a user, as well as delivered with the content, and it is typically used to make the user easily recognize the bookmarked URI in a bookmark list 108. For the case of a conventional bookmark without using a bookmarked position, when a user wants to replay the specified multimedia file, the file is played from the beginning of the file each time, regardless of how much of the file the user has already viewed. The user has no choice but to record the last accessed position on a memo and to move manually the last stopped point. If the multimedia file is viewed by streaming, the user must go through a series of buffering to find out the last accessed position, thus wasting much time. Even for the conventional bookmark with a bookmarked position, the same problem occurs when the multimedia content is delivered in live broadcast, since the bookmarked position within the multimedia content is not usually available, as well as when the user wants to replay one of the variations of the bookmarked multimedia content.

Further, conventional bookmarks do not provide a convenient way of switching between different data formats. Multimedia content may be generated and stored in a variety of formats. For example, video may be stored in the formats such as MPEG, ASF, RM, MOV, and AVI. Audio may be stored in the formats such as MID, MP3, and WAV. There may be occasions where a user wants to switch the play of content from one format to another. Since different data formats produced from the same multimedia content are often encoded independently, the same segment is stored at different temporal positions within the different formats. Since conventional bookmarks have no facility to store any content information, users have no choice but to review the multimedia content from the beginning and to search manually for the last-accessed segment within the content.

Time information may be incorporated into a bookmark to return to the last-accessed segment within the multimedia content. The use of time information only, however, fails to return to exactly the same segment at a later time for the following reasons. If a bookmark incorporating time information was used to save the last-accessed segment during the preview of multimedia content broadcast, the bookmark information would not be valid during a regular full-version broadcast, so as to return to the last-accessed segment. Similarly, if a bookmark incorporating time information was used to save the last-accessed segment during real-time broadcast, the bookmark would not be effective during later access because the later available version may have been edited or a time code was not available during the real-time broadcast.

Many video and audio archiving systems, consisting of several differently compressed files called "variations", could be produced from a single source multimedia content. Many web-casting sites provide multiple streaming files for a single video content with different bandwidths according to each video format. For example, CNN.com provides five different streaming videos for a single video content: two different types of streaming videos with the bandwidths of 28.8 kbps and 80 kbps, both encoded in Microsoft's Advanced Streaming Format (ASF). CNN.com also provides RM streaming format by RealNetworks, Inc. of Seattle, Wash. (RM), and a streaming video with the smart bandwidth encoded in Apple Computer, Inc.'s QuickTime streaming format (MOV). In this case, the five video files may start and end at different time points from the viewpoint of the source video content, since each variation may be produced by an independent encoding process varying the values chosen for encoding formats, bandwidths, resolutions, etc. This results in mismatches of time points because a specific time point of the source video content may be presented as different media time points in the five video files.

When a multimedia bookmark is utilized, the mismatches of positions cause a problem of mis-positioned playback. Consider a simple case where one makes a multimedia bookmark on a master file of a multimedia content (for example, video encoded in a given format), and tries to play another variation (for example, video encoded in a different format) from the bookmarked position. If the two variations do not start at the same position of the source content, the playback will not start at the bookmarked position. That is, the playback will start at the position that is temporally shifted with the difference between the start positions of the two variations.

The entire multimedia presentation is often lengthy. However, there are frequent occasions when the presentation is interrupted, voluntarily or forcibly, to terminate before finishing. Examples include a user who starts playing a video at work leaves the office and desires to continue watching the video at home, or a user who may be forced to stop watching the video and log out due to system shutdown. It is thus necessary to save the termination position of the multimedia file into persistent storage in order to return directly to the point of termination without a time-consuming playback of the multimedia file from the beginning.

The interrupted presentation of the multimedia file will usually resume exactly at the previously saved terminated position. However, in some cases, it is desirable to begin the playback of the multimedia file a certain time before the terminated point, since such rewinding could help refresh the user's memory.

In the prior art, the EPG (Electronic Program Guide) has played a crucial role as a provider of TV programming information. EPG facilitates a user's efforts to search for TV programs that he or she wants to view. However, EPG's two-dimensional presentation (channels vs. time slots) becomes cumbersome as terrestrial, cable, and satellite systems send out thousands of programs through hundreds of channels. Navigation through a large table of rows and columns in order to search for desired programs is frustrating.

One of the features provided by the recent set-top box (STB) is the personal video recording (PVR) that allows simultaneous recording and playback. Such STB usually contains digital video encoder/decoder based on an international digital video compression standard such as MPEG-1/2, as well as the large local storage for the digitally compressed video data. Some of the recent STBs also allow connection to the Internet. Thus, STB users can experience new services such as time-shifting and web-enhanced television (TV).

However, there still exist some problems for the PVR-enabled STBs. The first problem is that even the latest STBs alone cannot fully satisfy users' ever-increasing desire for diverse functionalities. The STBs now on the market are very limited in terms of computing and memory and so it is not easy to execute most CPU and memory intensive applications. For example, the people who are bored with plain playback of the recorded video may desire more advanced features such as video browsing/summary and search. Actually, all of those features require metadata for the recorded video. The metadata are usually the data describing content, such as the title, genre and summary of a television program. The metadata also include audiovisual characteristic data such as raw image data corresponding to a specific frame of the video stream. Some of the description is structured around "segments" that represent spatial, temporal or spatio-temporal components of the audio-visual content. In the case of video content, the segment may be a single frame, a single shot consisting of successive frames, or a group of several successive shots. Each segment may be described by some elementary semantic information using texts. The segment is referenced by the metadata using media locators such as frame number or time codes. However, the generation of such video metadata usually requires intensive computation and a human operator's help, so practically speaking, it is not feasible to generate the metadata in the current STB. Thus, one possible solution for this problem is to generate the metadata in the server connected to the STB and to deliver it to the STB via network. However, in this scenario, it is essential to know the start position of recorded video with respect to the video stream used to generate the metadata in the server/content provider in order to match the temporal position referenced by the metadata to the position of the recorded video.

The second problem is related to discrepancy between the two time instants: the time instant at which the STB starts the recording of the user-requested TV program, and the time instant at which the TV program is actually broadcast. Suppose, for instance, that a user initiated PVR request for a TV program scheduled to go on the air at 11:30 AM, but the actual broadcasting time is 11:31 AM. In this case, when the user wants to play the recorded program, the user has to watch the unwanted segment at the beginning of the recorded video, which lasts for one minute. This time mismatch could bring some inconvenience to the user who wants to view only the requested program. However, the time mismatch problem can be solved by using metadata delivered from the server, for example, reference frames/segment representing the beginning of the TV program. The exact location of the TV program, then, can be easily found by simply matching the reference frames with all the recorded frames for the program.

2. Search

The rapid expansion of the World Wide Web (WWW) and mobile communications has also brought great interest in efficient multimedia data search, browsing and management. Content-based image retrieval (CBIR) is a powerful concept for finding images based on image contents, and content-based image search and browsing have been tested using many CBIR systems. See, M. Flickner, Harpreet Sawhney, Wayne Niblack, Jonathan Ashley, Q. Huang, Byron Dom, Monika Gorkani, Jim Hafine, Denis Lee, Dragutin Petkovic, David Steele and Peter Yanker, "Query by image and video content: The QBIC system," *IEEE Computer*, Vol. 28. No. 9, pp. 23-32, September, 1995; Carson, Chad et al., "Region-Based Image Querying [Blobworld]," *Workshop on Content-Based Access of Image and Video Libraries*, Puerto Rico, June 1997; J. R. Smith and S. Chang, "Visually searching the web for content," *IEEE Multimedia Magazine*, Vol. 4, No. 3, pp. 12-20, Summer 1997, also Columbia U. CU/CTR Technical Report 459-96-25; A. Pentland, R. W. Picard and S. Sclaroff, "A Photobook: tools for content-based manipulation of image databases," in *Proc. Of SPIE Conf. On Storage and Retrieval for Image and Video Databases-II*, No. 2185, pp. 34-47, San Jose, Calif., February, 1944; J. R. Bach, C. Fuller, A. Guppy, A. Hampapur, B. Horowitz, R. Humphrey, R. C. Jain and C. Shu, "Virage image search engine: an open framework for image management," *Symposium on Electronic Imaging: Science and Technology—Storage & Retrieval for Image and Video Databases IV*, IS&T/SPIE'96, February, 1996; J. R. Smith and S. Chang, "VisualSEEk: A Fully Automated Content-Based Image Query System," *ACM Multimedia Conference*, Boston, Mass., November, 1996; Jing Huang, S. Ravi Kumar, Mandar Mitra, Wei-Jing Zhu and Ramin Zabih. "Image Indexing Using Color Correlograms,"

in *IEEE Conference on Computer Vision and Pattern Recognition*, pp. 762-768, June, 1997; and Simone Santini, and Ramesh Jain, "The 'El Nino' Image Database System," in *International Conference on Multimedia Computing and Systems*, pp. 524-529, June, 1999.

Currently, most of the content-based image search engines rely on low-level image features such as color, texture and shape. While high-level image descriptors are potentially more intuitive for common users, the derivation of high-level descriptors is still in its experimental stages in the field of computer vision and requires complex vision processing. Despite its efficiency and ease of implementation, on the other hand, the main disadvantage of low-level image features is that they are perceptually non-intuitive for both expert and non-expert users, and therefor, do not normally represent users' intent effectively. Furthermore, they are highly sensitive to a small amount of image variation in feature shape, size, position, orientation, brightness and color. Perceptually similar images are often highly dissimilar in terms of low-level image features. Searches made by low-level features are often unsuccessful and it usually takes many trials to find images satisfactory to a user.

Efforts have been made to overcome the limitations of low-level features. Relevance feedback is a popular idea for incorporating user's perceptual feedback in the image search. See, Y. Rui, T. Huang, and S. Mehrota, "A relevance feedback architecture in content-based multimedia information retrieval systems," in *IEEE Workshop on Content-based Access of Image and Video Libraries*, Puerto Rico, pp. 82-89, June, 1997; Yong Rui, Thomas S. Huang, Michael Ortega, and Sharad Mehrotra, "Relevance Feedback: A Power Tool in Interactive Content-Based Image Retrieval," in *IEEE Tran on Circuits and Systems for Video Technology*, Special Issue on Segmentation, Description, and Retrieval of Video Content, pp. 644-655, Vol. 8, No. 5, September, 1998; G. Aggarwal, P. Dubey, S. Ghosal, A. Kulshreshtha, and A. Sarkar, "iPURE: perceptual and user-friendly retrieval of images," in *Proc. of IEEE International Conference on Multimedia and Exposition*, Vol. 2, pp. 693-696, July, 2000; Ye Lu, Chunhui Hu, Xingquan Zhu, HongJiang Zhang and QiangYang, "A unified framework for semantics and feature based relevance feedback in image retrieval systems," in *Proc. of ACM International Conference on Multimedia*, pp. 31-37, October, 2000; H. Muller, W. Muller, S. Marchand-Maillet, and T. Pun, "Strategies for positive and negative relevance feedback in image retrieval," in *Proc. of IEEE Conference on Pattern Recognition*, Vol. 1, pp. 1043-1046, September, 2000; S. Aksoy, R. M. Haralick, F. A. Cheikh, and M. Gabbouj, "A weighted distance approach to relevance feedback," in *Proc. of IEEE Conference on Pattern Recognition*, Vol. 4, pp. 812-815, September, 2000; I. J. Cox, M. L. Miller, T. P. Minka, T. V. Papathomas, and P. N. Yianilos, "The Bayesian image retrieval system, PicHunter:theory, implementation, and psychophysical experiments," in *IEEE Transaction on Image Processing*, Vol. 9, pp. 20-37, January, 2000; P. Muneesawang, and Guan Ling, "Multi-resolution-histogram indexing and relevance feedback learning for image retrieval," in *Proc. of IEEE International Conference on Image Processing*, Vol. 2, pp. 526-529, January, 2001. A user can manually establish relevance between a query and retrieved images, and the relevant images can be used for refining the query. When the refinement is made by adjusting a set of low-level feature weights, however, the user's intent is still represented by low-level features and their basic limitations still remain.

Several approaches have been made to the integration of human perceptual responses and low-level features in image retrieval. One notable approach is to adjust an image's feature's distance attributes based on the human perceptual input. See, Simone Santini, and Ramesh Jain, "The 'El Nino' Image Database System," in *International Conference on Multimedia Computing and Systems*, pp. 524-529, June, 1999. Another approach, called "blob world," combines low-level features to derive slightly higher-level descriptions and presents the "blobs" of grouped features to a user to provide a better understanding of feature characteristics. See, Carson, Chad, et al., "Region-Based Image Querying [Blobworld]," *Workshop on Content-Based Access of Image and Video Libraries*, Puerto Rico, June, 1997. While those schemes successfully reflect a user's intent to some degree, it remains to be seen how grouping of features or feature distance modification can achieve the perceptual relevance in image retrieval. A more traditional computer vision approach to the derivation of high-level object descriptors based on generic object recognition has been presented for image retrieval. See, David A. Forsyth and Margaret Fleck, "Body Plans," in *IEEE Conference on Computer Vision and Pattern Recognition*, pp. 678-683, June, 1997. Due to its limited feasibility for general image objects and complex processing, its utility is still restricted.

With the rapid proliferation of large image/video databases, there has been an increasing demand for effective methods to search the large image/video databases automatically by their content. For a query image/video clip given by a user, these methods search the databases for the images/videos that are most similar to the query. In other words, the goal of the image/video search is to find best matches to the query image/video from the database.

Several approaches have been made towards the development of the fast, effective multimedia search methods. Milanes et al. utilized hierarchical clustering to organize an image database into visually similar groupings. See, R. Milanese, D. Squire, and T. Pun, "Correspondence analysis and hierarchical indexing for content-based image retrieval," in *Proc. IEEE Int. Conf. Image Processing*, Vol. 3, Lausanne, Switzerland, pp. 859-862, September, 1996. Zhang and Zhong provided a hierarchical self-organizing map (HSOM) method to organize an image database into a two-dimensional grid. See, H. J. Zhang and D. Zhong, "A scheme for visual feature based image indexing," in *Proc. SPIE/IS&T Conf. Storage Retrieval Image Video Database III*, Vol. 2420, pp. 36-46, San Jose, Calif., February, 1995. However, a weakness of HSOM is that it is generally too computationally expensive to apply to a large multimedia database.

In addition, there are other well known solutions using Voronoi diagram, Kd-tree, and R-tree. See, J. Bentley, "Multidimensional binary search trees used for associative searching," *Comm. of the ACM*, Vol. 18, No. 9, pp. 509-517, 1975; S. Brin, "Near neighbor search in large metric spaces," in *Proc. 21$^{st}$ Conf. On Very Large Databases (VLDB'95)*, Zurich, Switzerland, pp. 574-584, 1995. However, it is also known that those approaches are not adequate for the high dimensional feature vector spaces, and thus, they are useful only in low dimensional feature spaces.

Peer to Peer Searching

Peer-to-Peer (P2P) is a class of applications making the most of previously unused resources (for example, storage, content, and/or CPU cycles), which are available on the peers at the edges of networks. P2P computing allows the peers to share the resources and services, or to aggregate CPU cycles, or to chat with each other, by direct exchange. Two of the more popular implementations of P2P computing are Napster and Gnutella. Napster has its peers register files with a broker, and uses the broker to search for files to copy. The broker plays the role of server in a client-server model to facilitate the interaction between the peers. Gnutella has peers register files with network neighbors, and searches the P2P network for files to copy. Since this model does not require a centralized broker, Gnutella is considered to be a true P2P system.

3. Editing

In the prior art, video files were edited through video editing software by copying several segments of the input videos and pasting them to an output video. The prior art method, however, confronts two major problems mentioned below.

The first problem of the prior art method is that it requires additional storage to store the new version of an edited video file. Conventional video editing software generally uses the original input video file to create an edited video. In most of the cases, editors having a large database of videos attempt to edit the videos to create a new one. In this case, the storage is wasted storing duplicated portions of the video. The second problem with the prior art method is that a whole new metadata have to be generated for a newly created video. If the metadata are not edited in accordance with the edition of the video, even if the metadata for the specific segment of the input video are already constructed, the metadata may not accurately reflect the content. Because considerable effort is required to create the metadata of videos, it is desirable to reuse efficiently existing metadata, if possible.

Metadata of a video segment contain textual information such as time information (for example, starting frame number and duration, or starting frame number as well as the finishing frame number), title, keyword, and annotation, as well as image information such as the key frame of a segment. The metadata of segments can form a hierarchical structure where the larger segment contains the smaller segments. Because it is hard to store both the video and their metadata into a single file, the video metadata are separately stored as a metafile, or stored in a database management system (DBMS).

If metadata having a hierarchical structure are used, browsing a whole video, searching for a segment using the keyword and annotation of each segment, and using the key frames of each segment for visual summary of the video are supported. Also, not only does it support the existing simple playback, but also the playback and repeated playback of a specific segment. Therefor, the use of hierarchically-structured metadata is becoming popular.

4. Transcoding

With the advance of information technology, such as the popularity of the Internet, multimedia presentation proliferates into ever increasing kinds of media, including wireless media. Multimedia data are accessed by ever increasing kinds of devices such as hand-held computers (HHCs), personal digital assistants (PDAs), and smart cellular phones. There is a need for accessing multimedia content in a universal fashion from a wide variety of devices. See, J. R. Smith, R. Mohan and C. Li, "Transcoding Internet Content for Heterogeneous Client Devices," in *Proc. ISCASA*, Monterey, Calif., 1998.

Several approaches have been made to enable effectively such universal multimedia access (UMA). A data representation, the InfoPyramid, is a framework for aggregating the individual components of multimedia content with content descriptions, and methods and rules for handling the content and content descriptions. See, C. Li, R. Mohan and J. R. Smith, "Multimedia Content Description in the InfoPyramid," in *Proc. IEEE Intern. Conf. on Acoustics, Speech and Signal Processing*, May, 1998. The InfoPyramid describes content in different modalities, at different resolutions and at multiple abstractions. Then a transcoding tool dynamically selects the resolutions or modalities that best meet the client capabilities from the InfoPyramid. J. R. Smith proposed a notion of importance value for each of the regions of an image as a hint to reduce the overall data size in bits of the transcoded image. See, J. R. Smith, R. Mohan and C. Li, "Content-based Transcoding of Images in the Internet," in *Proc. IEEE Intern. Conf. on Image Processing*, October, 1998; S. Paek and J. R. Smith, "Detecting image Purpose in World-Wide Web Documents," in *Proc. SPIE/IS&T Photonics West, Document Recognition*, January, 1998. The importance value describes the relative importance of the region/block in the image presentation compared with the other regions. This value ranges from 0 to 1, where 1 stands for the highest important region and 0 for the lowest. For example, the regions of high importance are compressed with a lower compression factor than the remaining part of the image. Then, the other parts of the image are first blurred and then compressed with a higher compression factor in order to reduce the overall data size of the compressed image.

When an image is transmitted to a variety of client devices with different display sizes, a scaling mechanism, such as format/resolution change, bit-wise data size reduction, and object dropping, is needed. More specifically, when an image is transmitted to a variety of client devices with different display sizes, a system should generate a transcoded (e.g., scaled and cropped) image to fit the size of the respective client display. The extent of transcoding depends on the type of objects embedded in the image, such as cards, bridges, face, and so forth. Consider, for example, an image containing an embedded text or a human face. If the display size of a client device is smaller than the size of the image, sub-sampling and/or cropping to fit the client display must reduce the spatial resolution of the image. Users very often in such a case have difficulty in recognizing the text or the human face due to the excessive resolution reduction. Although the importance value may be used to provide information on which part of the image can be cropped, it does not provide a quantified measure of perceptibility indicating the degree of allowable transcoding. For example, the prior art does not provide the quantitative information on the allowable compression factor with which the important regions can be compressed while preserving the minimum fidelity that an author or a publisher intended. The InfoPyramid does not provide either the quantitative information about how much the spatial resolution of the image can be reduced or ensure that the user will perceive the transcoded image as the author or publisher initially intended.

5. Visual Rhythm

Fast Construction of Visual Rhythm

Once the digital video is indexed, more manageable and efficient forms of retrieval may be developed based on the index that facilitate storage and retrieval. Generally, the first step for indexing and retrieving of visual data is to temporally segment the input video, that is, to find shot boundaries due to camera shot transitions. The temporally segmented shots can improve the storing and retrieving of visual data if keywords to the shots are also available. Therefor, a fast and accurate automatic shot detector needs to be developed as well as an automatic text caption detector to automatically annotate keywords to the temporally segmented shots.

Even if abrupt scene changes are relatively easy to detect, it is more difficult to identify special effects, such as dissolve and wipe. Unfortunately, these special effects are normally used to stress the importance of the scene change (from a content point of view), so they are extremely relevant therefor they should not be missed. However, the wipe sequence detection method, relative to dissolve sequence, is less discussed and concerned. For scene change detection, a matching process between two consecutive frames is required. In order to segment a video sequence into shots a dissimilarity measure between two frames must be defined. This measure must return a high value only when two frames fall in different shots. Several researchers have used the dissimilarity measure based on the luminance or color histogram, correlogram, or any other visual feature to match two frames. However, these approaches usually produce many false alarms and it is very hard for humans to exactly locate various types of shots (especially dissolves and wipes) of a given video even when the dissimilarity measure between two frames are plotted, for example when they are plotted in 1-D graph where the horizontal axis represents time of a video sequence and the vertical axis represents the dissimilarity values between the histograms of the frames along time. They also require high computation load to handle different shapes, directions and patterns of various wipe effects. Therefor, it is important to develop a tool that enables human operator to efficiently verify the results of automatic shot detection where there usually might be many falsely detected and missing shots. Visual rhythm satisfies much of the above conditions.

Visual rhythm contains distinctive patterns or visual features for many type of video editing effects, especially for all wipe-like effects which manifest as visually distinguishable lines or curves on the visual rhythm with very little computational time, which enables an easy verification of automatically detected shots by human without actually playing the whole individual frame sequence to minimize or possible eliminate all false as well as missing shots. Visual rhythm on the other hand contains visual features readily available to detect caption text also. See, H. Kim, J. Lee and S. M. Song, "An efficient graphical shot verifier incorporating visual rhythm", in *Proceedings of IEEE International Conference on Multimedia Computing and Systems*, pp. 827-834, June, 1999.

Detecting Text in Video and Graphic Images

As contents become readily available on wide area networks such as the Internet, archiving, searching, indexing and locating desired content in large volumes of multimedia containing image and video, in addition to the text information, will become even more difficult. One important source of information about image and video is the text contained therein. The video can be easily indexed if access to this textual information content is available. The text provides clear semantics of video and are extremely useful in deducing the contents of video.

There are many ways that segment and recognize text in printed documents. Current video research tackles the text caption recognition problem as a series of sub-problems to: (a) identify the existence and location of text captions in complex background; (b) segment text regions; and (c) post-process the text regions for recognition using a standard OCR. Most current research focuses on tackling sub-problems (a) and (b) in raw spatial domain, with a few methods that can be extended to compressed domain processing.

A large number of methods has been studied extensively in recent years to detect text frames in uncompressed images and video. Ohya et al. performed character extraction through local thresholding and detected character candidate regions by evaluating gray level differences between adjacent regions. See, J. Ohya, A, Shio and S. Akamatsu, "Recognizing Characters in Scene Image," in *IEEE Trans. On pattern Analysis and Machine Intelligence*, Vol. 16, pp. 214-224. Haupmann and Smith used the spatial context of text and high contrast of text regions in scene images to merge large numbers of horizontal and vertical edges in spatial proximity to detect text. See, A. Haupmann, M. Smith, "Text, Speech, and Vision for Video Segmentation: The Informedia Project," in *AAAI Symposium on Computational Models for Integrating Language and Vision*, 1995. Shim et al. introduced a generalized region labeling algorithm to find homogeneous regions for text extraction. See, J. Shim, C. Dorai and M. Smith, "Automatic Text Extraction from Video for Content-Based Annotation and Retrieval," in *Proc. ICPR*, pp. 618-620, 1998. Manmatha showed the algorithm to detect and segment texts as regions of distinctive texture using pyramid technique for handling text fonts of different sizes. See, W. Manmatha, "Finding Text in Images," in *Proc. of ACM Int'l Conf. On Digital Libraries*, 3-12. Lienhart and Stuber provided Split-and-Merge algorithm based on characteristics of artificial text to segment text. See, R. Lienhart, "Automatic Text Recognition for Video Indexing," in *Proc. Of ACM MM*, pp. 11-20. Doermann and Kia used wavelet analysis and employed a multi-frame coherence approach to cluster edges into rectangular shape. See, L. Doermann, 0. Kia, "Automatic Text Detection and Tracking in Digital Video," in *IEEE Trans. On Image Processing*, Vol. 9, pp. 147-156. Sato et al. adopted a multi-frame integration technique to separate static text from moving background. See, T. Sato, T. Kanade and S. Satoh, "Video OCR: Indexing Digital News Libraries by Recognition of Superimposed Captions," in *Multimedia Systems*, Vol. 7, pp. 385-394.

Finally, several compressed domain methods have also been proposed to detect text regions. Yeo and Liu proposed a method for the detection of text caption events in video by modified scene change detection which cannot handle captions that gradually enter or disappear from frames. See, B. L. Yeo, "Visual Content Highlighting Visa Automatic Extraction of Embedded Captions on MPEG Compressed Video," in *SPIE/IS&T Symp. on Electronic Imaging Science and Technology*, Vol. 2668, 1996. Zhong et al. examined the horizontal variations of AC values in DCT to locate text frames and examined the vertical intensity variation within the text regions to extract the final text frames. See, Y. Zhong, K. Karu and A. Jain, "Automatic captions localization in compressed video," in *IEEE Trans. On PAMI*, 22(4), pp. 385-392. Zhong derived a binarized gradient energy representation directly from DCT coefficients which are subject to constraints on text properties and temporal coherence to locate text. See, Y. Zhong, "Detection of text captions in compressed domain video," in *Proc. Of Multimedia Information Retrieval Workshop ACM Multimedia'2000*, November 201-204. However, most of the compressed domain methods restrict the detection of text in I-frames of a video because it is time-consuming to obtain the AC values in DCT for intra-frame coded frames.

There is, therefor, a need in the art for a method and system that will enable the tagging of multimedia images for indexing, editing, searching and retrieving. There is also a need in the art to enable the indexing of textual information that is embedded in graphical images or other multimedia data so that the text in the image can also be tagged, indexed, searched and retrieved, as is other textual information. Further, there is also a need in the art for editing multimedia data for display, indexing, and searching in ways the prior art does not provide.

SUMMARY OF THE INVENTION

The invention overcomes the above-identified problems as well as other shortcomings and deficiencies of existing technologies by providing 1. Multimedia Bookmark The present invention provides a system and method for accessing multimedia content stored in a multimedia file having a beginning and an intermediate point, the content having at least one segment at the intermediate point. At a minimum, the system includes a multimedia bookmark, the multimedia bookmark having content information about the segment at the intermediate point, wherein a user can utilize the multimedia bookmark to access the segment without accessing the beginning of the multimedia file.

The system of the present invention can include a wide area network such as the Internet. Moreover, the method of the present invention can facilitate the creating, storing, indexing, searching, retrieving and rendering of multimedia content on any device capable of connecting to the network and performing one or more of the aforementioned functions. The multimedia content can be one or more frames of video, audio data, text data such as a string of characters, or any combination or permutation thereof.

The system of the present invention includes a search mechanism that locates a segment in the multimedia file. An access mechanism is included in the system that reads the multimedia content at the segment designated by the multimedia bookmark. The multimedia content can be partial data that are related to a particular segment.

The multimedia bookmark used in conjunction with the system of the present invention includes positional information about the segment. The positional information can be a URI, an elapsed time, a time code, or other information. While the multimedia file used in conjunction with the system of the present invention can be contained on local storage, it can also be stored at remote locations.

The system of the present invention can be a computer server that is operably connected to a network that has connected to it one or more client devices. Local storage on the server can optionally include a database and sufficient circuitry and/or logic, in the form of hardware and/or software in any combination that facilitates the storing, indexing, searching, retrieving and/or rendering of multimedia information.

The present invention further provides a methodology and implementation for adaptive refresh rewinding, as opposed to traditional rewinding, which simply performs a rewind from a particular position by a predetermined length. For simplicity, the exemplary embodiment described below will demonstrate the present invention using video data. Three essential parameters are identified to control the behavior of adaptive refresh rewinding, that is, how far to rewind, how to select certain frames in the rewind interval, and how to present the chosen refresh video frames on a display device.

The present invention also provides a new way to generate and deliver programming information that is customized to the user's viewing preferences. This embodiment of the present invention removes the navigational difficulties associated with EPG. Specifically, data regarding the user's habits of recording, scheduling, and/or accessing TV programs or Internet movies are captured and stored. Over a long period of time, these data can be analyzed and used to determine the user's trends or patterns that can be used to predict future viewing preferences.

The present invention also relates to the techniques to solve the two problems by downloading the metadata from a distant metadata server and then synchronizing/matching the content with the received metadata. While this invention is described in the context of video content stored on STB having PVR function, it can be extended to other multimedia content such as audio.

The present invention also allows the reuse of the content prerecorded on the analog VCR videotapes. Using the PVR function of STB, once the content of the VCR tape is converted into digital video and is stored on the hard disk on the STB, the present invention works equally well.

The present invention also provides a method for searching for relevant multimedia content based on at least one feature saved in a multimedia bookmark. The method preferably includes transmitting at least one feature saved in a multimedia bookmark from a client system to a server system in response to a user's selection of the multimedia bookmark. The server may then generate a query for each feature received and, subsequently, use each query generated to search one or more storage devices. The search results may be presented to the user upon completion.

In yet another embodiment, the present invention provides a method for verifying inclusion of attachments to electronic mail messages. The method preferably includes scanning the electronic mail message for at least one indicator of an attachment to be included and determining whether at least one attachment to the electronic mail message is present upon detection of the at least one indicator. In the event an indicator is present but an attachment is not, the method preferably also includes displaying a reminder to a user that no attachment is present.

In yet another embodiment, the present invention provides a method for searching for multimedia content in a peer to peer environment. The method preferably includes broadcasting a message from a user system to announce its entrance to the peer to peer environment. Active nodes in the peer to peer environment preferably acknowledge receipt of the broadcast message while the user system preferably tracks the active nodes. Upon initiation of a search request at the user system, a query message including multimedia features is preferably broadcast to the peer to peer environment. Upon receipt of the query message, a multimedia search engine on a multimedia database included in a storage device on one or more active nodes is preferably executed. A search results message including a listing of found filenames and network locations is preferably sent to the user system upon completion of the database search.

The present invention further provides a method for sending a multimedia bookmark between devices over a wireless network. The method preferably includes acknowledging receipt of a multimedia bookmark by a video bookmark message service center upon receipt of the multimedia bookmark from a sending device. After requesting and receiving routing information from a home location register, the video bookmark message service center preferably invokes a send multimedia bookmark operation at a mobile switching center. The mobile switching center then preferably sends the multimedia bookmark and, upon acknowledgement of receipt of the multimedia bookmark by the recipient device, notifies the video bookmark message service center of the completed multimedia bookmark transaction.

In another embodiment, the present invention provides a method for sending multimedia content over a wireless network for playback on a mobile device. In this embodiment, the mobile device preferably sends a multimedia bookmark and a request for playback to a mobile switching center. The mobile switching center then preferably sends the request and the multimedia bookmark to a video bookmark message service center. The video bookmark message service center then preferably determines a suitable bit rate for transmitting the multimedia content to the mobile device. Based on the bit rate and various characteristics of the mobile device, the video bookmark message service center also preferably calculates a new multimedia bookmark. The new multimedia bookmark is then sent to a multimedia server which streams the multimedia content to the video bookmark message service center before the multimedia content is delivered to the mobile device via the mobile switching center.

2. Search

The present invention further provides a new approach to utilizing user-established relevance between images. Unlike conventional content-based and text-based approaches, the method of the present invention uses only direct links between images without relying on image descriptors such as low-level image features or textual annotations. Users provide relevance information in the form of relevance feedback, and the information is accumulated in each image's queue of links and propagated through linked images in a relevance graph. The collection of direct image links can be effective for the retrieval of subjectively similar images when they are gathered from a large number of users over a considerable period of time. The present invention can be used in conjunction with other content-based and text-based image retrieval methods.

The present invention also provides a new method to fast find from a large database of image/frames the objects close enough to a query image/frame under a certain distortion. With the metric property of distance function, the information on LBG clustering, and Haar-transform based fast codebook search algorithm, which is also disclosed herein, the present invention reduces the number of distance evaluations at query time, thus resulting in fast retrieval of data objects from the database. Specifically, the present invention sorts and stores in advance the distances to a group of predefined distinguished points (called reference points) in the feature space and performs binary searches on the distances so as to speed up the search.

The present invention introduces an abstract multidimensional structure called hypershell. More practically, the hypershell can be conceived as a set of all the feature vectors in the feature space which lie away $r\pm\epsilon$ from its corresponding reference point, where $r$ is the distance between a query feature point and the reference point, and $\epsilon$ is a real number indicating the fidelity of search results. And the intersection of such hypershells leads to some intersected regions which are often small partitions of the whole feature space. Therefor, instead of the whole feature space, the present invention performs the search only on the intersected regions to improve the search speed.

3. Editing

The present invention further provides a new approach to editing video materials, in which it only virtually edits the metadata of input videos to create a new video, instead of actually editing videos stored as computer files. In the present invention, the virtual editing is performed either by copying the metadata of a video segment of interest in an input metafile or copying only the URI of the segment into a newly constructed metafile. The present invention provides a way of playing the newly edited video only with its metadata. The present invention also provides a system for the virtual editing. The present invention can be applied not only to videos stored on CD-ROM, DVD, and hard disk, but also to streaming videos over a network.

The present invention also provides a method for virtual editing multimedia files. Specifically, the one or more video files are provided. A metadata file is created for each of the video files, each of the metadata files having at least one segment to be edited. Thereafter, a single edited metafile is created that contains the segments to were to be edited from each of the metadata files so that when the edited metadata file is accessed, the user is able to play the segments to be edited in the edited order.

The present invention also provides a method for virtual editing multimedia files. Specifically, the one or more video files are provided. A metadata file is created for each of the video files, each of the metadata files having at least one segment to be edited. Thereafter, a single edited metafile is created that contains links to the segments to were to be edited from each of the metadata files so that when the edited metadata file is accessed, the user is able to play the segments to be edited in the edited order.

The present invention also includes a method for editing a multimedia file by providing a metafile, the metafile having at least one segment that is selectable; selecting a segment in the metafile; determining if a composing segment should be created, and if the composing segment should be created, then creating a composing segment in a hierarchical structure; specifying the composing segment as a child of a parent composing segment; determining if metadata is to be copied or if a URI is to be used; if the metadata is to be copied, then copying metadata of the selected segment to the component segment; if the URI is to be used, then writing a URI of the selected segment to the component segment; writing a URL of an input video file to the component segment; determining if all URLs of any sibling files are the same; and if the URL is the same as any of the sibling's URLs, then writing the URL to the parent composing segment and deleting the URLs of all sibling segments.

In a further embodiment, the method for editing a multimedia file includes determining if another segment is to be selected and if another segment is to be selected, then performing the step of selecting a segment in a metafile.

In yet a further embodiment of the method for editing a multimedia file, the method includes determining if another metafile is to be browsed and if another metafile is to be browsed, then performing the step of providing a metafile. The metafiles may be XML files or some other format.

The present invention also provides a virtual video editor in one embodiment. The virtual video editor includes a network controller constructed and arranged to access remote metafiles and remote video files and a file controller in operative connection to the network controller and constructed and arranged to access local metafiles and local video files, and to access the remote metafiles and the remote video files via the network controller. A parser constructed and arranged to receive information about the files from the file controller and an input buffer constructed and arranged to receive parser information from the parser are also included in the virtual video editor. Further, a structure manager constructed and arranged to provide structure data to the input buffer, a composing buffer constructed and arranged to receive input information from the input buffer and structure information from the structure manager to generate composing information and a generator constructed and arranged to receive the composing information from the composing buffer are preferably included and wherein the generator generates output information in a pre-selected format are preferably included.

In a further embodiment, the virtual video editor also includes a playlist generator constructed and arranged to receive structure information from the structure manager in order to generate playlist information and a video player constructed and arranged to receive the playlist information from the playlist generator and file information from the file controller in order to generate display information.

In yet a further embodiment, the virtual video editor also includes a display device constructed and arranged to receive the display information from the video player and to display the display information to a user.

In a further embodiment, the present invention provides a method for transcoding an image for display at multiple resolutions. Specifically, the method includes providing a multimedia file, designating one or more regions of the multimedia file as focus zones and providing a vector to each of the focus zones. The method continues by reading the multimedia file with a client device, the client device having a maximum display resolution and determining if the resolution of the multimedia file exceeds the maximum display resolution of the client device. If the multimedia file resolution exceeds the maximum display resolution of the display device, the method determines the maximum number focus zones that can be displayed on the client device. Finally, the method includes displaying the maximum number of focus zones on the client device.

4. Transcoding

The present invention also provides a novel scheme for generating transcoded (scaled and cropped) image to fit the size of the respective client display when an image is transmitted to a variety of client devices with different display sizes. The scheme has two key components: 1) perceptual hint for each image block, and 2) an image transcoding algorithm. For a given semantically important block in an image, the perceptual hint provides the information on the minimum allowable spatial resolution. Actually, it provides a quantitative information on how much the spatial resolution of the image can be reduced while ensuring that the user will perceive the transcoded image as the author or publisher want to represent it. The image transcoding algorithm that is basically a content adaptation process selects the best image representation to meet the client capabilities while delivering the largest content value. The content adaptation algorithm is modeled as a resource allocation problem to maximize the content value.

5. Visual Rhythm

One of the embodiments of the method of the present invention provides a fast and efficient approach for constructing visual rhythm. Unlike the conventional approaches which decode all pixels composing a frame to obtain certain group of pixel values using conventional video decoders, the present invention provides a method such that only few of the pixels composing a frame are decoded to obtain the actual group of pixels needed for constructing visual rhythm. Most video compressions adopt intraframe and interframe coding to reduce spatial as well as temporal redundancies. Therefor, once the group of pixels is determined for constructing visual rhythm, one only decodes this group of pixels in frames which are not referenced by other frames for interframe coding. For frames referenced by other frames for interframe coding, one decodes the determined group of pixels for constructing visual rhythm as well as other few pixels needed to decode this group of pixels for frames referencing to those frames. This allows fast generation of visual rhythm for its application to shot detection, caption text detection, or any other possible applications derived from it.

The other embodiment of the method of present invention provides an efficient and fast-compressed DCT domain method to locate caption text regions in intra-coded and inter-coded frames through visual rhythm from observations that caption text generally tend to appear on certain areas on video or are known a prior; and secondly, the method employs a combination of contrast and temporal coherence information on the visual rhythm, to detect text frame and uses information obtained through visual rhythm to locate caption text regions in the detected text frame along with their temporal duration within the video.

In one embodiment of the present invention, a content transcoder for modifying and forwarding multimedia content maintained in one or more multimedia content databases to a wide area network for display on a requesting client device is provided. In this embodiment, the content transcoder preferably includes a policy engine coupled to the multimedia content database and a content analyzer operably coupled to both the policy engine and the multimedia content database. The content transcoder of the present invention also preferably includes a content selection module operably coupled to both the policy engine and the content analyzer and a content manipulation module operably coupled to the content selection module. Finally, the content transcoder preferably includes a content analysis and manipulation library operably coupled to the content analyzer, the content selection module and the content manipulation module. In operation, the policy engine may receive a request for multimedia content from the requesting client device via the wide area network and policy information from the multimedia content database. The content analyzer may retrieve multimedia content from the multimedia content database and forward the multimedia content to the content selection module. The content selection module may select portions of the multimedia content based on the policy information and information from the content analysis and manipulation library and forward the selected portions of multimedia content to the content manipulation module. The content manipulation module may then modify the multimedia content for display on the requesting client device before transmitting the modified multimedia content over the wide area network to Features and advantages of the invention will be apparent from the following description of the embodiments, given for the purpose of disclosure and taken in conjunction with the accompanying drawings.

BRIEF DESCRIPTION OF THE DRAWINGS

A more complete understanding of the present invention and advantages thereof may be acquired by referring to the following description taken in conjunction with the accompanying drawings, wherein:

FIG. 26 is a block diagram illustrating different sampling strategies.

FIG. 27 is a block diagram illustrating an exemplary visual rhythm method of the present invention.

FIG. 28 is a block diagram illustrating the localization and segmentation of text information according to the present invention.

FIG. 29 is a block diagram illustrating the use of an exemplary Haar transformation according to the present invention.

FIGS. 32 (*a*) and (*b*) are block diagrams illustrating a comparison of a prior art video methodology and an exemplary editing method of the present invention.

FIG. 36 is an exemplary pseudocode implementation of the method of the present invention.

FIG. 37 is an exemplary pseudocode implementation of the method of the present invention.

FIG. 38 is an exemplary pseudocode implementation of the method of the present invention.

FIG. 39 is an exemplary pseudocode implementation of the method of the present invention.

FIG. 40 is an exemplary pseudocode implementation of the method of the present invention.

FIG. 41 is an exemplary pseudocode implementation of the method of the present invention.

FIG. 43 is a block diagram illustrating an exemplary transcoding method of the present invention without SRR value.

FIG. 44 is a block diagram illustrating an exemplary transcoding method of the present invention with SRR value.

Figure 1:
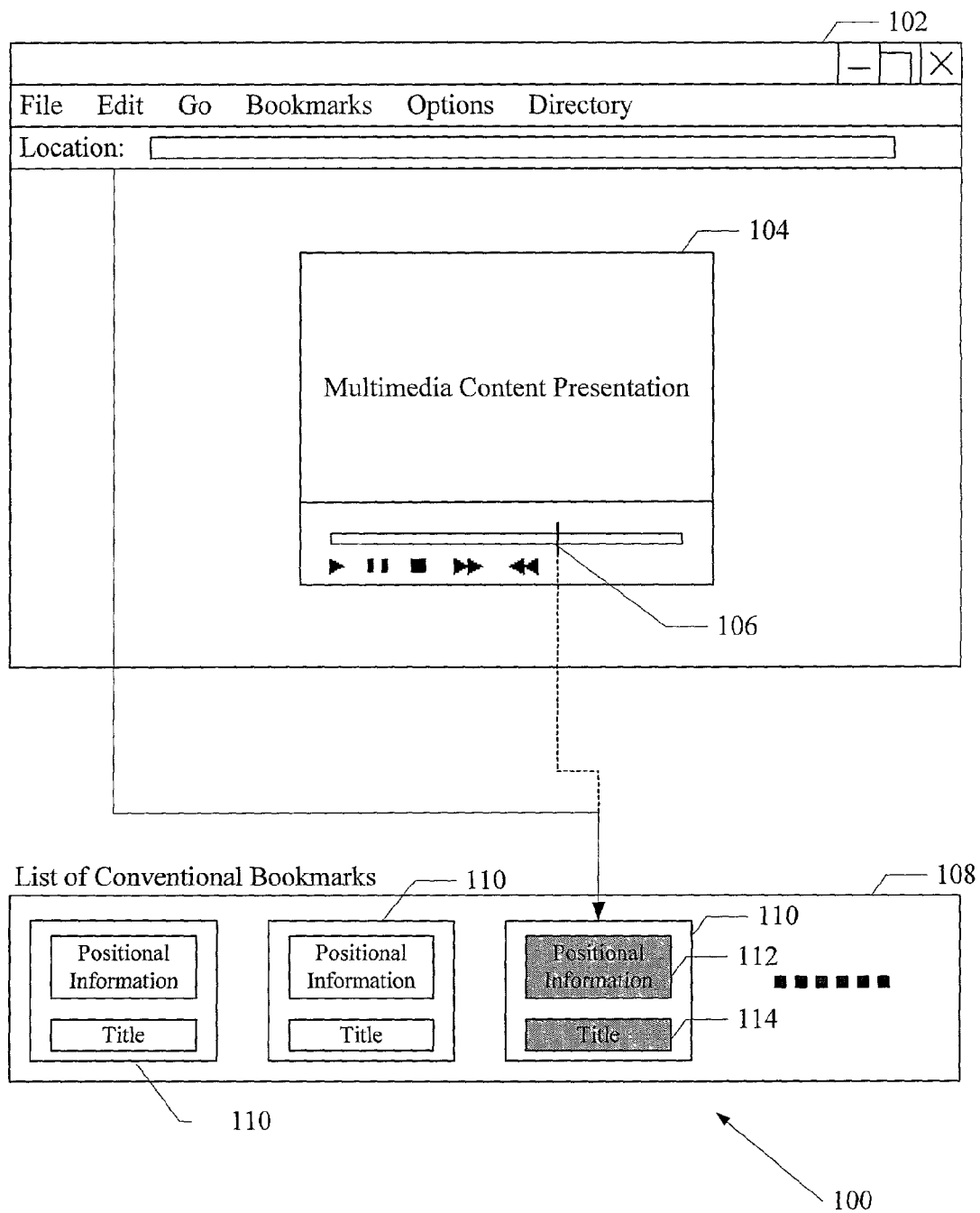
FIG. 1 is an illustration of a conventional prior art bookmark.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Figure 53:
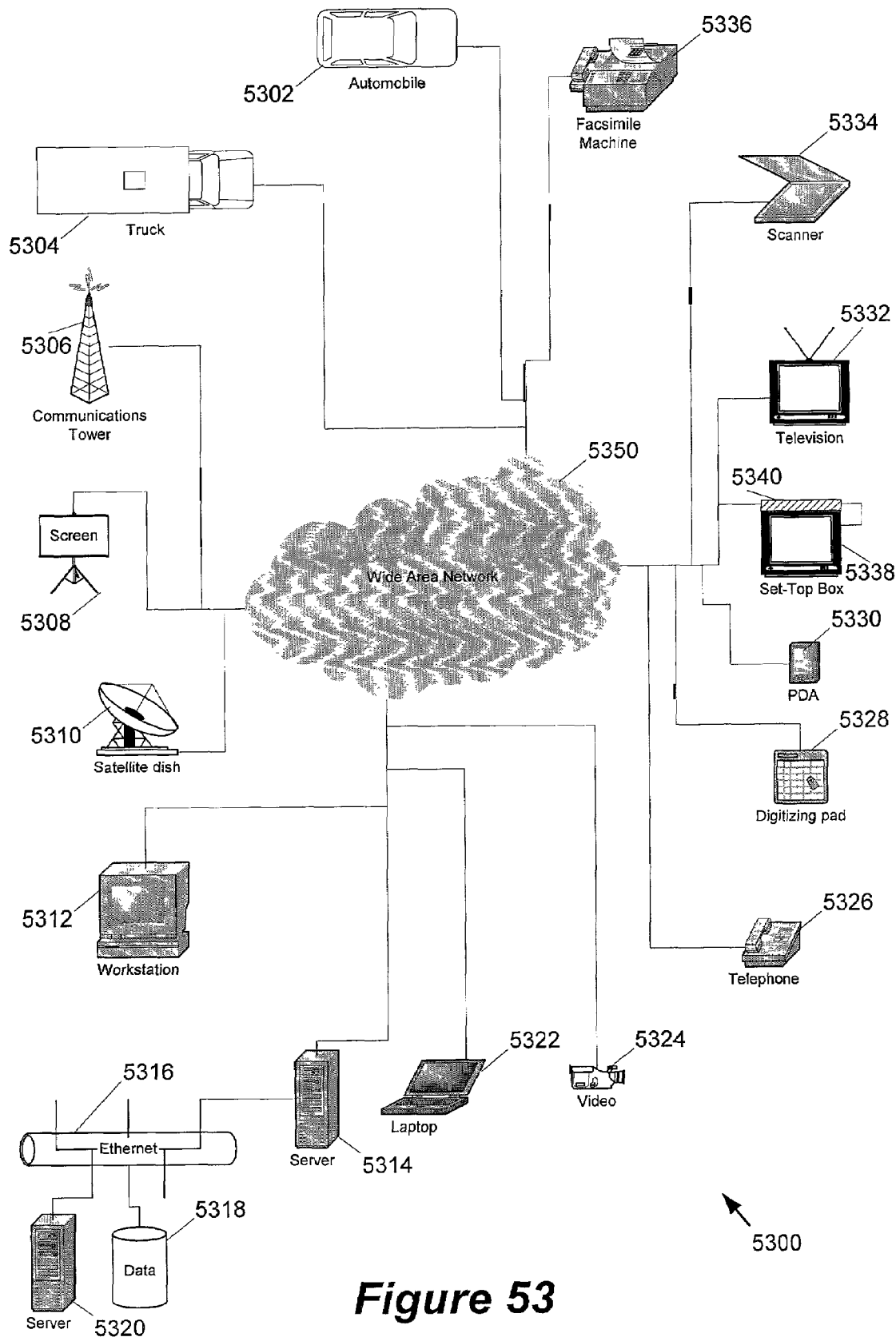
FIG. 53 is a block diagram of the system of the present invention.

FIG. 53 illustrates the system of the present invention. At the heart of the system of the present invention is a Wide Area Network 5350, exemplary or most famously embodied in the Internet. The present invention can be contained within the server 5314, as well as a series of clients such as Laptop 5322, Video Camera 5324, Telephone 5326, Digitizing Pad 5328, Personal Digital Assistance (PDA) 5330, Television 5332, Set Top Box 5340 (that is connected to and serves Television 5338), Scanner 5334, Facsimile Machine 5336, Automobile 5302, Truck 5304, Screen 5308, Work Station 5312, Satellite Dish 5310, and Communications Tower 5306, all useful for communications to or from remote devices for use with the system of the present invention. The present invention is particularly useful for set top boxes 5340. The set top boxes 5340 may be used as intermediate video servers for home networking, serving televisions, personal computers, game stations and other appliances. The server 5314 can be connected to an internal local area network via, for example, Ethernet 5316, although any type of communications protocol in a local area network or wide area network is possible for use with the present invention. Preferably, the local area network for the server 5314 has with it connections for data storage 5318 which can include database storage capability. The local area network connected to Ethernet 5316 may also hold one or more alternate servers 5320 for purposes of load balancing, performance, etc. The multimedia bookmarking scheme of the present invention can utilize the servers and clients of the system of the present invention, as illustrated in FIG. 53, for use in transferring data to or loading data from the servers through the Wide Area Network 5350.

In general, the present invention is useful for storing, indexing, searching, retrieving, editing, and rendering multimedia content over networks having at least one device capable of storing and/or manipulating an electronic file, and at least one device capable of playing the electronic file. The present invention provides various methodologies for tagging multimedia files to facilitate the indexing, searching, and retrieving of the tagged files. The tags themselves can be embedded in the electronic file, or stored separately in, for example, a search engine database. Other embodiments of the present invention facilitate the e-mailing of multimedia content. Still other embodiments of the present invention employ user preferences and user behavioral history that can be stored in a separate database or queue, or can also be stored in the tag related to the multimedia file in order to further enhance the rich search capabilities of the present invention.

Other aspects of the present invention include using hypershell and other techniques to read text information embedded in multimedia files for use in indexing, particularly tag indexes. Still more methods of the present invention enable the virtual editing of multimedia files by manipulating metadata and/or tags rather than editing the multimedia files themselves. Then the edited file (with rearranged tags and/or metadata) can be accessed in sequence in order to link seamlessly one or more multimedia files in the new edited arrangement.

Still other methods of the present invention enable the transcoding of images/videos so that they enable users to display images/videos on devices that do not have the same resolution capabilities as the devices for which the images/videos were originally intended. This allows devices such as, for example, PDA 5330, laptop 5322, and automobile 5302, to retrieve useable portions of the same image/video that can be displayed on, for example, workstation 5312, screen 5308, and television 5332.

Finally, the indexing methods of the present invention are enhanced by the unique modification of visual rhythm techniques that are part of other methods of the present invention. Modification of prior art visual rhythm techniques enable the system of the present invention to capture text information in the form of captions that are embedded into multimedia information, and even from video streams as they are broadcast, so that text information about the multimedia information can be included in the multimedia bookmarks of the present invention and utilized for storing, indexing, searching, retrieving, editing and rendering of the information.

1. Multimedia Bookmark

The methods of the present invention described in this disclosure can be implemented, for example, in software on a digital computer having a processor that is operable with system memory and a persistent storage device. However, the methods described herein may also be implemented entirely in hardware, or entirely in software, and in any combination thereof.

In general, after a multimedia content is analyzed automatically and/or annotated by a human operator, the results of analysis and annotation are saved as "metadata" with the multimedia content. The metadata usually include information on description of multimedia data content such as distinctive characteristic of the data, structure and semantics of the content. Some of the description provides information on the whole content such as summary, bibliography and media format. However, in general, most of the description is structured around "segments" that represent spatial, temporal or spatial-temporal components of the audio-visual content. In the case of video content, the segment may be a single frame, a single shot consisting of successive frames, or a group of several successive shots. Low-level features and some elementary semantic information may describe each segment. Examples of such descriptions include color, texture, shape, motion, audio features and annotated texts.

If it is desired to generate metadata for several variations of a multimedia content, it would be natural to generate the metadata only for a single variation, called a master file, and then have the other variations share the same metadata. This sharing of metadata would save a lot of time and effort by skipping the time-consuming and labor-intensive work of generating multiple versions of metadata. In this case, the media positions (in terms of time points or bytes) contained in the metadata obtained with respect to the master file may not be directly applied to the other variations. This is because there may be mismatches of media positions between the master and the other variations if the master and the other variations do not start at the same position of the source content.

The method and system of the present invention include a tag that can contain information about all or a portion of a multimedia file. The tag can come in several varieties, such as text information embedded into the multimedia file itself, appended to the end of the multimedia file, or stored separately from the multimedia file on the same or remote network storage device.

Alternatively, the multimedia file has embedded within it one or more global unique identifiers (GUIDs). For example, each scene in a movie can be provided with its own GUID. The GUIDs can be indexed by a search engine and the multimedia bookmarks of the present invention can reference the GUID that is in the movie. Thus, multiple multimedia bookmarks of the present invention can reference the same GUID in a multimedia document without impacting the size of the multimedia document, or the performance of servers handling the multimedia document. Furthermore, the GUID references in the multimedia bookmarks of the present invention are themselves indexable. Thus, a search on a given multimedia document can prompt a search for all multimedia bookmarks that reference a GUID embedded within the multimedia file, providing a richer and more extensive resource for the user.

Figure 2:
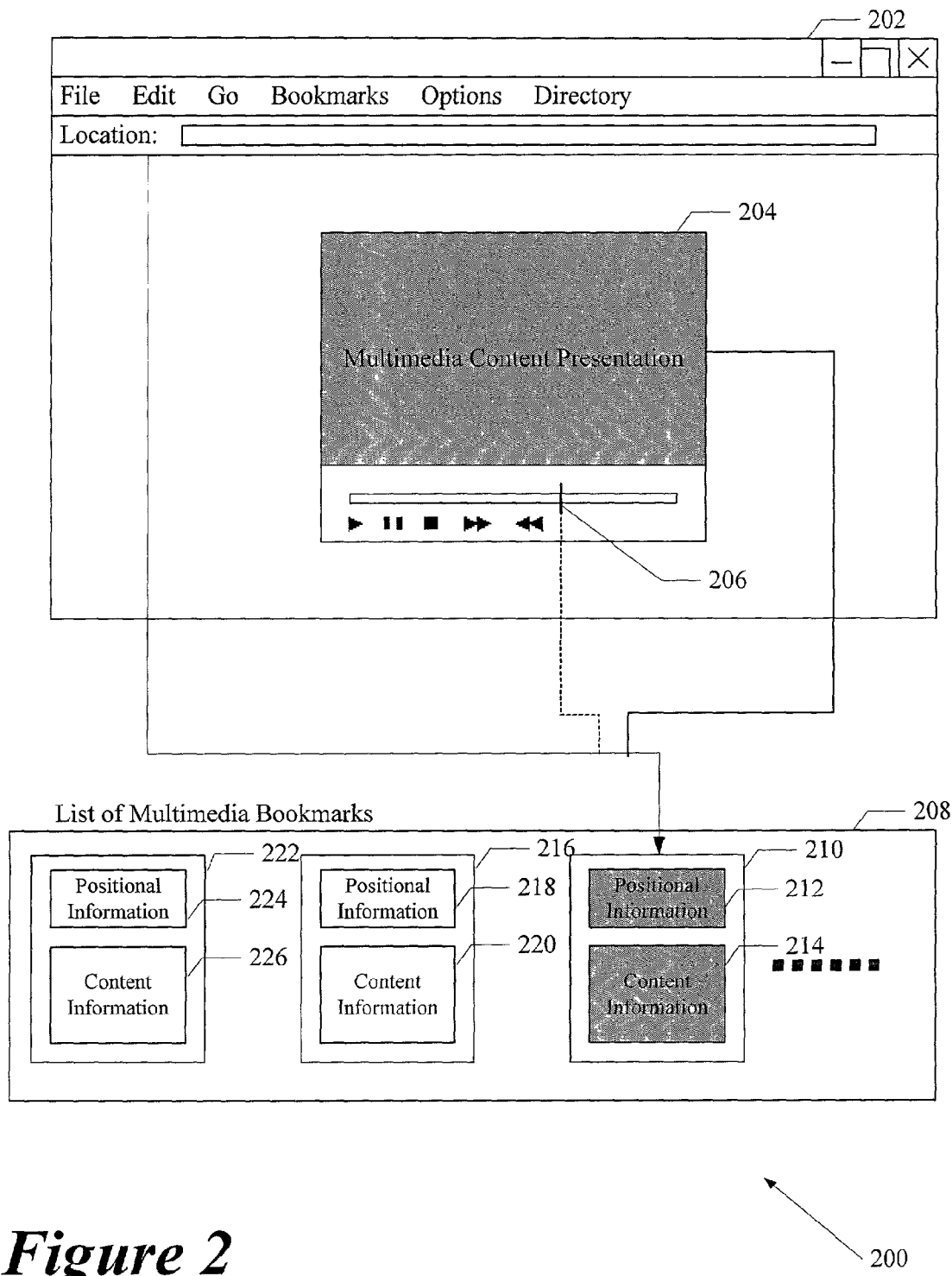
FIG. 2 is an illustration of a multimedia bookmark in accordance with the present invention.

FIG. 2 shows a multimedia bookmark 210 of the present invention comprising positional information 212 and content information 214. The positional information 212 is used for accessing a multimedia content 204 starting from a bookmarked position 206. The content information 214 is used for visually displaying multimedia bookmarks in a bookmark list 208, as well as for searching one or more multimedia content databases for the content that matches the content information 214.

The positional information 212 may be composed of a URI, a URL, or the like, and a bookmarked position (relative time or byte position) within the content. For the purposes of this disclosure, a URI is synonymous with a position of a file and can be used interchangeably with a URL or other file location identifier. The content information 214 may be composed of audio-visual features and textual features. The audio-visual features are the information, for example, obtained by capturing or sampling the multimedia content 204 at the bookmarked position 206. The textual features are text information specified by the user(s), as well as delivered with the content. Other aspects of the textual features may be obtained by accessing metadata of the multimedia content.

In one embodiment of the multimedia bookmark 210 of the present invention, the positional information 212 is composed of a URI and a bookmarked position like an elapsed time, time code or frame number. The content information 214 is composed of audio-visual features, such as thumbnail image data of the captured video frame, and visual feature vectors like color histogram for one or more of the frames. The content information 214 of a multimedia bookmark 210 is also composed of such textual features as a title specified by a user as well as delivered with the content, and annotated text of a video segment corresponding to the bookmarked position.

In the case of an audio bookmark of the present invention, the positional information 212 is composed of a URI, a URL, or the like, and a bookmarked position such as elapsed time. Similarly, the content information 214 is composed of audio-visual features such as the sampled audio signal (typically of short duration) and its visualized image. The content information 214 of an audio bookmark 210 is also composed of such textual features as a title, optionally specified by a user or simply delivered with the content, and annotated text of an audio segment corresponding to the bookmarked position. In the case of a text bookmark 210, the positional information 212 is composed of a URI, URL, or the like, and an offset from the starting point of a text document. The offset can be of any size, but is normally about a byte in size. The content information 214 is composed of a sampled text string present at the bookmarked position, and text information specified by user(s) and/or delivered with the content, such as the title of the text document.

Figure 3:
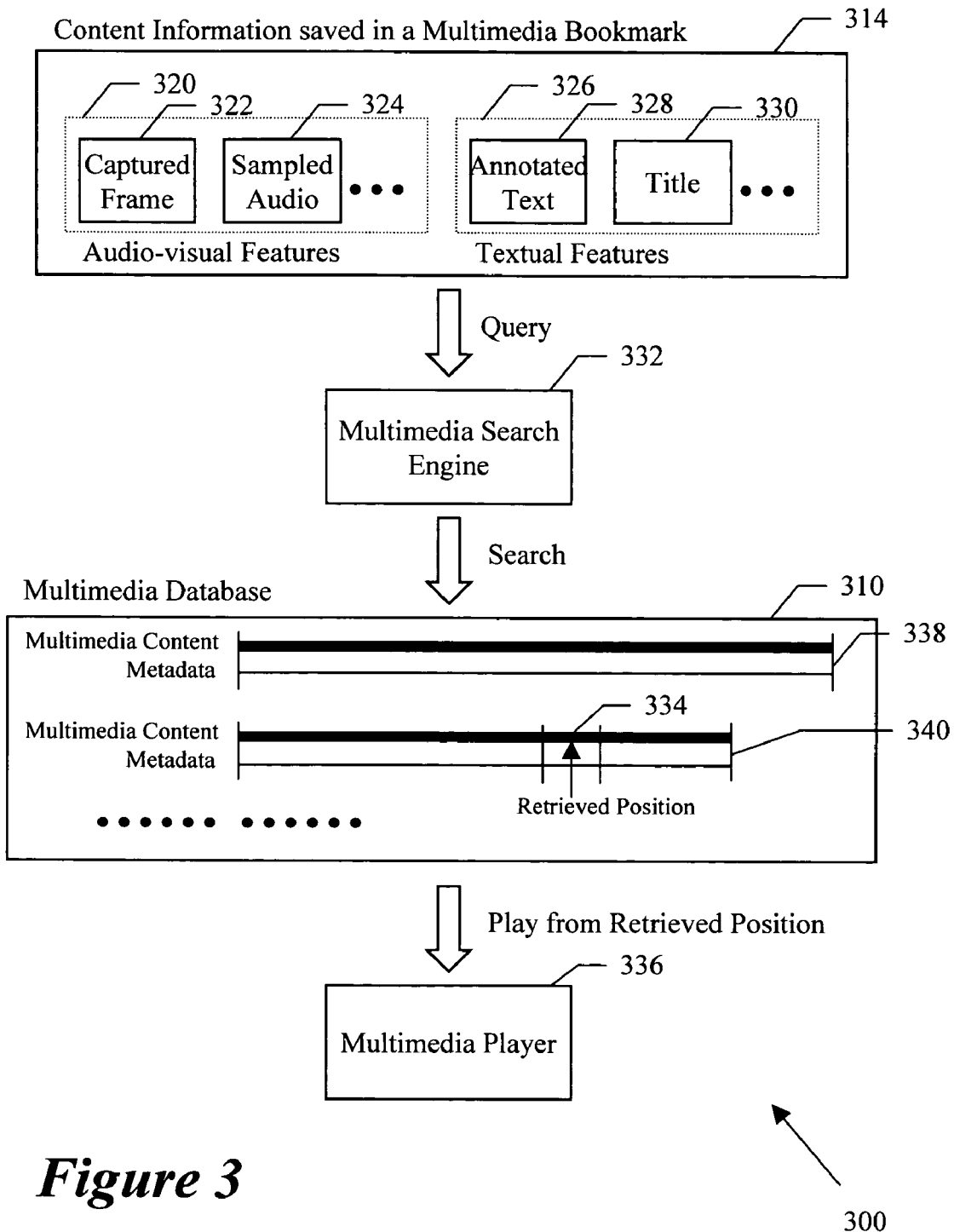
FIG. 3 is an illustration of exemplary searching for multimedia content relevant to the content information saved in the multimedia bookmark of the present invention, where both positional and content information are used.

FIG. 3 shows an illustration of searching for multimedia contents that are relevant to the content information 314 (that correlates to element 214 of FIG. 2) that is stored in the multimedia bookmark 210 of FIG. 2 of the present invention where both positional and content information are used. The content information 314 is comprised of audio-visual features 320 such as a captured frame 322 and a sampled audio data 324, and textual features 326 such as annotated text 328 and a title 330. There are many cases where a bookmark system that utilizes only positional information, such as URI and an elapsed time, such as that used by conventional bookmarks, may not be valid. For example, if a bookmark were generated during the preview of multimedia content broadcast, the bookmark would not be valid for viewing a full version of the broadcast. If a bookmark were saved during live Internet broadcast, the bookmark would not be valid for viewing an edited version of the live broadcast. Further, if a user wanted to access the bookmarked multimedia content from another site that also provides the content, even the positional information such as URI would be not be valid.

To solve the problems described in the background section, the present invention uses content information 314 (element 214 of FIG. 2) that is saved in the multimedia bookmark to obtain the actual positional information of the last-visited segment by searching the multimedia database 310 using the content information 314 as a query input. Content information characteristics such as captured frame 322, sampled audio data 324, annotated text of the segment corresponding to a bookmarked position 328, and the title delivered with the content 330 can be used as query input to a multimedia search engine 332. The multimedia search engine searches its multimedia database 310 by performing content-based and/or text-based multimedia searches, and finds the relevant positions of multimedia contents. The search engine then retrieves a list of relevant segments 334 with their positional information such as URI, URL and the like, and the relative position. With a multimedia player 336, a user can start playing from the retrieved segments of the contents. The retrieved segments 334 are usually those segments having contents relevant or similar to the content information saved in the multimedia bookmark.

Figure 4:
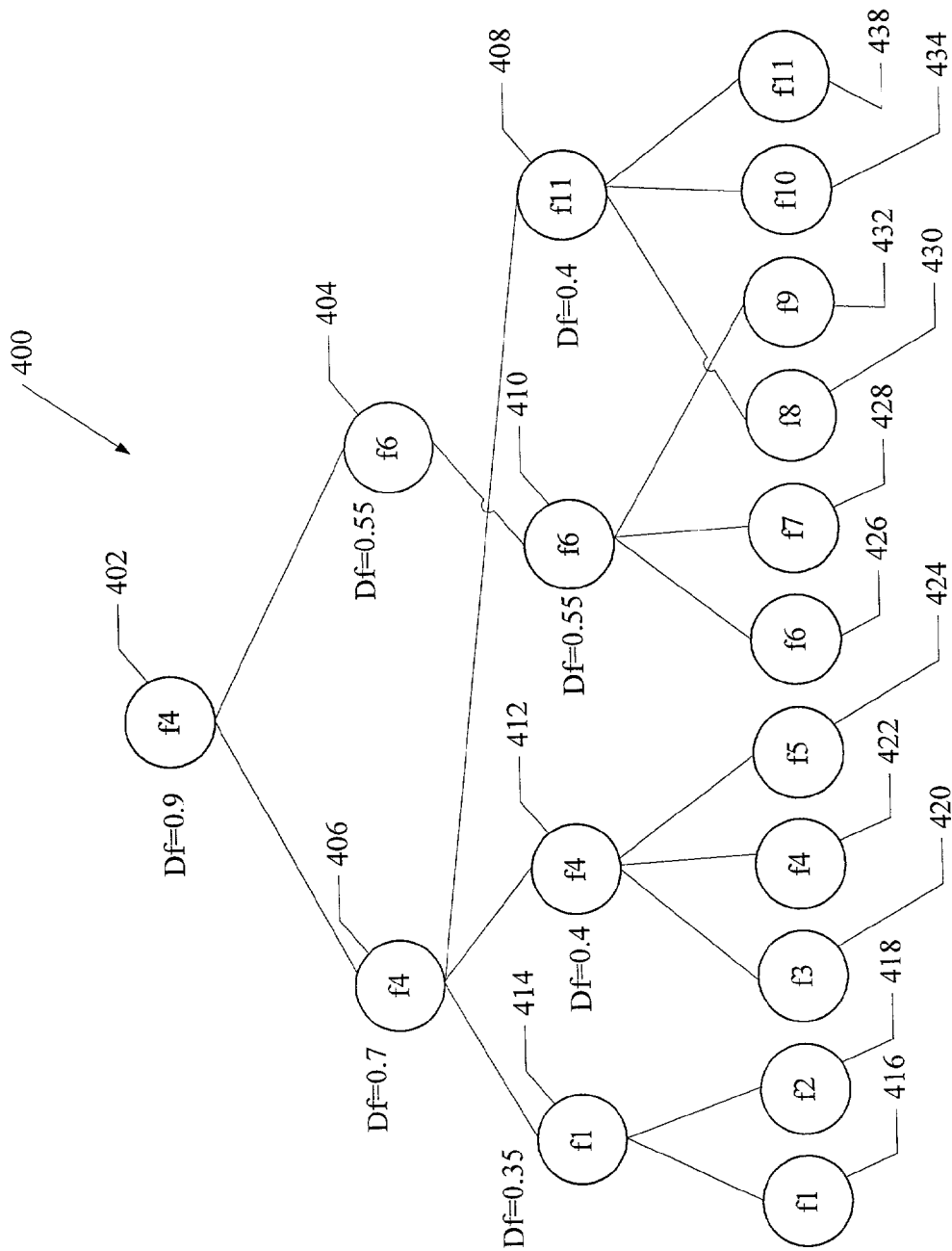
FIG. 4 is an illustration of an exemplary tree structure used by two exemplary search methods in accordance with the present invention.

FIG. 4 illustrates an embodiment of a key frame hierarchy used by a search method of the multimedia search engine 332 (see FIG. 3) in accordance with the present invention. The method arranges key frames in a hierarchical fashion to enable fast and accurate searching of frames similar to a query image.

The key frame hierarchy illustrated in FIG. 4 is a tree-structured representation for multi-level abstraction of a video by key frames, where a node denotes each key frame. A number Df is associated with each node and represents the maximum distance between the low-level feature vector of the node 414 and those of its decendent nodes in its subtree (for example, nodes 416 and 418). An example of such feature vector is the color histogram of a frame. If a video database composed of one or more key frame hierarchies, which correspond to different video sequences, must be searched to find a specific query image fq, the dissimilarity between fq and a subtree rooted at the key frame fm is measured by testing d(fq, fm)>Df+e where d(fq, fm) is a distance metric measuring dissimilarity such as the L1 norm between feature vectors, and e is a threshold value set by a user. If the condition is satisfied, searching of the subtree rooted at the node fm is skipped (i.e., the subtree is "pruned" from the search). This method of the present invention reduces the search time substantially by pruning out the unnecessary comparison steps.

Durable Multimedia Bookmark using Offset and Time Scale

Figure 5:
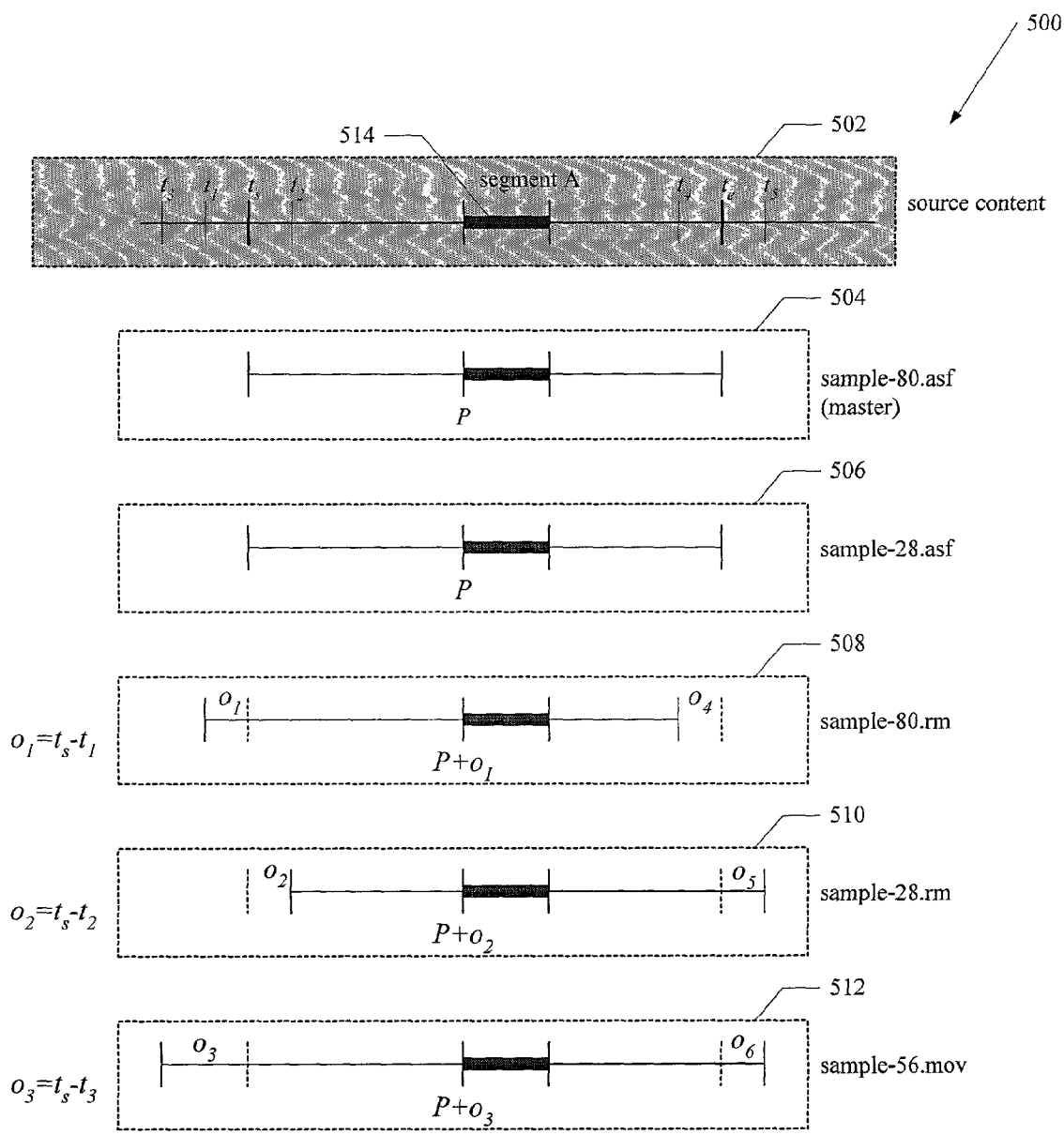
FIG. 5 is an example of five variations encoded by the present invention from the same source video content.

FIG. 5 shows an example of five variations encoded from the same source video content 502. FIG. 5 shows two ASF format files 504, 506 with the bandwidths of 28.8 and 80 kbps that start and end exactly at the same time points. FIG. 5 also shows the first RM format file 508 with the bandwidth of 80 kbps. In the RM file 508, source content starts to be encoded with the time interval $o_1$ before the start time point of the ASF files 504, 506, and ends to be encoded with the time interval $o_4$, before the end time point of the ASF files 504 and 506. The RM file 508 thus has an extra video segment with the duration of $o_1$ at the beginning. Consequently, compared with a start time point of a specific video segment 514 in the ASF files, the start time point of the video segment in the RM file is temporally shifted right with the time interval $o_1$. The start time point of the video segment in the RM file can be computed by adding the time interval $o_1$ the start time point of the video segment in the ASF files. Similarly, the second RM file 510 with the bandwidth of 28.8 kbps does not have a leading video segment with the duration of $o_2$. The start time point of the video segment 514 in the second RM file can be computed by subtracting the time interval $o_2$ from the start time point of the video segment in the ASF files. Also, the MOV file 512 with the smart bandwidth of 56 kbps has two extra segments with the duration of $o_3$ and $o_6$, respectively.

In another example, designate one of the different variations encoded with the same source multimedia content as the master file, and the other variations as slave files. In the example illustrated in FIG. 5, the ASF file encoded at the bandwidth of 80 kbps 504 is to be the master file, and the other four files are slave files. In this example, an offset of a slave file will be the difference of positions in time duration or byte offset between a start position of a master file and a start position of the slave file. In this example, the difference of positions $o_1$, $o_2$, and $o_3$ are offsets. The offset of a slave file is computed by subtracting the start position of a slave file from the start position of a master file. In this formula, the two start positions are measured with respect to the source content. Thus, the offset will have a positive value if the start position of a slave occurred before the start position of a master with reference to the source content. Conversely, the offset will have a negative value if the start position of a slave occurred after the start position of a master. For the example shown in FIG. 5, the offsets $o_1$ and $o_3$ are positive values, and $o_2$ is negative. Although not specifically required, by convention an offset of a master file is set to zero.

Consider the different variations encoded from the same source multimedia content. A user generates a multimedia bookmark with respect to one of the variations that is to be called a bookmarked file. Then, the multimedia bookmark is used at a later time to play one of the variations that is called a playback file. In other words, the bookmarked file pointed to by the multimedia bookmark, and the playback file selected by the user, may not be the same variation, but refer to the same multimedia content.

If there is only one variation encoded from the original content, both the bookmarked and the playback files should be the same. However, if there are multiple variations, a user can store a multimedia bookmark for one variation and later play another variation by using the saved bookmark. The playback may not start at the last accessed position because there may be mismatches of positions between the bookmarked and the playback files.

Associated with a multimedia content are metadata containing the offsets of the master and slave variations of the multimedia content in the form of media profiles. Each media profile corresponds to the different variation that can be produced from a single source content depending on the values chosen for the encoding formats, bandwidths, resolutions, etc. Each media profile of a variation contains at least a URI and an offset of the variation. Each media profile of a variation optionally contains a time scale factor of the media time of the variation encoded in different temporal data rates with respect to its master variation. The time scale factor is specified on a zero to one scale where a value of one indicates the same temporal data rate, and 0.5 indicates that the temporal data rate of the variation is reduced by half with respect to the master variation.

Table 1 is an example metadata for the five variations in FIG. 5. The metadata is written according to the ISO/IEC MPEG-7 metadata description standard which is under development. The metadata are described by XML since MPEG-7 adopted XML Schema as its description language. In the table, the offset values of the three variations 508, 510, 512 are assumed to be $o_1=2$, $o_2=-3$, and $o_3=10$ seconds, respectively. Also, the temporal data rate of the variation 512 is assumed to be reduced by half with respect to the master variation 504, and the other variations are not temporally reduced.

TABLE 1

An example of Metadata Description for Five Variations

```
<VariationSet>
    <Source>
        <Video>
            <MediaLocator>
                <MediaUri>http://www.server.com/sample-80.asf</MediaUri>
            </MediaLocator>
```

TABLE 1-continued

An example of Metadata Description for Five Variations

```
        </Video>
    </Source>
    <Variation timeOffset="PT0S" timeScale="1">
        <Source>
            <Video>
                <MediaLocator>
                    <MediaUri>http://www.server.com/sample-28.asf</MediaUri>
                </MediaLocator>
            </Video>
        </Source>
        <VariationRelationship>alternativeMediaProfile</VariationRelationship>
    </Variation>
    <Variation timeOffset="PT3S" timeScale="1">
        <Source>
            <Video>
                <MediaLocator >
                    <MediaUri>http://www.server.com/sample-80.rm</MediaUri>
                </MediaLocator>
            </Video>
        </Source>
        <VariationRelationship>alternativeMediaProfile</VariationRelationship>
    </Variation>
    <Variation timeOffset="-PT2S" timeScale"1">
        <Source>
            <Video>
                <MediaLocator>
                    <MediaUri>http://www.server.com/sample-28.rm</MediaUri>
                </MediaLocator>
            </Video>
        </Source>
        <VariationRelationship>alternativeMediaProfile</VariationRelationship>
    </Variation>
    <Variation timeOffset="PT10S" timeScale="0.5">
        <Source>
            <Video>
                <MediaLocator>
                    <MediaUri>http://www.server.com/sample-56.mov</MediaUri>
                </MediaLocator>
            </Video>
        </Source>
        <VariationRelationship>alternativeMediaProfile</VariationRelationship>
        <VariationRelationship>temporalReduction</VariationRelationship>
    <Variation>
</VariationSet>
```

Figure 6:
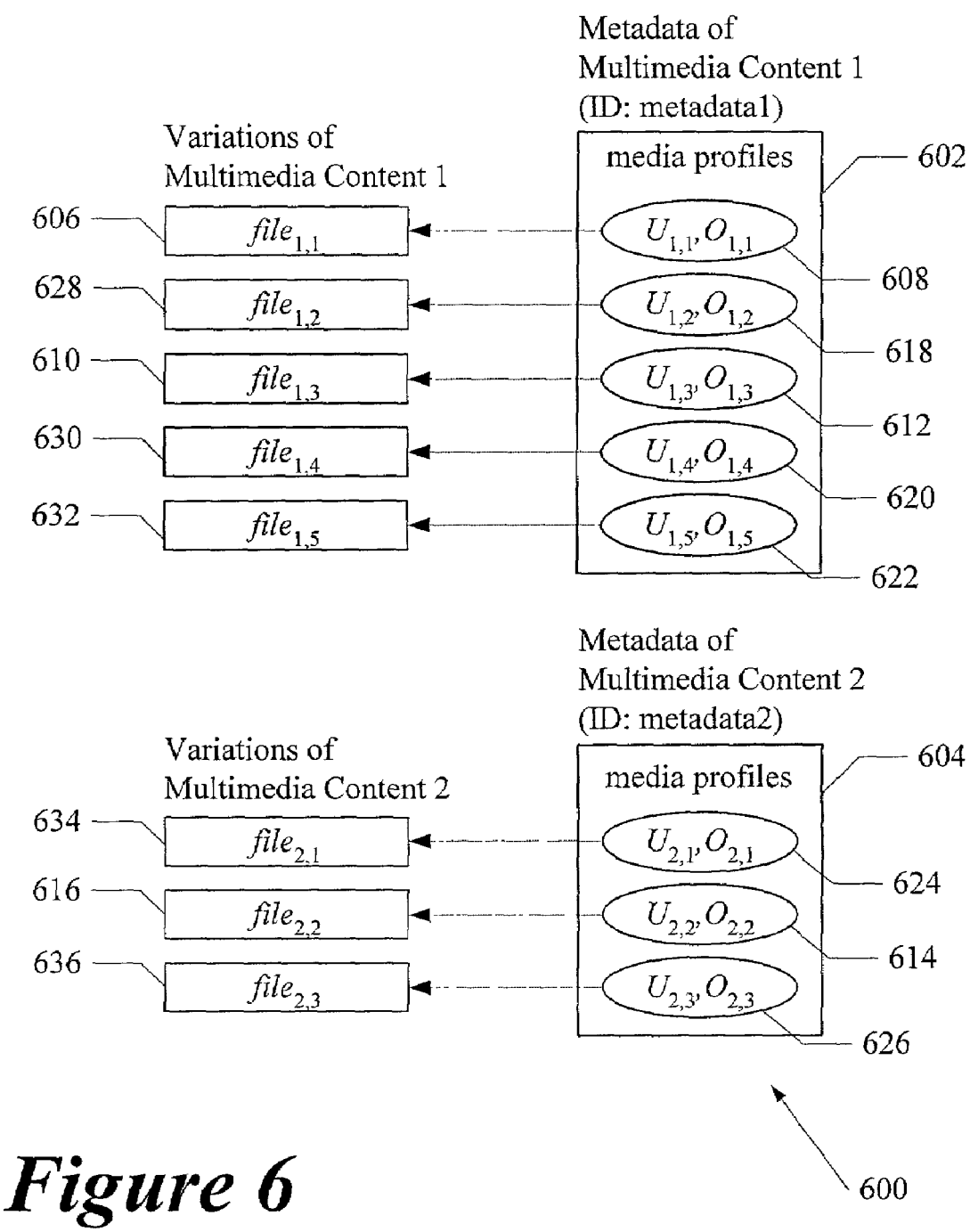
FIG. 6 is an example of two multimedia contents and their associated metadata of the present invention.

FIG. 6 shows an example of two multimedia contents and their associated metadata. Since the first multimedia content has five variations and the second has three variations, there are five media profiles in the metadata of the first multimedia content 602, and three media profiles in the metadata of the second 604. In FIG. 6, two subscripts attached to identifiers of variations, URIs, URLs or the like, and offsets represent a specific variation of a multimedia content. For example, the third variation of the first multimedia content 610 has the associated media profile 612 in the metadata of the first multimedia content 602. The media profile 612 provides the values of a URI and an offset of the third variation of the first multimedia content 610.

When a user at the client terminal wants to make a multimedia bookmark for a multimedia content having multiple variations, the following steps are taken. First, the user selects one of several variations of the multimedia content from a list of the variations and starts to play the selected variation from the beginning. When the user makes a multimedia bookmark on the selected variation, which now becomes a bookmarked file, a bookmark system stores the following positional information along with content information in the multimedia bookmark:

a. A URI of the bookmarked file;

b. A bookmarked position within the bookmarked file; and c. A metadata identification (ID) of the bookmarked file.

The metadata ID may be a URI, URL or the like of the metafile or an ID of the database object containing the metadata. The user then continues or terminates playing of the variation.

Figure 7:
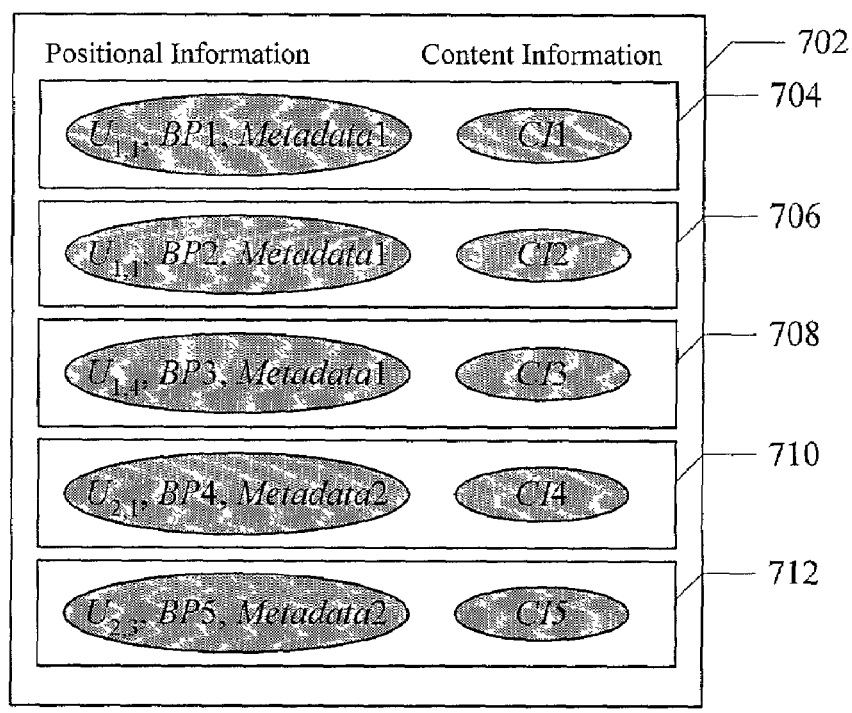
FIG. 7 is a list of example multimedia bookmarks of the present invention.

FIG. 7 shows an example of a list of bookmarks 702 for the variations of two multimedia contents in FIG. 6. The list contains the first and second bookmarks 704 and 706 for the first variation, and the third one 708 for the fourth variation of the first multimedia content. Because those three bookmarks are for the same multimedia content, they also have the same metadata ID. The list also contains the fourth and fifth bookmarks 710 and 712 for the first and third variations of the second multimedia content, respectively. Thus, these two bookmarks have the same metadata ID referring to the second multimedia content.

When a user wants to play the multimedia content from a saved bookmark position, the following steps are taken. The user selects one of the saved multimedia bookmarks from the user's bookmark list. The user can also select a variation from the list of possible variations. The selected variation now becomes a playback file. The bookmark system then checks whether the selected bookmarked file is equal to the playback file or not. If they are not equal, the bookmark system adjusts the saved bookmarked position in order to obtain an accurate playback position on the playback file. This adjustment is performed by using the offsets saved in a metafile and a bookmarked position saved in a multimedia bookmark. Assume that $P_b$ is a bookmarked position of a bookmarked file, and $P_p$ is the desirable position (adjusted bookmark position) of the playback file. Also, let $o_b$ and $o_p$ be the offsets of bookmarked and playback files, respectively. Further, let $s_b$ and $s_p$ be the time scale factors of bookmarked and playback files, respectively, and $s=s_p/s_b$ be a time scale ratio which converts a media time of a bookmarked file into the media time with respect to a playback file by multiplying the ratio to the media time of the bookmarked file. Then, the $P_p$ can be computed using the following formula:

i) $P_p = s \times P_b$     if $o_p = s \times o_b$
ii) $P_p = s \times P_b + (|o_p| + |s \times o_b|)$     if $o_p > 0 > s \times o_b$
iii) $P_p = s \times P_b + (|o_p - s \times o_b|)$     if $o_p > s \times o_b \geq 0$ or $0 \geq o_p > s \times o_b$
iv) $P_p = s \times P_b - (|o_p| + |s \times o_b|)$     if $o_p < 0 < s \times o_b$
v) $P_p = s \times P_b - (|o_p - s \times o_b|)$     if $0 \leq o_p < s \times o_b$ or $o_p < s \times o_b \leq 0$.

Figure 8:
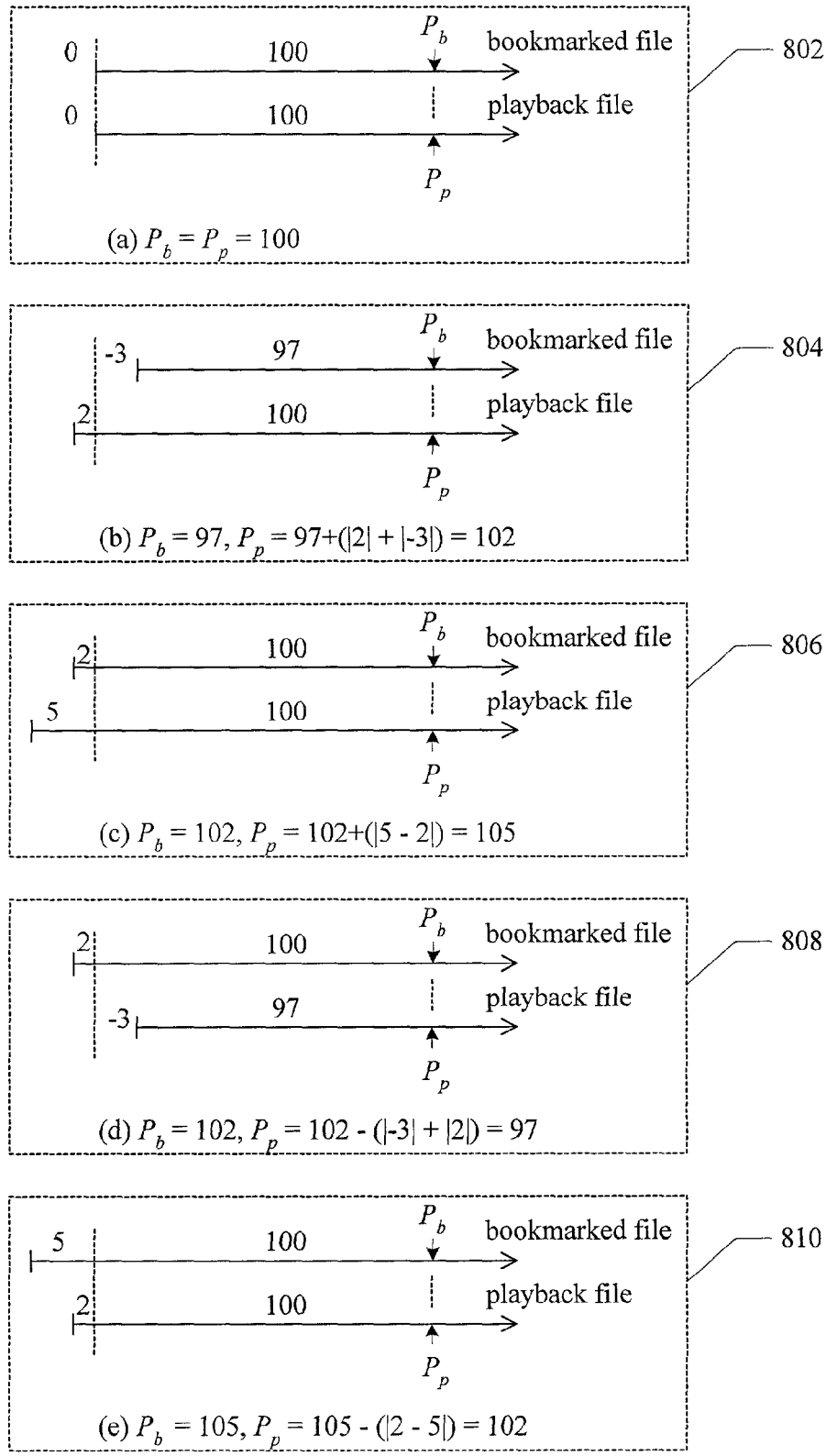
FIG. 8 is an illustration of an exemplary method of adjusting bookmarked positions in the durable bookmark system of the present invention.

FIG. 8 shows the five distinct cases (802, 804, 806, 808, 810) illustrating the above formula. In FIG. 8, both the time scale factors of bookmarked and playback files are assumed to be the same, thus making the time scale ratio be one, that is, s=1. In the above example, one offset is assumed for each slave file. In general, however, there may be a list of offset values for each slave file for the cases where the frame skipping occurs during the encoding of the slave file or the part of the slave file is edited.

This durable multimedia bookmark is to be explained with the examples in FIGS. 6 and 7. Suppose that a user wants to play back the third variation 610 of the first multimedia content in FIG. 6 from the position stored in the second bookmark 706 in FIG. 7. The second bookmark 706 was made with reference to the first variation 606 of the first multimedia content in FIG. 6. Note that the bookmarked file 606 is not equal to the playback file 610. Using the metadata ID saved in the bookmark, the bookmark system accesses the metadata of the first multimedia content 602. From the metadata, the system reads the media profile of the first variation 608 and the third variation 612. Using the offsets saved in the two profiles and a bookmarked position saved in a multimedia bookmark, the system adjusts the bookmarked position, thus obtaining a correct playback position of a playback file.

Offset Computation

In FIG. 5, an offset of a slave file is defined as the difference between the start position of a master file and the start position of a slave file. This offset calculation requires locating a referential segment, for example, the segment A 514 in FIG. 5. After aligning the start position of the referential segment from a master file with the start position of the same referential segment from a slave file, the offset is calculated as the start time of the master file minus the start time of the slave file.

A referential segment may be any multimedia segment bounded by two different time positions. In practice, however, a segment bounded between two specific successive shot boundaries in the case of a video is frequently used as a referential segment. Thus, the following method may be used to determine a referential segment:

1. Locate the first two shot boundaries from the beginning of each of the master and the slave file using a technique of shot boundary detection;
2. Check whether the starting frame at the first shot detected from the master file is visually similar to the corresponding frame detected from the slave file using a content-based frame/video matching technique. Check whether the same is true for the ending frames of the shots, too; and
3. Determine the segment satisfying the conditions in 1) and 2) and let it be the referential segment.

The method of choosing a referential segment is not limited to the procedure mentioned above. There may be other procedures within the framework of the above method of automatic detection of a referential segment and computation of an offset based on the referential segment detected.

User Interface and Flow Chart

Figure 9:
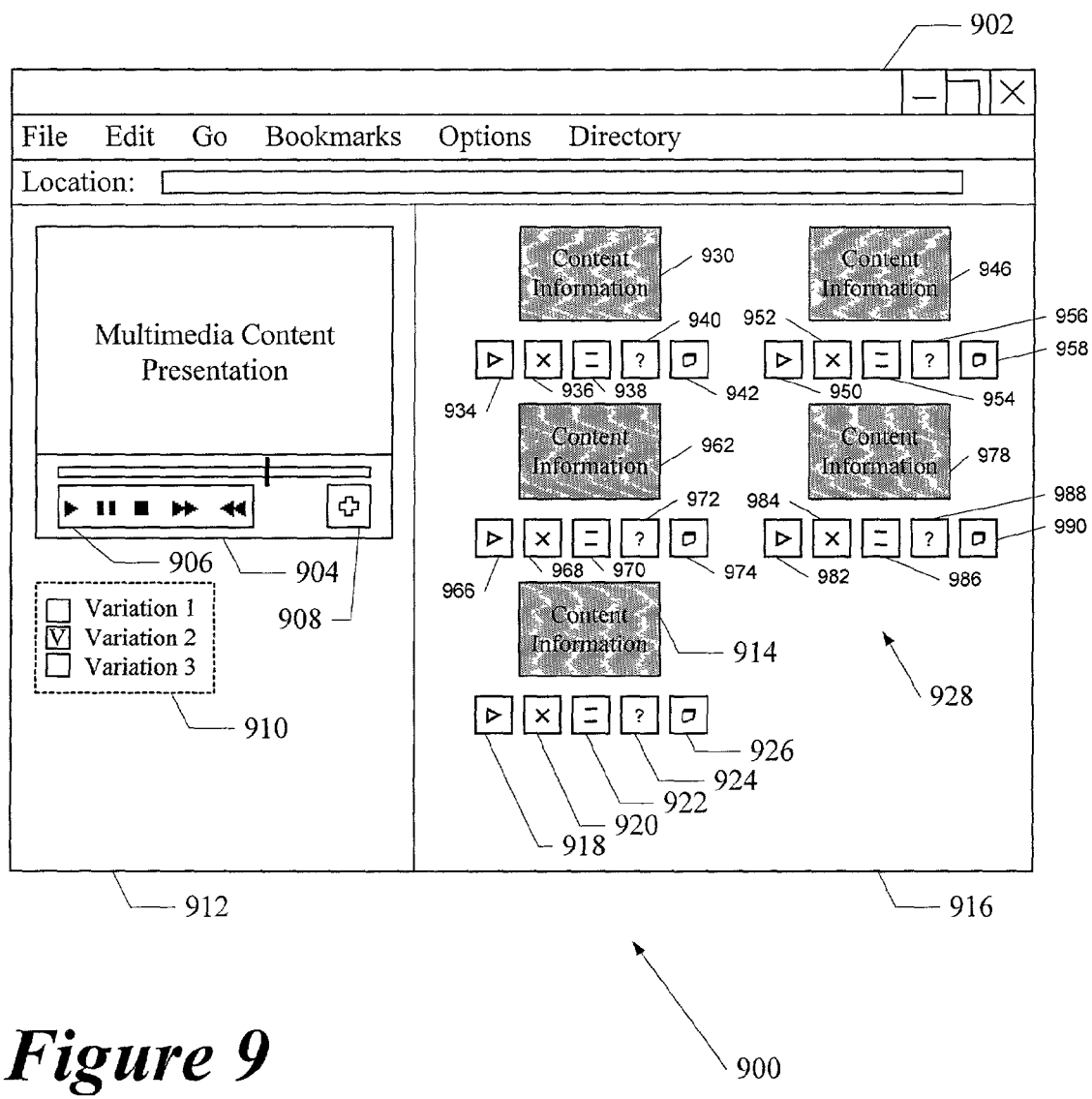
FIG. 9 is an illustration of an exemplary user interface incorporating a multimedia bookmark of the present invention.

FIG. 9 shows an example of a user interface incorporating the multimedia bookmark of the present invention. The user interface 900 is composed of a playback area 912 and a bookmark list 916. Further, the playback area 912 is also composed of a multimedia player 904 and a variation list 910. The multimedia player 904 provides various buttons 906 for normal VCR (Video Cassette Recorder) controls such as play, pause, stop, fast forward and rewind. Also, it provides another add-bookmark control button 908 for making a multimedia bookmark. If a user selects this button while playing a multimedia content, a new multimedia bookmark having both positional and content information is saved in a persistent storage. Also, in the bookmark list 916, the saved bookmark is visually displayed with its content information. For example, a spatially reduced thumbnail image corresponding to the temporal location of interest saved by a user in the case of a multimedia bookmark is presented to help the user to easily recognize the previously bookmarked content of the video.

In the bookmark list 916, every bookmark has five bookmark controls just below its visually displayed content information. The left-most play-bookmark control button 918 is for playing a bookmarked multimedia content from a saved bookmarked position. The delete-bookmark control button 920 is for managing bookmarks. If this button is selected, the corresponding bookmark is deleted from the persistent storage. The add-bookmark-title control button 922 is used to input a title of bookmark given by a user. If this button is not selected, a default title is used. The search control button 924 is used for searching multimedia database for multimedia contents relevant to the selected content information 914 as a multimedia query input. There are a variety of cases when this control might be selected. For example, when a user selects a play-bookmark control to play a saved bookmark, the user might find out that the multimedia content being played is not in accordance with the displayed content information due to the mismatches of positional information for some reason. Further, the user might want to find multimedia contents similar to the content information of the saved bookmark. The send-bookmark control button 926 is used for sending both positional and content information saved in the corresponding bookmark to other people via e-mail. It should be noted that the positional information sent via e-mail includes either a URI or other locator, and a bookmarked position.

For durable bookmarks, the variation list 910 provides possible variations of a multimedia content with corresponding check boxes. Before a traditional normal playback or a bookmarked playback, a user selects a variation by checking the corresponding mark. If the multimedia content does not have multiple variations, this list may not appear in the user interface.

Figure 10:
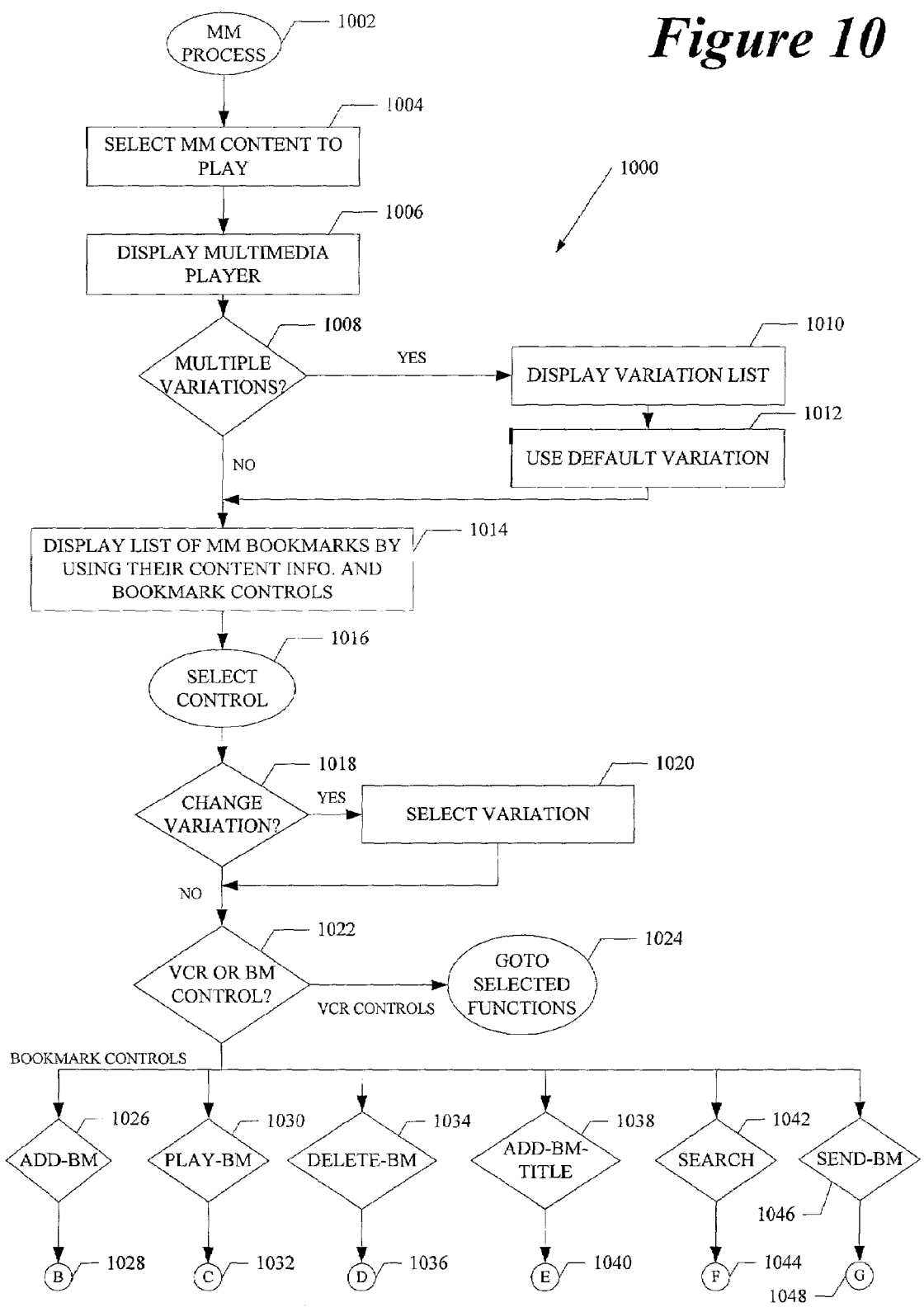
FIG. 10 is a flowchart illustrating an exemplary embodiment of a method of the present invention that is effective to implement the disclosed processing system.

FIG. 10 is an exemplary flow chart illustrating the overall method 1000 of saving and retrieving multimedia bookmarks with the two additional functions: i) Searching for other multimedia content relevant to the content pointed by the bookmark and ii) Sending a bookmark to another person via e-mail. In the multimedia process, step 1002, if a user wants to play the multimedia content (step 1004), the multimedia player is first displayed to the user in step 1006. A check is made in step 1008 to determine if multiple variations of multimedia content are available. If so, then two extra steps are taken. In step 1010, the variation list is presented to the user and (optionally) with a default variation in step 1012. Thereafter, in step 1014, the list of multimedia bookmarks is displayed to the user by using their content information and bookmark controls. In a select control, step 1016 is performed. A check is made to determine if the user wants to change the variation, step 1018. If so, the user can select the other variation, step 1020. Thereafter, in step 1022, a check is made to determine if the user has selected one of the conventional VCR-type controls (e.g., play, pause, stop, fast forward, and rewind) or one of the bookmark-type controls (add-bookmark, play-bookmark, delete-bookmark, add-bookmark-title, search, and send-bookmark). If the user selects a conventional control button, the execution of the method jumps to the selected function 1024. Otherwise, if the user selects one of the controls related to the bookmarks (1026, 1030, 1034, 1038, 1042, and 1046), the program goes to the corresponding routine (1028, 1032, 1036, 1040, 1044, and 1048), respectively. Until the different multimedia content is selected (step 1004), the multimedia player with the variation list and the bookmark list will continue to be displayed (steps 1006, 1010 and 1014).

Figure 11:
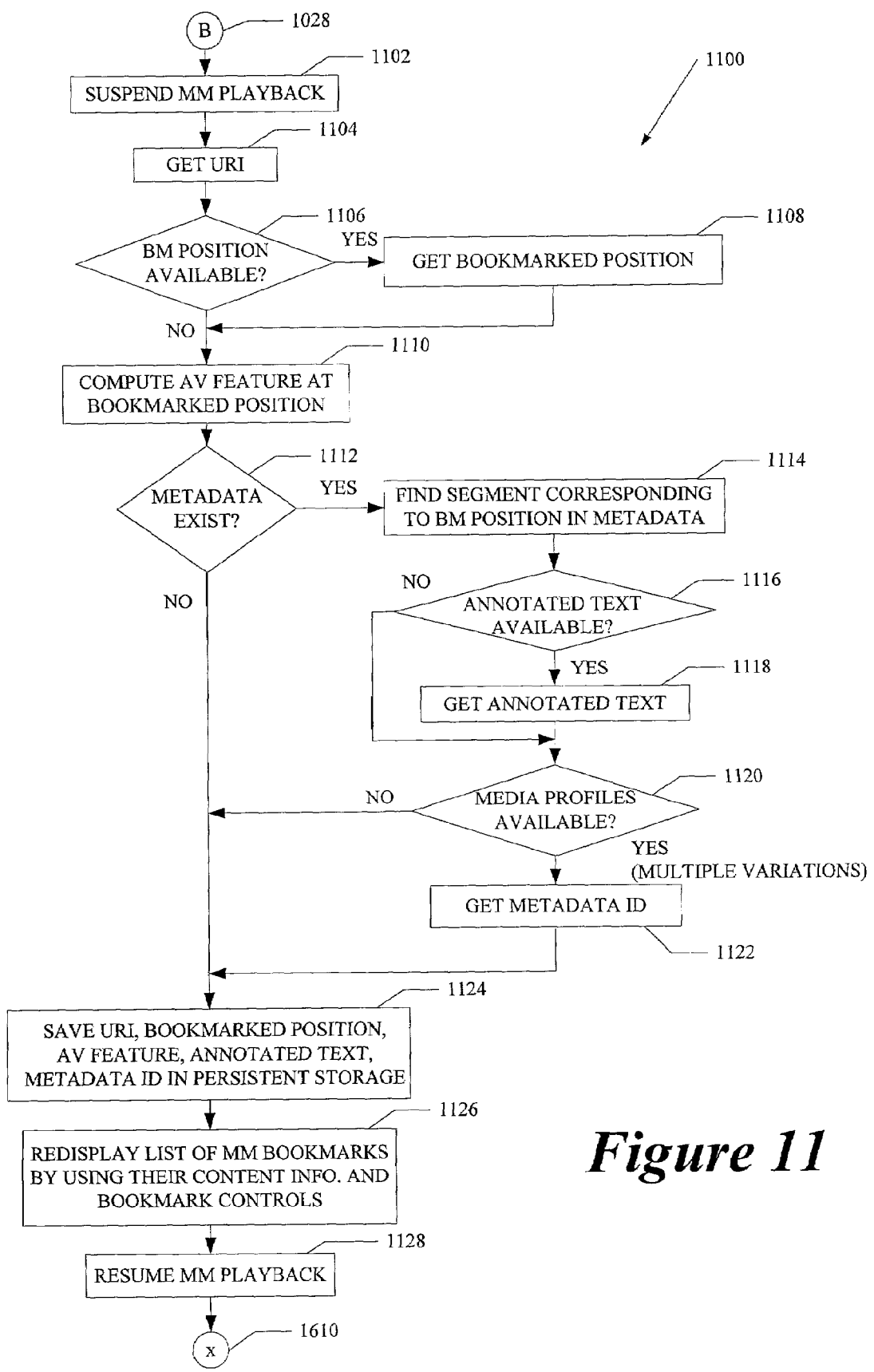
FIG. 11 is a flowchart illustrating the overall process of saving and retrieving multimedia bookmarks of the present invention.

FIG. 11 is a flow chart illustrating the process of adding a multimedia bookmark. When the add-bookmark control is selected (step 1026 of FIG. 10), execution of the method proceeds to step 1028 of FIG. 11. In this portion 1100 of the method of the present invention, the multimedia playback is suspended in step 1102. Then, the URI, URL or similar address is obtained in step 1104. A check is made in step 1106 to determine if the information on the bookmarked position such as time code is available at the currently suspended multimedia content. If so, execution is moved to step 1108, where the bookmarked position is obtained. In step 1110, the bookmarked position data, if available, are used to capture, sample or derive audio-visual features of the suspended multimedia content at the bookmarked position. In step 1112, a check is made to determine if the metadata exists. If not, then execution jumps to step 1124 where the URI (or the like), the bookmarked position, and the audio-visual features are stored in persistent storage. Otherwise (i.e., the metadata of the suspended multimedia content exist), the search is conducted to find a segment corresponding to the bookmarked position in the metadata in step 1114. Next, a check is made to determine if the annotated text is available for the segment. If so, then the annotated text is obtained in step 1118. If not, step 1118 is skipped and execution resumes at step 1120, where a check is made to determine if there are media profiles that contain offset values of the suspended multimedia content. If so, step 1122 is performed where a metadata ID is obtained in order to adjust the bookmarked position in future playback. Otherwise, step 1122 is skipped and the method proceeds directly to step 1124, where the annotated text and the metadata ID are also stored in persistent storage. Then, in step 1126, the list of multimedia bookmarks is redisplayed with their content information and bookmark controls. The multimedia playback is resumed in step 1128, and execution of the method is moved to a clearing-off routine 1610 (of FIG. 16) that is performed at the end of every bookmark control routine.

Figure 16:
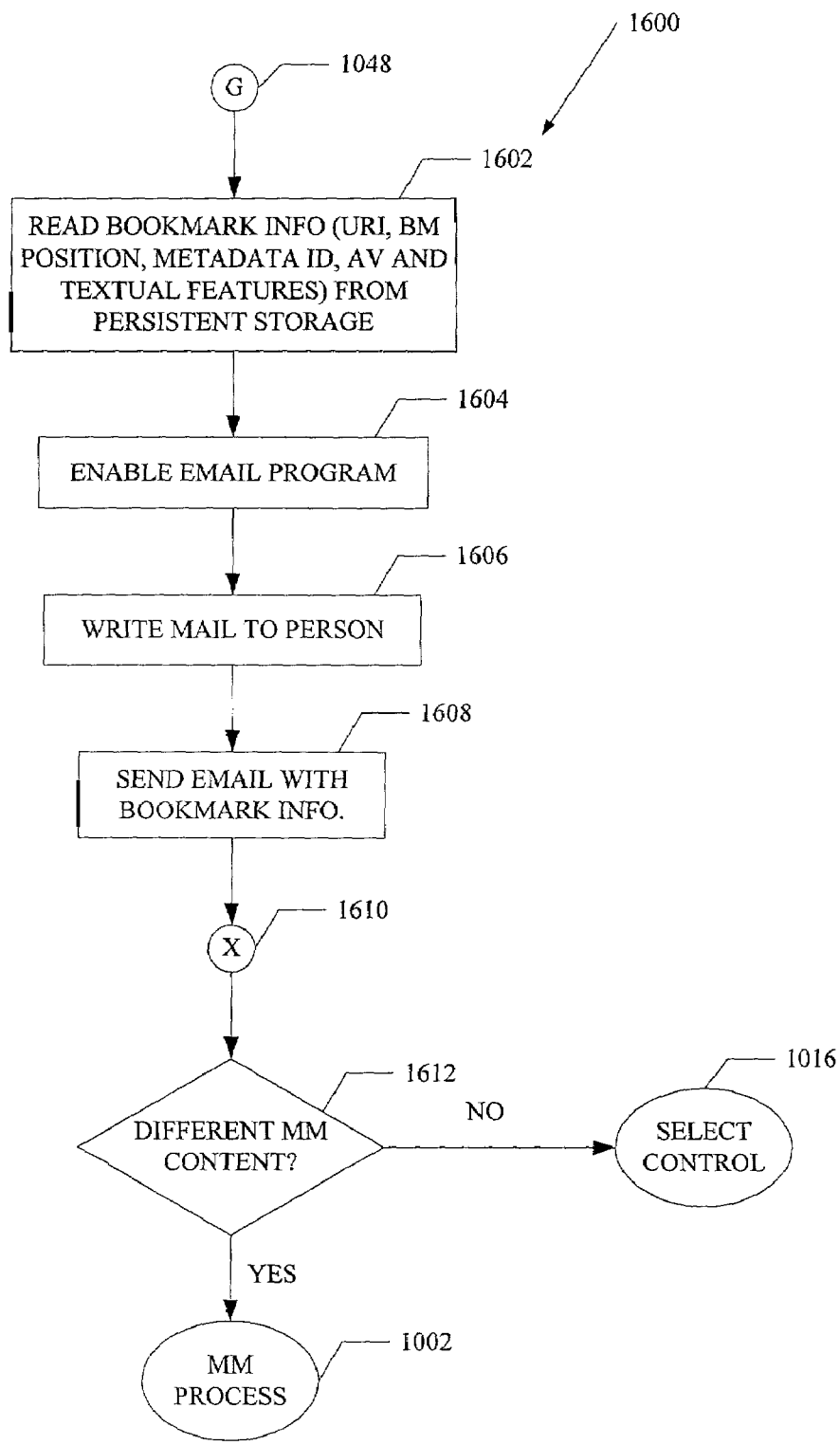
FIG. 16 is a flow chart illustrating an exemplary process of the present invention for sending a bookmark to other people via e-mail.

In the clearing-off routine 1610, illustrated in FIG. 16, a check is made in step 1612 to determine if the user wants to play back different multimedia content. If so, the method returns to step 1002 (see FIG. 10) where another multimedia process begins. Otherwise, the method resumes at step 1016 of FIG. 10, where the multimedia process waits for the user to select one of the conventional VCR or bookmark controls.

Figure 12:
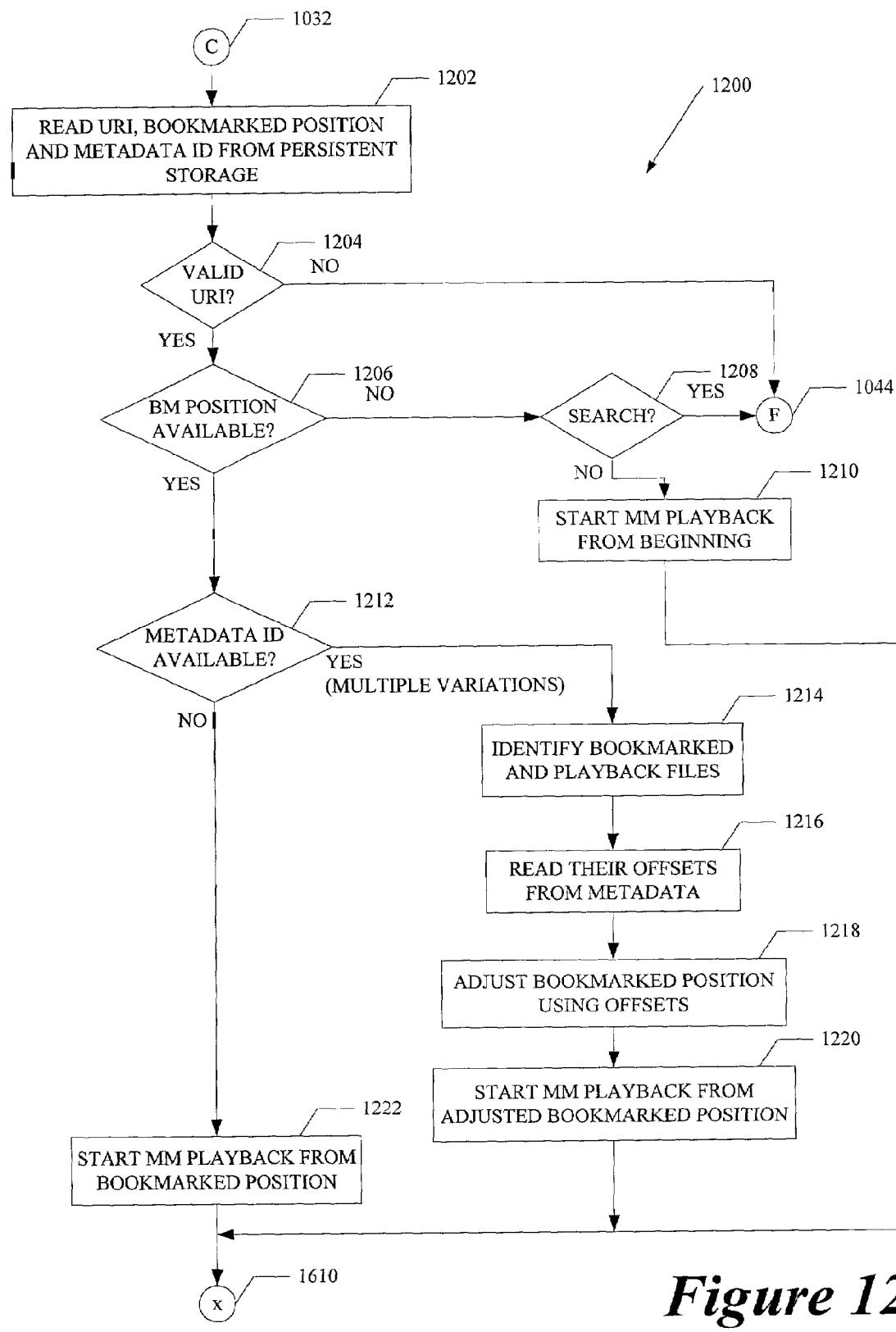
FIG. 12 is a flowchart illustrating an exemplary process of playing a multimedia bookmark of the present invention.

FIG. 12 is a flow chart illustrating the process of playing a multimedia bookmark. When the play-bookmark control is selected by the user in step 1030 (see FIG. 10), step 1032 is invoked. In step 1202 (see FIG. 12), the URI or the like, bookmarked position, and metadata ID for the multimedia content to be played back are read from persistent storage. A check is made in step 1204 to determine if the URI of the content is valid. If not, execution of the method is shifted to step 1044 (see FIG. 10) where the process of the content-based and/or text-based search begins. The URI of the content becomes invalid when the multimedia content is moved to other location, for example. If the URI of the content is valid (the result of step 1204 is positive), a check is made to determine if the bookmarked position is available. If not, a check is made to determine if the user desires to select the content-based and/or text-based search in step 1208. If so, execution is moved to step 1044 (see FIG. 10). Otherwise, the method moves to step 1210, where the user can just play the multimedia content from the beginning. If the URI of the content is valid and the bookmarked position is available (e.g., both results of steps 1204 and 1206 are positive), a check is made in step 1212 to determine if the metadata ID is available. If it is not available, the multimedia playback starts from the bookmarked position in step 1222. Otherwise, the bookmarked and playback files are identified in step 1214 and the values of their respective offsets are read from the metadata in step 1216. Then, in step 1218, the bookmarked position is adjusted by using offsets. The multimedia playback starts from the adjusted bookmarked position in step 1220. After starting one of the playbacks (1210, 1220, or 1222), the method executes the clearing-off routine in step 1610 of FIG. 16.

Figure 13:
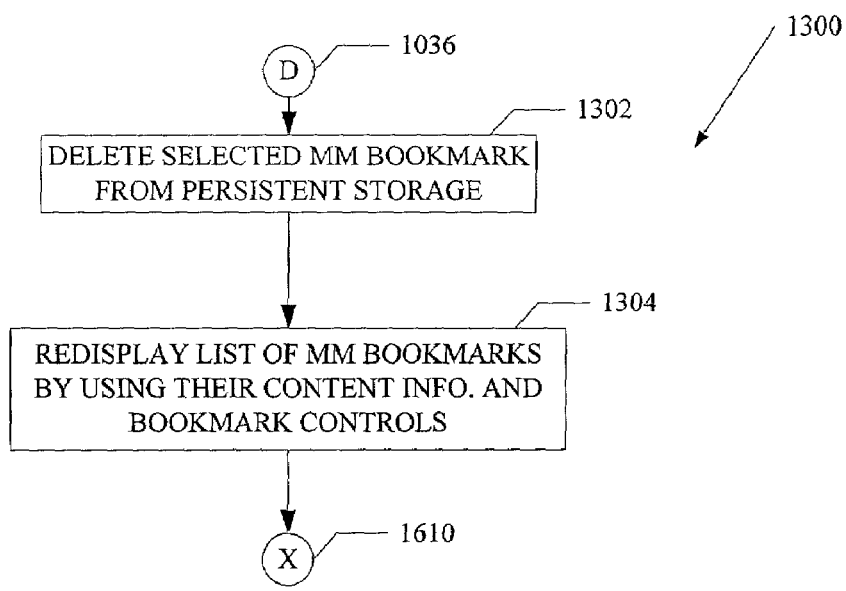
FIG. 13 is a flowchart illustrating an exemplary process of deleting a multimedia bookmark of the present invention.

FIG. 13 is a flow chart illustrating the process of deleting a multimedia bookmark. When the delete-bookmark control is selected (step 1034 of FIG. 10), the method invokes the routine illustrated in FIG. 13. In this particular portion 1300 of the method of the present invention, all positional and content information of the selected multimedia bookmark is deleted from the persistent storage in step 1302. Then, the list of multimedia bookmarks is redisplayed with their content information and bookmark controls in step 1304, and then execution is shifted to the clearing-off routine, step 1610 of FIG. 16.

Figure 14:
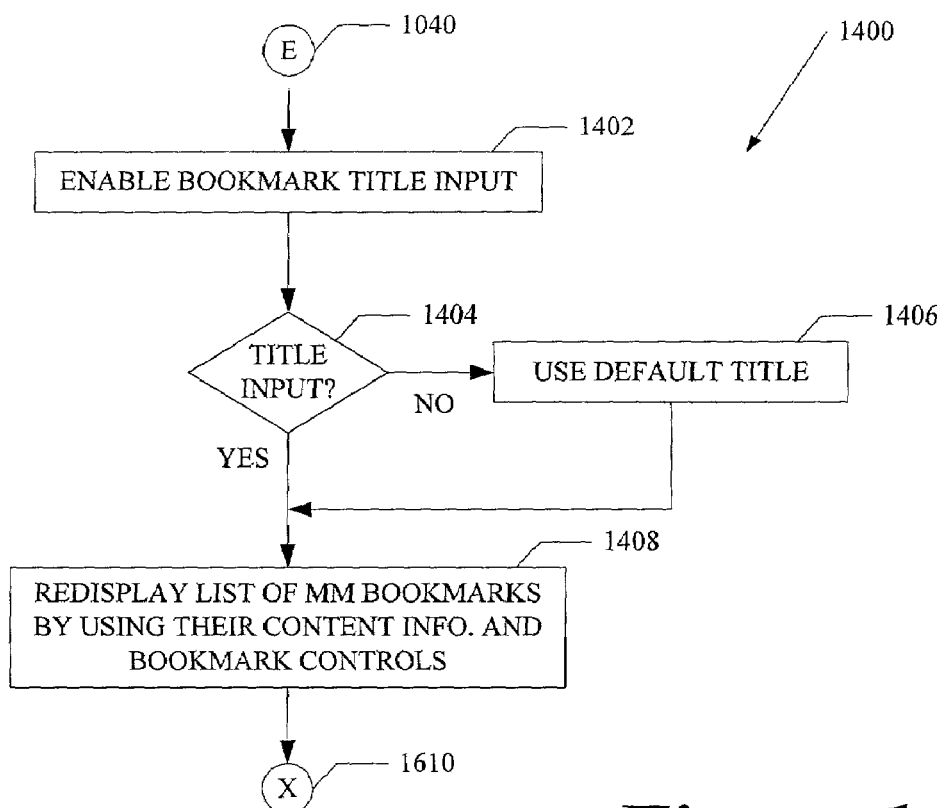
FIG. 14 is a flowchart illustrating an exemplary process of adding a title to a multimedia bookmark of the present invention.

FIG. 14 is a flow chart illustrating the process of adding a title to a multimedia bookmark. When the add-bookmark-title control is selected (step 1038 of FIG. 10), the program goes through this portion 1400 of the method of the present invention. In this routine, the user will be prompted to enter a title in step 1402 for the saved multimedia bookmark. A check is made to determine if the user entered a title in step 1404. If not, the program may provide a default title in step 1406 that may be made in accordance with a predetermined routine. In any case, execution proceeds to step 1408, where the list of multimedia bookmarks is redisplayed with their content information, including the titles and bookmark controls. Thereafter, the method executes the clearing-off routine of step 1610 of FIG. 16.

Figure 15:
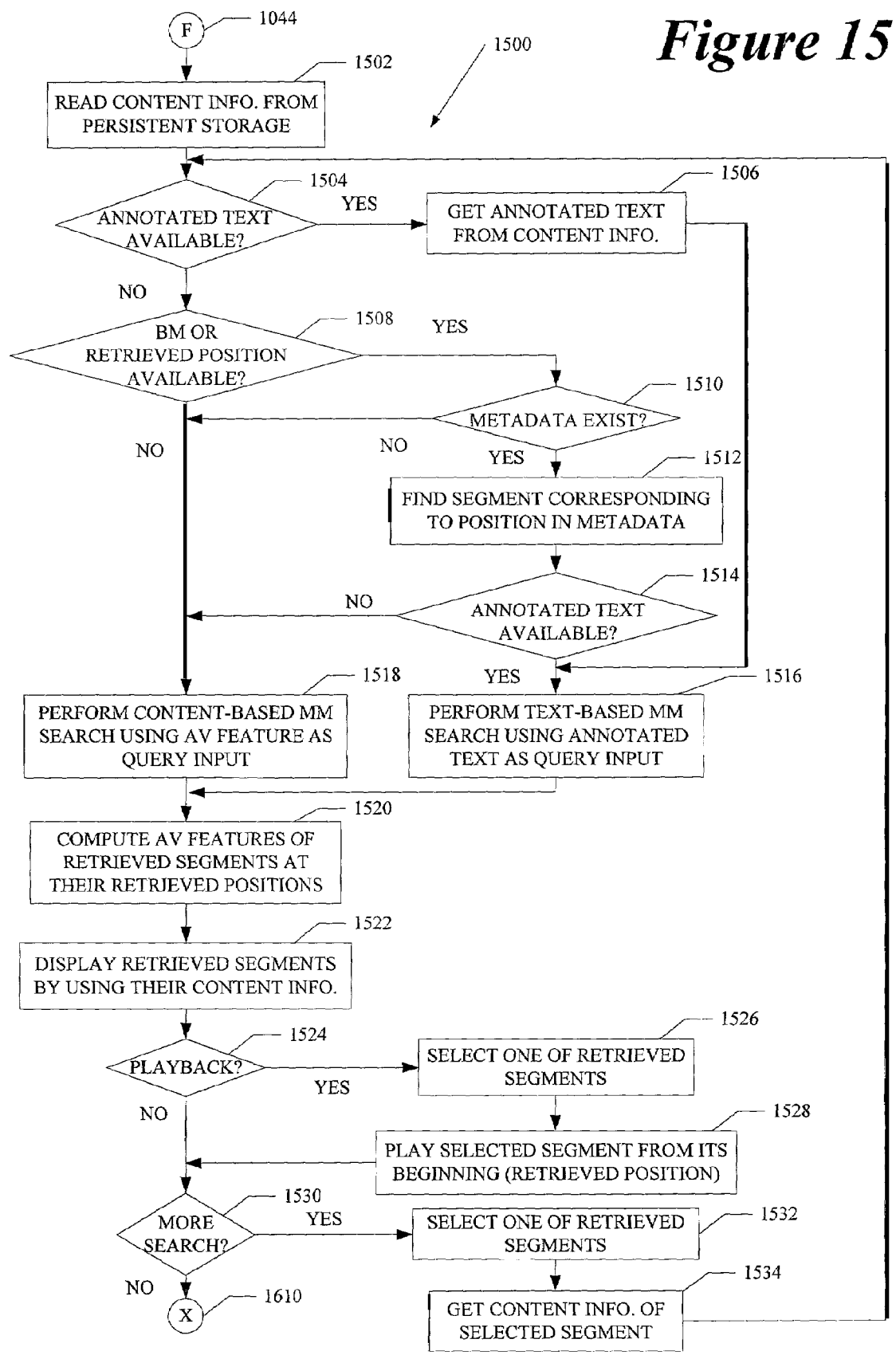
FIG. 15 is a flowchart illustrating an exemplary process of the present invention for searching for the relevant multimedia content based upon content, as well as textual information if available.

FIG. 15 is a flow chart illustrating the portion 1500 of the present invention for searching for the relevant multimedia content based on audio-visual features as well as textual features saved in a multimedia bookmark, if available. The search methods currently available can be largely categorized into two types: content-based search and text-based search. Most of the prior art search engines utilize a text-based information retrieval technique. The present invention also employs content-based multimedia search engines which use, for example, the retrieval technique based on such visual and audio characteristics or features as color histogram and audio spectrum. The content information of a particular segment, stored in a multimedia bookmark, may be used to find other relevant information about the particular segment. For example, a frame-based video search may be employed to find other video segments similar to the particular video segments.

Alternatively, a text-based search may be combined with a frame-based video search to improve the search result. Most of frame-based video search methods are based on comparing low-level features such as colors and texture. These methods lack semantics necessary for recognition of high-level features. This limitation may be overcome by combining a text-based search. Most available multimedia contents are annotated with text. For example, video segments showing President Clinton may be annotated with "Clinton." In that case, the combined search using the image of Clinton wearing a red shirt as a bookmark may find other video segments containing Clinton, such as the segment showing Clinton wearing a blue shirt.

When the user selects as a query input a particular bookmark or partial segment of the multimedia content such as a thumbnail image in the case of a video search, the search routine (1044 of FIG. 15) is invoked in the following three scenarios:

i. The user selects search control (step 1042 of FIG. 10) in order to retrieve the multimedia content relevant to the query;
ii. The URI of the bookmarked multimedia content is not valid (the result of step 1204 of FIG. 12 is negative); and
iii. The URI of the bookmarked multimedia content is valid, but the bookmarked position is not available (the result of step 1206 of FIG. 12 is negative and the result of step 1208 is positive).

Once invoked, this portion 1500 is invoked and the content information of the multimedia bookmark such as audio-visual and textual features of the query input and the positional information, if available, are read from persistent storage in step 1502. Examples of visual features for the multimedia bookmark include, but are not limited to, captured frames in JPEG image compression format or color histograms of the frames.

In step 1504, a check is made to determine if the annotated texts are available. If so, the annotated text is retrieved directly from the content information of the bookmark in step 1506 and execution proceeds immediately to step 1516, where the process of the text-based multimedia search is performed by using the annotated texts as query input, resulting in the multimedia segments having texts relevant to the query. If the result of step 1504 is negative, the annotated texts can be also obtained by accessing the metadata, using the positional information. Thus a check is made in step 1508 to determine if the positional information is available. If so, then another check is made to determine if the metadata exist in step 1510. If so (i.e., the result of step 1510 is positive), step 1512 is executed, where a segment corresponding to the bookmarked position in the metadata is found. A check is then made to determine if some annotated texts for the segment are available in step 1514. If so (i.e., the result of step 1514 is positive), the text-based multimedia search is also performed in step 1516. If the annotated texts or the positional information is not available from the content information of the bookmark (i.e., the result of step 1514 is negative) or from the metadata (i.e., the result of step 1510 is negative), then a content-based multimedia search is performed by using the audio-visual features of the bookmark as query input in step 1518. The result of step 1518 is that the resulting multimedia segments have audiovisual features similar to the query. It should be noted that both the text-based multimedia search (step 1516) and the content-based multimedia search (step 1518) can be performed in sequences, thus combining their results. Alternatively, one search can be performed based the results of the other search, although they are not presented in the flow chart of FIG. 15.

The audio-visual features of the retrieved segments at their retrieved positions are computed in step 1520 and temporarily stored to show visually the search results in step 1522, as well as to be used as query input to another search if desired by the user in steps 1530, 1532, and 1534. If the user wants to play back one of the retrieved segments, i.e., the result of step 1524 is positive, the user selects a retrieved segment in step 1526, and plays back the segment from the beginning of the segment in step 1528. The beginning of the retrieved segment that was selected is called as the retrieved position in either step 1528 or step 1508. If the user wants another search (i.e., the result of step 1530 is positive), the user selects one of retrieved segments in step 1532. Then, the content information, including audio-visual features and annotated texts for the selected segment, is obtained by accessing temporarily stored audio-visual features and/or the corresponding metadata in step 1534, and the new search process begins at step 1504. If the user wants no more playbacks and searches, the execution is transferred to the clearing-off routine, step 1610 of FIG. 16.

Depending on the kind of information available in the multimedia bookmark, there can be a handful of client-server-based search scenarios. An excellent example is the multimedia bookmarks of the present invention. With the combination of the multimedia bookmark information tabulated in Table 2, some examples of the client-server-based search scenario are described. Note that even if the text-based search is used in the description of the present invention, a user does not type in the keywords to describe the video that the user seeks. Moreover, the user might be unaware of doing text-based search. The present invention is designed to hide this cumbersome process of keyword typing from the user.

TABLE 2

Search types with available bookmark information

| Search Type | Available bookmark information | | |
|---|---|---|---|
| | Captured Image | Positional Info. | Annotated Text |
| A | ✓ | | |
| B | | ✓ | |
| C | | | ✓ |
| D | ✓ | ✓ | |
| E | ✓ | | ✓ |
| F | | ✓ | ✓ |
| G | ✓ | ✓ | ✓ |

Search Type A: The multimedia bookmark has only information on image.

1. When a user at a client side selects a bookmarked image, the client sends the image data to the server as a query frame.
2. The server finds the segment containing the query frame using a frame-based video search.
3. The server checks if the segment has annotated text. If so, go to step 4. Otherwise, provide the user with the result of the frame-based video search and terminate.
4. The server performs a text-based video search using the annotated text as keywords.
5. Provide the user with the combined results of the frame-based search in step 2 and the text-based search in step 4.

Search Type B: The multimedia bookmark has only positional information.

1. When a user at a client side selects a multimedia bookmark, the client sends the position information about the image to the server.
2. The server performs a frame-based video search, using as a query frame the frame corresponding to the specified position.
3. The server checks if the segment at the specified position has annotated text. If so, go to step 4. Otherwise, provide the user with the result of the frame-based video search and terminate.
4. The server performs a text-based video search using the annotated text as keywords.
5. Provide the user with the combined results of steps 2 and 4.

Search Type C: The multimedia bookmark has only annotated text. When a sever at a client side selects a multimedia bookmark, the client sends the annotated text to the server.

1. The server performs a text-based video search using the annotated text as keywords.
2. Provide the user with the result of step 2.

Search Type D: The multimedia bookmark has both image and positional information. This type of search can be implemented in the way of either Search Type A or B.

Search Type E: The multimedia bookmark has both image and annotated text.

1. When a user at a client side selects a bookmark image, the client sends the image data and the annotated text to the server.
2. The server performs a frame-based video search using the image as a query image.
3. The server performs a text-based video search using the annotated texts as search keywords. Note that the execution order of steps 2 and 3 can be switched.
4. Provide the user with the combined results of steps 2 and 3.

Search Type F: The multimedia bookmark has both positional information and annotated text.

1. When a user at a client side selects a multimedia bookmark, the client sends the positional information and the annotated texts to the server;
2. The server performs a frame based video search, using the frame corresponding to the specified position as a query frame.
3. The server performs a text-based video search using the annotated texts as search keywords. Note that the execution order of steps 2 and 3 can be switched.
4. Provide the user with the combined results of steps 2 and 3.

Search Type G: The multimedia bookmark has all the information: image, position, and annotated text. This type of search can be implemented in the way of either Search Type E or F.

FIG. 16 is a flow chart illustrating the method of sending a bookmark to other people via e-mail. When the send-bookmark control is selected (step 1046 of FIG. 10), step 1048 of FIG. 16 is invoked. According to the method of FIG. 16, all saved bookmark information, including the URI, the bookmarked position and metadata ID, the audio-visual and the textual features of a selected multimedia bookmark to be sent, are read from the persistent storage in step 1602. Then, in step 1604, the user will be prompted to enter some related input in order to send an e-mail to another individual or a group of people. If all of the necessary information is input by the user in step 1606, the e-mail is sent to the designated persons with the bookmark information in step 1608. At this point, the method goes into the clearing-off routine, step 1610, that may be entered from several other portions of the method shown in FIGS. 11, 12, 13, 14, and 15. As shown in FIG. 16, a check is made in step 1612 to determine if other multimedia contents are available. If so, execution of the method is transferred to step 1002 of FIG. 10. Otherwise, execution of the method is transferred to step 1016 of FIG. 10.

The multimedia bookmark may consist of the following bookmarked information:

1. URI of a bookmarked file;
2. Bookmarked position;
3. Content information such as an image captured at a bookmarked position;
4. Textual annotations attached to a segment which contains the bookmarked position;
5. Title of the bookmark;
6. Metadata identification (ID) of the bookmarked file;
7. URI of an opener web page from which the bookmarked file started to play; and
8. Bookmarked date.

The bookmarked information includes not only positional (1 and 2) and content information (3, 4, 5, and 6) but also some other useful information, such as opener web page and bookmarked date, etc.

The content information can be obtained at the client or server side when its corresponding multimedia content is being played in networked environment. In case of a multimedia bookmark, for example, the image captured at a bookmarked position (3) can be obtained from a user's video player or a video file stored at a server. The title of a bookmark (5) might be obtained at a client side if a user types in his own title. Otherwise, a default title, such as a title of a bookmarked file stored at a server, can be used as the title of the bookmark. The textual annotations attached to a segment which contains the bookmarked position are stored in a metadata in which offsets and time scales of variations also exist for the durable bookmark. Thus, the textual annotations (4) and metadata ID (6) are obtained at a server.

The bookmarked information can be stored at a client's or server's storage regardless of the place where the bookmarked information is obtained. The user can send the bookmarked information to others via e-mail. When the bookmarked information is stored at a server, it is simple to send the bookmarked information via e-mail, that is, to send just a link of the bookmarked information stored at a server. But, when the bookmarked information is stored at a user's storage, the user has to send all of the information to another via e-mail. The delivered bookmarked information can then be stored at the receiver's storage, and the bookmarked multimedia content starts to play exactly from the bookmarked position. Also, the bookmarked multimedia content can be replayed at any time the receiver wants.

Some content information of the bookmarked information, such as a captured image, is also multimedia data, and all the other information, including the positional information is textual data. Both forms of the bookmarked information stored at a user's storage are sent to other person within a single e-mail. There can be two possible methods of sending the information from one user to another user via an e-mail:

1. Using the watermarking technology: All textual information can be encoded into the content information. For the case of multimedia bookmark, all textual information such as a URL of a video file and a bookmarked position expressed as a time code can be encoded into an thumbnail image captured at the bookmarked position. According to the watermarking technology, the image encoded with the texts can be visually almost the same as the original image. The image encoded with the texts can be attached to any e-mail message. The image delivered with the message can then be decoded, and the separated image and the texts be saved at a receiver's storage.

2. Using an HyperText Markup Language (HTML) document: An HTML document can be sent via e-mail. All textual parts of bookmarked information can be directly included in the HTML document to be sent via e-mail. But the captured image in case of a multimedia bookmark cannot be directly included in the HTML from which the included image will be detached and stored at a receiver's local storage. This is because the image is represented in a binary file format. Sending the binary image within an HTML document can be possible by converting the binary image into a text string with encoders, such as Base-16 or Base-64, and directly including it in an HTML document as a normal character string. The converted image is called as an inline media by which one can locate any multimedia file in an HTML document. When the HTML is sent to another user, the included text image is decoded into a binary image, thus being saved and displayed at the user's storage and screen, respectively. The receiving user may not view the detailed information, but can play the multimedia content from the bookmarked position. Table 3 is a sample HTML document which includes both the captured content image and the last of the textual bookmarked information.

TABLE 3

An example of HTML document holding bookmarked information

```
<Html>
    <Body>
        <Object id="IMDisplay" codebase=http://www.server.com/BookmarkViewer
            classid=CLSID:FFD1F137-722C-46B7 VIEWASTEXT>
            <Param name="BookmarkedFile" value="mms://www.server.com/sample.mpg">
            <Param name="BookmarkedPosition" value="435.78705499999995">
            <Param name="OpenerURL" value="http://www.server.com/sample..html">
            <Param name="BookmarkTitle" value="Sample Title">
            <Param name="BookmarkDate" value="July 24">
            <!--Inline media: character coded binary image-->
            <Param name ="CapturedImage"
                value="/9j/4AAQSkZJRgABAQAAAQABAAD/2wBDAAMC
AgMCAgMDAwMEAwMEBQgFBQQEBQoHBwYIDAoMDAsKCwsNDhIQDQ4R
DgsLEBYQERMUFRUVDA8XGBYUGBIUFRT/2wBDAQMEBAUEBQkFBQkUD
QsNFBQUFBQUFBQUFBQUFBQUF/ ....
xXluhIEakJ9+7Db8blCELwzAvsfiP4htpVE9yHtY12pawxwoI0MqyFUwhCrjeoUAAB
8AYGD41RR7Fdyrva59E6f+0F4s0HV7bXNHvDp2twwJb29zb29vGsK7JUkEapEMK
yugKsSD5eW3fKEx/GfxZ8WfEOx0W28SarJq0GkI0NgJ4o1aGNipZA4UMV+UEAk
4xk58OooVL10uFz//2Q= =">
        </Object>
    </Body>
</Html>
```

Figure 17:
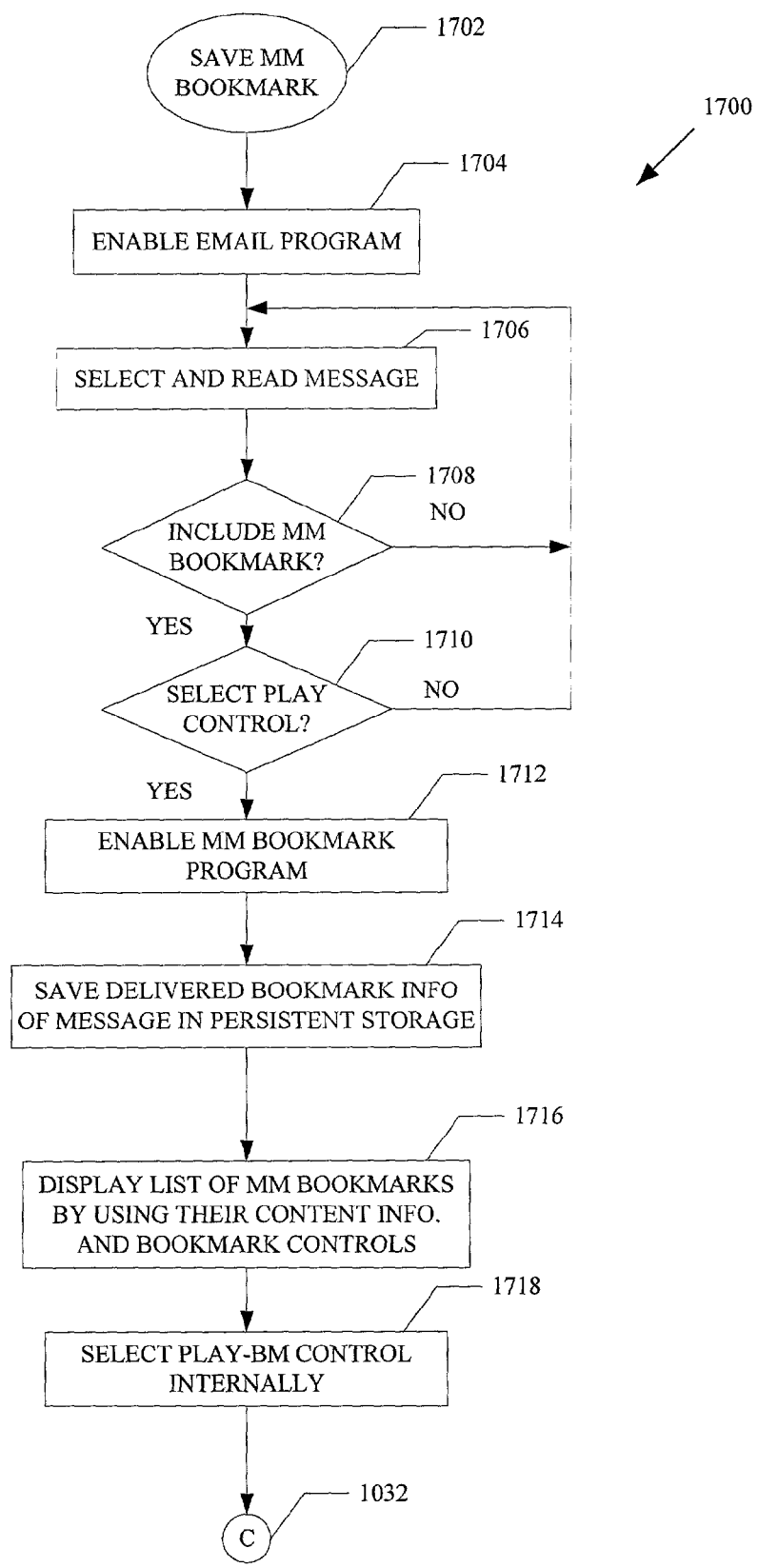
FIG. 17 is a flowchart illustrating an exemplary method of the present invention for e-mailing a multimedia bookmark of the present invention.

FIG. 17 is an exemplary flow chart illustrating the process of saving a multimedia bookmark at a receiving user's local storage. When a user invokes his e-mail program in step 1704, the user selects a message to read in step 1706. A check is made in step 1708 to determine if the message includes a multimedia bookmark. If not, execution is moved to step 1706 where the user selects another message to read. Otherwise, another check is made in step 1710 to determine if the user wants to play the multimedia bookmark by selecting a play control button, which appears within the message. If not, execution is also moved to step 1706, where the user selects another message to read. Otherwise, in step 1712, a multimedia bookmark program having such a user interface illustrated in FIG. 9 is invoked. In step 1714, the delivered bookmark information included in the message is saved at the user's persistent storage, thus adding the delivered multimedia bookmark into the user's list of local multimedia bookmarks. Then, in step 1716, content information of the saved multimedia bookmark can appear at the multimedia bookmark program. Next, the play-bookmark control is internally selected in step 1718. Execution is then moved to step 1032 of FIG. 12.

Sending Messages to Mobile Devices

Short Message Service (SMS) is a wireless service enabling the transmission of short alphanumeric messages to and from mobile phones, facsimile machines, and/or IP addresses. The method of the present invention, which provides for sending a multimedia bookmark of the present invention between an IP address and a mobile phone, and also between mobile phones and other mobile phones, is based on the SMS architecture and technologies.

Figure 18:
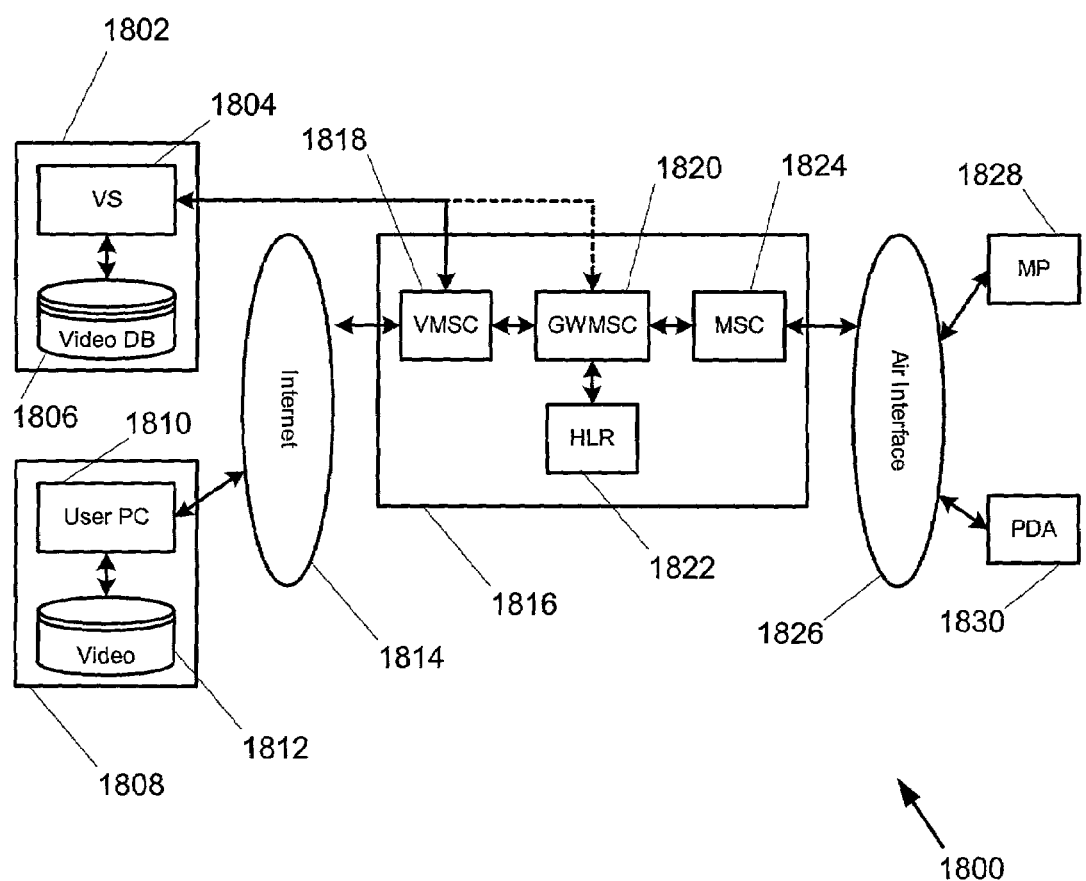
FIG. 18 is a block diagram illustrating an exemplary system for transmitting multimedia content to a mobile device using the multimedia bookmark of the present invention.

FIG. 18 illustrates the basic elements of this embodiment of the present invention. Specifically, the video server VS 1804 of the server network 1802 is responsible for streaming video over wired or wireless networks. The server network 1802 also has the video database 1806 that is operably connected to the video server 1804.

The multimedia bookmark message service center (VMSC) 1818 acts as a store-and-forward system that delivers a multimedia bookmark of the present invention over mobile networks. The multimedia bookmark sent by a user PC 1810, either stand-alone or part of a local area network 1808, is stored in VMSC 1818, which then forwards it to the destination mobile phone 1828 when the mobile phone 1828 is available for receiving messages.

The gateway to the mobile switching center 1820 is a mobile network's point of contact with other networks. It receives a short message like a multimedia bookmark from VMSC and requests the HLR about routing information, and forwards the message to the MSC near to the recipient mobile phone.

The home location register (HLR) 1822 is the main database in the mobile network. The HLR 1822 retains information about the subscriptions and service profile, and also about the routing information. Upon the request by the GWMSC 1820, the HLR 1822 provides the routing information for the recipient mobile phone 1828 or personal digital assistant 1830. The mobile phone 1828 is typically a mobile handset. The PDA 1830 includes, but is not limited to, small handheld devices, such as a Blackberry, manufactured by Research in Motion (RIM) of Canada.

The mobile switching center 1824 (MSC) switches connections between mobile stations or between mobile stations and other telephone and data networks (not shown).

Sending a Multimedia Bookmark to a Mobile Phone from a PC

Figure 19:
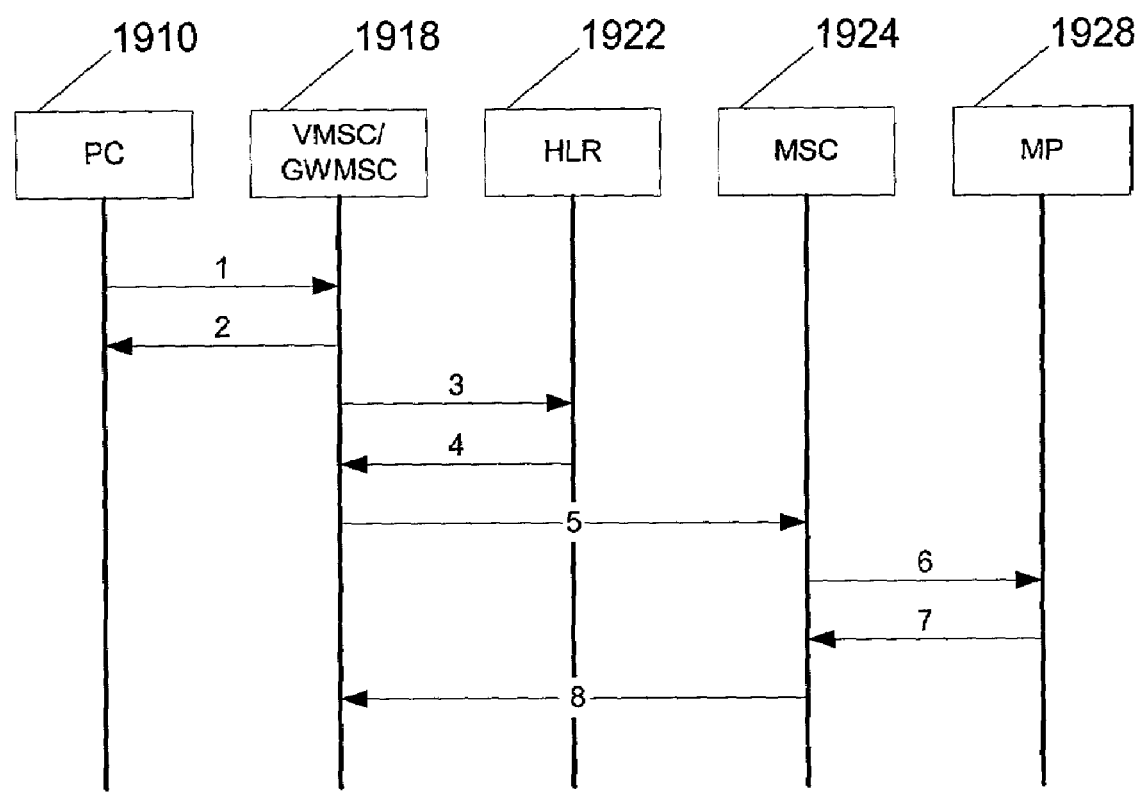
FIG. 19 is a block diagram illustrating an exemplary message signal arrangement of the present invention between a personal computer and a mobile device.

FIG. 19 illustrates the method of the present invention for sending a multimedia bookmark from a personal computer to a mobile telephone over a mobile network. In step 1 of FIG. 19, the personal computer submits a multimedia bookmark to the VMSC 1918. Next, in step 2, the VMSC 1918 returns an acknowledgement to the PC 1910, indicating the reception of the multimedia bookmark. In step 3, the VMSC 1918 sends a request to the HRL 1922 to look up the routing information for the recipient mobile. Then the HRL 1922 sends the routing information back to the VMSC 1918, step 4. In step 5, the VMSC 1918 invokes the operation to send the multimedia bookmark to the MSC 1924. Then, in step 6, the MSC delivers the multimedia bookmark to the mobile phone 1928. In step 7, the mobile phone 1928 returns an acknowledgement to the MSC 1924. Then in step 8, the MSC 1924 notifies the VMSC 1918 of the outcome of the operation invoked in step 5. Incidentally, the method described above is equally applicable to personal digital assistants that are connected to mobile networks.

Sending a Multimedia Bookmark to a Mobile Phone from Another Mobile Phone

Figure 20:
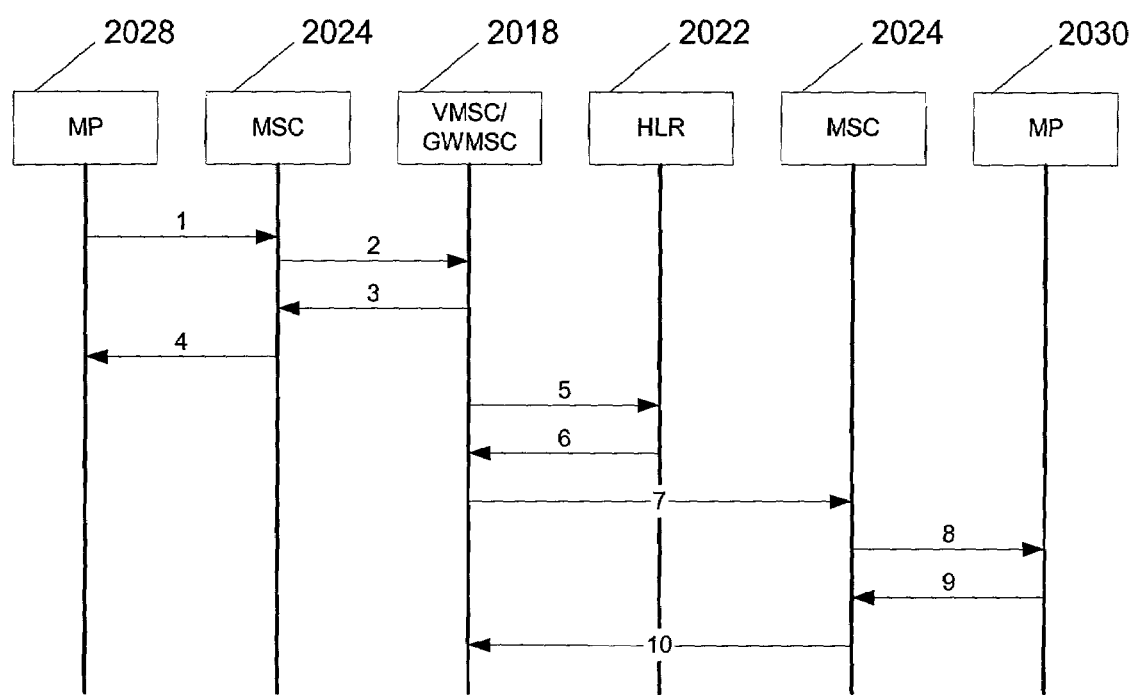
FIG. 20 is a block diagram illustrating an exemplary message signal arrangement of the present invention between two mobile devices.

FIG. 20 illustrates an alternate embodiment of the present invention that enables the transmission of a multimedia bookmark from one mobile device to another. Referring to FIG. 20, the method begins at step 1, where the mobile phone 2028 submits a request to the MSC 2024 to send a multimedia bookmark to another mobile telephone customer. In step 2, the MSC 2024 sends the multimedia bookmark to the VMSC 2018. Thereafter, in step 3, the VMSC 2018 returns an acknowledgement to the MSC 2024. In step 4, the MSC 2024 returns to the sending mobile phone 2028 an acknowledgement indicating the acceptance of the request. In step 5, the VMSC 2018 queries the HLR 2022 for the location of the recipient mobile phone 2030. It should be noted that the sender or the recipient need not be a mobile telephone. The sending and/or receiving device could be any device that can send or receive a signal on a mobile network. In step 6 of FIG. 20, the HLR 2022 returns the identity of the destination MSC 2024 that is close to the recipient device 2030. Then the VMSC 2018 delivers the multimedia bookmark to the MSC 2024 in step 7. Then, in step 8, the MSC 2024 delivers the multimedia bookmark to the recipient mobile device 2030. In step 9, the mobile device 2030 returns an acknowledgement to the MSC 2024 for the acceptance of the multimedia bookmark. Finally, in step 10, the MSC 2024 returns to the VMSC 2018 the outcome of the request (to send the multimedia bookmark).

Playing Video on a Mobile Handset or Other Mobile Device

Figure 21:
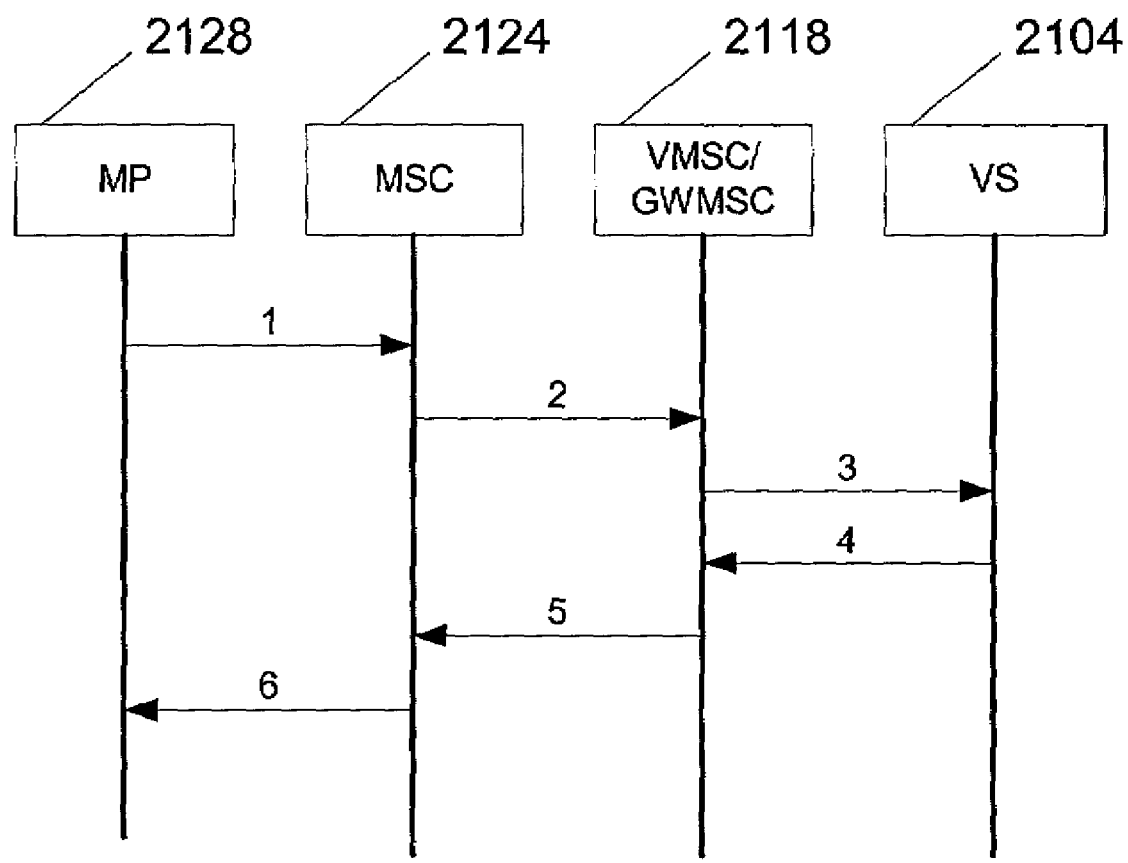
FIG. 21 is a block diagram illustrating an exemplary message signal arrangement of the present invention between a video server and a mobile device.

FIG. 21 illustrates an alternate embodiment of the present invention for playing video sequences on a mobile device. Specifically, the method begins generally at step 1, where the mobile device 2128 submits a request to the MSC 2124 to play the video associated with the multimedia bookmark. In step 2, the MSC 2128 sends the request with the multimedia bookmark to the VMSC 2118. It is often the case that the video pointed to by the multimedia bookmark cannot be streamed directly to the mobile device 2128. For example, if the marked video that is in high bit rate format is to be transmitted to the mobile device 2128, then the high bit rate video data might not be delivered properly due to the limited bandwidth available. Further, the video might not be properly decoded on the mobile device 2128 due to the limited computing resources on the mobile device. In that case, it is desirable to deliver a low bit rate version of the same video content to the mobile device 2128. However, a problem occurs when the position specified by the multimedia bookmark does not point to the same content for the low bit rate video. To solve the problem, prior to relaying the request to VS 2104, the VMSC 2118 decides which bit rate video is the most suitable for the current mobile device 2128. The VMSC 2118 also calculates the new marked location to compensate for the offset value due to the different encoding format or different frame rate needed to display the video on the mobile device 2128. After completing this internal decision and computation, in step 3, the VMSC 2118 sends the modified multimedia bookmark to the video server 2104, using the server IP address designated in the multimedia bookmark. Thereafter, in step 4, the video server 2104 starts to stream the video data down to the VMSC 2118. Subsequently, in step 5, the VMSC 2118 passes the video data to the MSC 2124. Then, in step 6, the MSC 2124 delivers the video data to the service requester, mobile device 2128. Steps 4 though 6 are repeated until the mobile device 2128 issues a termination request.

User History

The metadata associated with multimedia bookmark include positional information and content information. The positional information can be a time code or byte offset to denote the marked time point of the video stream. The content information consists of textual information (features) and audio-visual information. There are two types of textual information depending upon its source: i) a bookmark user and ii) a bookmark server. When a user makes a multimedia bookmark at the specific position of the video stream (generally, multimedia file), i) a user can input the text annotation and other metadata that the user would like to associate with the bookmark, and/or ii) the multimedia bookmark system (server) delivers and associates the corresponding metadata with the bookmark. An example of metadata from the server includes the textual annotation describing the semantic information of the bookmarked position of the video stream.

The semantic annotation or description or indexing is often performed by humans since it is usually difficult to automatically generate semantic metadata by using the current state of the art video processing technologies. However, the problem is that the manual annotation process is time-consuming, and, further, different people, even the specialists, can differently describe the same video frames/segment.

The present invention discloses an approach to solve the above problem by making use of (bookmark) user's annotations. It enables video metadata to gradually be populated with information from users as time goes by. That is, the textual metadata for each video frames/segment are improved using a large number of users' textual annotations.

The idea behind the invention is as follows. When a user makes a multimedia bookmark at the specific position, the user is asked to enter the textual annotation. If the user is willing to annotate for his/her own later use, the user will describe the bookmark using his/her own words. This textual annotation is delivered to the server. The server collects and analyzes all the information from users for each video stream. Then, the analyzed metadata that basically represent the common view/description among a large number of users are attached to the corresponding position of the video stream.

Figure 54:
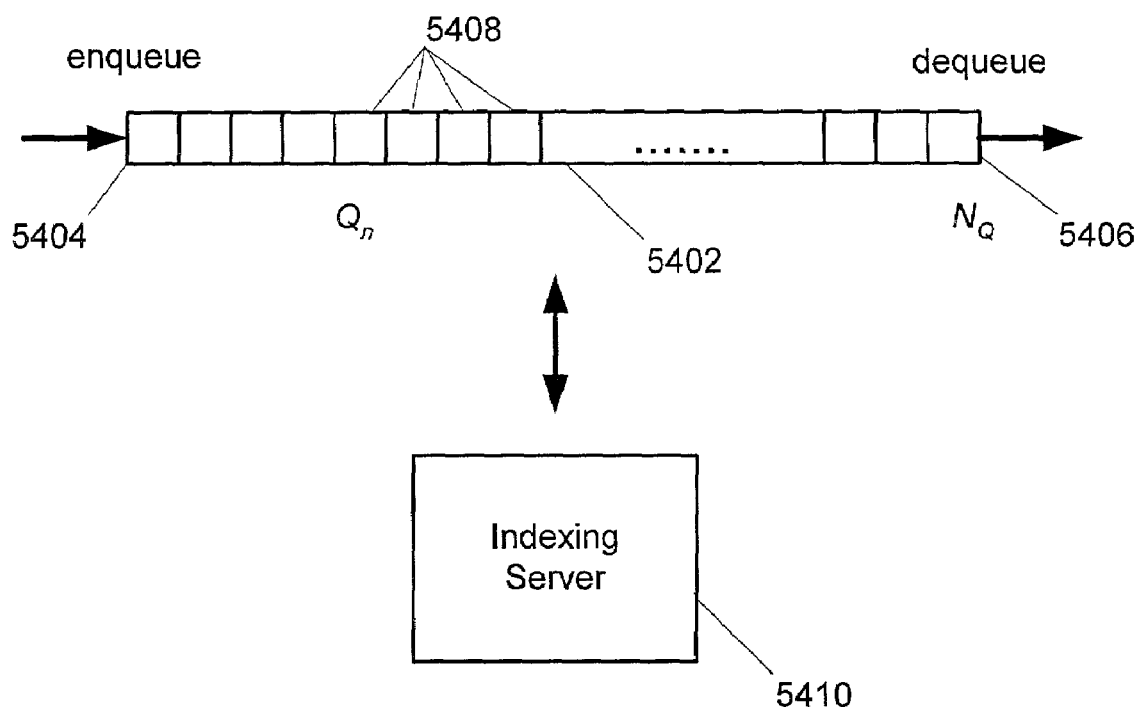
FIG. 54 is a block diagram of an exemplary relevance queue of the present invention.

For each video stream, there is a queue of size N, called "relevance queue," that keeps the textual annotation with the corresponding bookmarked position as shown in FIG. 54. Specifically, FIG. 54 shows a relevance queue 5402 having an enqueue 5404 and a dequeue 5406 with one or more intermediate elements 5408.

The queue of FIG. 54 is initially empty. When a user makes a multimedia bookmark at the specific position of the video stream (generally multimedia file), a user inputs the text annotation that the user would like to associate with the bookmark. The text annotation is delivered to the server and is enqueued. For example, assume the first element of the queue 5404 for the golf video stream $V_a$ is "Tiger Woods; 01:21:13:29." A second user subsequently marks a new element at the 01:21:17:00 in hours:minutes:seconds:frames of the golf video stream $V_a$ (same video stream as before) and enters the keyword "Tee Shot." Then, the first element is shifted to the second and the new input is entered into the relevance queue 5402 for the video stream $V_a$ at the enqueue 5404. This queue operation continues indefinitely.

Periodically, the video indexing server 5410 regularly analyzes each queue. Suppose, for instance, that the video stream is segmented into a finite number of time intervals using the automatic shot boundary detection method. The indexing server 5410 groups the elements inside the queue by checking time codes so that the time codes for each group are included by each time interval corresponding to each segment. For each group, the frequency of each keyword is computed and the highly frequent keywords are considered as new semantic text annotation for the corresponding segment. In this way, the semantic textual metadata for each segment can be generated by utilizing a large number of users.

Application of User History to Text Search Engine

When users make a bookmark for a specific URL like www.google.com, they can add their own annotations. Thus, if the text engine maintains a queue for each document/URL, it can collect a large number of users' annotations. Therefor, it can analyze the queue and find out the most frequent words that become new metadata for the document/URL.

In this way, the search engine would continuously have users update and enrich the text databases. This would help in the internationalization of the process, as users who are not native speakers of the particular web site content would annotate the contents in their own language and help their countrymen who conduct a search using their native tongue to find the site.

Adaptive Refreshing

The present invention provides a methodology and implementation for adaptive refresh rewinding, as opposed to traditional rewinding, which simply performs a rewind from a particular position by a predetermined length. For simplicity, the exemplary embodiment described below will demonstrate the present invention using video data. Three essential parameters are identified to control the behavior of adaptive refresh rewinding: that is, how far to rewind, how to select which refresh frames in the rewind interval, and how to present the chosen refresh video frames on a display device.

Rewind Scope

The scope of rewinding implies how much to rewind a video back toward the beginning. For example, it is reasonable to set 30 seconds before the saved termination position, or the last scene boundary position viewed by the user. Depending on a user preference, the rewind scope may be set to a particular value.

Frame Selection

Depending on the time a set of refresh frames is determined, the selection can be static or dynamic. A static selection allows the refresh frames to be predetermined at the time of DB population or at the time of saving the termination position, while a dynamic selection determines the refresh frames at the time of the user's request to play back the terminated video.

The candidate frames for user refresh can be selected in many different ways. For example, the frames can be picked out at random or at some fixed interval over the rewind interval. Alternatively, the frames at which a video scene change takes place can be selected.

Frame Presentation

Depending on the screen size of display devices, there might be two presentation styles: slide show and storyboard. The slide show is good for devices with a small display screen while the storyboard may be preferred with devices having a large display screen. In the slide show presentation, the frames keep appearing sequentially on the display screen at regular time intervals. In the storyboard presentation, a group of frames is simultaneously placed on the large display panel.

Figure 55:
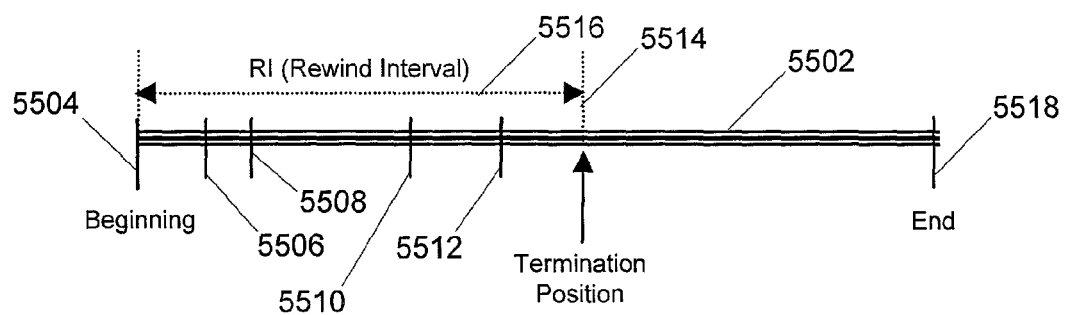
FIG. 55 is a timeline diagram showing an exemplary embodiment of the rewind method of the present invention.

FIG. 55 illustrates an embodiment of the rewind aspect of the present invention. If during playback a video is paused, terminated or otherwise interrupted, the viewing user or the client system displaying the video preferably sends a request to mark the video at the point of interruption to the server delivering the multimedia content to the client device. As illustrated in FIG. 55, upon receipt of a request to mark, an instance between beginning 5504 and end 5518 of video or multimedia content 5502 is preferably selected as the videos termination or marked position 5514. Then, using marked position 5514 and metadata associated with the video or multimedia content, the server randomly selects a sequence of refresh frames 5506, 5508, 5510 and 5512 from rewind interval 5516 for storage on a storage device. When the viewing user or client later initiates playback of the interrupted video, the server first delivers the sequence of refresh frames 5506, 5508, 5510 and 5512 to the client. At the client system, refresh frames 5506, 5508, 5510 and 5512 are preferably displayed either in a slide-show or storyboard format before the video or multimedia content 5502 resumes playback from termination or marked position 5514.

Figure 56:
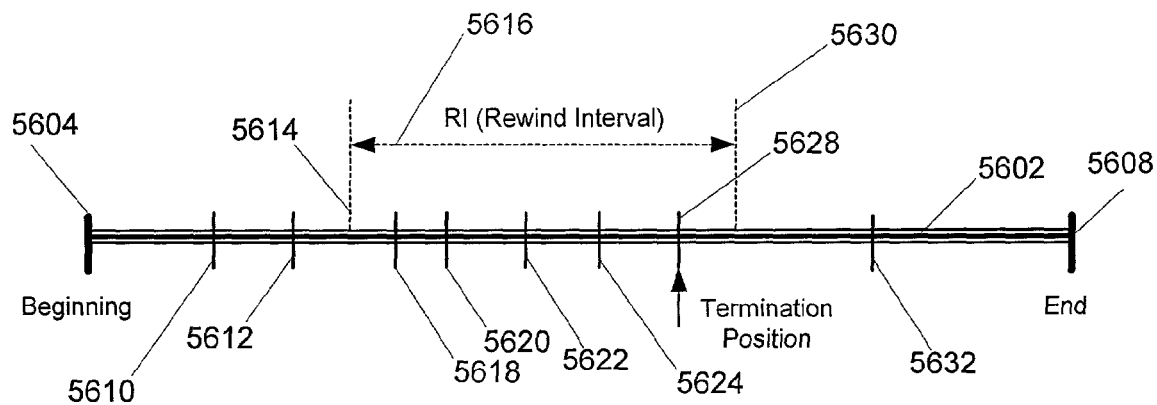
FIG. 56 is a timeline diagram showing an exemplary embodiment of the rewind method of the present invention.

FIG. 56 illustrates an alternate embodiment of the rewind aspect of the present invention. In this embodiment, upon interruption of multimedia content 5602, having a length from beginning 5604 to end 5608, such as a video, a request to mark the current location of video is sent by the client system to the network server. Having preferably run a scene change detection algorithm over the video or multimedia content 5602 at the time of database population, the network server has already retained a list of scene change frames 5610, 5612, 5618, 5620, 5622, 5624, 5628 and 5632. Using the list of scene change frames 5610, 5612, 5618, 5620, 5622, 5624, 5628 and 5632 as well as the information associated with termination or marked position 5630, the network server is able to determine the sequence of refresh frames 5618, 5620, 5622, 5624 and 5628 over the interval between viewing termination position 5630 and beginning position 5614, or alternatively, the rewind internal 5616. Once playback of the video or multimedia content 5602 is restarted, the network server preferably delivers to the client the sequence of selected refresh frames 5618, 5620, 5622, 5624 and 5628. Refresh frames 5618, 5620, 5622, 5624 and 5628 are then preferably displayed by the client in a slide-show or storyboard manner before the video or multimedia content 5602 continues from termination position 5630.

A third embodiment of the method of the present invention may also be gleaned from FIG. 56. In this embodiment, a request to mark the current location or termination position 5630 of the video is sent to the network server by the client. When playback of the interrupted video or multimedia content 5602 is later requested, the server preferably executes a scene change detection algorithm on the rewind interval 5616, i.e., the segment of multimedia content 5602 between viewing beginning position 5614 and termination position 5630. Upon completion of the scene detection algorithm, the network server sends the client system the resulting list of scene boundaries or scene change frames 5618, 5620, 5622, 5624 and 5628, which will serve as refresh frames. Playback of the video or multimedia content 5602 preferably begins upon completion of the client's display of refresh frames 5618, 5620, 5622 and 5624.

Figure 57:
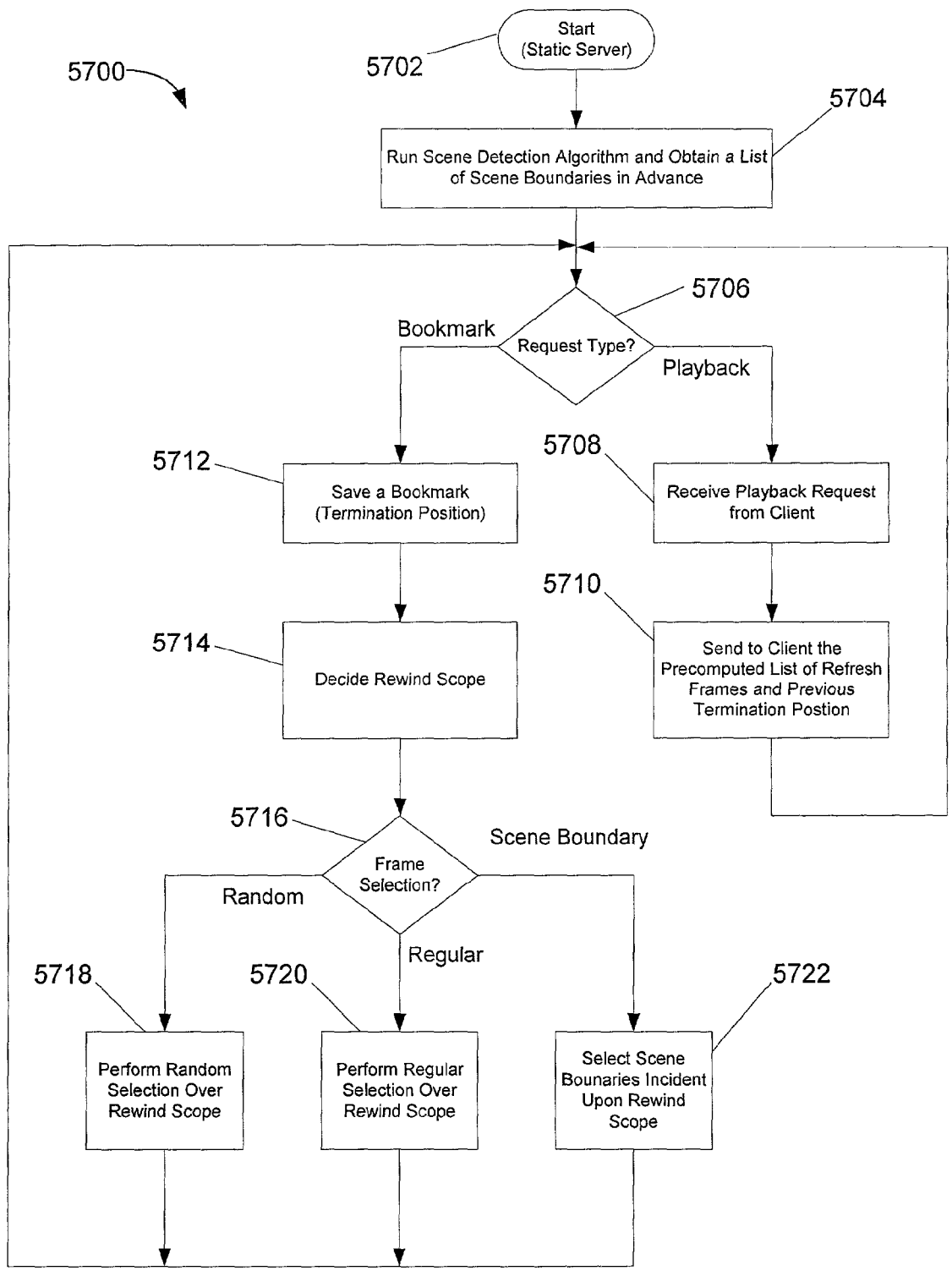
FIG. 57 is a flowchart showing an exemplary embodiment of the retrieval method of the present invention.

Illustrated in FIG. 57 is a flow chart depicting a static method of adaptive refresh rewinding implemented on a network server according to teachings of the present invention. Upon initiation at step 5702, method 5700 preferably proceeds to step 5704, where the network server runs a scene detection algorithm on video or other multimedia content to obtain a list of scene boundaries in advance of video or other multimedia content playback.

Upon completion of the scene detection algorithm at step 5704, method 5700 preferably proceeds to step 5706, where a request received from a client system by the network server is evaluated to determine its type. Specifically, step 5706 determines whether the request received by the network server is a video or multimedia content bookmark or playback request.

If the request is determined to be a playback request, the playback request is preferably received by the network server at step 5708. At step 5710, the network server then preferably sends the client system a pre-computed list of refresh frames and the previous termination position for the video or multimedia media content requested for playback.

Alternatively, if the request is determined to be a video or multimedia content bookmark request at step 5706, method 5700 preferably proceeds to step 5712. At step 5712, a multimedia bookmark, preferably using termination position information received from the client, may be created and saved in persistent storage.

At step 5714, the rewind scope for the bookmark is preferably decided. As mentioned above, the rewind scope generally defines how much to rewind the video or multimedia file back towards its beginning. For example, the rewind scope may be a fixed amount before the termination position or the last scene boundary prior to the termination position. User preferences may also be employed to determine the rewind scope.

Once the rewind scope has been decided at step 5714, method 5700 preferably proceeds to step 5716 where the method of frame selection for determining the refresh scenes to be later displayed at the client system is determined. As mentioned above, refresh frames can be selected in many different ways. For example, refresh frames can be selected randomly, at some fixed-interval or at each scene change. Depending upon user preference settings, or upon other settings, method 5700 may proceed from step 5716 to step 5718 where refresh frames may be selected randomly over the rewind scope. Method 5700 may also proceed from step 5716 to step 5720 where refresh frames may be selected at fixed or regular intervals. Alternatively, method 5700 may proceed from step 5716 to step 5722 where refresh frames are selected based on scene changes. Upon completion of the selection of refresh frames at any of steps 5718, 5720 or 5722, method 5700 preferably returns to step 5706 to await the next request from a client.

Figure 58:
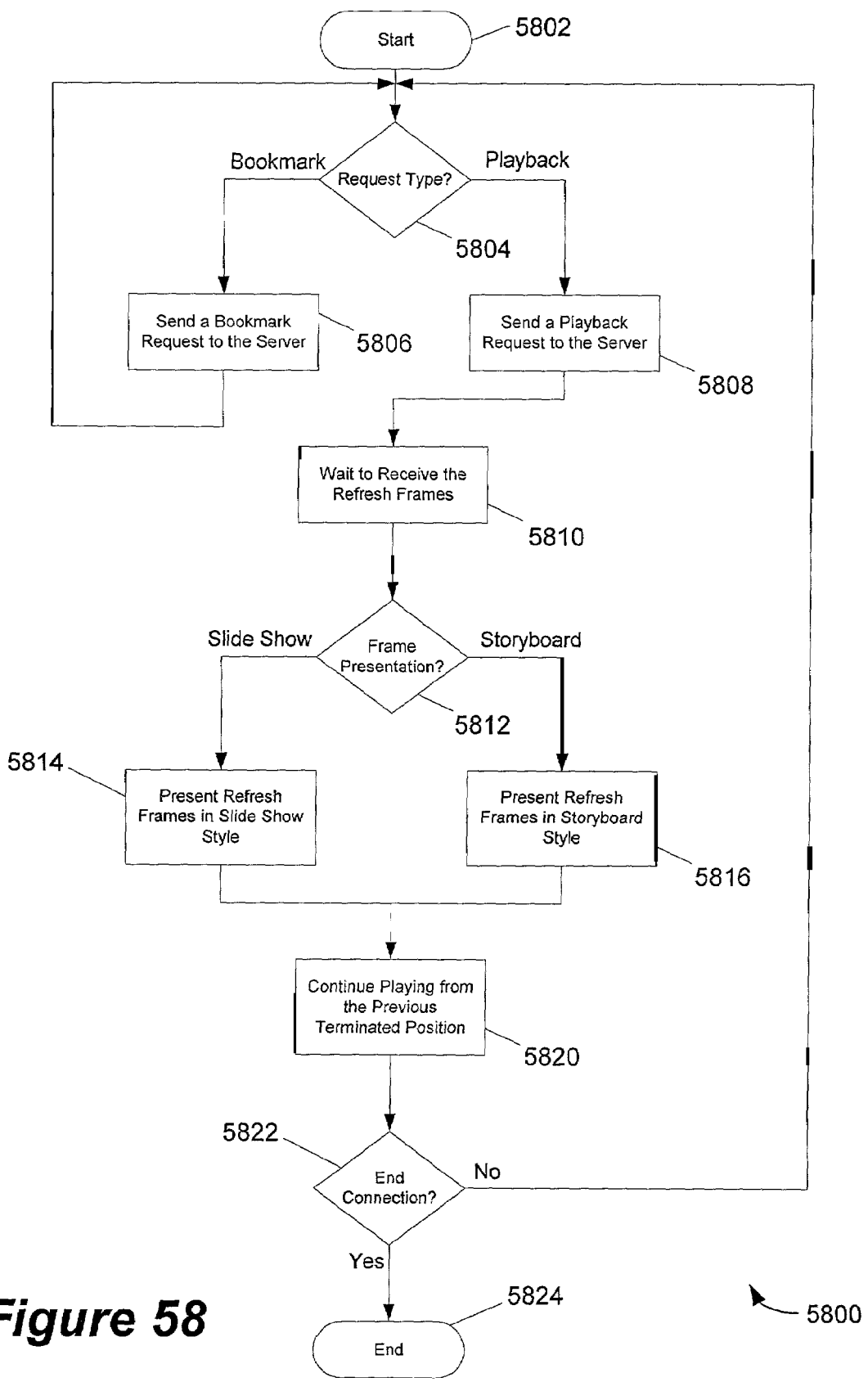
FIG. 58 is a flowchart showing another exemplary embodiment of the retrieval method of the present invention.

Referring now to FIG. 58, a flow chart illustrating a method of adaptive refresh rewinding implemented on a client system according to teachings of the present invention is shown. Upon initiation at step 5802, method 5800 preferably waits at step 5804 for a user request. Upon receipt of a user request, the request is evaluated to determine whether the request is a video or multimedia content bookmark request or whether the request is a video or multimedia content playback request.

If at step 5804, a video or multimedia content bookmark request is received, method 5800 preferably proceeds to step 5806. At step 5806, a bookmark creation request is preferably sent to a network server configured to use method 5700 of FIG. 57 or method 5900 of FIG. 59. Once the bookmark request has been sent, method 5800 preferably returns to step 5804 where the next user request is awaited.

If at step 5804, a video or multimedia content playback request is received, method 5800 preferably proceeds to step 5808. At step 5808, the client system sends a playback request to the network server providing the video or multimedia content. After sending the playback request to the network server, method 5800 preferably proceeds to step 5810 where the client system waits to receive the refresh frames from the network server.

Upon receipt of the refresh frames at step 5810, method 5800 preferably proceeds to step 5812 where a determination is made whether to display the refresh frames in a storyboard or a slide show manner. Method 5800 preferably proceeds to step 5814 if a slide show presentation of the refresh frames is to be shown and to step 5816 if a storyboard presentation of the refresh frames is to be shown. Once the refresh frames have been presented at either step 5814 or 5816, method 5800 preferably proceeds to step 5820.

At step 5820, the client system begins playback of the interrupted video or multimedia content from the previously terminated position (see FIGS. 55 and 56). Once the video or multimedia content has completed playback or is otherwise stopped, method 5800 preferably proceeds to step 5822 where a determination is made whether or not to end the client's connection with the network server. The determination to be made at step 5822 may be made from a user prompt, from user preferences, from server settings or by other methods. If it is determined at step 5822 that the client connection with the server is to end, method 5800 preferably severs the connection and proceeds to step 5824 where method 5800 ends. Alternatively, if a determination is made at step 5822 that the client connection with the server is to be maintained, method 5800 preferably proceeds to step 5804 to await a user request.

Figure 59:
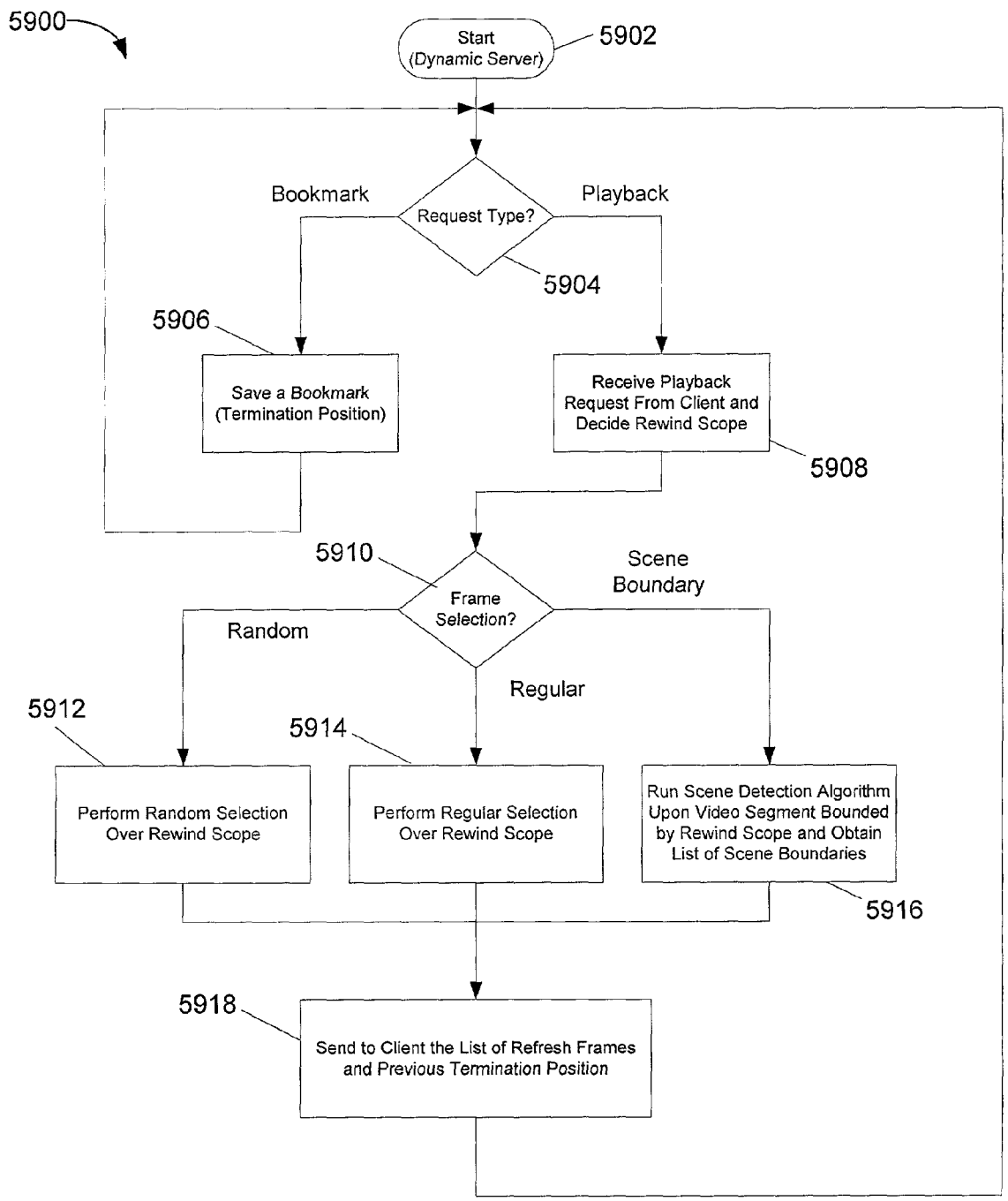
FIG. 59 is a flowchart showing another exemplary embodiment of the retrieval method of the present invention.

Referring now to FIG. 59, a flow chart illustrating a dynamic method of adaptive refresh rewinding implemented on a network server according to teachings of the present invention is shown. Upon initiation at step 5902, method 5900 preferably proceeds to step 5904 where a request received from a client by the network server is evaluated to determine its type. Specifically, step 5904 determines whether the request received by the network server is a video or multimedia content bookmark or playback request.

If, at step 5904, the request is determined to be a video or multimedia content bookmark request, method 5900 preferably proceeds to step 5906. At step 5906, a bookmark, preferably using termination position information received from the client, may be created and saved in persistent storage.

Alternatively, if at step 5904 the request is determined to be a playback request, the playback request is preferably received by the network server at step 5908. In addition, a decision regarding the rewind scope of the playback request is made by the network server at step 5908. Upon completing receipt of the playback request and determining the rewind scope, method 5900 preferably proceeds to step 5910 where the type of refresh frame selection to be made is determined.

At step 5910, the network server determines whether refresh frame selection should be made based on randomly selected refresh frames from the rewind scope, refresh frames selected at fixed intervals throughout the rewind scope or scene boundaries during the rewind scope. If a determination is made that the refresh frames should be selected randomly, method 5900 preferably proceeds to step 5912 where refresh frames are randomly selected from the rewind scope. If, at step 5910, a determination is made that the refresh frames should be selected at fixed or regular intervals over the rewind scope, such selection preferably occurs at step 5914. Alternatively, if the scene boundaries should be used as the refresh frames, method 5900 preferably proceeds to step 5916. At step 5916, the network server preferably runs a scene detection algorithm on the segment of video or multimedia content bounded by the rewind scope to obtain a listing of scene boundaries. Upon completion of the selection of refresh frames at any of steps 5912, 5914 or 5916, method 5900 preferably proceeds to step 5918.

At step 5918, the network server preferably sends the selected refresh frames to the client system. In addition, the network server also preferably sends the client system its previous termination position for the video or multimedia content requested for playback. Once the selected refresh frames and the termination position have been sent to the client system, method 5900 preferably returns to step 5904 where another client request may be awaited.

Storage of User Preferences

The multimedia bookmark of the present invention, in its simplest form, denotes a marked location in a video that consists of positional information (URL, time code), content information (sampled audio, thumbnail image), and some metadata (title, type of content, actors). In general, multimedia bookmarks are created and stored when a user wants to watch the same video again at a later time. Sometimes, however, the multimedia bookmarks may be received from friends via e-mail (as described herein) and may be loaded into a receiving user's bookmark folder. If the bookmark so received does not attract the attention of the user, it may be deleted shortly thereafter. With the lapse of time, only the multimedia bookmarks intriguing the user will likely remain in the user's bookmark folder, the remaining bookmarks thereby representing the most valuable information about a user's viewing tastes. Accordingly, one aspect of the present invention provides a method and system embodied in a "recommendation engine" that uses multimedia bookmarks as an input element for the prediction of a user's viewing preferences.

Figure 49:
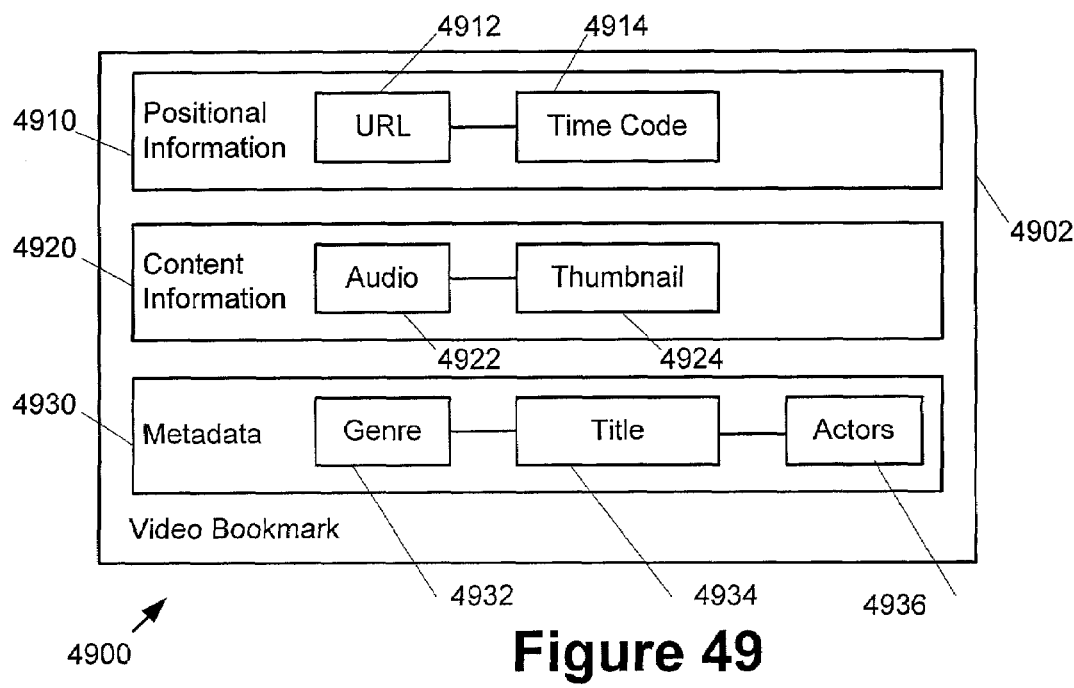
FIG. 49 is a block diagram illustrating the contents of an embodiment of the video bookmark of the present invention.

FIG. 49, indicated generally at 4900, illustrates the elements of an embodiment of a multimedia bookmark of the present invention. The multimedia bookmark 4902 contains positional information 4910 preferably consisting of a URL 4912 and a time code 4914. Content information 4920 may also be stored in the multimedia bookmark 4902. Exemplary of the present invention, audio data 4922 and a thumbnail 4924 of the visual information are preferably stored in the content information 4920. Preferably included in metadata information 4930 of multimedia bookmark 4902 are genre description 4932, the title 4934 of the associated video and information regarding one or more actors 4936 featured in the video. Other types of information may also be stored in multimedia bookmark 4902.

Figure 50:
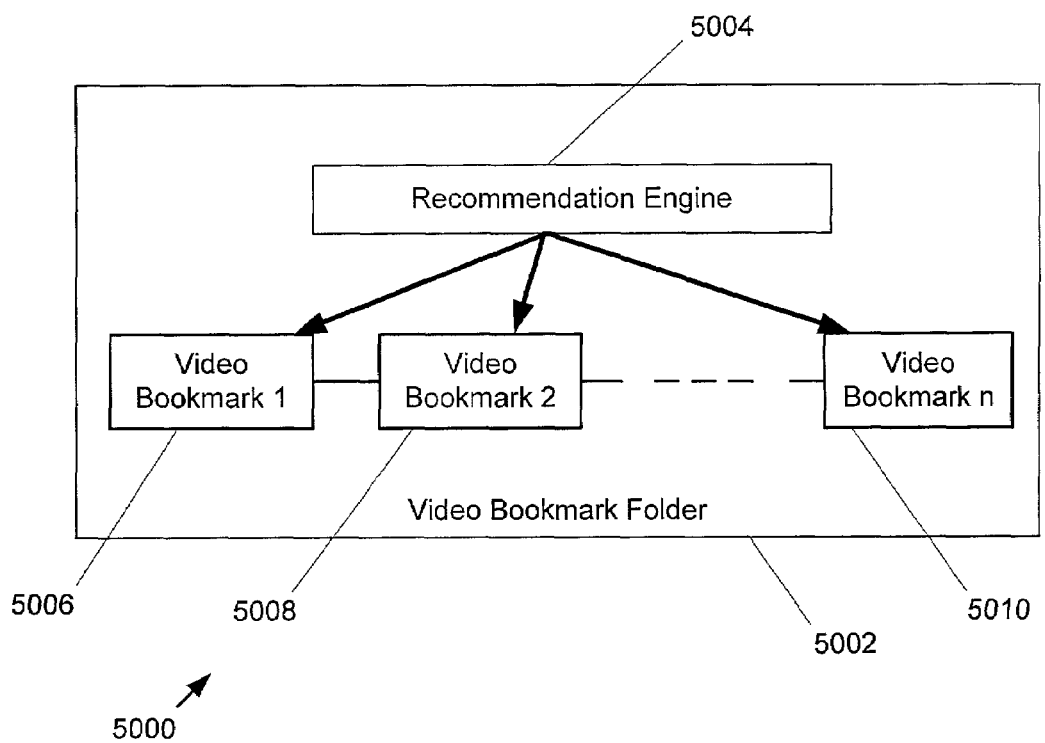
FIG. 50 is a block diagram illustrating the recommendation engine of the present invention.

Indicated generally at 5000 in FIG. 50 is a block diagram depicting one aspect of the method of the present invention. According to teachings of the present invention, a recommendation engine 5004 may be employed to evaluate a user's multimedia bookmark folder 5002 to determine or predict a user's viewing preferences. Generally, recommendation engine 5004 is preferably configured to read any positional, content and/or metadata information contained in any of the multimedia bookmarks 5006, 5008 and 5010 maintained in a user's multimedia bookmark folder 5002.

In one embodiment, the recommendation engine 5004 periodically visits the user's multimedia bookmark folder 5002 and performs a statistical analysis upon the multimedia bookmarks 5006, 5008 and 5010 maintained therein. For example, assume that a user has 10 multimedia bookmarks in his multimedia bookmark folder. Further assume that five of the bookmarks are captured from sports programs, three are captured from science fiction programs, and two are captured from situation comedy programs. As the recommendation engine 5004 examines the "genre" attribute contained in the metadata of each multimedia bookmark, it preferably counts the number of specific keywords and infers that this user's most favorite genre is sports followed by science fiction and situation comedy. Over time and as the user saves additional multimedia bookmarks, the recommendation engine 5004 is better able to identify the user's viewing preferences. As a result, whenever the user wishes to view a program, the recommendation engine can use its predictive capabilities to serve as a guide to the user through a multitude of program channels by automatically bringing together the user's preferred programs. The recommendation engine 5004 may also be configured to perform similar analyses on such metadata information as the "actors," "title," etc.

Figure 51:
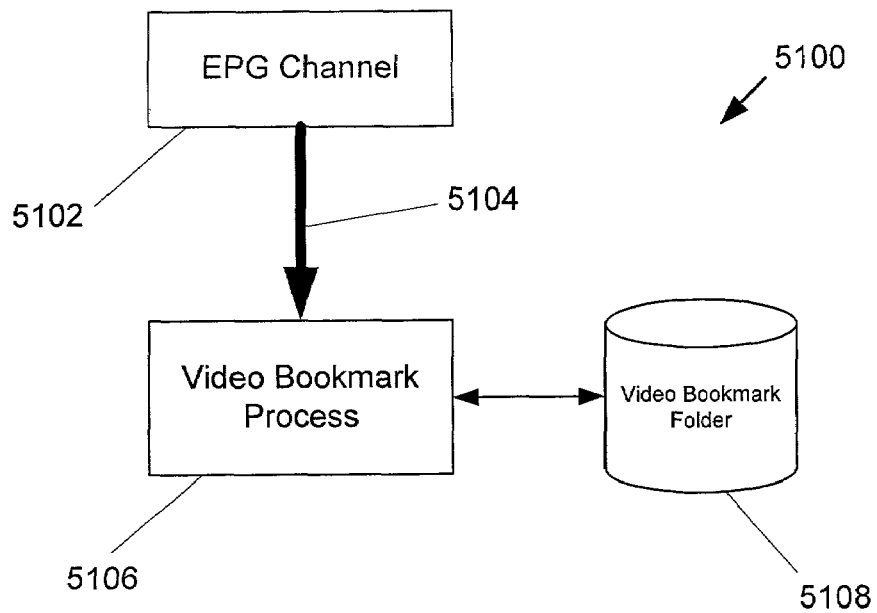
FIG. 51 is a block diagram illustrating the video bookmark process of the present invention in conjunction with an EPG channel.

Illustrated in FIG. 51, indicated generally at 5100, is a block diagram incorporating one or more EPG channel streams 5104 with teachings of the present invention. Upon receipt, by the multimedia bookmark process 5106, of a user request for creation of a multimedia bookmark, the preferred information to be associated with the multimedia bookmark, i.e., the positional, content and metadata information illustrated in FIG. 49, is preferably gathered. While aspects of the positional information, i.e., desired URL and time code information, used in the multimedia bookmark as well as the content information, i.e., a desired audio segment and thumbnail image, may be gathered directly from the video's source, the metadata will likely have to be found elsewhere. Accordingly, in the embodiment illustrated in FIG. 51, the metadata (genre, title, actors) information sought by the multimedia bookmark process 5106 may be obtained from the EPG channel 5102 via EPG channel stream 5104. This metadata is the source of information used by the recommendation engine of the present invention to examine the users' viewing preferences. After extracting the metadata from the EPG channel stream 5104, the multimedia bookmark process 5106 creates a new multimedia bookmark and places the multimedia bookmark into the user's multimedia bookmark folder on the user's storage device 5108.

Figure 52:
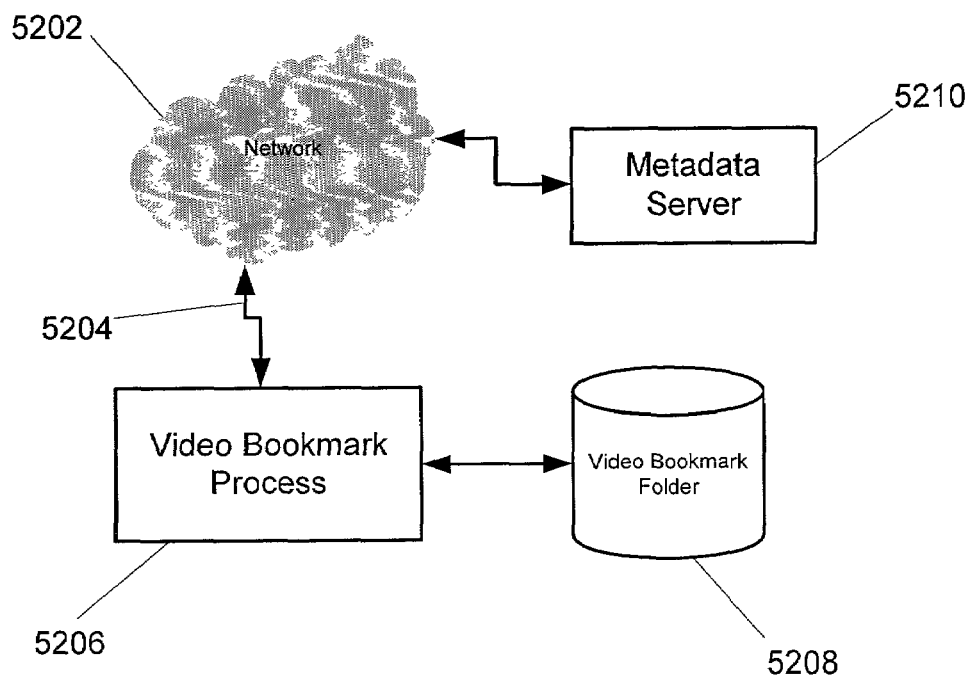
FIG. 52 is a block diagram illustrating the video bookmark process of the present invention in conjunction with a network.

Illustrated in FIG. 52 is a block diagram of a system incorporating teachings of the present invention without an EPG channel. Upon receipt, by the multimedia bookmark process 5206, of a user request to create a multimedia bookmark, the preferred information to be associated with the multimedia bookmark, i.e., the positional, content and metadata information illustrated in FIG. 49, is preferably gathered. Again, the positional and content information to be included in the multimedia bookmark may be readily obtained from the video's source. However, to obtain the desired metadata, the multimedia bookmark process 5206 preferably accesses network 5202 via two-way communication medium 5204 to thereby establish a communication link with metadata server 5210. Preferably located on metadata server 5210 is such metadata as genre, title, actors, etc. Once a communication link is established between multimedia bookmark process 5206 and metadata server 5210, the multimedia bookmark process 5206 may download or otherwise obtain the metadata information it prefers for inclusion in the multimedia bookmark. After the desired metadata has been obtained by the multimedia bookmark process 5206, the user's multimedia bookmark is preferably placed in the user's multimedia bookmark folder on the user's storage device 5208.

MetaSync First Embodiment

Figure 68:
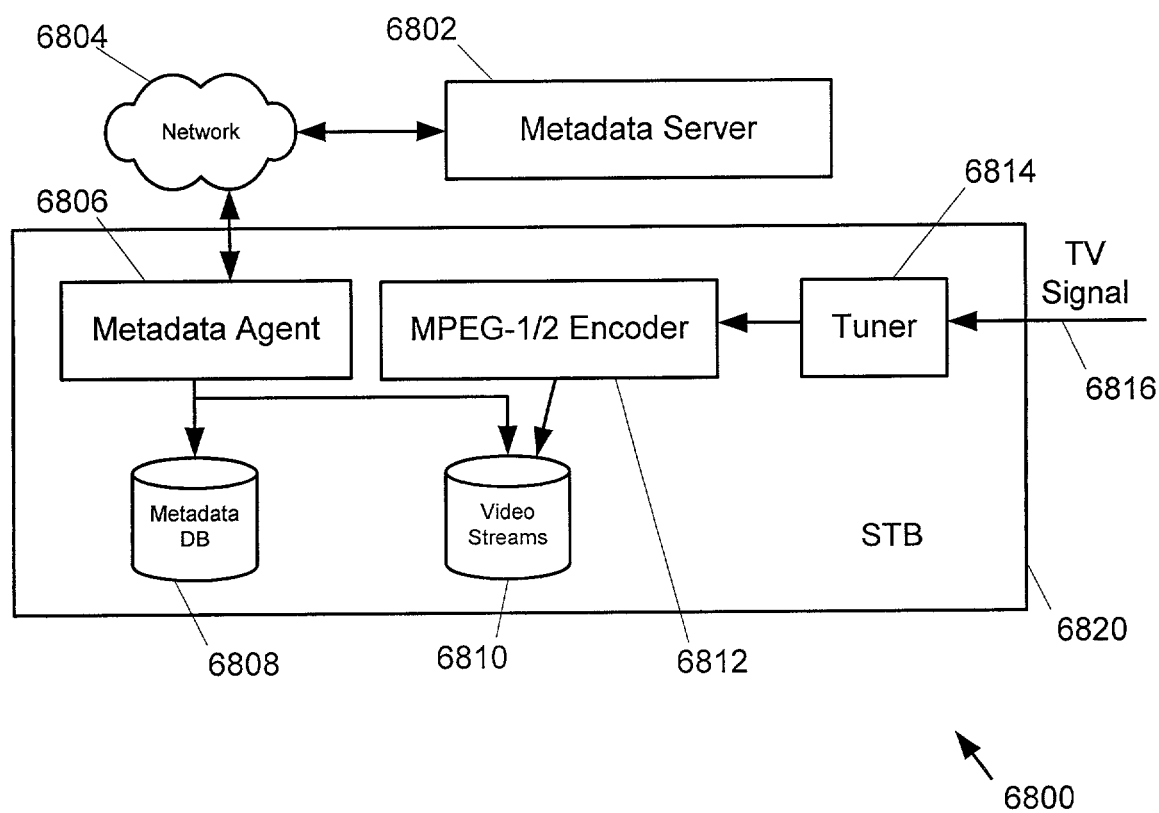
FIG. 68 is a block diagram illustrating an exemplary embodiment of the metadata server and metadata agent of the present invention.

FIG. 68 shows the system to implement the present invention for a set top box ("STB") with the personal video recorder ("PVR") functionality. In this embodiment 6800 of the present invention, the metadata agent 6806 receives metadata for the video content of interest from a remote metadata server 6802 via the network 6804. For example, a user could provide the STB with a command to record a TV program beginning at 10:30 PM and ending at 11:00 PM. The TV signal 6816 is received by the tuner 6814 of the STB 6820. The incoming TV signal 6816 is processed by the tuner 6814 and then digitized by MPEG encoder 6812 for storage of the video stream in the storage device 6810. Metadata received by the metadata agent 6806 can be stored in a metadata database 6808, or in the same data storage device 6810 that contains the video streams. The user could also indicate a desire to interactively browse the recorded video. Assume further that due to emergency news or some technical difficulties, the broadcasting station sends the program out on the air from 10:45 PM to 11:15 PM.

In accordance with the user's directions, the PVR on the STB starts recording the broadcast TV program at 10:30 sharp. In addition to the recording, since the user also wants to browse the video, the STB also needs the metadata for browsing the program. An example of such metadata is shown in the Table 4. Unfortunately, it is not easy to automatically generate the metadata on the STB if it has only limited processing (CPU) capability. Thus, the metadata agent 6806 requests from a remote metadata server 6802 for the metadata needed for browsing the video that was specified by the user via the metadata agent 6806. Upon the request, the corresponding metadata is delivered to the STB 6820 transparently to the user.

The delivered metadata might include a set of time codes/frame numbers pointing to the segments of the video content of interest. Since these time codes are defined relative to the start of the video used to generate the metadata, they are meaningful only when the start of the recorded video matches that of the video used for metadata. However, in this scenario, there is a 15-minute time difference between the recorded content on the STB 6820 and the content on the metadata server 6802. Therefor, the received metadata cannot be directly applied to the recorded content without proper adjustments. The detailed procedure to solve this mismatch will be described in the next section.

MetaSync Second Embodiment

Figure 69:
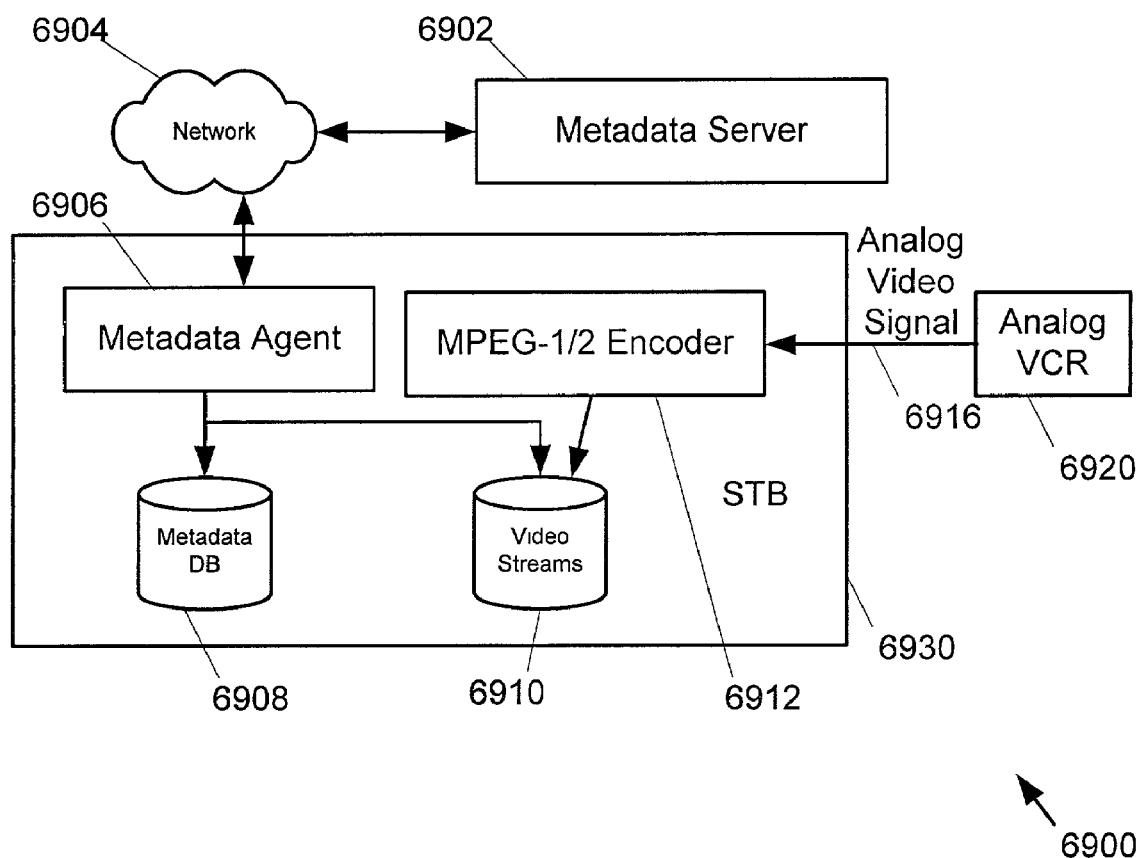
FIG. 69 is a block diagram illustrating an alternate exemplary embodiment of the metadata server and metadata agent of the present invention.

FIG. 69 shows the system 6900 that implements the present invention when a STB 6930 with PVR is connected to the analog video cassette recorder (VCR) 6920. In this case, everything is the same as the previous embodiment, except for the source of the video stream. Specifically, metadata server 6902 interacts with the metadata agent 6906 via network 6904. The metadata received by the metadata agent 6906 (and optionally any instructions stored by the user) are stored in metadata database 6908 or video stream storage device 6910. The analog VCR 6920 provides an analog video signal 6916 to the MPEG encoder 6912 of the STB 6930. As before, the digitized video stream is stored by the MPEG encoder 6912 in the video stream storage device 6910.

From the business point of view, this embodiment might be an excellent model to reuse the content stored in the conventional videotapes for the enhanced interactive video service. This model is beneficial to both consumers and content providers. Thus, unless consumers want very high quality video compared to VHS format, they can reuse their content which they already paid for whereas the content providers can charge consumers at the nominal cost for metadata download.

Video Synchronization with the Metadata Delivered Forward Collation

Figure 70:
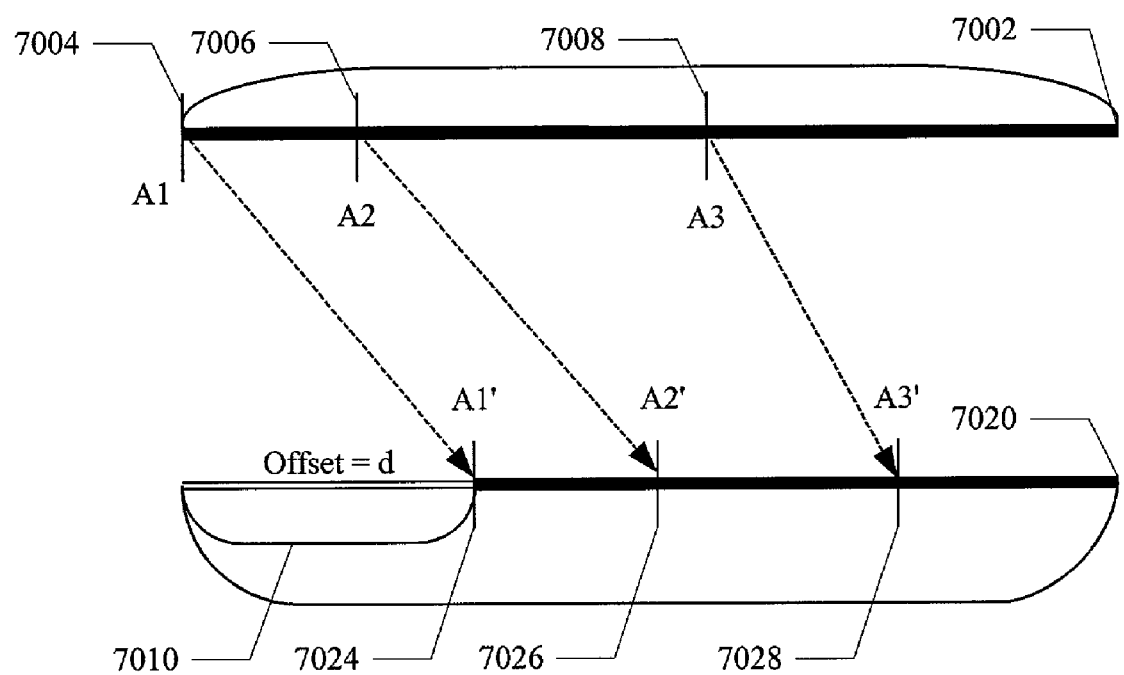
FIG. 70 is a timeline comparison illustrating exemplary offset recording capability of the present invention.

Video synchronization is necessary when a TV program is broadcast behind schedule (noted above and illustrated in FIG. 70). Starting from the beginning 7024 of one recorded video stream A' (7020) of interest in the STB, the forward collation is to match the reference frames/segment A1 (7004) which is delivered from the server, against all the frames on the STB and to find the most similar frames/segment A1' (7024). As a result of this matching, the temporal media offset value d (7010) is determined, which implies that each representative frame number (or time code) that is received from the server for metadata services has to be added by the offset d (7010). In this way, the downloaded metadata is synchronized with the video stream encoded in the STB. As illustrated in FIG. 70, the use of the offset 7010 enables correlation of frames A1 (7004) to A1' (7024), A2 (7006), and A3 (7008) to A3' (7028).

For the synchronization, the server can send the STB characteristic data other than image data that represents the reference frame or segment. The important thing to do is to send the STB a characteristic set of data that uniquely represents the content of reference frame or segment for the video under consideration. Such data can include audio data and image data such as color histogram, texture and shape as well as the sampled pixels. This synchronization generally works for both analog and digital broadcasting of programs since the content information is utilized.

In the case when the broadcast TV program to be recorded is in the form of digital video stream such as MPEG-2 and the downloaded metadata was generated with reference to the same digital stream, the information such as PTS (presentation time stamp) present in the packet header can be utilized for synchronization. This information is needed especially when the program is recorded from the middle of the program or when the recording of the program stops before the end of the program. Since both the first and last PTSs are not available in the STB, it is difficult to compute the media time code with respect to the start of the broadcast program unless such information is periodically broadcast with the program. In this case, if the first and the last PTSs of the digital video stream are delivered to the STB with the metadata from the server, the STB can synchronize the time code of the recorded program with respect to the time code used in the metadata by computing the difference between the first and last PTS since the video stream of the broadcast program is assumed to be identical to that used to generate the metadata.

Backward Collation

Figure 71:
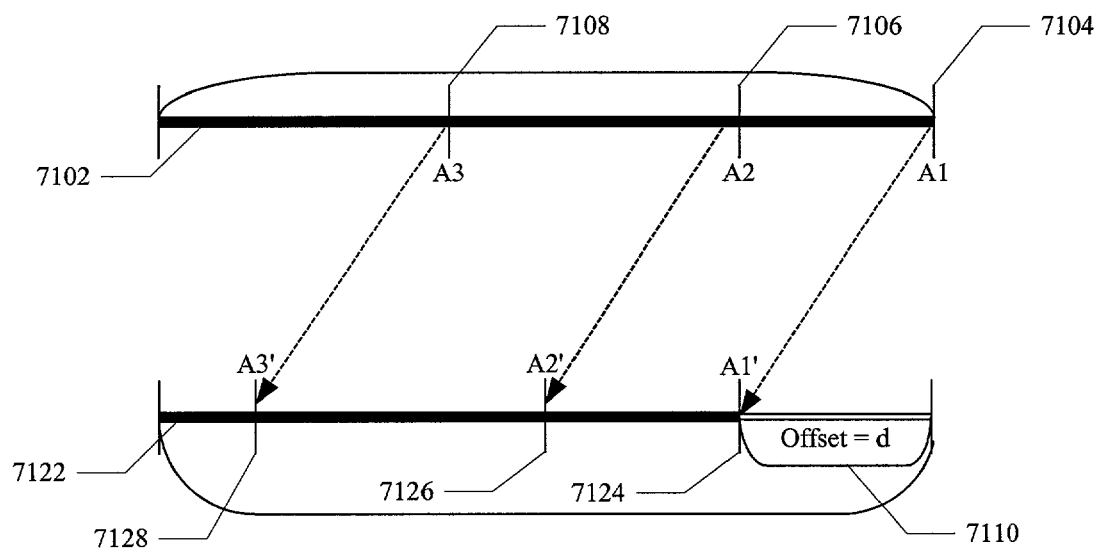
FIG. 71 is a timeline comparison illustrating alternate exemplary offset recording capability of the present invention.

A backward collation is needed when a TV program (7102) is broadcast ahead of the schedule as illustrated in FIG. 71. Starting from the end of one recorded video stream A' (7122) in the STB, the backward collation is to match the reference frame A1 (7104) from the metadata server against all the frames on the STB and to find the most similar frame A1' (7124) to the reference frame A1 (7104). As a result of this matching, the offset value d (7110) is determined, which implies that each representative frame number or time code that is received from the server has to be subtracted by the offset d (7110) to obtain, for example, the correlation between frames A2 (7106) with A2' (7126) and A3 (7108) with A3' (7128) as illustrated in FIG. 71.

Detection of Commercial Clip

Figure 72:
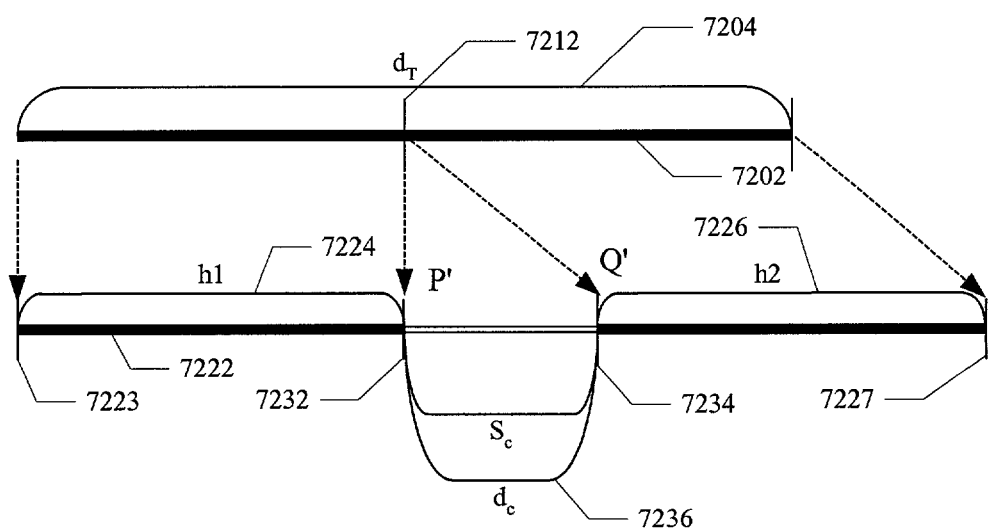
FIG. 72 is a timeline comparison illustrating exemplary interrupt recording capability of the present invention.

In this scenario, the user has set a flag instructing the STB to ignore commercials that are embedded in the video stream. For this scenario, assume that the metadata server knows which advertisement clip is inserted in the regular TV program, but it does not know exactly the temporal position of inserted clip. Assume further that the frame P (7212) is the first frame of the advertisement clip $S_C$ (7230), the frame Q (7212) is the last frame of $S_C$ (7230), the temporal length of the clip $S_C$ is $d_C$ (7236) and the total temporal length of the TV program (video stream A 7202) is $d_T$ (7204) as illustrated in FIG. 72.

i) Forward Detection of Advertisement Segment

Given the reference frame P (7212), examining the frames from the beginning to the end of a recorded video stream A' (7222), the most similar frame P' (7232) to the reference frame P (7212) is identified by using an image matching technique and the temporal distance h1 (7224) between the start frame (7223) to the frame P' (7232) is computed. Then, for each received representative frame who code) is greater than h1 (7224), the value of $d_c$ (7236) is added.

ii) Backward Detection of Advertisement Segment

Given the reference frame Q (7212), examining the frames from the end to the head of a recorded video stream A' (7222), the most similar frame Q' (7234) to the reference frame Q (7212) is found and the temporal distance h2 (7226) between the end frame (7227) to the frame Q' (7234) is computed. Then, for each received representative frame whose frame number (or time code) is greater than $d_T-(h2+d_c)$, it is adjusted by adding by $d_c$ (7236).

Detection of Individual Program Segments from a Composite Video File

Figure 73:
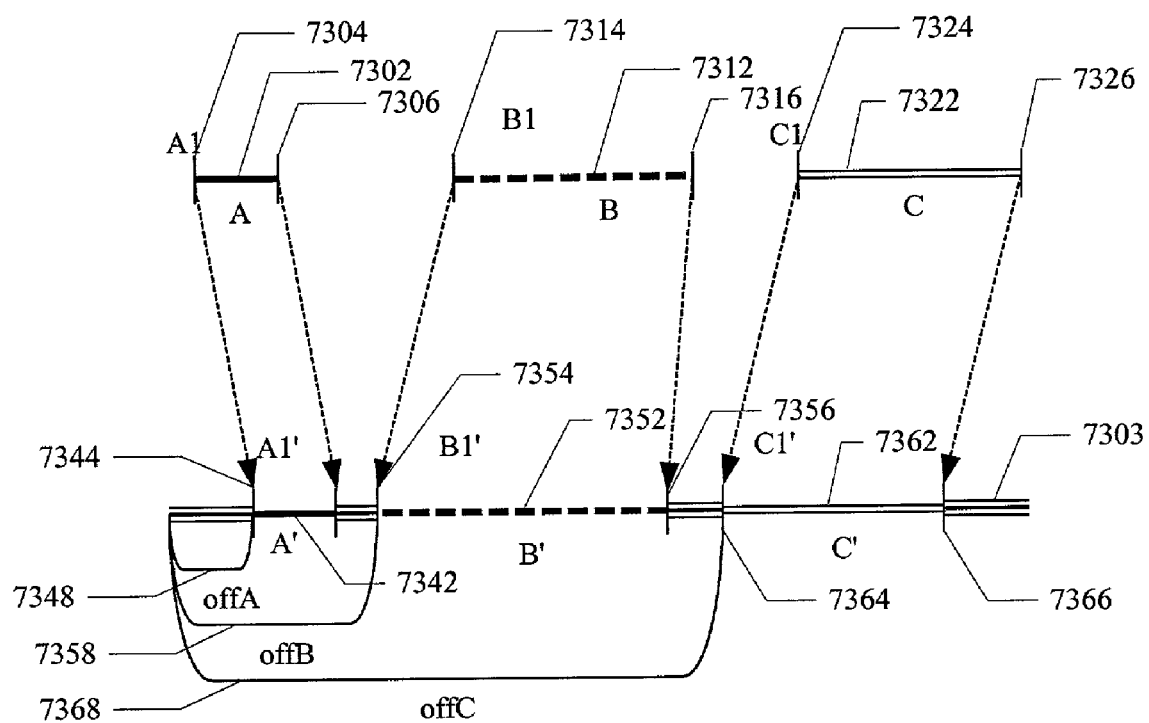
FIG. 73 is a timeline comparison illustrating the exemplary disparate and sequential recording capabilities of the present invention.

This case takes place when a user issues a request to record multiple programs into a single video stream in a sequential order as shown in FIG. 73. For a given reference frame, this procedure computes the frame (or time code) offset from the first frame of the video stream up to the frame which is most similar to the reference frame. For example, assume there are three reference start frames A1 (7304), B1 (7314), and C1 (7324), and end frames 7306, 7316, and 7326, that are selected from videos A 7302, B 7312, and C 7322, respectively. For the reference frame A1 (7304), moving in the direction from the beginning to the end of the video stream 7303, the procedure matches the frame A1 (7304) against all the frames on the stream 7303 and finds the most similar frame A1' (7344). The offset "offA" (7348) from the beginning 7305 to the location of A1' (7344) is now computed.

This process is repeated in the same manner for the other reference frames B1 (7314) and C1 (7324) for video streams 7312 and 7322, respectively. That is, find the most similar frames B1' (7354) and C1' (7364) of the video streams 7352 and 7362, respectively and then compute the offset for the frame B1' (7354), which is "offB" (7358), followed by the offset for the frame C1' (7364), which is "offC" (7368) from the beginning 7305. This enables calculation of the end frames 7352 and 7366 of video streams 7352 and 7362, respectively. In this way, a user can access to the exact start and end positions of each program.

TABLE 4

An example of metadata for video browsing in XML Schema

```
<?xml version="1.0" encoding="EUC-KR"?>
<Mpeg7 xmlns=http://www.mpeg7.org/2001/MPEG-7_Schema
    xmlns:xsi="http://www.w3c.org/1999/XMLSchema-instance"
    xml:lang="en" type ="complete">
    <ContentDescription xsi:type="SummaryDescriptionType">
        <Summarization>
            <Summary xsi:type="HierarchicalSummaryType" components="keyVideoClips"
                hierarchy="independent">
                <SourceLocator>
                    <MediaUri>mms://www.server.com/news.asf</MediaUri>
                </SourceLocator>
```

TABLE 4-continued

An example of metadata for video browsing in XML Schema

```
            <HighlightSummary level="0" duration="00:01:35:04">
                <Name>Top Stories</Name>
                <HighlightSegment>
                    <KeyVideoClip>
                        <MediaTime>
                            <MediaTimePoint>00:09:05:22</MediaTimePoint>
                            <MediaDuration>00:00:24:28</MediaDuration>
                        </MediaTime>
                    </KeyVideoClip>
                    <KeyFrame> <MediaUri>16354.jpg</MediaUri> </KeyFrame>
                <HighlightSegment>
                <HighlightChild level="1" duration="00:00:24:28">
                    <Name>Wrestler Hogan</Name>
                    <HighlightSegment>
                        <KeyVideoClip>
                            <MediaTime>
                                <MediaTimePoint>00:09:05:22</MediaTimePoint>
                                <MediaDuration>00:00:24:28</MediaDuration>
                            </MediaTime>
                        </KeyVideoClip>
                        <KeyFrame> <MediaUri>16354.jpg</MediaUri> </KeyFrame>
                    </HighlightSegment>
                </HighlightChild>
                <HighlightChild level ="1" duration="00:00:35:21">
                    <Name>Gun Shoots in Colorado</Name>
                    <HighlightSegment>
                        <KeyVideoClip>
                            <MediaTime>
                                <MediaTimePoint>00:09:30:20</MediaTimePoint>
                                <MediaDuration>00:00:35:21</MediaDuration>
                            </MediaTime>
                        </KeyVideoClip>
                        <KeyFrame> <MediaUri>17096.jpg</MediaUri> </KeyFrame>
                    </HighlightSegment>
                </HighlightChild>
                <HighlightChild level="1" duration="00:00:34:15">
                    <Name>Women Wages</Name>
                    <HighlightSegment>
                        <KeyVideoClip>
                            <MediaTime>
                                <MediaTimePoint>00:10:06:11</MediaTimePoint>
                                <MediaDuration>00:00:34:15</MediaDuration>
                            </MediaTime>
                        </KeyVideoClip>
                        <KeyFrame> <MediaUri>18171.jpg</MediaUri> </KeyFrame>
                    </HighlightSegment>
                </HighlightChild>
            </HighlightSummary>
        </Summary>
    </Summarization>
  </ContentDescription>
</Mpeg7>
```

Automatic Labeling of Captured Video with Text from EPG

Imagine that a show program from a cable TV is stored on a user's hard disk using PVR. Incidentally, if the user wants to browse the video, he would need some metadata for it. One of the convenient ways to get the metadada about the show is to use the information from the EPG stream. Thus, if one could grab the EPG data, one could generate some level of automatic authoring and associate at least title, date, show time and other metadata with the video.

E-Mail Attachments

Users often forget to attach documents when they send e-mail. A solution to that problem would be to analyze the e-mail content and give a message to the user asking if he or she indeed attached it. For example, if the user sets an option flag on his e-mail client software program that is equipped with the present invention, a small program or other software routine then analyzes the e-mail content in order to determine if there is the possibility or likelihood of an attachment being referenced by the user. If so, then a check is made to determine if the draft e-mail message has an attachment. If there is no attachment, then a reminder message is issued to the user inquiring about the apparent need for an attachment.

An example of the method of content analysis of the present invention includes:
1. Matching the words in the e-mail text by scanning the e-mail contents for words like "enclose," or "attach" or their equivalent in other languages, preferably the language setting designated by the user.
2. If one of the keywords is present, then determining if the e-mail has at least one attachment.
3. If no attachment exists and a keyword was found, then issuing a reminder message to the user regarding the need for an attachment.

User Interface for Showing Relative Position

Figure 61:
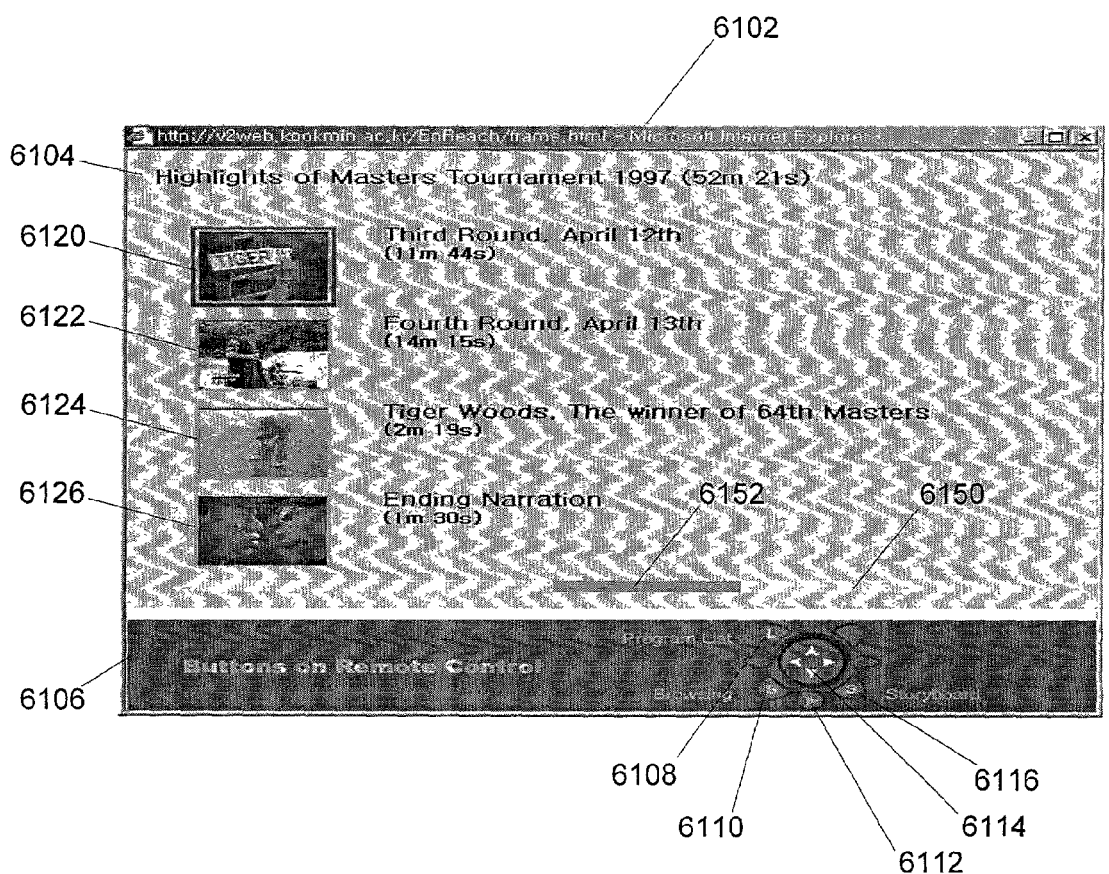
FIG. 61 is a web page illustrating a web page having an exemplary duration bar of the present invention.
Figure 62:
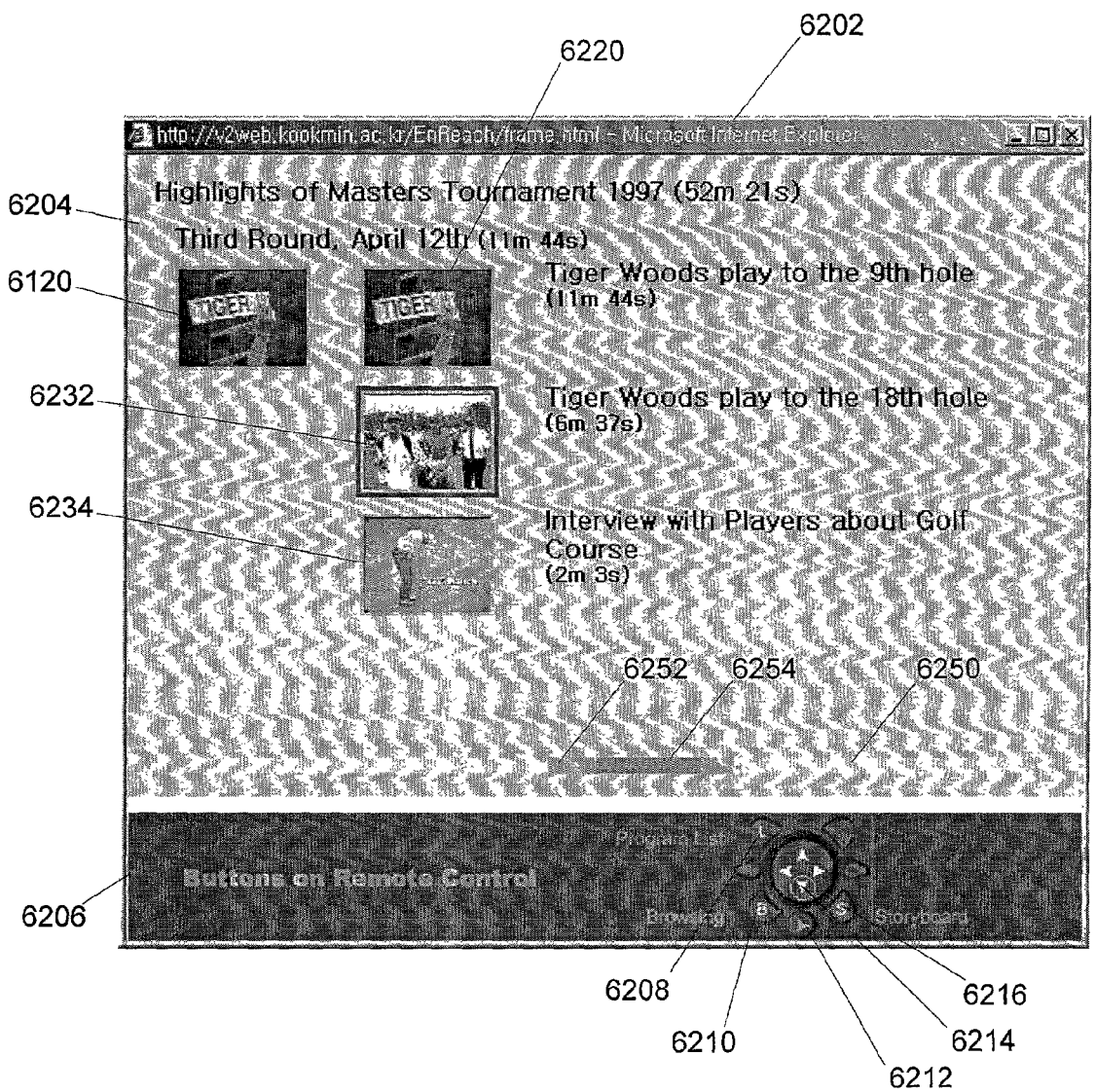
FIG. 62 is a web page illustrating a web page having an exemplary duration bar of the present invention.

Reference is made to FIGS. 61 and 62 that illustrate portions of the highlights of the Masters tournament of 1997.

Specifically, in FIG. 61, is a browser window 6102 having a Web page 6104 and a remote control bar button 6106 along the bottom of the window 6102. On the web page 6104 are various hyperlinks and references made to portions of video, the third round 6120, the fourth round 6122, Tiger Woods' biography 6124 and the ending narration 6126. The remote control buttons have various functionality, for example, there is a program list button 6108, a browsing button 6110, a play button 6112, and a story board button 6116. In the center of the buttons is a multifunction button 6114 that can be enabled with various functionality for moving among various selections within a web page. This is particularly useful if the page contains a number of thumbnail images in a tabular format.

FIG. 62 contains a drill-down from one of the video links in FIG. 61. Specifically, in FIG. 62 there is the standard web browsing window 6202 with the web page 6204 and the button control bar 6206. As with FIG. 61, the remote control button bar 6206 has identical functionality as the one described in FIG. 61. Similarly, the remote control buttons have various functionality, for example, there is a program list button 6208, a browsing button 6210, a play button 6212, and a story board button 6216. As illustrated in FIG. 62, the selected image from FIG. 61, namely 6120, appears in FIG. 62 again as element 6120. The corresponding video portion of Tiger Woods' play on the ninth hole is element 6220, and the web page illustrates several other video clips, namely the play to the 18th hole 6232, and the interview with players 6234.

Figure 60:
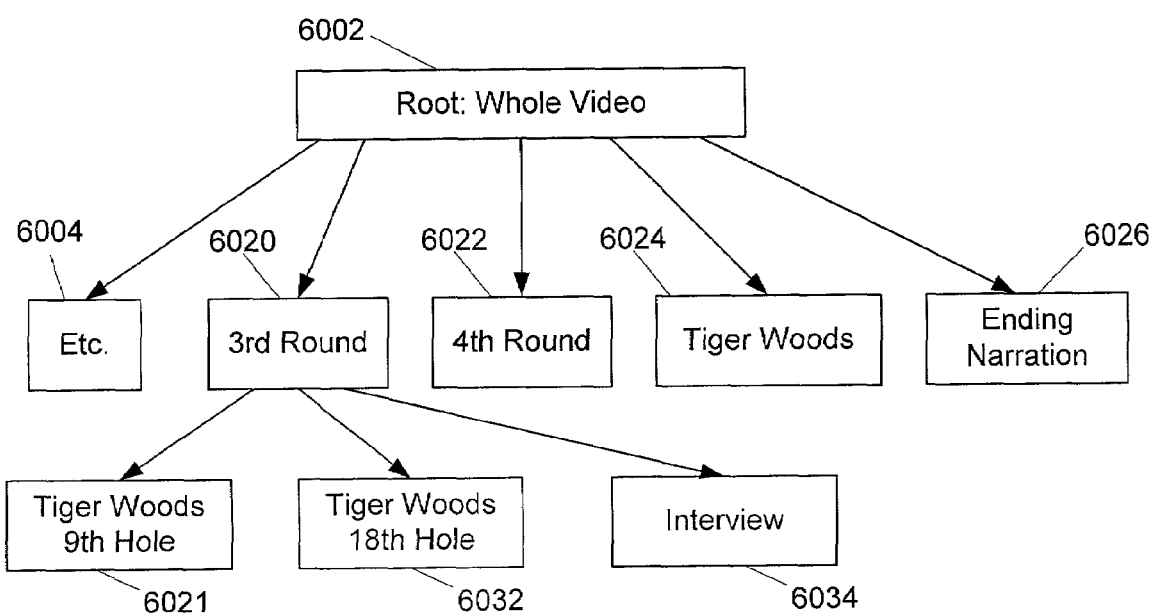
FIG. 60 is a block diagram illustrating a hierarchical arrangement of images that exemplifies a navigation method of the present invention.

FIG. 60 illustrates a hierarchical navigation scheme of the present invention as it relates to FIGS. 61 and 62. This hierarchical tree is usually utilized as a semantic representation of video content. Specifically, there is the whole video 6002 that contains all the video segments which compose a single hierarchical tree. Subsets of the video segments were shown in video clip 6004, the third round 6020, the fourth round 6022, Tiger Woods' biography 6024, and the ending narration 6026 that correspond to elements 6120, 6122, 6124 and 6126, respectively, of FIG. 61. The lower three boxes of FIG. 60 correspond to the three choices available, as illustrated in FIG. 62, namely, Tiger Woods' first nine holes 6021, which corresponds to element 6220 of FIG. 62, as well as Tiger Woods' second nine holes 6032, and the interview 6034, which correspond to the remaining two elements illustrated in FIG. 62. As shown in FIG. 60, the hierarchical navigation scheme allows a user to quickly drill down to the desired web page without having to wait for the rendering of multiple interceding web pages. The hierarchical status bar, using different colors, can be used to show the relative position of the segment as currently selected by the user.

Referring back to FIG. 61, FIG. 61 further contains a status bar 6150 that shows the relative position 6152 of the selected video segment 6120, as illustrated in FIG. 61. Similarly, in FIG. 62, the status bar 6250 illustrates the relative position of the video segment 6120 as portion 6252, and the sub-portion of the video segment 6120, i.e., 6254, that corresponds to Tiger Woods' play to the 18th hole 6232.

Optionally, the status bar 6150, 6250 can be mapped such that a user can click on any portion of the mapped status bar to bring up web pages showing thumbnails of selectable video segments within the hierarchy, i.e., if the user had clicked on to a portion of the map corresponding to element 6254, the user would be given a web page containing starting thumbnail of Tiger Woods' play to the 18th hole, as well as Tiger Woods' play to the ninth hole, as well as the initial thumbnail for the highlights of the Masters tournament, in essence, giving a quick map of the branch of the hierarchical tree from the position on which the user clicked on the map status bar.

Alternate Embodiments

Preferably, the video files are stored in each user's storage devices, such as a hard disk on a personal computer (PC) that are themselves connected to a P2P server so that those files can be downloaded to other users who are interested in watching them. In this case, if a user A makes a multimedia bookmark on a video file stored in his/her local storage and sends the multimedia bookmark via an e-mail to the user B, the user B cannot play the video starting from the position pointed to by the bookmark unless the user B downloads the entire video file from user A's storage device. Depending upon the size of the video file and the bandwidth available, the full download could take a considerable length of time. The present invention solves this problem by sending the multimedia bookmark as well as a part of the video as follows:

1) The user A sends the summary of the video generated manually, or automatically by video analysis, or semi-automatically. The summary could be a set of key frames representing the whole video where one of the key-frames is the bookmarked frame that is highlighted.
2) The user A then sends the short video clip file near the bookmarked position. The video clip file can be generated by editing the video file such as an MPEG-2, among others.

Thus, the user B can decide if he/she wants to download the whole video after watching the part of the video containing the bookmarked position. By use of the present invention, bandwidth can be saved that would otherwise have been devoted to downloading whole video files in which user B would not have sufficient interest to justify the download.

Yet another embodiment of the present invention deals with the problem with the broadcast video when the user cannot make the bookmark of his/her favorite segment when the segment disappears and thereafter a new scene appears at the same place in the video. One solution would be to use the time-shifting property of the digital personal video recorder (PVR). Thus, as long as a certain amount of video segment prior to the current part of the video being played is always recorded by the PVR and stored in temporary (or permanent non-volatile) storage, the user always can go back to his/her favorite position of the video.

Alternatively, suppose that the user A sends a bookmark to the user B as described above. There still occurs a problem if the video is broadcast without video-on-demand functionality. In this case, when the smart set-top box (STB) of the user B receives a bookmark, the STB can check the electronic programming guide (EPG) and see if the same program will be scheduled to be broadcast sometime in the future. If so, the STB can automatically records the same program at the scheduled time and then the user B can play the bookmarked video.

2. Search

An embodiment of the present invention is based on the observation that perceptually relevant images often do not share any apparent low-level features but still appear conceptually and contextually similar to humans. For instance, photographs that show people in swimsuits may be drastically inconsistent in terms of shape, color and texture but conceptually look alike to humans. In contrast to the methodologies mentioned above, the present invention does not rely on the low-level image features, except in an initialization stage, but mostly on the perceptual links between images that are established by many human users over time. While it is unfeasible to manually provide links between a huge number of images at once, the present invention is based on the notion that a large number of users over a considerable period of time can build a network of meaningful image links. The method of the present invention is a scheme that accumulates information provided by human interaction in a simpler way than image feature-based relevance feedback and utilizes the information for perceptually meaningful image retrieval. It is independent of and complementary to the image search methods that use low-level features and therefor can be used in conjunction with them.

This embodiment of the method of the present invention is a set of algorithms and data structures for organizing and accumulating users' experience in order to build image links and to retrieve conceptually relevant images. A small amount of extra data space, a queue of image links, is needed for each query image in order to document the prior browsing and searching. Based on this queue of image links, a graph data structure with image objects and image links is formed and the constructed graph can be used to search and cluster perceptually relevant images effectively. The next section describes the underlying mathematical model for accumulating users' browsing and search based on image links. The subsequent section presents the algorithm for the construction of perceptual relevance graph and searching.

Information Accumulation Using Image Links

Data Structure for Collecting Relevance Information

Figure 30:
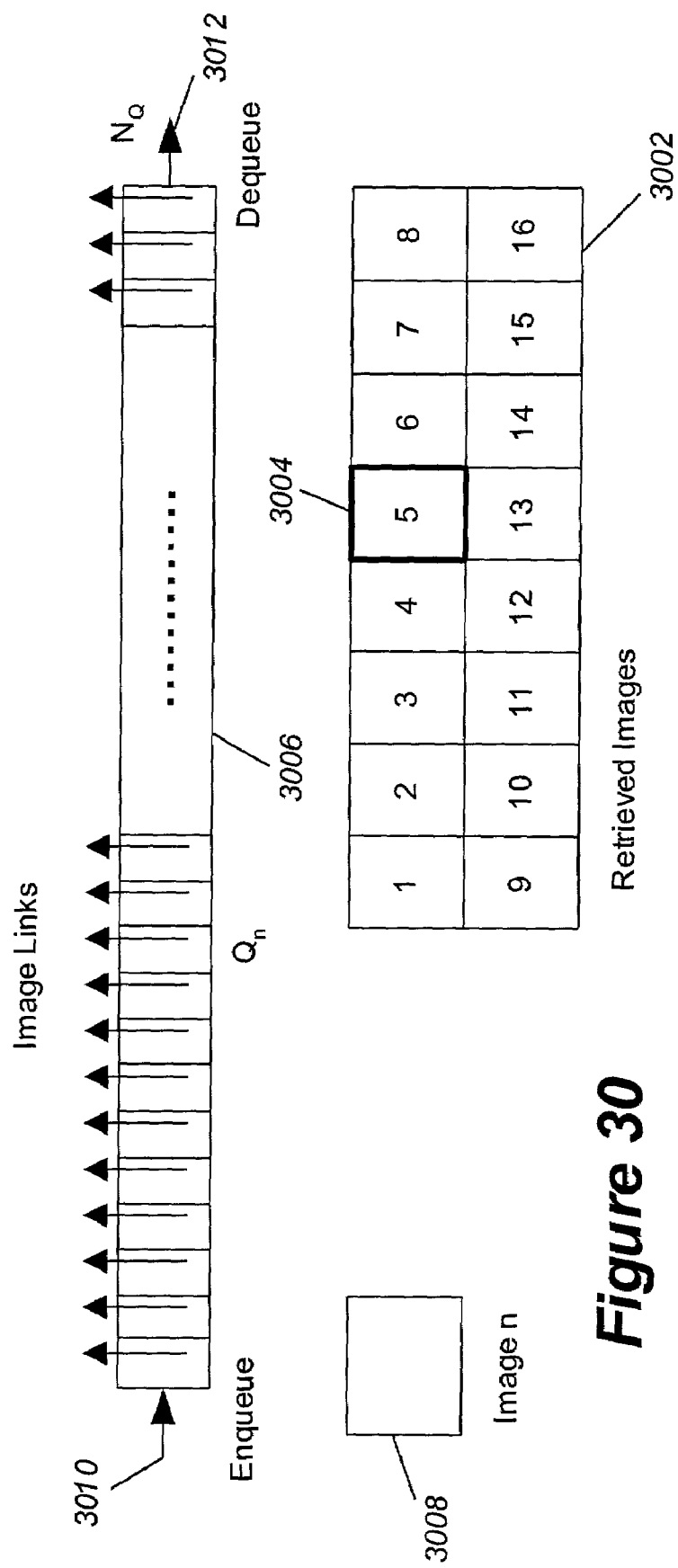
FIG. 30 is a block diagram illustrating an exemplary queue for image links of the present invention.

There are potentially many ways of accumulating information about users' prior feedback. The present invention utilizes the concept of collecting and propagating perceptual relevance information using simple data structures and algorithms. The relevance information provided by users can be based on image content, concept, or both. For storing an image's links to other images that some relevance is established to, each image has a queue of finite length as illustrated in FIG. 30. This is called the "relevance queue." The relevance queue 3006 can be initially empty or filled with links to computationally similar images (CSIs) determined by low-level image feature descriptors such as color, shape and texture descriptors that are commonly used in a conventional content-based image search engine.

A perceptually relevant image (PRI) is determined by a user's selection in a manner that is similar to that of general relevance feedback schemes. When the image of interest is presented as a query and initial image retrieval is performed, the user views the retrieved images and establishes relevance by clicking perceptually related images as positive examples. FIG. 30 illustrates the case of Image 5 3004 of the retrieved images 3002 being clicked and its link being enqueued 3010 into the relevance queue $Q_n$ 3006 of the query Image n 3008. In contrast to previous relevance feedback schemes where the positive examples are used for adjusting low-level feature weights or distances, the method of the present invention inserts the link to the clicked image, the PRI, into the query image's relevance queue by the normal "enqueue" operation 3010. The oldest image link is deleted from the queue in a de-queue operation 3012. The list of PRIs for each image queue is updated dynamically whenever a link is made to the image by a user's relevance feedback, and thus, an initially small set of links will grow over time. The frequency at which a PRI appears in the queue is the frequency of the users' selection and can be taken as the degree of relevance. This data structure that is comprised of image data and image links will become the basic vertex and edge structures, respectively, in the relevance graph that is developed for image searching, and the frequency of the PRI will be used for determining edge weights in the graph.

Conventional relevance feedback methods explicitly require users to select positive or negative examples and may further require imposing weighting factors on selected images. In this embodiment of the present invention, users are not explicitly instructed to click similar images. Instead, the user simply browses and searches images motivated only by their interest. During the users' browsing and searching, it is expected that they are likely to click more often on relevant images than irrelevant images so the relevance information is likewise accumulated in the relevance queues.

Mathematical Model for Information Accumulation

It is conceivable to develop a sophisticated update scheme that minimizes the is variability of users' expertise, experience, goodwill and other psychological effects. In the present invention, however, only the basic framework for PRI links without psychology-based user modeling is presented. The assumption is that there are more users with good intention than others, and in this case, it is shown in the experimental studies that the effect of sporadic false links to irrelevant images is minimized over time for the proposed scheme.

The structure of the image queue as defined above affords many different interpretations. The entire queue structure, one queue for each image in the database, may be viewed upon as a state vector that gets updated after each user interaction, namely by the enqueue and dequeue operations. If all images are labeled in the database by the image index 1 through N, where N is the total number of images, the content of the queue may be represented by the queue matrix $Q = [Q_1 | \ldots | Q_N]$ of size $N_Q \times N$, where $N_Q$ is the length of the image queue. The nth column of the queue matrix, $Q_n$, contains the image indices as its elements and they may be initialized according to some low-level image relevance criteria.

When a user searches (queries) the database using the nth image, the system will return with a list of similar images on the display window. Suppose the user then clicks the image with index m. This would result in updating the nth column $Q_n$ of the queue matrix corresponding to enqueue and dequeue operations. This can simply be modeled by the following update equation for the jth element of $Q_n$:

$$Q_n(k) = \begin{cases} m, & k = 1 \\ Q_n(k-1), & k = 2, \ldots, N_Q \end{cases}$$

The queue matrix defined as such, immediately allows the following definition of the state vector.

The state vector representing the image queue is defined by an N×N matrix $S = [S_1 | \ldots | S_N]$ whose nth column $S_n$ is an N×1 vector which basically represents the image queue for the nth image in the database. The jth element of $S_n$ is defined to be:

$$S_n(j) = \sum_{\text{All } i \text{ such that } Q_n(i) = j} \alpha(1-\alpha)^{i-1},$$

where $0 < \alpha < 1$. Note that if the weighting $\alpha(1-\alpha)^{i-1}$ inside the summation is 1, then $S_n$ would simply be the histogram of image indices of the nth image queue, $Q_n$. Thus, $S_n$ as defined above is basically a weighted histogram of image indices of the nth image queue $Q_n$. The weight $\alpha$ serves as the forgetting factor. Note that for an infinite queue ($N_Q = \infty$), $S_n$ is a valid probability mass function as $\Sigma S_n(j)=1$ and $S_n(j) \geqq 0$. Even for a finite queue, for instance, with $N_Q=256$ and the forgetting factor $\alpha=0.1$, the sum $\Sigma S_n(j) \approx 1-2 \times 10^{-12}$. With the above relationship between the queue content and the state vector, evolution of the state at time p may be described by the following update equation:

$$S_n^{(p+1)} = (1-\alpha)S_n^{(p)} + \alpha e_{EQ}^{(p)}$$

where $e_{EQ}^{(p)}$ is a natural basis vector where all elements are zero except for one whose row index is identical to the index of the image currently being enqueued. What one would like, of course, is for this state vector to approach a state that makes sense for the current database content. Given a database of N images, assume that there exists a unique N×N image relevance matrix $R=[R_1| \ldots |R_N]$. The matrix is composed of elements $r_{mn}$, the relevance values, which in essence is the probability of a viewer clicking the mth image while searching (querying) for images similar to the nth image. The actual values in the relevance matrix R will necessarily be different for different individuals. However, when all users are viewed upon as a collective whole, the assumption of the existence of a unique R becomes rather natural. The state update equation, during steady-state operation, may be expressed by the expectation operation:

$$E[S_n^{(\infty)}] = E[e_{EQ}^{(\infty)}] = R_n = n\text{th column of } R$$

The above equality expresses precisely the desired result. That is, the state vector (matrix) S converges to the image relevance matrix R, provided that an image relevance matrix exists. Although the discussion of the state vector is helpful in identifying the state to which it converges, the actual construction and update (of the state vector) is not necessary. As the image queue has all information that it needs to compute the state vector (or the image relevance values), the implementation requires only the image queue itself. The current state vector is computed as required. As such, it is during the image retrieval process, when it needs to use the forgetting factor $\alpha$ to return images similar to the query image based on the current image relevance values.

Relevance Queue Initialization

Figure 31:
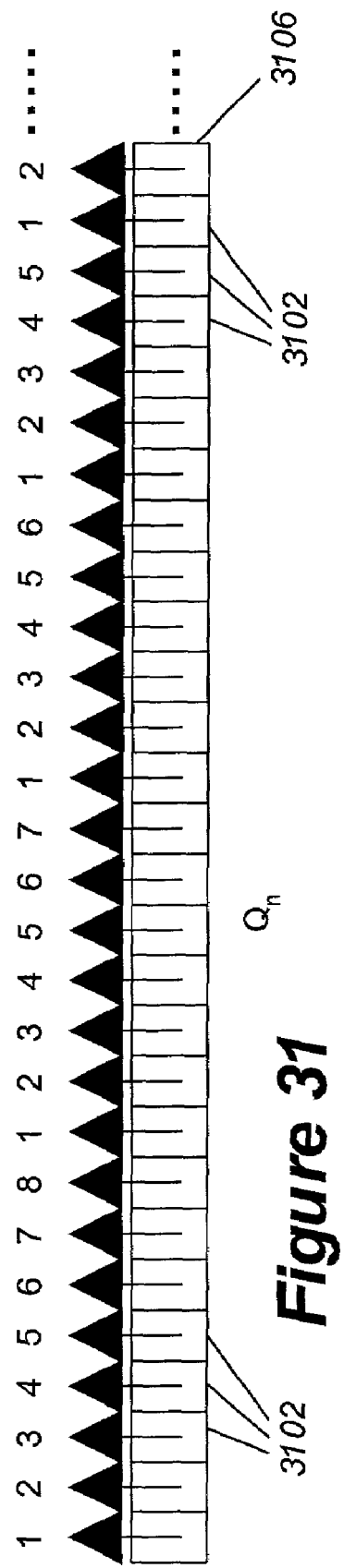
FIG. 31 is a block diagram illustrating an alternate exemplary queue for image links of the present invention.

The discussion in the previous subsection assumes steady state of the relevance queue. When a new image is inserted into a database, it does not have any links to PRIs and no images can be presented to a user to click. The relevance queue is initialized with CSIs obtained with a conventional search engine in a manner that makes higher-ranked CSIs have higher relevance values. In the initialization stage, CSI links are put into the relevance queue evenly but higher-ranked CSI links more frequently. An initialization method is illustrated for eight retrieved CSIs 3102 in the relevance queue 3106 in FIG. 31 where the image link numbers denote the ranks of the retrieved CSIs. This technique ensures that higher-ranked CSIs will remain longer in the queue as users replace CSIs with PRIs by relevance feedback.

Construction of Relevance Graph and Image Search

Construction of Relevance Graph

Figure 47:
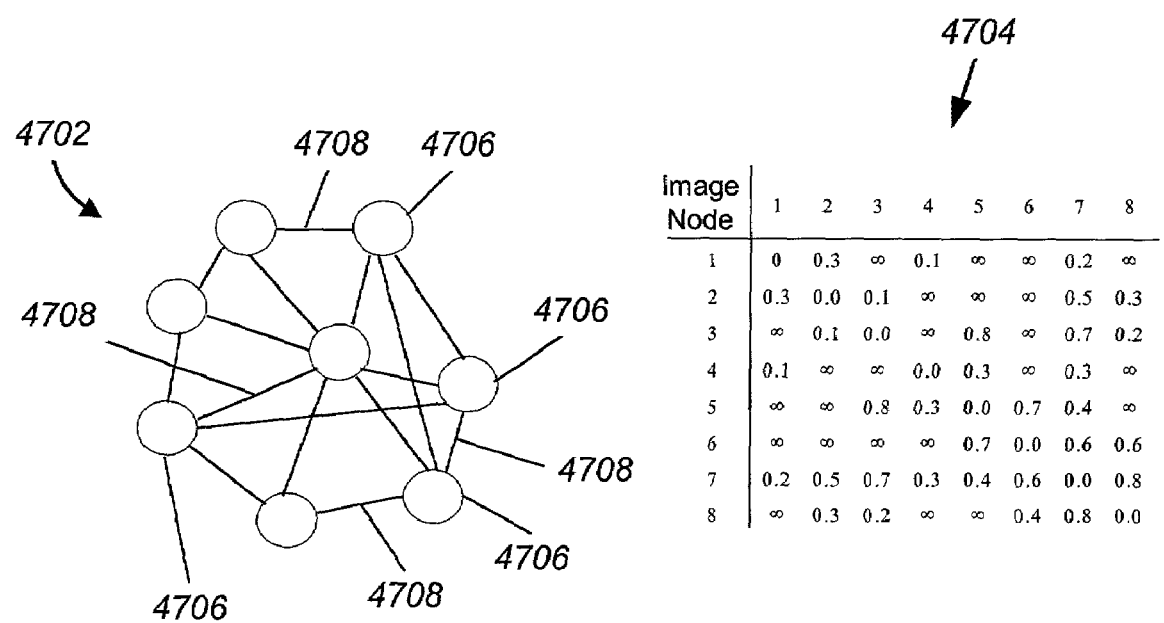
FIG. 47 is a block diagram and table illustrating image nodes and edges according to an exemplary method of the present invention.

Graph is a natural model for representing syntactic and semantic relationships among multimedia data objects. Weighted graphs are used by the present invention to represent relevance relationships between images in an image database. As shown in FIG. 47, the vertices 4706 of the graph 4702 represent the images and the edges 4708 are made by image links in the image queue.

An edge between two image vertices $P_n$ and $P_j$ is established if image $P_j$ is selected by users when $P_n$ is used as a query image, and therefor image $P_j$ appears for a certain number of times in the image link queue of $P_n$. The edge cost is determined by the frequency of image $P_j$ in the image link queue of $P_n$, i.e., the degree of relevance established by users. Among many potential cost functions, the following function is used:

$$\text{Cost}(n,j) = \text{Thr}[1 - S_n(j)],$$

where the threshold function is defined as:

$$\text{Thr}[X] = \begin{cases} X, & X \leq \text{threshold} \\ \infty, & \text{otherwise} \end{cases}$$

The threshold function signifies the fact that $P_j$ is related to $P_n$ by a weighted edge only when $P_j$ appears in the image link of $P_n$ more than a certain number of times. If the frequency of $P_j$ is very low, $P_j$ is not considered to be relevant to $P_n$. Associative and transitive relevance relationships are given as:

$$(P_n \to_{Cost(n,j)} P_j) \to_{Cost(j,k)} P_k = P_n \to_{Cost(n,j)} (P_j \to_{Cost(j,k)} P_k),$$

If $P_n \to_{Cost(n,j)} P_j$ and $P_j \to_{Cost(j,k)} P_k$, then $P_n \to_{Cost(n,k)} P_k$, where $P_n \to_{Cost(n,j)} P_j$ denotes the relevance relationship from $P_n$ to $P_j$ with $\text{Cost}(n,j)$, and $\text{Cost}(n,k) = \text{Cost}(n,j) + \text{Cost}(j,k)$.

It would require many user studies using various sets of images to determine which of the symmetric and asymmetric relevance relationships is more effective. A relevance relationship can possibly be asymmetric while a relevance graph is generally a directed graph. However, in the present invention, assume a symmetric relationship simply because it propagates image links more in a graph for a given number of user trials. The symmetry of relevance is represented by the symmetric cost function:

$$\text{Cost}(n,j) = \text{Cost}(j,n) = \text{Min}[\text{Cost}(n,j), \text{Cost}(j,n)],$$

and the commutative relevance relationship:

$$P_n \to_{Cost(n,j)} P_j = P_j \to_{Cost(j,n)} P_n.$$

The symmetry of relevance relationship results in undirected graphs as shown in FIG. 47. Specifically, FIG. 47 illustrates an undirected graph 8102 for a set of eight images and its adjacency matrix 4704, respectively.

Image Search

The present invention employs a relevance graph structure that relates PRIs in a way that facilitates graph-based image search and clustering. Once the image relevance is represented by a graph, one can use numerous well-established generic graph algorithms for image search. When a query image is given and it is a vertex in a relevance graph, it is possible to find the most relevant images by searching the graph for the lowest-cost image vertices from the source query vertex. A shortest-path algorithm such as Dijkstra's will assign lowest costs to each vertex from the source and the vertices can be sorted by their costs from the query vertex.

See, Mark A. Weiss, "Algorithms, Data Structures, and Problem Solving with C++," Addison-Wesley, Mass., 1995.

Hypershell Search

Generally, the first step of most image/video search algorithms is to extract a K-dimensional feature vector for each image/frame representing the salient characteristics to be matched. The search problem is then translated as the minimization of a distance function $d(o_i,q)$ with respect to i, where q is the feature vector for the query image and $o_i$ is the feature vector for the i-th image/frame in the database. Further, it has been known that search time can be reduced when the distance function $d(\bullet,\bullet)$ has metric properties: 1) $d(x,y)\geq 0$; 2) $d(x,y)=d(y,x)$; 3) $d(x,y)\leq d(x,z)+d(z,y)$ (a triangular inequality). Using the metric properties, particularly triangular inequality property, the hypershell search disclosed in the present invention also reduces the number of distance evaluations at query time, thus resulting in the fast retrieval. Specifically, the hypershell algorithm uses the distances to a group of predefined distinguished points (hereafter called reference points) in a feature space to speed up the search.

To be more specific, the hypershell algorithm computes and stores in advance the distances to k reference points $(d(o, p_1), \ldots, d(o, p_k))$ for each feature vector o in the database of images/frames. Given the query image/frame q, its distances to the k reference points $(d(q, p_1), \ldots, d(q, p_k))$ are first computed. If, for some reference point $p_i$, $|d(q, p_i)-d(o, p_i)|>\epsilon$, then $d(o,q)>\epsilon$ holds by triangular inequality, which means that the feature vector o is not close enough to the query q that there is no need to explicitly evaluate $d(o,q)$. This is one of the underlying ideas of the hypershell search algorithm.

Indexing (or Preprocessing)

To make videos searchable, the videos should be indexed. In other words, prior to searching the videos, a special data structure for the videos should be built in order to minimize the search cost at query time. The indexing process of the hypershell algorithm consists of a couple of steps.

First, the indexer simply takes a video as an input and sequentially scans the video frames to see if they can be representative frames (or key frames), subject to some predefined distortion measure. For each representative frame, the indexer extracts a low-level feature vector such as color correlogram, color histogram, or color coherent vector. The feature vector should be selected to well represent the significant characteristics of the representative frame. The current exemplary embodiment of the indexer uses color correlogram that has information on spatial correlation of colors as well as color distribution. See, J. Huang, S. K. Kumar, M. Mitra, W. Zhu and R. Zabih, "Image indexing using color correlogram," in *Proc. IEEE on Computer Vision and Pattern Recognition*, 1997.

Second, the indexer performs PCA (Principal Component Analysis) on the whole set of the feature vectors extracted in the previous step. The PCA method reduces the dimensions of the feature vectors, thereby representing the video more compactly and revealing the relationship between feature vectors to facilitate the search.

Third, given the metric distance such as $L_2$ norm, the LBG (Linde-Buzo-Gray) clustering is performed on the entire population of the dimension-reduced feature vectors. See, Y. Linde, A. Buzo and R. Gray, "An algorithm for vector quantization design," in *IEEE Trans. on Communications*, 28(1), pp. 84-95, January, 1980. The clustering starts with a codebook of a single codevector (or cluster centroid) that is the average of the entire feature vectors. The code vector is split into two and the algorithm is run with these two codevectors. The two resulting codevectors are split again into four and the same process is repeated until the desired number of codevectors is obtained. These cluster centroids are used as the reference points for the hyperhsell search method.

Finally, the indexer computes distance graphs for each reference point and each cluster. For a reference point $p_i$ and a cluster $C_j$, the distance graph $G_{i,j}=\{(a,n)\}$ is a data structure to store a sequence of value pairs (a,n), where a is the distance from the reference point $p_i$ to the feature vectors in the cluster $C_j$ and n is the number of feature vectors at the distance a from $p_i$. Therefor, if the number of reference points is k and the number of cluster m, then mk distance graphs are computed and stored into a database.

Figure 48:
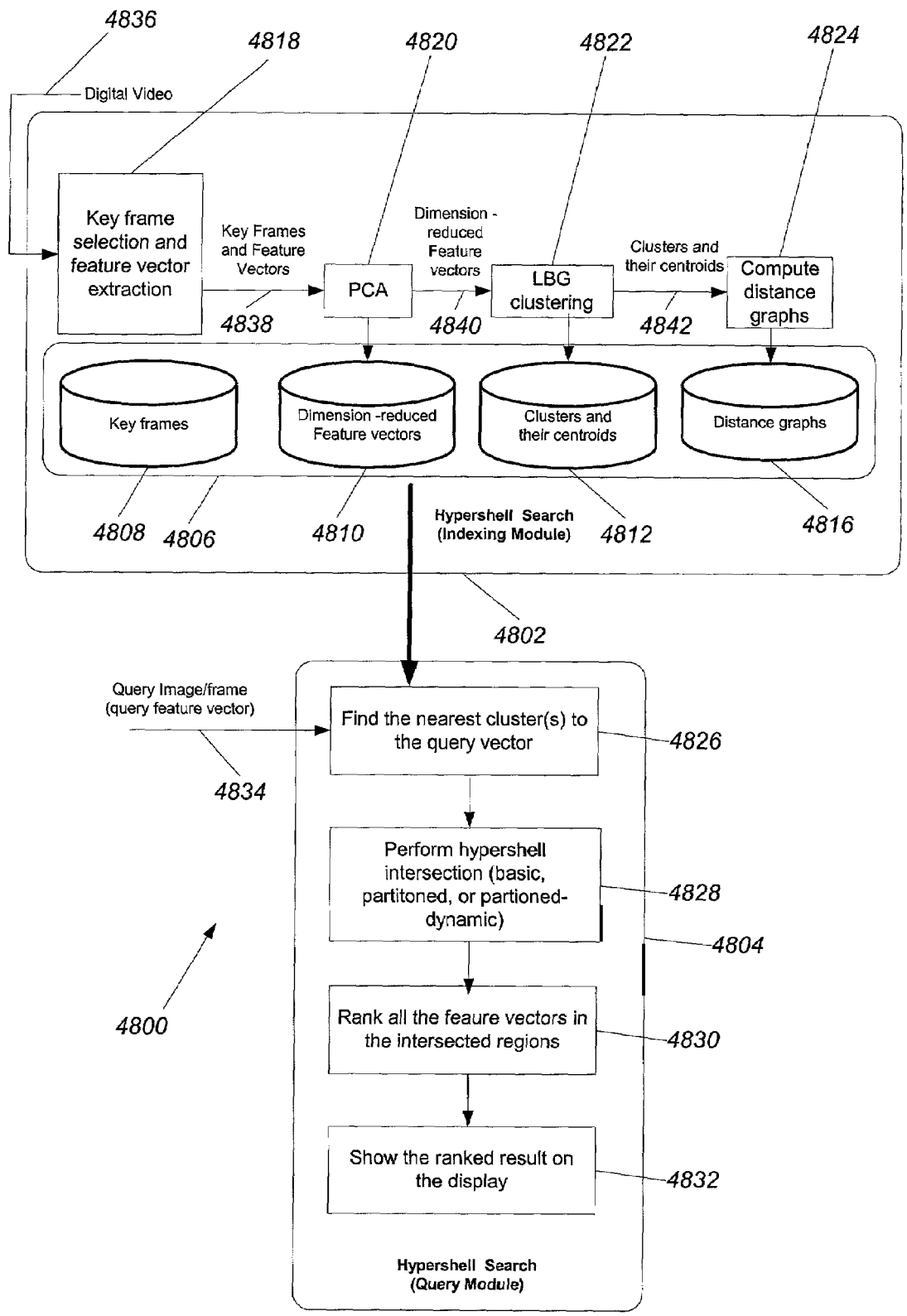
FIG. 48 is a block diagram illustrating an exemplary hypershell search method of the present invention.

The indexing data such as dimension-reduced feature vectors, cluster information, and distance graphs produced at the above steps are fully exploited by the hypershell search algorithm to find the best matches to the query image from the database. FIG. 48 illustrates this indexing process.

FIG. 48 illustrates the system 4800 of the present invention for implementing the hypershell search. The system 4800 is composed generally of an indexing module 4802 and a query module 4804. The indexing module contains storage devices in a storage module 4806 for storing frame and vector data. Specifically, storage space is allocated for key frames 4808, dimension-reduced feature vectors 4810, clusters and related centroids 4812, and distance graphs 4816. The storage elements mentioned above can be combined onto a single storage device, or dispersed over multiple storage devices such as a RAID array, storage area network, or multiple servers (not shown). In operation the digital video 4836 is sent to a key frame module 4818 which extracts feature vector information from selected frames. The key frames and associated feature vectors are then forwarded to the PCA module 4820 which both stores the feature vector information into storage module 4810, as well as forwards the dimension-reduced feature vectors 4840 to the LGB clustering module 4822. The LGB clustering module 4822 stores the clusters and their associated centroids into the cluster storage module 4812 and forwards the clusters and their centroids to the compute module 4824. The compute module 4824 computes the distance graphs and stores them into the distance graph storage module 4816. The indexing module 4802 is typically a combination of hardware and software, although the indexing module is capable of being implemented solely in hardware or solely in software.

The information stored in the indexing module is available to the query module 4802 (i.e., the query module 4804 is operably connected to the indexing module 4802 through a data bus, network, or other communications mechanism). The query module 4802 is typically implemented in software, although it can be implemented in hardware or a combination of hardware and software. The query module 4804 receives a query 4834 (typically in the form of an address or vector) for image or for frame information. The query is received by the find module 4826 which finds the nearest one or more clusters nearest to the query vector. Next, in module 4828, the hypershell intersection (either basic, partitions, and/or partitions-dynamic) is performed. Next, in module 4830, all of the feature vectors that are within the intersected regions (found by module 4828) are ranked. Thereafter, the ranked results are displayed to the user via display module 4832.

Search Algorithm

The problem of proximity search is to find all the feature points whose distance from a query point q is less than distance $\epsilon$ where distance $\epsilon$ is a real number indicating the fidelity of the search results. See, E. Chavez, J. Marroquin and G. Navarro, "Fixed queries array: a fast and economical data structure for proximity searching," in *Multimedia Tools and Applications*, pp. 113-135, 2001. The present invention called the hypershell search algorithm provides one of the efficient solutions for the proximity search.

Figure 63:
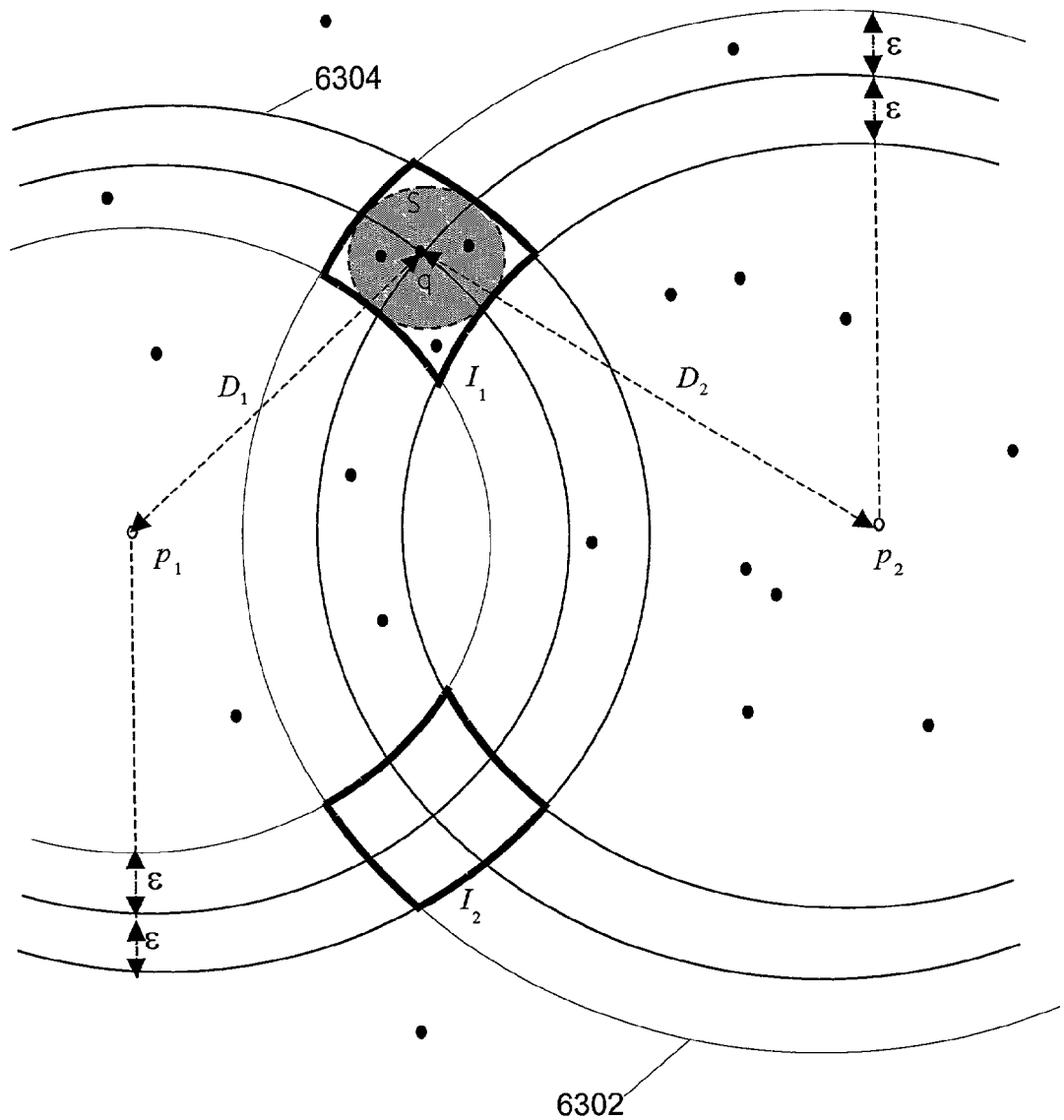
FIG. 63 is a diagram illustrating an exemplary hypershell search method of the present invention.

A two-dimensional feature vector space is assumed in FIG. 63 for simplicity. Assume further that there are two reference points $p_1$ and $p_2$, respectively, in the 2D feature space. Given a query point q, the hypershell search first computes all of the distances $D_i$ (i=1, 2) between the query point q and the reference points $p_i$(i=1, 2) and then generates one hypershell for each reference point. Each hypershell denoted by 6302 and 6304 is preferably 2ϵ in thickness and lies $D_i$ (i=1, 2) away from its center located at its corresponding reference point $p_i$. The intersection of the two hypershells 6302 and 6304 leads to the two regions $I_1$ and $I_2$ indicated in bold lines in FIG. 63. As illustrated, the intersection region $I_1$ includes a circle S of radius ϵ centered at query point q.

The feature points inside the circle S of FIG. 63 are those feature points similar to the query point q, up to the degree of ϵ, and thus are the desired results of a proximity search. The value of ϵ may be predetermined at the time of database buildup or determined dynamically by a user at the time of query. Since all the points in the circle are contained in the intersections $I_1$ and $I_2$, it is desirable to search only the intersections instead of the whole feature space, thus dramatically reducing the search space.

Figure 64:
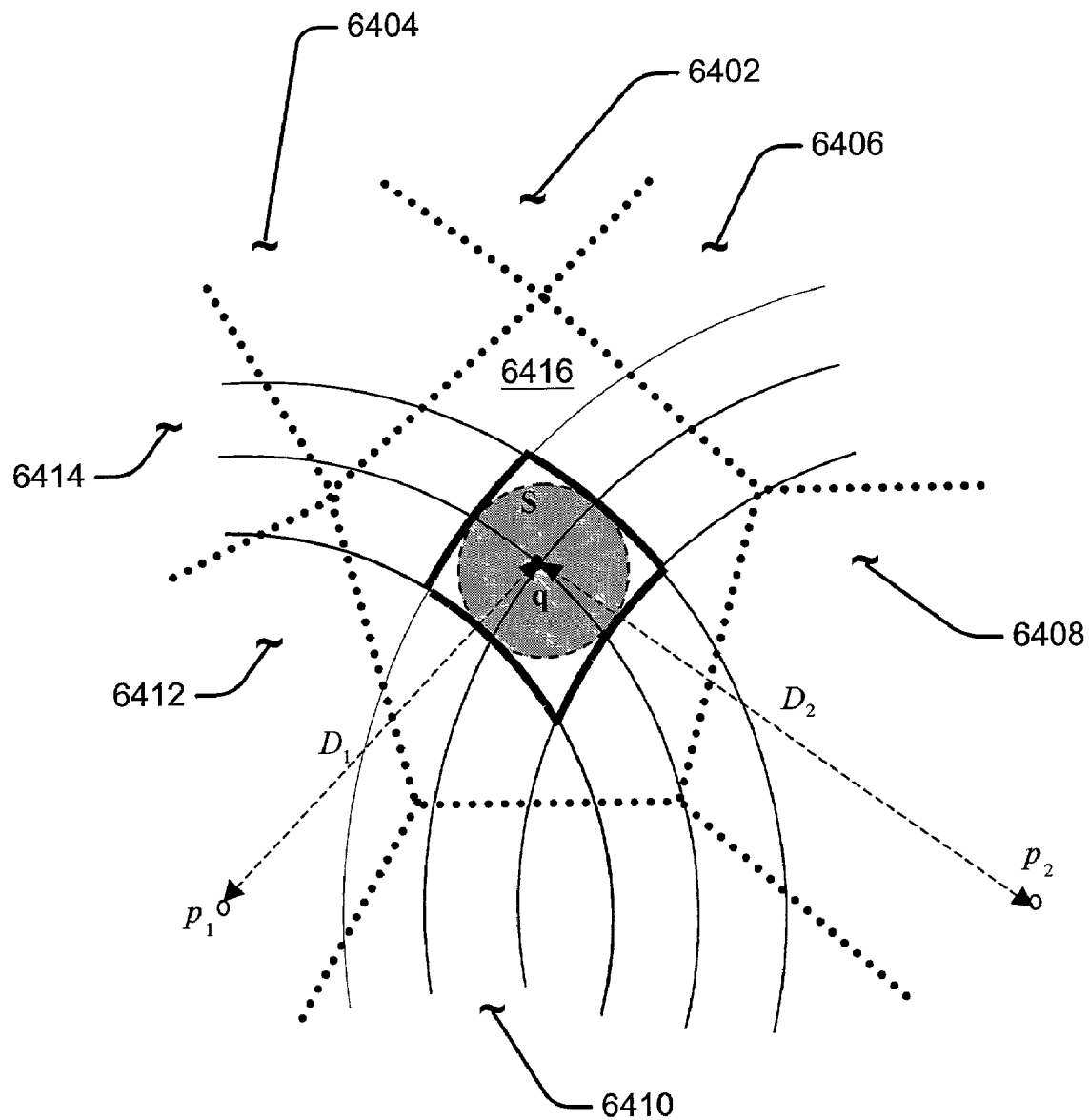
FIG. 64 is a diagram illustrating another exemplary hypershell search method of the present invention.

As illustrated in FIG. 63, there may be more than one intersection resulting from hypershell intersection in a multidimensional feature space. For example, the two intersected regions $I_1$ and $I_2$, of the 2-D feature space are illustrated in FIG. 63. In such case, however, it is possible that one or more of intersected regions may be irrelevant to the search. For example, in FIG. 63, the region $I_1$ is highly pertinent to the query point q while the region $I_2$ is not. Thus, to improve search performance, the least relevant regions, such as $I_2$, should be eliminated. One way to achieve such elimination is to partition the original feature space into a certain number of smaller spaces (also called clusters) and to apply the hypershell intersection to the clusters or segmented feature spaces. FIG. 64 illustrates clusters 6402, 6404, 6406, 6408, 6410, 6412, 6414 and 6416 whose boundaries are denoted by dotted lines. Collectively, the dotted lines may be referred to as a Voronoi diagram of cluster centroids. Referring to FIGS. 63 and 64, among the intersection $I_1$ and $I_2$, only the region $I_1$ would be considered a relevant region because it resides inside the same cluster to which the query point Q belongs.

Three Preferred Embodiments

In searching for information according to the present invention, one or more of three preferred methods may be employed. In one embodiment of the present invention where clusters are not employed, a basic hypershell search algorithm may be used. In another embodiment of the present invention where clusters obtained by using the LBG algorithm described above are employed to improve search times, a partitioned hypershell search algorithm or a partitioned-dynamic hypershell search algorithm may be used. The basic hypershell search algorithm is discussed below with reference to FIG. 65. The partitioned hypershell search algorithm and the partitioned-dynamic hypershell search algorithm are also discussed below with reference to FIGS. 66 and 67, respectively. Regardless of the search algorithm employed, however, for a given query image/frame q and distortion ϵ, a set of the images/frames, O, satisfying, $$O = \{o_k | d(o_k, q) \leq \epsilon, o_k \in R\}$$

are searched, where R is an image/video database and d(•,•) is a metric distance.

Basic Hypershell Search Algorithm

Figure 65:
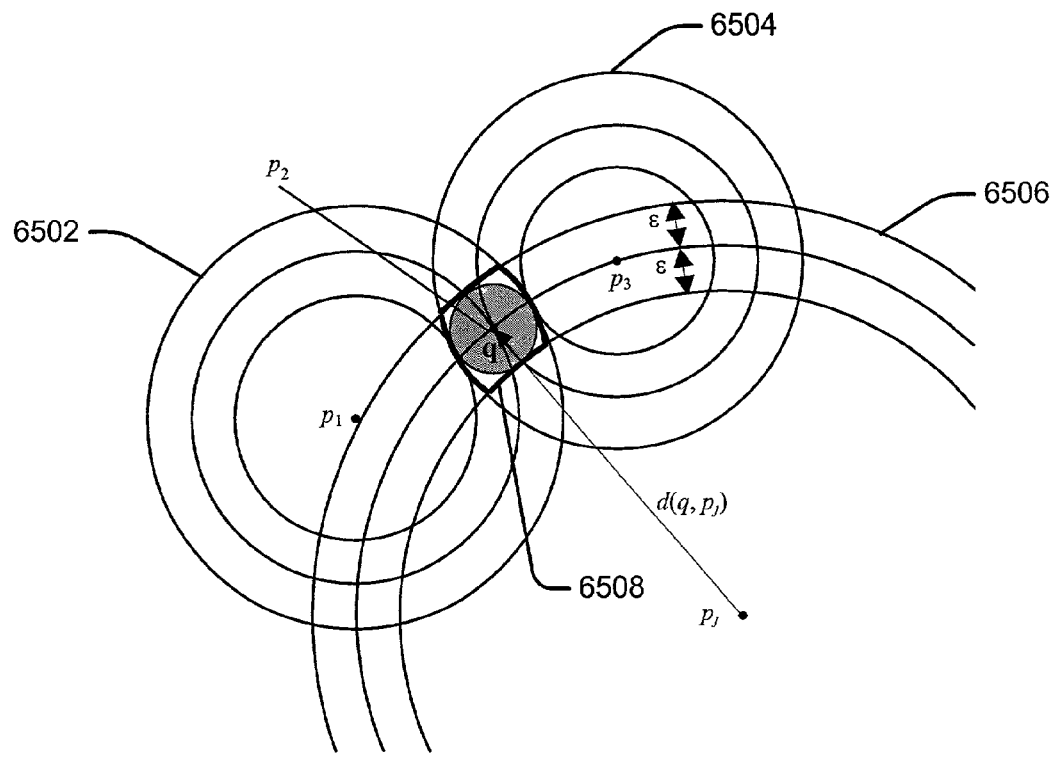
FIG. 65 is a diagram illustrating another exemplary hypershell search method of the present invention.

In the first preferred embodiment of the basic hypershell search algorithm, $$O = \{o_k \mid d(o_k, q) \leq \varepsilon, o_k \in I\}$$

$$I = \bigcap_{j=1}^{J} I_j$$

$$I_j = \{i_k \mid \; |d(i_k, p_j) - d(q, p_j)| \leq \varepsilon\},$$

where $p_j$'s are the predetermined reference points and J is the number of reference points. And, $I_j$ denotes the hypershell that is 2ϵ wide and centered at the reference point $p_j$, and I denotes the set of intersections obtained by intersecting all the hypershells $I_j$. As illustrated in FIG. 65, three hypershells 6502, 6504, and 6506 are generated by the basic hypershell search algorithm upon running an image/frame query with a distortion ϵ. Further, the use of the hypershells 6502, 6504 and 6506 produces the intersection 6508, bounded by bold lines. As mentioned above, the feature vector points within the intersection 6508 include those points that would be retrieved in a proximity search. It is worth noting that compared with the other two embodiments described afterward, the basic shell search algorithm tends to cause a considerable search cost, namely time to intersect hypershells, because the number of data (image/frame) points contained in the intersection are usually relatively larger than the other two methods.

Partitioned Hypershell Search Algorithm

Figure 66:
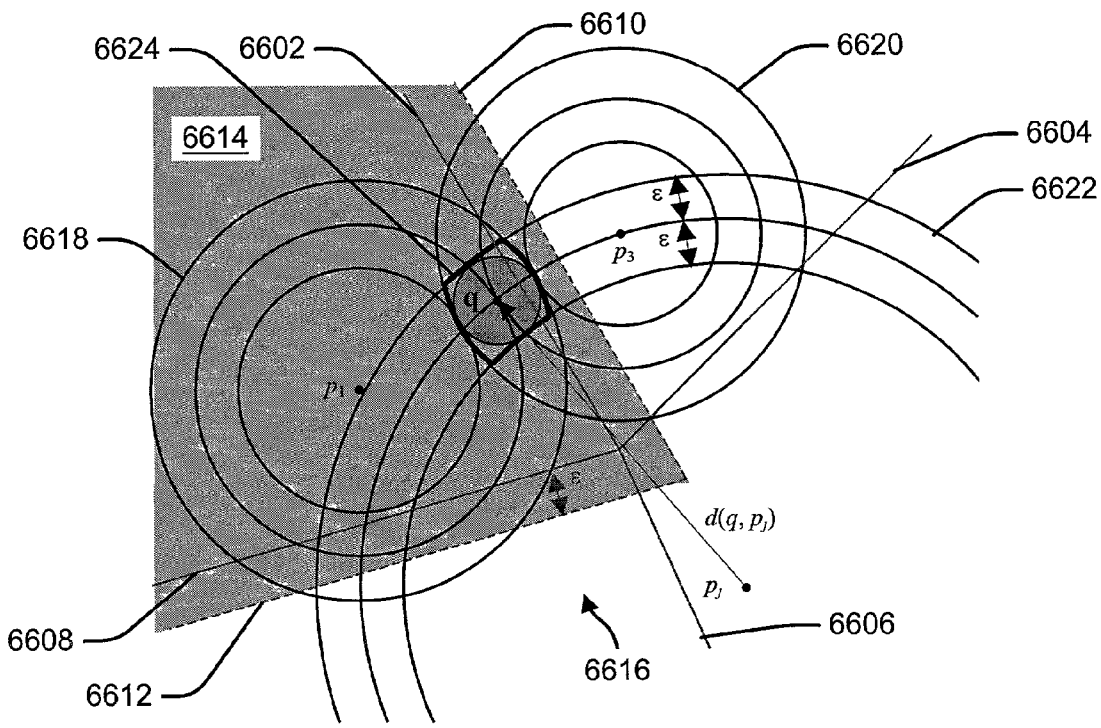
FIG. 66 is a diagram illustrating another exemplary hypershell search method of the present invention.
Figure 67:
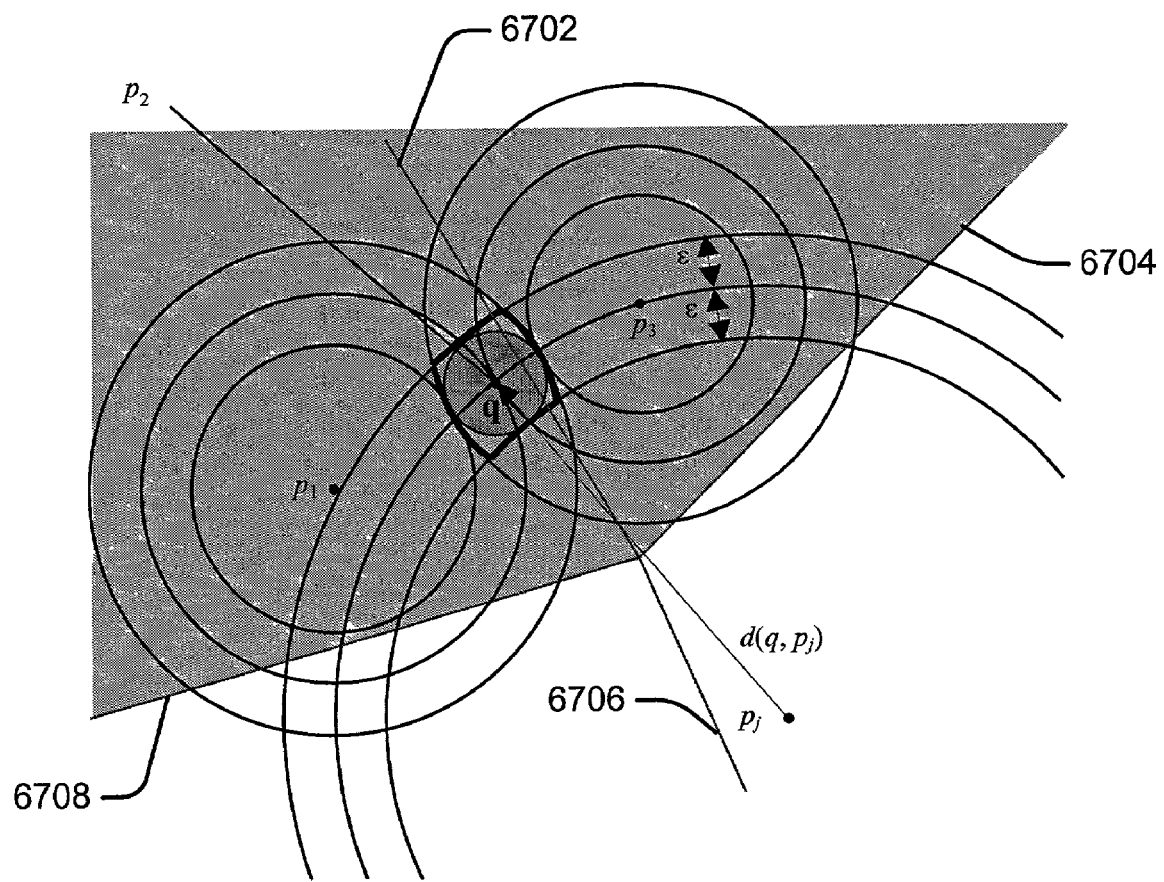
FIG. 67 is a diagram illustrating another exemplary hypershell search method of the present invention.

In the second preferred embodiment of the partitioned hypershell search algorithm, $$O = \{o_k \mid d(o_k, q) \leq \varepsilon, o_k \in I\}$$

$$I = \bigcap_{j=1}^{J} I_j$$

$$I_j = \{i_k \mid \; |d(i_k, p_j) - d(q, p_j)| \leq \varepsilon, i_k \in C_n\},$$

where $C_n$ represents the closest cluster from query image/frame q. Similarly to the first embodiment, $I_j$ denotes the hypershell that is 2ϵ wide and centered at the reference point $p_j$ and I denotes the set of intersections obtained by intersecting all the hypershells. In this case, however, only the portion of hypershells surrounded by the expanded boundary by ϵ of cluster $C_n$ as shown in FIG. 66 is searched. Without the boundary expansion, a feature point o that is close enough to the query image q (i.e., d(o,q)≦ϵ) but resides in the neighboring cluster would not be included in the outcome of the proximity search. It is often the case that many other cluster-based search algorithms do not guarantee the search results with a given fidelity. The lines 6602, 6604, 6606 and 6608 indicate the original cluster boundaries, the dotted lines 6610 and 6612 indicate the original cluster boundaries expanded by a distortion ϵ, and the darkened region 6614 denotes the expanded cluster $C_n$ that includes the expansion region 6616 over which the search is performed.

Similar to FIG. 65, FIG. 66 illustrates three hypershells 6618, 6620 and 6622 that were created upon running an image/frame query q given a distortion ϵ. After partitioning the region of hypershells 6618, 6620 and 6622, as indicated by cluster boundaries 6602, 6604, 6606 and 6608, the region 6614 can be selected as the most pertinent region for further consideration. For the region 6614, the intersecting region 6624 is identified and actually searched.

Partitioned-Dynamic Hypershell Search Algorithm

While the partitioned hypershell search algorithm is the fastest of three algorithms, it also has a larger memory requirement than its alternatives. The extra storage is needed due to boundary expansion. For instance, a feature (image/frame) point near a cluster boundary, i.e., boundary lines 6702, 6704, 6706 and 6708 of FIG. 67, often turns out to be an element contained in the multiple clusters. Therefor, as an alternative, the partitioned-dynamic hypershell search algorithm is a light version of partitioned hypershell search algorithm with less memory requirement, but approximately same search time as the partitioned hypershell search algorithm.

$$O = \{o_k \mid d(o_k, q) \leq \varepsilon, o_k \in I\}$$

$$I = \bigcap_{j=1}^{J} I_j$$

$$I_j = \{i_k \mid \ \mid d(i_k, p_j) - d(q, p_j) \mid \leq \varepsilon, i_k \in C\}$$

$$C = \bigcup C_k : d(C_k, q) \leq r + \varepsilon$$

$$r = \min_k d(C_k, q)$$

where $d(C_k, q)$ is the distance between a center of cluster and a feature point. The $I_j$ denotes the hypershell that is $2\varepsilon$ wide and centered at the reference point $p_j$, and I denotes the set of intersections obtained by intersecting all the hypershells. The r is the shortest of all the distances between the query point and the cluster centroids. The C is the set of clusters whose centroids are within the distance $r+\varepsilon$ from the query point.

Fast Codebook Search

Given an input vector Q, a codebook search problem is defined to select a particular code vector $X_i$ in a codebook C such that $$\|Q-X_i\| < \|Q-X_j\| \text{ for } j=1, 2, \ldots, N, j \neq i$$

where N denotes the size of codebook C. The present invention of the fast codebook search is used to find the closest cluster for the hypershell search described previously.

Multi-resolution Structure Based on Haar Transform

Let $H(\cdot)$ stand for the Haar transform. Suppose further that a vector $X=(x_1, x_2, \ldots, x_k) \in R^k$, and its transformed one, $X^h = H(X) = (x_1^h, x_2^h, \ldots, x_k^h)$, where k is the power of 2, for example, $2^m$. Then, a Haar-transform based multi-resolution structure for vector X is defined to be a sequence of vectors $\{X^{h,0}, X^{h,1}, \ldots, X^{h,n}, \ldots, X^{h,m}\}$, where $X^{h,n}$ is an n-th level vector of size $2^n$ and $X^{h,m}=X^h$. The multi-resolution structure is built in bottom-up direction, taking the vector $X^h = X^{h,m}$ as an initial input and successively producing the (m−1), (m−2), ..., n, ..., 2, 1, 0-th level vectors in this order. Specifically, n-th level vector is obtained from (n+1)-th level vector by simple substitution:

$$X^{h,n}[p] = X^{h,(n+1)}[p] \text{ for } p=1, 2, \ldots, 2^n$$

where $X^{h,n}[p]$ denotes p-th coordinate of vector $X^{h,n}$.

FIG. 29 illustrates the use of the Haar transform in the present invention. Specifically, the original feature space 2902 contains various elements $X^0$ 2904, $X^1$ 2906, $X^2$ 2908, and $X^3$ 2910 as illustrated in FIG. 29. Upon the transformation 2930, there appear the corresponding transform elements $X^{h,0}$ 2914, $X^{h,1}$ 2916, $X^{h,2}$ 2918, and $X^{h,3}$ 2920 in the Haar transform space 2912 corresponding to elements $X^0$ 2904, $X^1$ 2906, $X^2$ 2908, and $X^3$ 2910, respectively.

Properties

Property 1:

Suppose $Q=(q_1, q_2, \ldots, q_k)$, $X=(x_1, x_2, \ldots, x_k)$, $Q^h = H(Q) = (q_1^h, q_2^h, \ldots, q_k^h)$, and $X^h = H(X) = (x_1^h, x_2^h, \ldots, x_k^h)$. Then, the $L_2$ distance between Q and X is equal to the $L_2$ distance of between $Q^h$ and $X^h$:

$$\sqrt{\sum_{i=1}^{k}(q_i - x_i)^2} = \sqrt{\sum_{i=1}^{k}(q_i^h - x_i^h)^2}$$

Property 2:

Assume that $D^n(Q^h, X^h)$ symbolizes the $L_2$ distance between two n-th level vectors $Q^{h,n}$ and $X^{h,n}$ in Haar transform space. Then the following inequality holds true:

$$D^m(Q^h, X^h) \geq D^{m-1}(Q^h, X^h) \geq \ldots \geq D^1(Q^h, X^h) \geq D^0(Q^h, X^h)$$

The following pseudo code provides a workable method for the use of the cookbook search:

```
Input: Q              // query vector
       HaarCodeBk     // codebook),
       CbSize         // size of codebook)
       VecSize        // Dimension of codevector)
Output: NN            // index of the codevector nearest to Q)
Algorithm:
min_dist = ∞;
Q_haar = HaarTrans(Q);     //Compute Haar transform of Q
for(i = 0; i<CbSize; i++)
{
    for(length =1; length <=VecSize; length =length * 2)
    {
        dist = LevelwiseL2Dist (Q_haar, HaarCodeBk[i], length);
        if(dist >=min_dist)
        {
            break;
            // Go to the outer loop to try another codevector
        }
        if(length = = VecSize)
        {
            min_dist = dist;
            NN = i;
        }
    }
}
return NN;
```

Peer to Peer Searching

To the best of the present inventors' knowledge, most of current P2P systems perform searches only using a string of keywords. However, it is well-known that if the search for multimedia content is made with visual features as well as the textual keywords, it could yield the enhanced results. Furthermore, if the search engine is enforced by advantages of P2P computing, the scope of the results can be expanded to include a plurality of diverse resources on peer's local storage as well as Web pages. Additionally, the time dedicated to the search will be remarkably reduced due to the distributed and concurrent computing. Taking the best parts from the visual search engine and the P2P computing architecture, the present invention offers a seamless, optimized integration of both technologies.

Basic assumptions underlying the implementation of this method of the present invention: (Gnutella model: server-less model or pure peer-to-peer model)

1. The network consists of nodes (i.e., peers) and connections between them.
2. The nodes have same capability and responsibility. There is no central server node. Each node functions as both a client and a server.
3. A node knows only its own neighbors.

The following is a scenario to find image files according to an embodiment of the present invention:

1. A new user (denoted as NU) enters the P2P network.
2. NU broadcasts or multicasts a message called ping to announce its presence.
3. Nodes that receive the ping send a pong back to NU to acknowledge that they have received the ping message.
4. NU keeps track of nodes that sent those pong messages so that it retains a list of active nodes to which NU is able to connect.
5. When NU initiates a search request, it broadcasts or multicasts to the network the query message that contains visual features as well as a string of keywords.
6. A node (denoted as SN) that receives the query message runs image search engine upon the image database on the node's local storage. If SN finds images to satisfy the search criteria, it responds to NU with the search result message that may contain the SN's IP address and a list of found file sizes and names.
7. NU attempts to make a connection to the node SN using SN's IP address and download image files.
8. If NU triggers another search request, go to step 5. Otherwise, it terminates the connection and leaves the P2P network.

Figure 25:
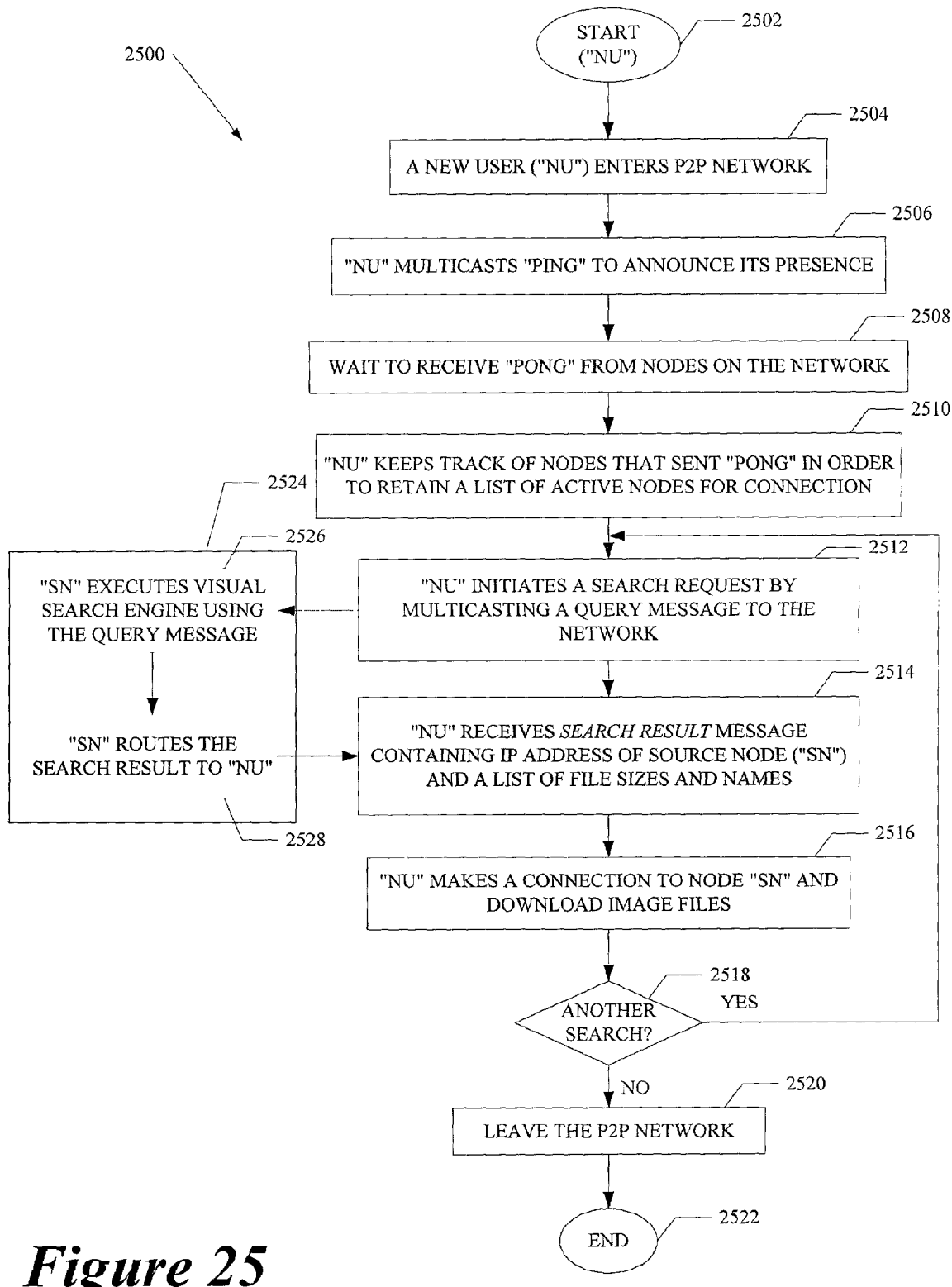
FIG. 25 is a flowchart illustrating an exemplary peer-to-peer exchange of the multimedia bookmark of the present invention.

FIG. 25 is a flowchart illustrating the method 2500 of the present invention. The method begins generally at step 2502. Thereafter, a new user (NU) enters the peer-to-peer (P2P) network in step 2504. The new user multicasts a "ping" (service request) signal to announce its presence in step 2506. The new user then waits to receive one or more "pong" (acknowledgement) signals from other users on the network, step 2508. The new user keeps track of the nodes that sent "pong" messages in order to retain a list of active nodes for subsequent connections, step 2510. The new user then initiates a search request by multicasting a query message to the network in step 2512. The source node (SN) 2524 receives the new user's search request and executes a "visual" search using the query parameters in the new user's query message, step 2526. The source node then routes the search results to the new user in step 2528. The new user receives the search result message that contains the source node's IP address as well as a list of names and sizes of found files, step 2514. Thereafter, the new user makes a connection to the source node using the source node's IP address, and downloads multimedia files, in step 2516. A check is made to determine if the new user wants another search request in step 2518. If so, the execution loops back to the step 2512. Otherwise, the user leaves the P2P network in step 2520 and terminates the program in step 2522.

3. Editing [DS_3_Editing.doc]

The present invention includes a method and system of editing video materials in which it only edits the metadata of input videos to create a new video, instead of actually editing videos stored as computer files. The present invention can be applied not only to videos stored on CD-ROM, DVD, and hard disk, but also to streaming videos on a local area network (LAN) and wide area networks (WAN) such as the Internet.

The present invention further includes a method of automatically generating an edited metadata using the metadata of input videos. The present invention can be used on a variety of systems related to video editing, browsing, and searching. This aspect of the present invention can also be used on stand-alone computers as well those connected to a LAN or WAN such as the Internet.

In order for the present invention to achieve such goals, metadata of an input video file to be edited contain a URL of the video file and segment identifiers which enables one to uniquely identify metadata of a segment such as time information, title, keywords, annotations, and key frames of the segment. A virtually edited metafile contains metadata copied from some specific segments of several input metafiles, or contains only the URIs (Uniform Resource Identifier) of these segments. In the latter, each URI consists of both a LRL of the input metafile and an identifier of the segment within the metafile.

The significance and the practical application of the present invention are described in detail by referencing the illustrated figures. FIG. 32 compares the former video editing concept 3200 with the concept of virtual editing in the present invention 3200'. In FIG. 32, it is assumed that the metadata used during the virtual editing, is stored on a separate metafile. Referring to FIG. 32, the prior art method (FIG. 32(a)) merely sends the various video files 3202 to the video editor 3206 where a user edits the videos to produce an edited video 3208. In contrast, the method of the present invention, as illustrated in FIG. 32(b), utilizes metafiles 3204 of the videos 3202 and edits the metafiles 3204 in the virtual video editor 3206' to produce a metafile 3210 of a virtually edited video.

Figure 33:
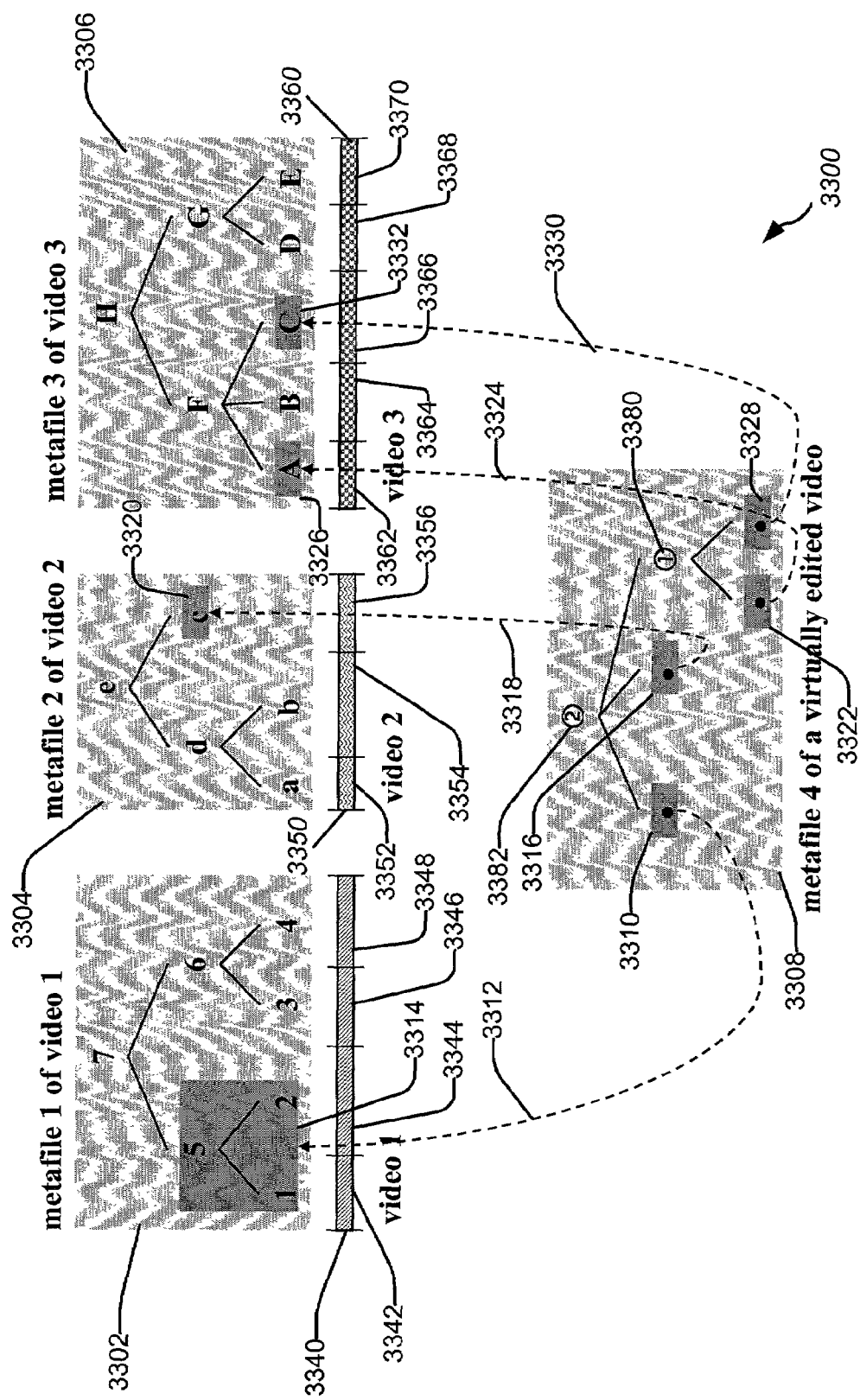
FIG. 33 is a block diagram illustrating an exemplary segmentation and reconstruction of a new multimedia video presentation according to the method of the present invention.

FIG. 33 is an example of the creation of a new video using the virtual editing of the present invention with the metafile of the three videos. Video 3340 consists of four segments 3342, 3344, 3346, 3348 that correspond to elements 1, 2, 3, and 4, respectively, in the metafile 3302 of video 3340. Segments 1 and 2 of metafile 3302 are grouped to segment 5; segments 3 and 4 are grouped to segment 6, and segments 5 and 6 themselves are grouped into segment 7 of metafile 3302. Similarly, video 2 (3350) has three segments 3352, 3354, and 3356 which correspond to elements a, b, and c, respectively, of metafile 3304. As with metafile 3302, metafile 3304 groups the elements in a hierarchical structure (a and b into d, and c and d into e). Video 3 (3360), meanwhile, has five elements 3362, 3364, 3366, 3368, and 3370 that correspond to elements A, B, C, D, and E, respectively, of metafile 3306 as illustrated in FIG. 33. As with the other two metafiles, metafile 3306 has its elements grouped in a hierarchical structure, namely, A, B, and C into F; and D and E into G from which F and G are grouped into H as illustrated in FIG. 33.

The virtually edited metadata 3308 is composed of segments 3310, 3316, 3322, and 3328 each of which has an segment identifiers 3312, 3318, 3324, and 3330, respectively, indicating that, for example, segment 3310 is from segment 5 (3314) of metadata 3302, segment 3316 is from segment c (3320) of metadata 3304, and segments 3322 and 3328 are from segment A (3326) and C (3332) of metadata 3306 as shown in FIG. 33. In order to form a hierarchical structure with the above segments, two segments 3380 and 3382 are defined in metafile 3308 as shown in FIG. 33.

There are two kinds of segments within the metafile of the virtually edited video: a component segment of which the metadata has already been defined in the input video metafile, such as segments 3310, 3316, 3322, and 3328, and a composing segment of which the metadata is newly defined in the metafile of the edited video such as segments 3380 and 3382.

A composing segment can have other composing segments and/or component segments as its child node, while the component segment cannot have any child nodes. Virtual video editing is, essentially, the process of selecting and rearranging segments from the several input video metafiles, hence the composing segments are defined in such a way as to form a desired hierarchical tree structure with the component segments chosen from the input metafiles.

FIG. 33 describes the process of generating the virtually edited metadata. Segment 5 (3314) of metafile 3302, the segment to be edited, is selected by browsing through metafile 3302. Composing segment 3382 is newly generated, and it has the selected segment 5 (3314) as its child node by generating a new segment 3310 and saving an identifier of the segment 5 (3314) into the new segment. Therefor, the new segment 3310 becomes a component segment within the hierarchical structure being edited. Segment c (3320), another segment to be edited, is selected by browsing through metafile 3304. In order to make the selected segment c (3320) be a child of the segment 3382, a new segment 3316 is generated and an identifier of the segment c (3320) is saved into the new segment. One can browse through metafile 3306, and want to make two non-consecutive segments A (3326) and C (3332) be a consecutive segment and give some title to the new segment. The composing segment 3382 has then another newly created composing segment 3380 as its child node, write the title into metadata of the segment 3380. The segment 3380 has the selected segments A (3326) and C (3332) as its children by generating two new segment 3322 and 3328, and saving identifiers of the segment A (3326) and C (3332) into the new segments, respectively. The new segments 3322 and 3328 thereby become component segments within the hierarchical structure being edited.

Figure 34:
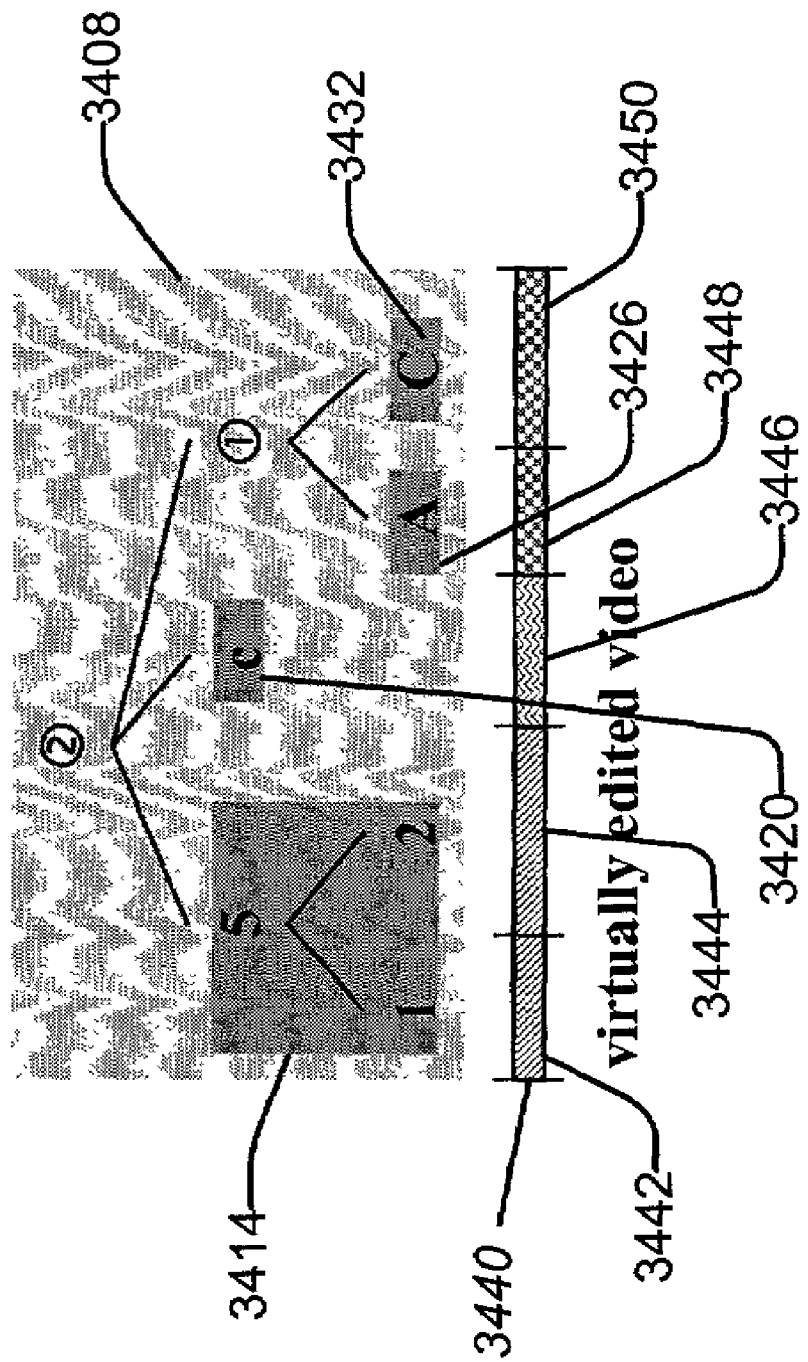
FIG. 34 is a block diagram illustrating an exemplary edited multimedia file according to the present invention.

Eventually, the edited metadata of FIG. 33 must be transformed into video that is useful to the user. FIG. 34 illustrates the virtually edited metadata 3408 and its corresponding restructured video 3440. Specifically, segment 5 (3414) presents video segments 3442 and 3444. Similarly, segment c (3420) presents video segment 3446, and segments A (3426) and C (3432) present video segments 3448 and 3450, respectively.

When metadata of a selected segment in an input metafile is copied to a component segment in a virtually edited metafile, the copy operation can be performed by one of the two ways described below. First, all the metadata belonging to the selected segment of an input metafile are copied to a component segment within the hierarchical structure being edited. This method is quite simple. Moreover, a user can freely modify or customize the copied metadata without affecting the input metafile.

Second, record only the URI of the selected segment of an input metafile into the component segment within the hierarchical structure being edited. Since the URI is composed of a URL of the input metafile, and an identifier of the selected segment within the file, the segment within the input metafile can be accessed from a virtually edited metafile if the URI is given. With this method, a user cannot customize the metadata of the selected segment. Users can only reference it as it is. Also, if the metadata of a referenced segment is modified, the virtually edited metafile referencing the segment will be reflected accordingly regardless of the user's intention.

In both methods, for the playback of the virtually edited metafile, the URL of input video file containing the copied or reference segment has to be stored in the corresponding input metafile. In a virtually edited metafile generated with the first method, if the video URLs of all the sibling nodes belonging to a component segment are equal, the URL of the video file is stored to the composing components having these nodes as children, and remove the URL of the video file from the metadata of these nodes. This step guarantees that all the segments belonging to the composing segment come from the same video file if metadata of a composing segment has the URL of a video file. When making a play list for playback of a composing segment, an efficient algorithm can be achieved using this characteristic. That is, when inspecting a composing segment in order to make its play list, without inspecting its all descendents, the inspection can be stop if the segment has a URL of a video file.

Figure 35:
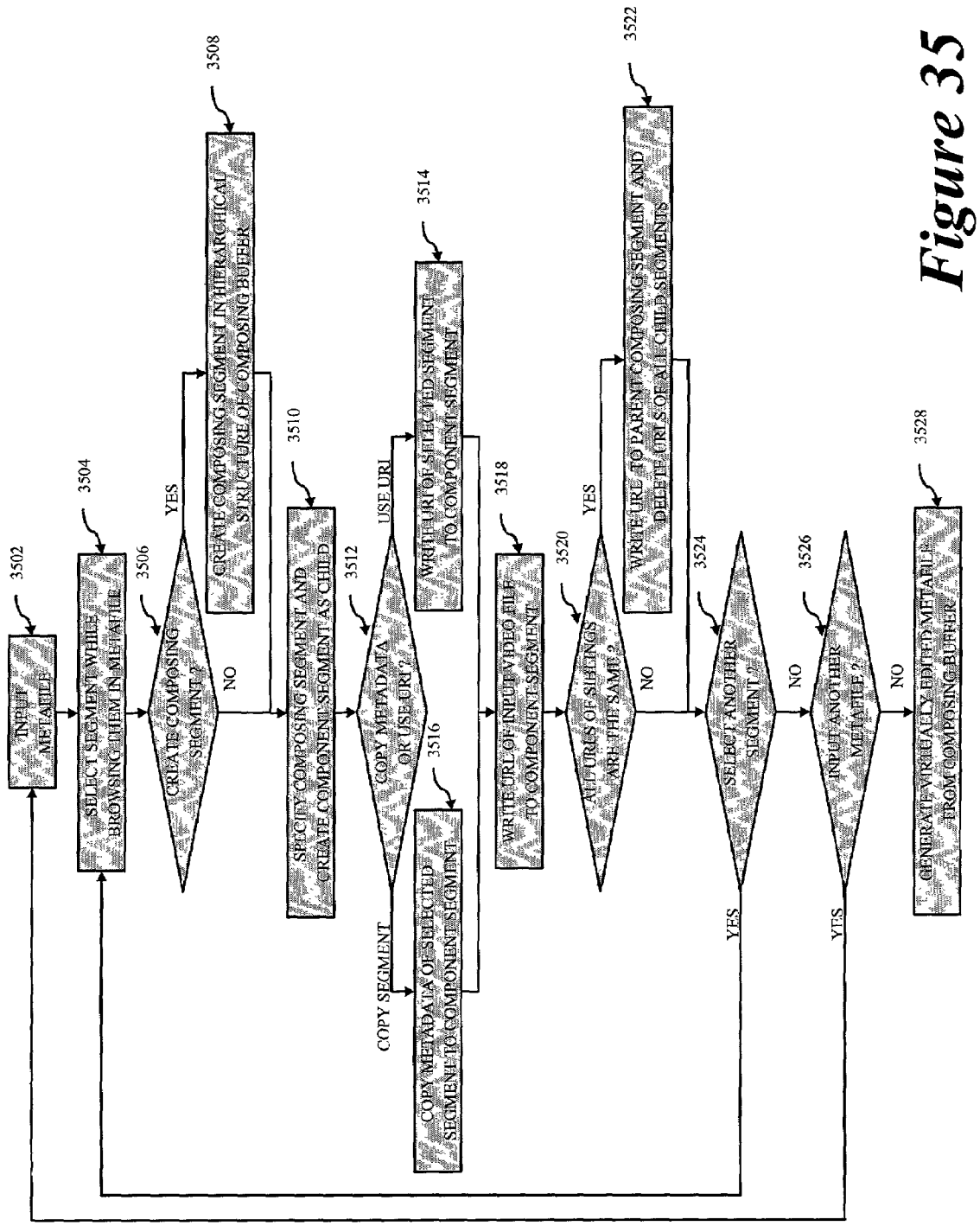
FIG. 35 is a flowchart of an exemplary method of the present invention for virtual video editing based on metadata.

FIG. 35 is a flowchart of the method of the present invention for virtual video editing based on metadata. The present invention can only be applied in the situation where the content-based hierarchically structured metadata of the video is within the metafile itself or in a database management system (DBMS). In the flowchart of FIG. 35, it is assumed that the metadata exists in the form of metafile. Even if the metadata is stored in a DBMS, the method of the present invention can be applied if each segment can be uniquely identified by providing some type of key or identifier of an database object.

A detailed description of the method depicted in FIG. 35 is as follows. The method begins generally at step 3502, where a metafile of an input video is loaded. Next, in step 3504, one or more segments are selected while browsing through the metafile. A check is made in step 3506 to determine if a composing segment should be created. If so, step 3508 is performed where the composing segment is created in a hierarchical structure being edited within the composing buffer. Thereafter, or if the result of step 3506 is negative, step 3510 is performed, where a composing segment is specified from newly created or pre-existing ones and a component segment is created as a child node of the specified composing segment. Next, in step 3512, a check is made to determine if a copy of the metadata is to be used, or a URI is used in its place. If a copy of the segment is used, then step 3516 is performed where metadata of the selected segment is copied to the newly created component segment. If the URI is to be used, then step 3514 is executed where the URI of the selected segment is copied to the component segment. In either case, step 3518 is next performed, where the URL of the input video file is written to the component segment. Next, a check is made at step 3520 to determine if all of the URL's of any of the sibling nodes are identical. If so, step 3522 is performed where the URL is written to the parent composing segment and URL's of all of the child segments are deleted. Thereafter, in step 3524, a check is made to determine if another segment is to be selected. If so, execution is looped back to step 3504. Otherwise, a check is made at step 3526 to determine if another metafile is to be input to the process. If so, then execution loops back all the way to step 3502. Otherwise, a virtually edited metafile is generated from the composing buffer in step 3528 and the method ends.

FIGS. 36, 37, 38, 39, and 40 describe the preferred application of the present invention. Video 1 and its metafile along with video 2 and its metafile (see FIG. 33) are stored in a computer with the domain name www.video.server1, as inputs. Video3 and its metafile (see FIG. 33) are stored in www.video.server2. FIG. 36 is a description of the metafile for video 1 (see FIG. 33) using extensible markup language (XML), the universal format for structured documents. The metafile of video 1 contains the UTRL to video 1, and every pre-defined segment contains several metadata including the time information of the segment. The pre-defined segment also has its own segment identifier to uniquely distinguish them within a file. Video 2, and video 3 of FIG. 33 are described in XML in the same way in FIG. 37 and FIG. 38, respectively.

FIGS. 39 and 40 are the representation of the metafile in XML, after virtually editing video 1, video 2, and video 3. Assume that the metafile is stored in www.video.server2. As indicated in FIG. 35, there are two ways in copying a metadata of input metafile's selected segment to a component segment of a virtually edited metafile. FIG. 39 was composed by the first method, which is to copy all the metadata within a selected segment to the component segment. FIG. 40 was composed by the second method, which is to store the URI of the selected segment to the composition segment. In FIG. 40, the URI is composed of the input metafile's URL and the segment identifier within the file, according to the xlink and xpointer specification. The "#" between the URL and the segment identifier indicates that the URI is composed of URL and segment identifier with XML. The id( ) function which has the segment identifier as its parameter, indicates that the segment identifier is uniquely identifiable.

To play a specific segment of the virtual edited metafile, a play list of the actual videos within the segment has to be created. The play list contains the URLs of the videos contained in the selected segment as well as the time information (for example, the starting frame number and duration) sequentially. When the virtual video player receives the play list, it will play the segments arranged in the play list sequentially. FIG. 41 is a representation of the play list of the root segment in FIG. 39, and FIG. 40 using XML.

Figure 42:
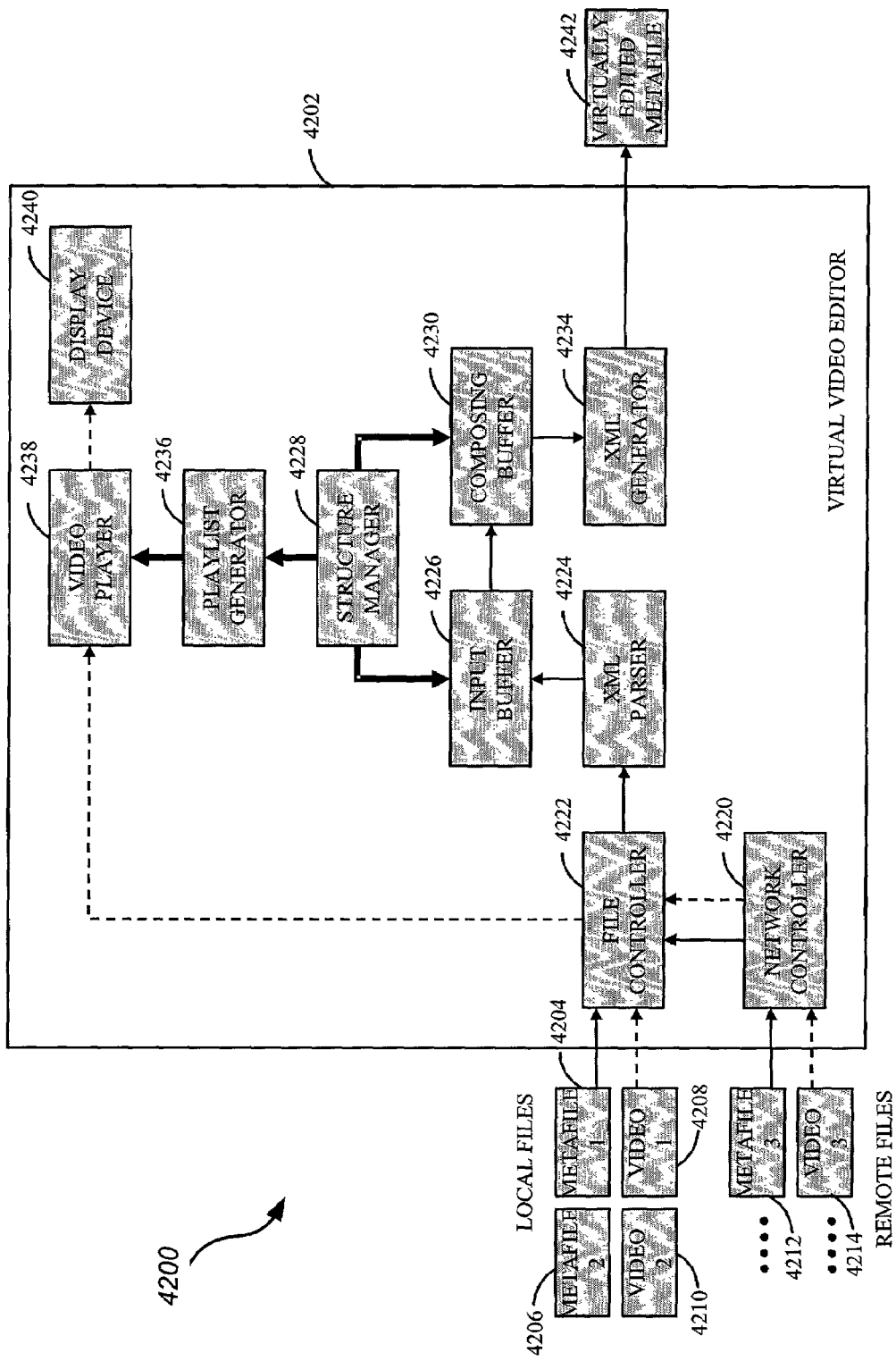
FIG. 42 is a block diagram illustrating an exemplary virtual video editor of the present invention.

FIG. 42 is the block diagram of a virtual video editor supporting virtual video editing. In FIG. 42, the dotted line represents the flow of data file, solid line the flow of metadata, and the bold solid line the flow of control signal. The major components of the virtual video editor are as follows.

The input video file (4208, 4210, 4214) and their metafile (4204, 4206, 4212) reside in the local computer or computers connected by network. In FIG. 42, video1 (4208) and video 2 (4210) resides in the local computer and video 3 (4214) in a computer connected by network. Therefor, when the video file and metafile are in the computer connected by network, its video file and metafile are transferred to the virtual video editor 4202 through network. The above process, is processed by the file controller 4222 and the network controller 4220. In other words, after the video and metafile are transferred from the network controller 4220 to user, the file controller 4222 reads the video file as well as the metafile in the local computer, or the video file and the metafile transferred by the network. The metafile read from the file controller is transferred to the XML parser 4224. After the XML parser validates whether the transferred metadata are well-formed according to XML syntax, the metadata is stored to input buffer 4226. In this case, the metadata stored in the input buffer has a hierarchical structure described in the input metafile.

A user performs virtual video editing with the structure manager 4228. First, by browsing and playing some segments of the input buffer through the display device 4240 using video player 4238, select a video segment to be copied. The process of copying the metadata of the selected segment to the composing buffer is done by the structure manager 4228. That is, all the operations related to the creation of edited hierarchical structure as well as the management done within the input buffer, such as the selection of a particular composing segment, constructing a new composing segment as well as a component segment, copying the metadata, are performed by the structure manager.

For example, assume that segment c (3320) of video 2 (3304) (see FIG. 33) is selected by the editor. The URL of video 2 is www.video.server1/video2, and the URI of a segment c 3320 in the metafile is www.video.server1/metafile2.xml#id(seg$_{13}$c). By referring to FIG. 37, the metadata of segment 'seg$_{13}$ c' of video 2 is as follows.

```
<Segment id="seg_c" title ="segment c" duration="150">
    <StartTime>230</StartTime> <MediaDuration>150<
    /MediaDuration>
    <Keyframe>...</Keyframe> <Annotation>...</Annotation>
    ...
</Segment>
```

There are two methods on copying the metadata to the component segment of a composing buffer as described in FIG. 35. First, the selected metadata itself is copied to the component segment generated at the composing buffer (see FIG. 39).

```
<Segment id="seg_c" title="segment c" duration="150">
    <MediaURI>//www.video.server1/video2</MediaURI>
    <StartTime>230</StartTime> <MediaDuration>150<
    /MediaDuration>
    <Keyframe>...</Keyframe> <Annotation>...</Annotation>
    ...
</Segment>
```

Second, only the URI of selected segment is copied to the component segment generated at the composing buffer (see FIG. 40).

```
<Segment xlink:form="simple" show="embed"
    href="//www.video.server1/metafile2.xml#id(seg_c)">
    </MediaURI>//www.video.server1/video2</MediaURI>
</Segment>
```

To indicate which input video is related to the copied metadata, the metadata of the newly created component segment contains the URL to the relevant videos of the segment.

A play list generator 4236 is used to play segments in the hierarchical structure of the input buffer or composing buffer. Through the metafile's URL and time information obtained by the metadata, the play list generator passes the play list such as FIG. 41, to video player 4238. The video player plays the segments defined in the play list sequentially. The video being played is shown through the display device 4240. When the editing is done, the hierarchical structure edited in the composing buffer is saved as metafile 4242 by the XML generator 4234.

4. Transcoding 4.1 Perceptual Hint for Image Transcoding 4.1.1 Spatial Resolution Reduction Value The present invention also provides a novel scheme for transcoding an image to fit the size of the respective client display when an image is transmitted to a variety of client devices with different display sizes. First, the method of perceptual hints for each image block is introduced, and then an image transcoding algorithm is presented as well as an embodiment in the form of a system that incorporates the algorithm to produce the desired result. The perceptual hint provides the information on the minimum allowable spatial resolution reduction for a given semantically important block in an image. The image transcoding algorithm selects the best image representation to meet the client capabilities while delivering the largest content value. The content value is defined as a quantitative measure of the information on importance and spatial resolution for the transcoded version of an image.

A spatial resolution reduction (SRR) value is determined by either the author or publisher as well as by an image analysis algorithm and can also be updated after each user interaction. SRR specifies a scale factor for the maximum spatial resolution reduction of each semantically important block within an image. A block is defined as a spatial segment/region within an image that often corresponds to the area of an image that depicts a semantic object such as car, bridge, face, and so forth. The SRR value represents the information on the minimum allowable spatial resolution, namely, width and height in pixels, of each block at which users can perceptually recognize according to the author's expectation. The SRR value for each block can be used as a threshold that determines whether the block is to be subsampled or dropped when the block is transcoded.

Consider the n number of blocks of users' interests within an image $I_A$. If one denotes the ith block as $B_i$, $I_A = \{B_i\}$, i=1, ..., n, then, the SRR value $r_i$ of $B_i$ is modeled as follows:

$$r_i \equiv \frac{r_i^{min}}{r_i^o},$$

where $r_i^{min}$ is the minimum spatial resolution that human can perceive and $r_i^o$ is the original spatial resolution of $B_i$, respectively. For simplicity, the spatial resolution is defined as the length in pixels of either the width or height in a block.

The SRR value ranges from 0 to 1 where 0.5 indicates that the resolution can be reduced by half and 1 indicates the resolution cannot be reduced. For a 100×100 block whose SRR value is 0.7, for example, the author of the block of information can indicate that the resolution of the block could be reduced up to the size of 70×70 (thus, minimum allowable resolution) without degrading the perceptibility of users. This value can then be used to determine the acceptable boundaries of resolutions that can be viewed by a given device over the system of the present invention illustrated in FIG. 53.

The SRR value also provides a quantitative measure of how much the important blocks in an image can be compressed to reduce the overall data size of the compressed image while preserving the image fidelity that the author intended.

4.1.2 Transcoding Hint for Each Image Block

The SRR value can be best used with the importance value in J. R. Smith, R. Mohan, and C.-S. Li, "Content-based Transcoding of Images in the Internet," in *Proc. IEEE Intern. Conf. on Image Processing*, October 1998; and S. Paek and J. R. Smith, "Detecting Image Purpose in World-Wide Web Documents," in *Proc. SPIE/IS&T Photonics West, Document Recognition*, January 1998. Both SRR value ($r_i$) and importance value ($s_i$) are associated with each $B_i$. Thus:

$$I_A = \{B_i\} = \{(r_i, s_i)\}, i=1, \ldots, n.$$

4.1.3 Image Transcoding Algorithm Based on Perceptual Hint 4.1.3.1 Content Value Function V Image transcoding can be viewed in a sense as adapting the content to meet resource constraints. Rakesh Mohan, et al., modeled the content adaptation process as a resource allocation in a generalized rate-distortion framework. See, e.g., R. Mohan, J. R. Smith and C.-S. Li, "Multimedia Content Customization for Universal Access," in *Multimedia Storage and Archiving Systems*, Boston, Mass.: SPIE, Vol. 3527, November 1998; R. Mohan, J. R. Smith and C.-S. Li, "Adapting Multimedia Internet Content for Universal Access," *IEEE Trans. on Multimedia*, Vol. 1, No. 1, pp. 104-14, March 1999; and R. Mohan, J. R. Smith and C.-S. Li, "Adapting Content to Content Resources in the Internet," in *Proc. IEEE Intern. Conf. on Multimedia Comp. and Systems ICMCS99*, Florence, June 1999. This framework has been built on the Shannon's rate-distortion (R-D) theory that determines the minimum bit-rate R needed to represent a source with desired distortion D, or alternately, given a bit-rate R, the distortion D in the compressed version of the source. See, C. E. Shannon, "A Mathematical Theory of Communications," Bell Syst. Tech. J., Vol. 27, pp. 379-423, 1948. They generalized the rate-distortion theory to a value-resource framework by considering different versions of a content item in an InfoPyramid as analogous to compressions, and different client resources as analogous to the bit-rates, respectively. However, the value-resource framework does not provide the quantitative information on the allowable factor with which blocks can be compressed while preserving the minimum fidelity that an author or a publisher intended. In other words, it does not provide the quantified measure of perceptibility indicating the degree of allowable transcoding. For example, it is difficult to measure the loss of perceptibility when an image is transcoded to a set of a cropped and/or scaled ones.

To overcome this problem, an objective measure of fidelity is introduced in the present invention that models the human perceptual system that is called a content value function V for any transcoding configuration C:

$$C = \{I, r\},$$

where $I \subset \{1, 2, \ldots, n\}$ is a set of indices of the blocks to be contained in the transcoded image and r is a SRR factor of the transcoded image. The content value function V can be defined as:

$$V = V(I, r)$$
$$= \sum_{i \in I} V_i(r)$$
$$= \sum_{i \in I} (s_i \cdot u(r - r_i)),$$

where $$u(x) = \begin{cases} 1, & \text{if } x \geq 0 \\ 0, & \text{elsewhere.} \end{cases}$$

The above definition of V now provides a measure of fidelity that is applicable to the transcoding of an image at different resolution and different sub-image modalities. In other words, V defines the quantitative measure of how much the transcoded version of an image can have both importance and perceptual information. The V takes a value from 0 to 1, where 1 indicates that all of important blocks can be perceptible in the transcoded version of image and 0 indicates that none can be perceptible. The value function is assumed to have the following property:

Property 1: The value V is monotonically increasing in proportion to r and I. Thus:

1.1 For a fixed I, $V(I,r_1) \leq V(I,r_2)$ if $r_1 < r_2$, 1.2 For a fixed r, $V(I_1,r) \leq V(I_2,r)$ if $I_1 \subset I_2$.

4.1.4 Content Adaptation Algorithm

Denoting the width and height of the client display size by W and H, respectively, the content adaptation is modeled as the following resource allocation problem:

maximize (V(I, r)) such that $$\begin{cases} r|x_u - x_l| \leq W \\ \text{and} \\ r|y_u - y_l| \leq H \end{cases}$$

where the transcoded image is represented by a rectangular bounding box whose lower and upper bound points are $(x_l, y_l)$ and $(x_u, y_u)$, respectively.

Lemma 1: For any I, the maximum resolution factor is given by $$r^I_{max} = \min_{i,j \in I} r_{i,j}$$

where $$r_{ij} = \min\left(\frac{W}{|x_i - x_j|}, \frac{H}{|y_i - y_j|}\right).$$

The Lemma 1 says that only those configurations C={I, r} with $r \leq r^I_{max}$ are feasible. Combined with property 1.1, this implies that for a given I, the maximum value is attainable when C={I, $r^I_{max}$}. Therefor other feasible configurations C={I, r}, $r < r^I_{max}$ do not need to be searched. At this moment, one has a naïve algorithm for finding an optimal solution: for all possible $I \subset \{1, 2, \ldots, n\}$, calculate $r^I_{max}$ by maximal resolution factor (above) and again V(I, $r^I_{max}$) by the content value function defined in the subsection 4.1.3.1 to find an optimal configuration $C_{opt}$.

The algorithm can be realized by considering a graph $R=[r_{ij}]$, $1 \leq i, j \leq n$, and noting that an I corresponds to a complete subgraph (clique) of R, and then $r^I_{max}$ is the minimum edge or node value in I.

Assume I to be a clique of degree K ($K \geq 2$). It is easily shown that among the cliques, denoted by S, of I, there are at least $2^{K-2}$ cliques whose $r^S_{max}$ is equal to $r^I_{max}$, which, according to Property 1.2, need not be examined to find the maximum value of V. Therefor, only maximal clique will be searched. Initially, r is set to $r^R_{max}$ so that all of the blocks could be contained in the transcoded image. Then r is increased discretely and for the given r, the maximal cliques are only examined. A minimum heap H is maintained in order to store and track maximal cliques with $r_{max}$ as a sorting criterion. The following pseudo-code is illustrative of finding the optimal configuration:

```
Enqueue R into H
WHILE H is not empty
    I is dequeued from H
    Calculate V(I, r^I max)
    Enqueue maximal cliques inducible from I after removing the
        critical (minimum) edge or node
END_WHILE
Print optimal configuration that maximizes V.
```

FIGS. 43 and 44 demonstrate the results of transcoding according to the method of the present invention. Specifically, FIG. 43 illustrates a comparison 4300 of a non-transformed resolution reduction scheme 4302 to a transcoded scheme 4304 of the present invention. Underneath each example is a content value parameter indicative of the "value" seen by the user. As shown in FIG. 43, the images for workstations 4306 and 4316 are identical in content value (1.0). When moved to a color PC with a smaller screen, the entire image is merely shrunk proportionally and the content value for the images 4308 and 4318 remains 1.0. However, a small television, for example, has a smaller screen. The prior art method shrinks the image 4310 yet again, bringing the resolution detail and thus the content value to 0, while the transcoding method of the present invention preserves the resolution of the areas of interest 4330 in the image 4320 while removing (cropping) relatively extraneous information and thus commands a higher content value of 0.53. This same result is illustrated for images 4312 and 4314, for the HHC and PDA of the prior art method; and for images 4322 and 4324 for the respective examples employing the method of the present invention. It should be noted that the designation of the area(s) of interest 4330 can be specified by the author or an image analysis algorithm, or it may be identified by adaptive techniques through user-feedback as explained elsewhere within this disclosure.

Similarly, FIG. 44 illustrates a comparison 4400 of a non-transformed resolution reduction scheme 4402 to a transcoded scheme 4404 of the present invention. Underneath each example is a content value parameter indicative of the "value" seen by the user. As shown in FIG. 44, the images for workstations 4406 and 4416 are identical in content value (1.0). When moved to a color PC with a smaller screen, the entire image is merely shrunk proportionally and the content value for the images 4408 and 4418 remains 1.0. However, a small television, for example, has a smaller screen. The prior art method shrinks the image 4410 yet again, bringing the resolution detail and thus the content value to 0, while the transcoding method of the present invention preserves the resolution of the area of interest 4430 in the image 4420 while removing (cropping) relatively extraneous information and thus commands a higher content value of 1.0. This same result is illustrated for images 4412 and 4414, for the HHC and PDA of the prior art method; and for images 4422 and 4424, for the respective examples employing the method of the present invention.

As described above, this disclosure has provided a novel scheme for transcoding an image to fit the size of the respective client display when an image is transmitted to a variety of client devices with different display sizes. First the notion of perceptual hint for each image block is introduced, and then an optimal image transcoding algorithm is presented.

4.2 Video Transcoding Scheme

Figure 45:
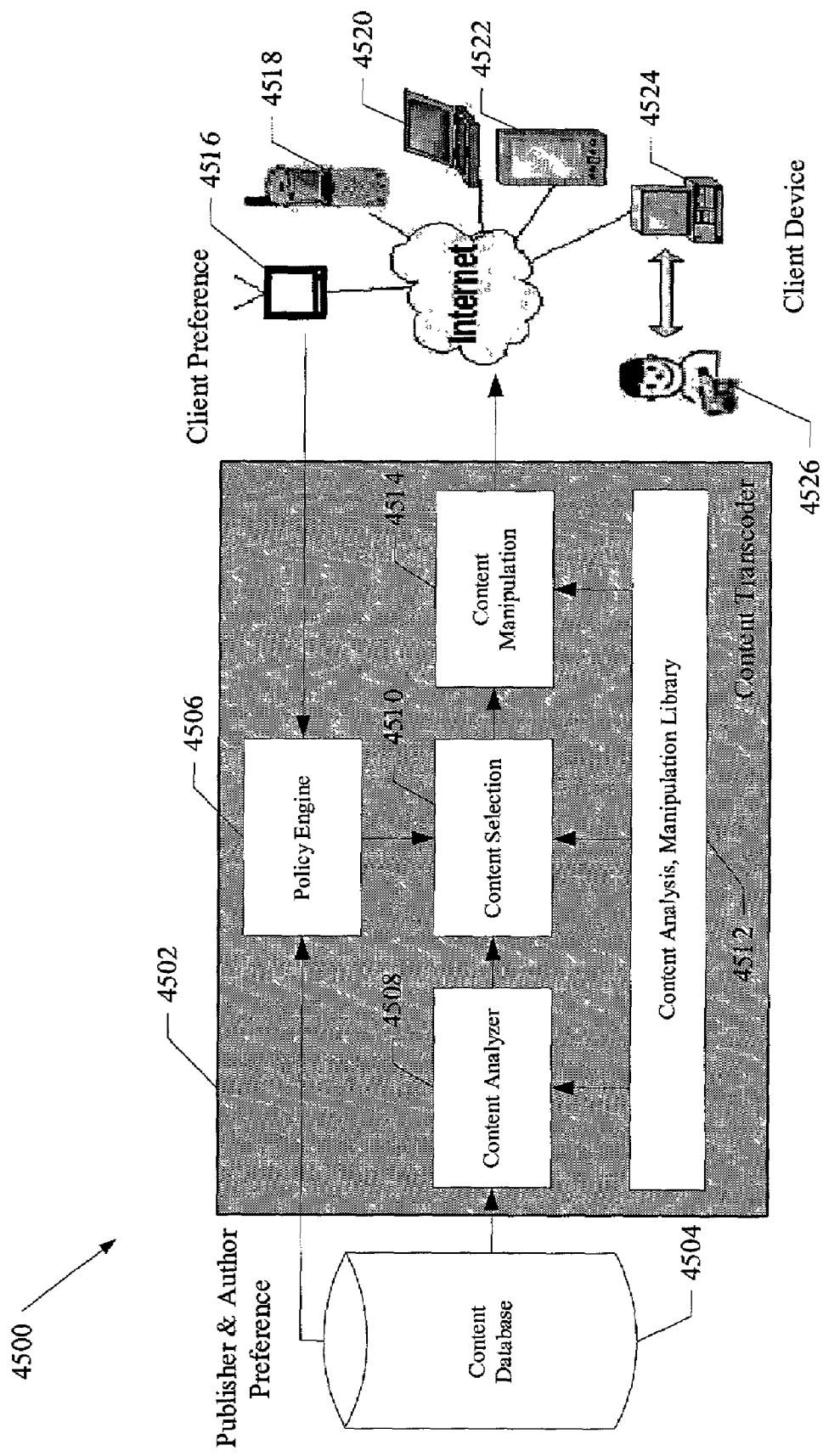
FIG. 45 is a block diagram illustrating an exemplary content transcoder of the present invention.

The method of the present invention further provides a scheme to transcode video with a variety of client devices having different display sizes. A general overview of the scheme is illustrated in FIG. 45. Generally, the content transcoder 4502 contains various modules that take data from a content database 4504, modify the content and forward the modified content to the Internet for viewing by various devices. More specifically, the system 4500 has content database 4504 that maintains content information as well as (optionally) publisher and author preferences. Upon a request, either from the Internet or from a client device such as television 4516 (or another transmitting device), a signal is received by the policy engine 4506 that resides within the content transcoder 4502. The policy engine 4506 is operative with the content database 4504 and can receive policy information from the database 4504 as illustrated in FIG. 45. Content information is retrieved from the database 4504 to the content analyzer 4508 that then forwards the content to the content selection module 4510 that is operative also with the policy engine 4506. Based upon policy and information from the content analysis and manipulation library 4512, specific content is selected and forwarded to the content manipulation module 4514, which modifies the content for viewing by the specific requesting device. It should be noted that the content analysis and manipulation library 4512 is operative with most of the main modules, specifically the content analyzer 4508 as well as the content selection module 4510 and the content manipulation module 4514. Typically, the output information from the content transcoder is forwarded to the Internet for eventual receipt and display on, for example, personal computer 4524 for the enjoyment of user 4526, personal data appliance 4522, laptop 4520, mobile telephone 4518, and television 4516.

The policy engine module 4506 gathers the capabilities of the client, the network conditions and the transcoding preferences of the user as well as from the publisher and/or author. This information is used to define the transcoding options for the client. The system then selects the output-versions of the content and uses a library of content analysis and manipulation routines to generate the optimal content to be delivered to the client device.

The content analyzer 4508 analyzes the video, namely the scene of video frames, to find their type and purpose, the motion vector direction, and face/text, etc. Based on this information, the content selection module 4510 and the manipulation module 4514 transcode the video by selecting adaptively the attention area that is defined by a position and size for a rectangular window, for example, in a video that is intended to fit the size of the respective client display. The system 4500 will select a dynamically transcoded (for example, scaled and/or cropped) area in the video without degrading the perceptibility of users. Also, this system has the manual editing routine that alters/adjusts manually the position and size of the transcoded area by the publisher and author.

Figure 46:
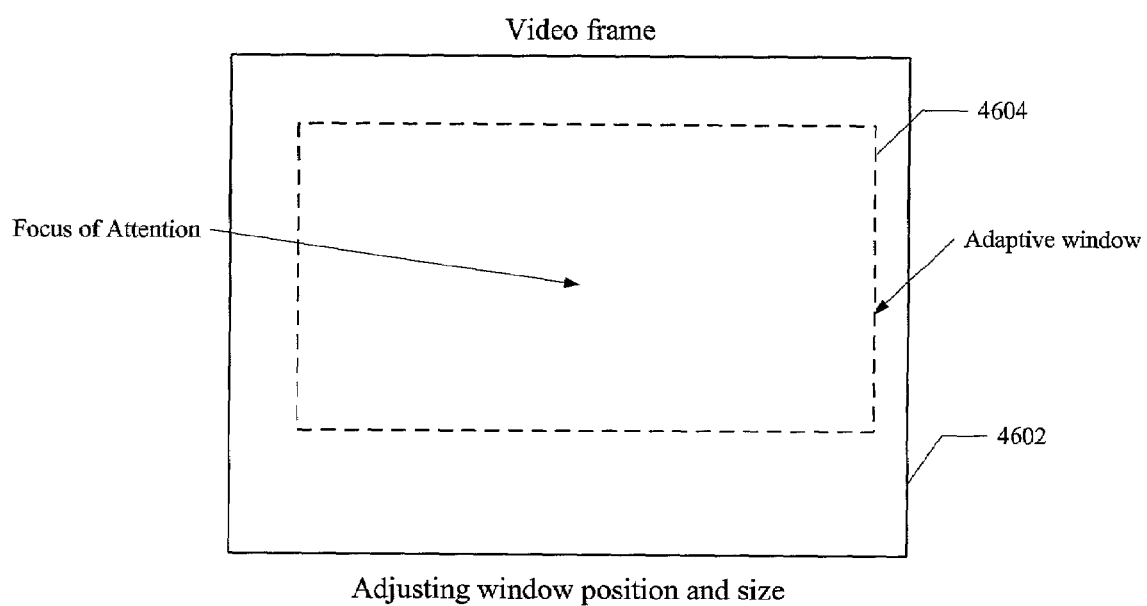
FIG. 46 is a block diagram illustrating an exemplary adaptive widow focusing method of the present invention.

FIG. 46 illustrates an example of focus of attention area 4604 within the video frame 4602 that is defined by an adaptive rectangular window in the figure. The adaptive window is represented by the position and size as well as by the spatial resolution (width and height in pixels). Given an input video, a simplified transcoding process can be summarized as:
1. Perform a scene analysis within the entire frame or certain slices of the frame;
2. Determine the widow size and position and adjust accordingly; and
3. Transcode the video according to the determined window.

Given the display size of the client device, the scene (or content) analysis adaptively determines the window position as well as the spatial resolution for each frame/clip of the video. The information on the gradient of the edges in the image can be used to intelligently determine the minimum allowable spatial resolution given the window position and size. The video is then fast transcoded by performing the cropping and scaling operations in the compressed domain such as DCT in case of MPEG-1/2.

The present invention also enables the author or publisher to dictate the default window size. That size represents the maximum spatial resolution of area that users can perceptually recognize according to the author's expectation. Furthermore, the default window position is defined as the central point of the frame. For example, one can assume that this default window size is to contain the central 64% area by eliminating 10% background from each of the four edges, assuming no resolution reduction. The default window can be varied or updated after the scene analysis. The content/scene analyzer module analyzes the video frames to adaptively track the attention area. The following are heuristic examples of how to identify the attention area. These examples include frame scene types (e.g., background), synthetic graphics, complex, etc., that can help to adjust the window position and size.

4.2.1 Landscape or Background

Computers have difficulty finding outstanding objects perceptually. But certain types of objects can be identified by text and face detection or object segmentation. Where the objects are defined as spatial region(s) within a frame, they may correspond to regions that depict different semantic objects such as cards, bridges, faces, embedded texts, and so forth. For example, in the case that there exist no larger objects (especially faces and text) than a specific threshold value within the frame, one can define this specific frame as the landscape or background. One may also use the default window size and position.

4.2.2 Synthetic Graphics

One may also adjust the window to display the whole text. The text detection algorithm can determine the window size.

4.2.3 Complex

In the case of the existing recognized (synthetic or natural) objects whose size is larger than a specific threshold value within the frame, initially one may select the most important object among objects and include this object in the window. The factors that have been found to influence the visual attention include the contrast, shape, size and location of the objects. For example, the importance of an object can be measured as follows:
1. Important objects are in general in high contrast with their background;
2. The bigger the size of an object is, the more important it is;
3. A thin object has high shape importance while a rounder object will have lower one; and
4. The importance of an object is inversely proportional to the distance of center of the object to the center of the frame.

At a highly semantic level, the criteria for adjusting the window are, for example:
1. Frame with text at the bottom such as in news; and
2. Frame/scene where two people are talking each other. For example, person A is in the left side of the frame. The other is in the right side of the frame. Given the size of the adaptive window, one cannot include both in the given window size unless the resolution is reduced further. In this case, one has to include only one person.

5. Visual Rhythm

The visual rhythm of a video is a single image, that is, a two-dimensional abstraction of the entire three-dimensional content of the video constructed by sampling certain group of pixels of each image sequence and temporally accumulating the samples along time. Each vertical line in the visual rhythm of a video consists of a small number of pixels sampled from a corresponding frame of the video according to a specific sampling strategy. FIG. 26 shows several different sampling strategies 2600 such as horizontal sampling 2603, vertical sampling 2605, and diagonal sampling 2607. For example, the diagonal sampling strategy 2607 is to sample some pixels regularly from those lying at a diagonal line of each frame of a video. The sampling strategies illustrated in FIG. 26 are only a partial list of all realizable sampling strategies for visual rhythm utilized for many useful applications such as shot detection and caption text detection.

The sampling strategies must be carefully chosen for constructing the visual rhythm to retain the edit effects that characterize shot changes. Diagonal sampling provides the best visual features for distinguishing various video editing effects on the visual rhythm. All visual rhythms presented hereafter are assumed to be constructed using the diagonal sampling strategy for shot detection. But the presented invention can be easily applied to any sampling strategy.

The construction of visual rhythm is, however, a very time-consuming process using conventional video decoders for digital video because they are designed to decode all pixels composing a frame while visual rhythm requires only a few pixels of a frame. Therefor, one needs an efficient method to construct visual rhythm as fast as possible in compressed video. The method will thus enable the time of shot detection process to be greatly reduced, as well as the text caption detection process, or any other application derived from it.

In video terminology, a compression method that employs only spatial redundancy is referred to as an intraframe coda, and frames coded in such a way are defined as intra-coded frames. Most video coders adopt block-based coding either in the spatial or transform domain for intraframe coding to reduce spatial redundancy. For example, MPEG adopts discrete cosine transform (DCT) of 8×8 block into which 64 neighboring pixels are exclusively grouped. Therefor, whatever compression scheme (DCT, discrete wavelet transform, vector quantization, etc.) is adopted for a given block, one need only decompress a small number of blocks in an intra-coded frame, instead of decoding the whole blocks composing the frame when only few pixels out of the whole pixels are needed. This situation is similarly applied to loose JPEG on individual images. In order to achieve optimum compression, most video coders also use a method that exploits the temporal redundancy between frames, referred as interframe coding (predictive, interpolate) by tracking the N×M block in the reference picture that better matches (according to a given criterion) the characteristics of the block in the current picture, in which for the specific case of MPEG compression standard N, M=16, commonly referred to as macroblock. However, the present invention does not restrict to this rectangular geometry but assumes that the geometry of the matching block at the reference picture need not be the same as the geometry of the block in the current picture, since objects in the real world undergo scale changes as well as rotation and warping. An efficient way to only decode the actual group of pixels needed for constructing visual rhythm of such a hybrid (intraframe and interframe) coded frames can be processed as follows:

1. Out of the blocks composing a given frame sequence, decode only the blocks needed to decode the blocks containing at least one pixel, selected by a predetermined sampling strategy for constructing visual rhythm; and
2. Obtain the pixel values for constructing visual rhythm from the decoded blocks.

Figure 22:
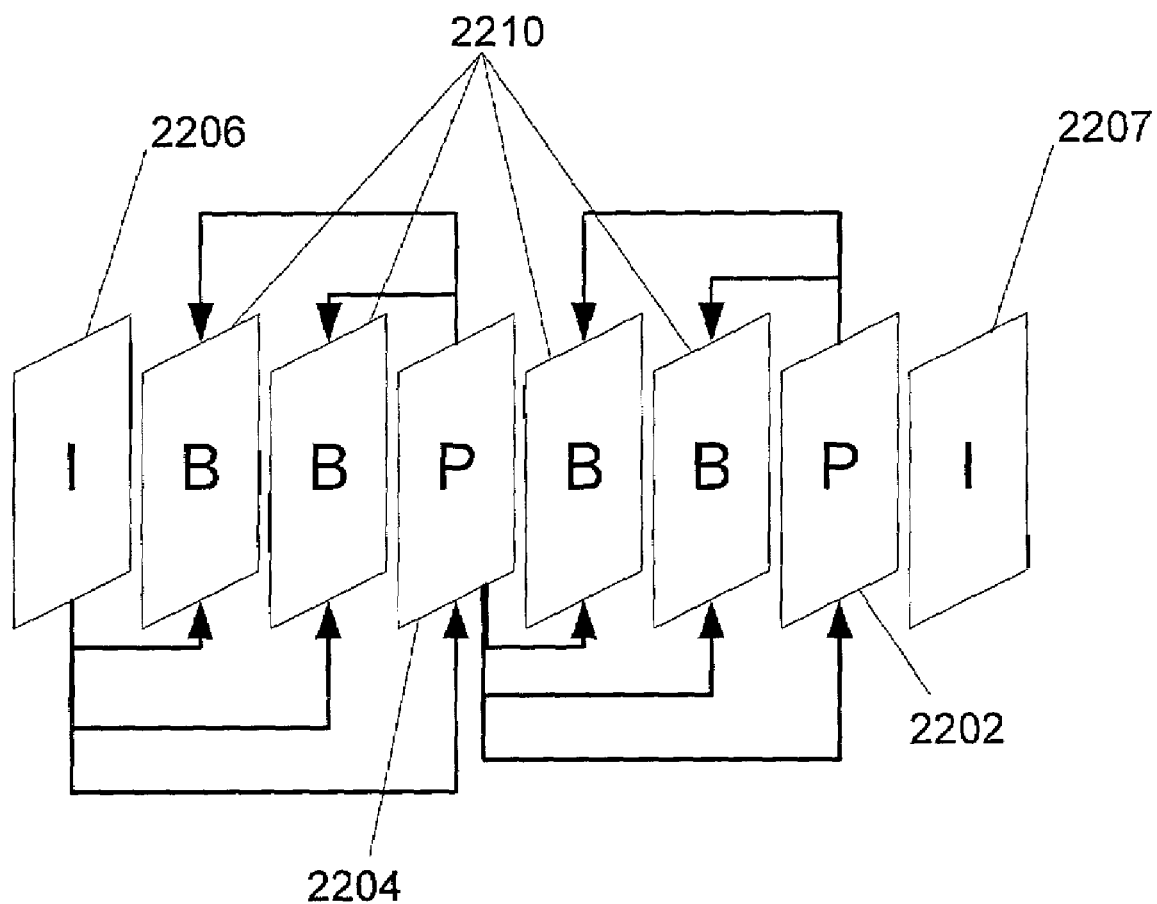
FIG. 22 is a block diagram illustrating an exemplary data correlation method of the present invention.

For example, define three different types of pictures using the MPEG-1 terminology. Intra-pictures (I-pictures) are compressed using intraframe coding; that is, they do not reference any other pictures in the coded bit stream. Referring to FIG. 22, predicted pictures (P-picture) 2204 and 2202 are coded using motion-compensated prediction from past I-picture 2206 or P-picture 2204, respectively. Bidirectionally predicted picture (B-pictures) 2210 are coded using motion-compensated prediction from either past and/or future I-pictures 2206 or P-pictures 2204 and 2202. Therefor, given a pixel selected by a predetermined sampling strategy for constructing visual rhythm, one needs only decode the blocks in I-, P- and B-pictures needed to decode the block containing the corresponding pixel in the current picture.

Many video coding applications restrict the search to a $[-p, p-1]$ region around the original location of the block due to the computation-intensive operations to find an N×M pixel region in the reference picture that better matches (according to a given criterion) the characteristics of N×M pixel region in the current picture. This implies that one need only decompress the blocks within the $[-p, p-1]$ region around original location of the blocks containing the pixels to be sampled for constructing visual rhythm in pictures possibly referenced by other picture types for motion compensation. For pictures that cannot be referenced by other picture types for motion compensation, one only needs to decompress the blocks containing the pixels sampled for visual rhythm.

Figure 23:
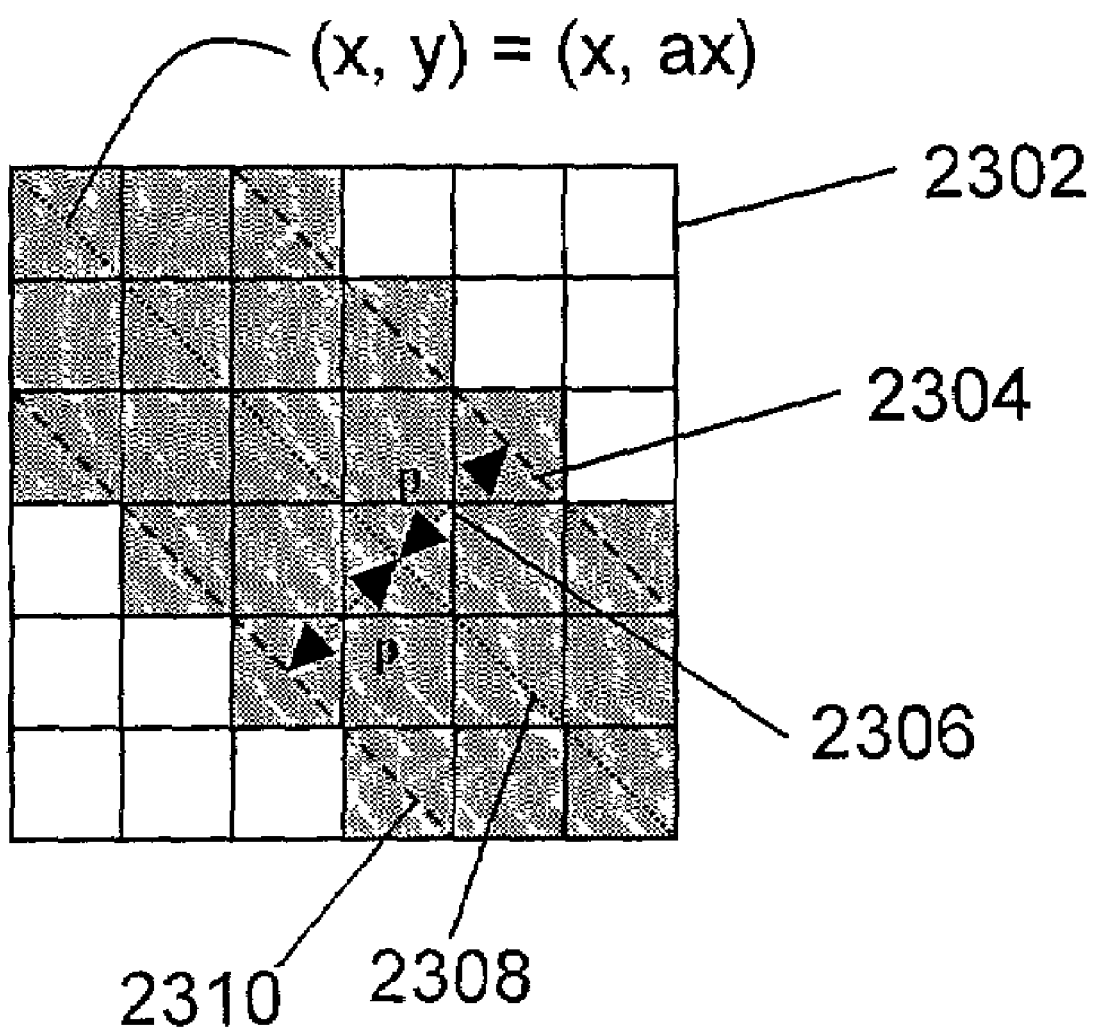
FIG. 23 is a block diagram illustrating an exemplary swiping technique of the present invention.
Figure 24:
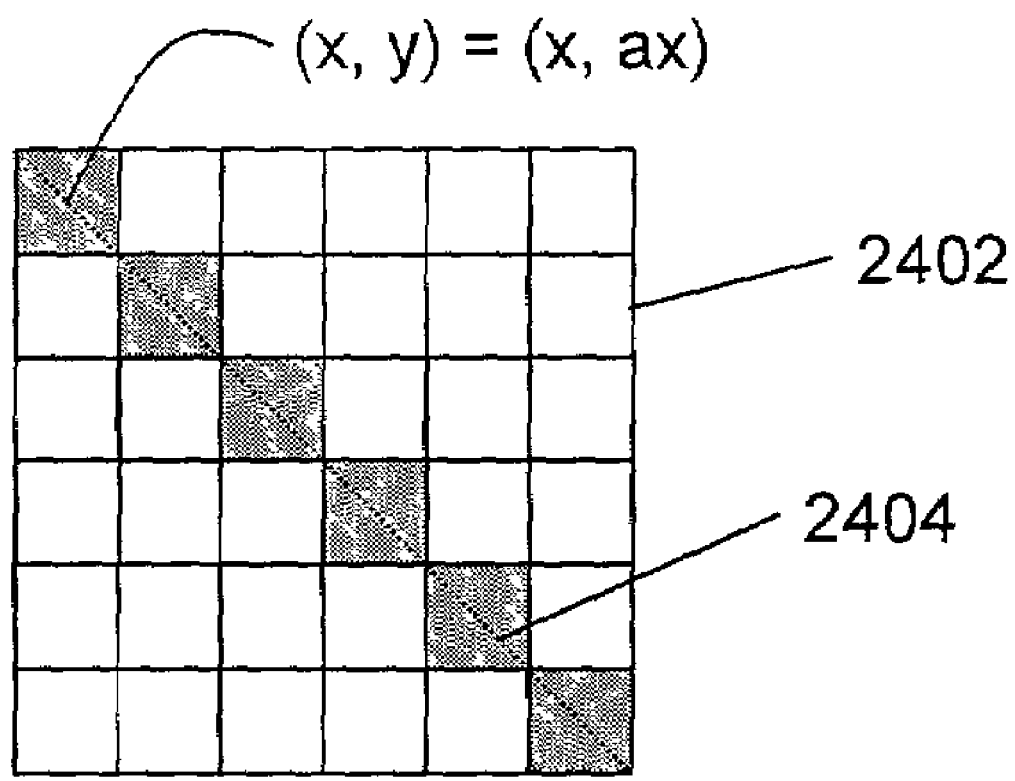
FIG. 24 is a block diagram illustrating an alternate exemplary swiping technique of the present invention.

For example, FIG. 23 and FIG. 24 illustrate the shaded blocks that need to be decompressed for the construction of visual rhythm in frames that can be referenced by other frames for motion compensation and frames that can't be referenced by other frames, respectively. Visual rhythm constructed by sampling the diagonal pixels located on 2308 of a frame 2302, one only needs to decompress the shaded blocks in FIG. 23 which lie in between the lines 2304 and 2310 (separated by value 2306, the search range p of motion prediction). For frames not referenced by other frames (B-pictures), one simply needs to decompress the blocks located along the diagonal line 2404 of the frame 2402 as illustrated in FIG. 24.

Such approach allows one to obtain certain group of pixels without decoding unnecessary blocks and guarantees that the pixel values obtained from the decoded blocks can be obtained for constructing visual rhythm even without fully decoding the whole blocks composing each frame sequence.

For some compression schemes using the discrete cosine transform (DCT) for intra-frame coding like Motion-JPEG and MPEG or any other transform domain compression schemes such as discrete wavelet transform, it is further possible to reduce the time for constructing visual rhythm. For example, a DCT block of N×N pixels is transformed to the frequency domain representation resulting in one DC and (N×N−1) AC coefficients. The single DC coefficient is N-times the average of all N×N pixel values. It means that the DC coefficient of a DCT block can be served as a pixel value of a pixel included in the block if accurate pixel values may not be required. Extraction of a DC coefficient from a DCT block can be performed fast because it does not fully decode the DCT block. In the present invention, after recognizing the shaded blocks illustrated in FIGS. 23 and 24, the extraction of DC coefficients from the blocks can be utilized instead of fully decoding the blocks and obtaining the pixel values of the pixels that will be selected by a predetermined sampling strategy for constructing visual rhythm. The same approach can be applied to any given compression scheme by only utilizing any coefficients readily available through compression.

Fast Text Detection

For the design of an efficient real-time caption text locator, resort is made of using a portion of the original video called a partial video. The partial video must retain most, if not all, of the caption text information. The visual rhythm, as defined below, satisfies this requirement. Let $f_{DC}(x,y,t)$ be the pixel value at location (x,y) of an arbitrary DC image that consists of the DC coefficients of the original frame t. Using the sequences of DC images of a video called the DC sequence, the visual rhythm VR of the video V is defined as follows:

$$VR = \{f_{VR}(z,t)\} = \{f_{DC}(x(z),y(z),t)\}$$

where x(z) and y(z) are one-dimensional functions of the independent variable z. Thus, the visual rhythm is a two-dimensional image consisting of DC coefficients sampled from a three-dimensional data (DC sequence). Visual rhythm is also an important visual feature that can be utilized to detect scene changes.

The sampling strategies, x(z) and y(z), must be carefully chosen for the visual rhythm to retain caption text information. One sets x(z), y(z) as:

$$(x(z), y(z)) = \begin{cases} \left(\frac{W}{H}z, z\right), & 0 \le z < H \\ \left(2W - \frac{W}{H}z, z - H\right), & H \le z < 2H \\ \left(\frac{W}{2}, z - 2H\right), & 2H \le z < 3H \end{cases}$$

where W and H are the width and the height of the DC sequence, respectively.

The sampling strategies above are due partially, if not entirely, to empirical observations that portions of caption text generally tend to appear on these particular region. FIG. 26 illustrates a set of sampling strategies for constructing visual rhythm from a set of frames making up a video stream. Specifically, the frame sequence 2602 utilizes a single horizontal sampling 2603 across the middle of the frame. Alternatively, the frame sequence 2604 utilizes vertical sampling 2605 from top to bottom of the frame midway between the left and right sides. Finally, the frame sequence 2606 utilizes diagonal sampling 2607 from one corner of the frame to the catty corner. It will be understood that the scanning techniques noted above can be mixed and matched (e.g., combining vertical and diagonal) and that multiple scans can take place (e.g., multiple horizontal scans, or cross-diagonal scans) to enhance the search, albeit with a potential performance loss due to the extra computational overhead. However, the sampling strategies can be set in a flexible manner for text detection of specific video materials where the approximate regions of caption text are known a priori.

FIG. 27(a) shows an example of visual rhythm when diagonals of a frame are sampled. Referring to FIG. 27(c), frame 2714 is one of a set of frames used to construct binarized visual rhythm 2712 where only the pixels 2718 corresponding to caption text are represented in white. A caption 2716 is embedded in the frame 2714 and the subsequent set of frames used to construct the binarized visual rhythm 2712 so that "caption line" 2718 is formed within the binarized visual rhythm 2712. FIG. 27(a) and FIG. 27(b) illustrate the visual rhythm 2702 of video content (FIG. 27(a)) and its corresponding binarized visual rhythm 2708 where pixels corresponding to caption 2710 are represented in white (FIG. 27(b)). Caption text embedded in zone 2706 of visual rhythm illustrated in FIG. 27(a) shows that caption possess certain properties such as in region 2704. This region 2704 of FIG. 27(a) can be separated and is represented in white 2710 as in FIG. 27(b) to form binarized visual rhythm 2708. Once the binarized visual rhythm 2708 is obtained, only a portion of the content of the entire frame need be scanned in order to extract the textual information in order to create appropriate multimedia bookmarks according to the method of the present invention. As illustrated in FIG. 28, the method of the present invention similarly enables to locate the caption text 2804 of a frame 2802, as well as multiple captions 2808, 2810, and 2812 from another frame 2806 and extract the text and obtain the binarized results 2804', 2808', 2810', and 2812' for subsequent processing, recognizing text, indexing, storing and retrieving.

Caption Frame Detection

The caption frame detection stage seeks for caption frames, which herein are defined as a video or an image frame that contains one or more caption text. Caption frame detection algorithm is based on the following characteristics of caption text within video:

1. Characters in a single caption text tend to have similar color;
2. Captioned text tends to retain their size and font over multiple frames;
3. Text caption is either stationary or linearly moving;
4. Text caption contrast with their background; and
5. Text caption remains in the scene for a number of consecutive frames.

It is preferable to restrict oneself to locating only stationary caption text because stationary text is more often an important carrier of information and herewith more suitable for indexing and retrieving than moving caption text. Therefor, for purposes of this disclosure reference is made to stationary caption text for caption text mentioned in the rest of this disclosure.

With the above characteristics of video, one could observe that pixels corresponding to caption text sampled from portions of DC sequence manifest themselves as long horizontal line 2704 in high contrast with their background on the visual rhythm 2702. Hence, horizontal lines on the visual rhythm in high contrast with their background are mostly due to caption text, and they provide clues of when each caption text appears within the video. Thus, visual rhythm serves as an important visual feature for detecting caption frames.

First of all, to detect caption frames, horizontal edge detection is performed on visual rhythm using Prewitt edge operator with convolution kernels $$\begin{bmatrix} -1 & -1 & -1 \\ 0 & 0 & 0 \\ 1 & 1 & 1 \end{bmatrix}$$

on visual rhythm to obtain $VR_{edge}(z,t)$ as follows:

$$VR_{edge}(z, t) = \sum_{i=-1}^{1} \sum_{j=-1}^{1} w_{i,j} f_{VR}(z+j, t+i)$$

To obtain caption line defined as horizontal line on the visual rhythm, possibly formed due to portions of caption text, edge values $VR_{edge}(z,t)$ value greater than $\tau=150$ and edge values $VR_{edge}(z,t)$ are connected in the horizontal direction. Caption lines with lengths shorter than frame length corresponding to a specific amount of time is neglected, since caption text usually remains in the scene for a number of consecutive frames. Through several experiments on various types of video materials, shortest captions appear to be active for at least two seconds, which translates into a caption line with frame length of 60 if the video is digitized at 30 frames per second. Thus caption lines with length less than 2 seconds can be eliminated. The resulting set of caption lines with the temporal duration appear in the form:

$$LINE_k, [z_k, t_k^{start}, t_k^{end}], k=1, \ldots, N_{LINE}$$

where $[z_k, t_k^{start}, t_k^{end}]$ denotes the Z coordinate, beginning and end frame of the occurrence of caption line $LINE_k$ on the visual rhythm, respectively, and $N_{LINE}$ is the total number of caption lines. The caption lines are ordered by increasing starting frame number:

$$t_1^{start} \leq t_2^{start} \leq \ldots \leq t_{N_{LINE}}^{start}$$

FIG. 27(b) shows $VR_{Binarized}(z,t)$, the binarized visual rhythm representing caption lines in white 2710 possibly formed due to caption text from visual rhythm of FIG. 27(a), where $$VR_{Binarized}(z, t) = \begin{cases} 1, & z = z_k, t_k^{start} \leq t \leq t_k^{end} \\ 0, & \text{elsewhere} \end{cases}$$

where $k=1, \ldots, N_{LINE}$.

The frames not in between the temporal duration of the resulting set of caption lines can be assumed to not contain any caption text and are thus omitted as caption frame candidates.

Caption Text Localization

Caption text localization stage seeks to spatially localize caption text within the caption frame along with its temporal duration within the video.

Let $f_{DC}(x,y,t)$ be the pixel value at (x,y) of the DC image of frame t. Given the sampling strategy in equation (2) for the visual rhythm, caption line, $LINE_k$, is formed due to a portion of caption text located on $(x,y)=(x(z_k), y(z_k))$ in DC sequences between $t_k^{start}$ and $t_k^{end}$.

Furthermore, if a portion of caption text is located on $(x,y)=(x(z_k), y(z_k))$ within a DC image, one can assume for other portions of caption text to appear along $y=y(z_k)$ because caption text is usually horizontally aligned. Therefor, a caption line can be used to approximate the location of caption text within the frame, and enable one to provide an algorithm to focus on specific area of the frame.

Thus, from the above observations, for each $LINE_k$ it is possible to simply segment caption text region located along $y=y(z_k)$ on a DC image in between $t_k^{start}$ and $t_k^{end}$ and assume this segmented region to appear along the temporal duration of caption line $LINE_k$.

To localize a caption text candidate regions for caption line $LINE_k$, it is preferable to cluster pixels with values $f_{VR}(z_k,t)\pm\delta$ (where $\delta=10$) from the pixels of horizontal scanline $y=y(z_k)$ with value $f_{VR}(z_k,t)$, using 4-connected clustering algorithm in DC image of frame t, where $t=(t_k^{start}+t_k^{end})/2$. This is partially because the character in a single text caption tends to have similar color and is horizontally aligned. Each of the clustered regions contains the value of leftmost, rightmost, top and down location of the pixels that are merged together.

Once the clustered regions have been obtained for $LINE_k$, one needs to merge regions corresponding to portions of a caption text to form bounding box around the caption text. It is preferable to verify whether each region is formed by caption text based upon the heuristic obtained through empirical observations on text across a range of text sources. Because the focus is on finding caption text, a clustered region should have similar clustered regions nearby that belong to the same caption text. Such heuristic can be described using connectability, which is defined as:

Let A and B be different text candidate regions. A and B are connectable if they are of similar height and horizontally aligned, and there is a path between A and B.

Here, two regions are considered to be of similar height if the height of a shorter region is at least 40% of the height of a taller one. To determine the horizontal alignment, regions are project onto the Y-axis. If the overlap of the projections of two regions is at least 50% of the shorter one, they are considered to be horizontally aligned. In addition, it is clear that regions corresponding to the same caption text should be close to each other. By empirical observations, the spacing between the characters and words of a caption text is usually less than three times the height of the tallest character, and so is the width of a character in most fonts. Therefor, the following criterion is optionally used to merge regions corresponding to portions of caption text to obtain a bounding box around the caption text:

Two regions, A and B, are merged if they are connectable and there is a path between A and B whose length is less than 3 times the height of the taller region.

Moreover, the aspect-ratio constraint can be enforced on the final merged regions:

$$\frac{Width}{Height} > \tau_A, (\tau_A = 0.7).$$

where Width and Height are the width and height of the final caption text region.

The caption text region is expected to meet the above constraint; otherwise, they are removed as text regions. The final caption text region takes the temporal duration of its corresponding caption line.

The above procedures are iterated to obtain a bounding box around the caption text for each caption line $LINE_K$, in increasing order of k ($k=1, \ldots, N_{LINE}$). However, since several caption lines are usually formed due to the same caption text, the caption text localization process is omitted for a caption line $LINE_k$ if there exists any caption text region obtained beforehand on the horizontal scanline $y=y(z_k)$. The usefulness of this text region extraction step is that it is inexpensive and fast, robustly supplying bounding boxes around caption text along with their temporal information.

The present invention, therefor, is well-adapted to carry out the objects and attain both the ends and the advantages mentioned, as well as other benefits inherent therein. While the present invention has been depicted, described, and is defined by reference to particular embodiments of the invention, such references do not imply a limitation on the invention, and no such limitation is to be inferred. The invention is capable of considerable modification, alternation, alteration, and equivalents in form and/or function, as will occur to those of ordinary skill in the pertinent arts. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of generating and using a multimedia bookmark for a position selected within a multimedia file of a multimedia content, comprising:

generating bookmark position information identifying a selected position within said multimedia file;

generating a title or image representing said selected position;

linking said title or image and said bookmark position information to stored profile information for said multimedia file and variations of said multimedia content, wherein said profile information includes an offset and a scale of each of a plurality of multimedia files containing said content with respect to a master file of said multimedia content;

invoking the multimedia bookmark; and calculating a playback position of a playback file based on said bookmark position information, where said calculating comprises:

i) $P_p = s \times P_b$     if $o_p = s \times o_b$ ii) $P_p = s \times P_b + (|o_p| + |s \times o_b|)$     if $o_p > 0 > s \times o_b$ iii) $P_p = s \times P_b + (|o_p - s \times o_b|)$     if $o_p > s \times o_b \geq 0$ or $0 \geq o_p > s \times o_b$ iv) $P_p = s \times P_b - (|o_p| + |s \times o_b|)$     if $o_p < 0 < s \times o_b$ v) $P_p = s \times P_b - (|o_p - s \times o_b|)$     if $0 \leq o_p < s \times o_b$ or $o_p < s \times o_b \leq 0$.

where $P_p$ is the playback position;
$P_b$ is the bookmarked position;
$o_b$ is an offset of the multimedia file;
$o_p$ is an offset of the playback file; and
s is equal to $s_p/s_b$ where $s_p$ is a scale of the playback file and $s_b$ is a scale of the multimedia file.

2. The method of claim 1 additionally comprising, prior to said generating position information:
selecting a multimedia file;
playing said selected multimedia file; and
invoking an add-bookmark command.

3. The method of claim 1 wherein said linking includes linking to an offset table containing offset values for cases where frame skipping occurs.

4. The method of claim 3 additionally comprising computing the offset values stored in said offset table by:
choosing a referential segment;
aligning the start position of said referential segment in a master file with the start position of said referential segment in a slave file; and
computing the difference in start times.

5. The method of claim 4 wherein said choosing a referential segment includes using video matching techniques to locate a segment in a video bounded by two specific boundaries.

6. A method of locating a playback position in a multimedia playback file based on a multimedia bookmark generated in connection with a bookmarked multimedia file, said method comprising:

selecting a multimedia file, referred to as a playback file;

invoking a multimedia bookmark from which a bookmarked position can be determined, additionally, by using said multimedia bookmark, enabling access to an offset and a scale for each of said playback file and said bookmarked multimedia file from which said multimedia bookmark was generated;

determining a time scale ratio from said scale for said playback file and said scale for said bookmarked file; and calculating a playback position based on said bookmarked position, said time scale ratio, said offset for said playback file, and said offset for said bookmarked file;

wherein said calculating comprises:

i) $P_p = s \times P_b$     if $o_p = s \times o_b$ ii) $P_p = s \times P_b + (|o_p| + |s \times o_b|)$     if $o_p > 0 > s \times o_b$ iii) $P_p = s \times P_b + (|o_p - s \times o_b|)$     if $o_p > s \times o_b \geq 0$ or $0 \geq o_p > s \times o_b$ iv) $P_p = s \times P_b - (|o_p| + |s \times o_b|)$     if $o_p < 0 < s \times o_b$ v) $P_p = s \times P_b - (|o_p - s \times o_b|)$     if $0 \leq o_p < s \times o_b$ or $o_p < s \times o_b \leq 0$.

where $P_p$ is the playback position;
$P_b$ is the bookmarked position;
$o_b$ is the offset of the bookmarked file;
$o_p$ is the offset of the playback file; and
s is equal to $s_p/s_b$ where $s_p$ is the scale of the playback file and $s_b$ is the scale of the bookmarked file.

7. The method of claim 6 wherein said enabling access includes enabling access to an offset table containing offset values for cases where frame skipping occurs.

8. The method of claim 7 additionally comprising computing the offset values stored in said offset table by:
choosing a referential segment;
aligning the start position of said referential segment in a master file with the start position of said referential segment in a slave file; and
computing the difference in start times.

9. The method of claim 8 wherein said choosing a referential segment includes using video matching techniques to locate a segment in a video bounded by two specific boundaries.

\* \* \* \* \*